(12) United States Patent
Matsuzaki et al.

(10) Patent No.: US 6,813,357 B1
(45) Date of Patent: Nov. 2, 2004

(54) EXCLUSIVE KEY SHARING METHOD

(75) Inventors: Natsume Matsuzaki, Kanagawa (JP); Jun Anzai, Kanagawa (JP); Tsutomu Matsumoto, Kanagawa (JP)

(73) Assignee: Matsushita Communication Industrial Co., Ltd., Yokohama (JP)

( * ) Notice: Subject to any disclaimer, the term of this patent is extended or adjusted under 35 U.S.C. 154(b) by 0 days.

(21) Appl. No.: 09/622,941

(22) PCT Filed: Dec. 22, 1999

(86) PCT No.: PCT/JP99/07234
§ 371 (c)(1),
(2), (4) Date: Aug. 24, 2000

(87) PCT Pub. No.: WO00/39957
PCT Pub. Date: Jul. 6, 2000

(30) Foreign Application Priority Data

| Dec. 25, 1998 | (JP) | P.10-368817 |
| Jan. 20, 1999 | (JP) | P.11-12227 |
| Mar. 9, 1999 | (JP) | P.11-62247 |
| Aug. 30, 1999 | (JP) | P.11-242877 |

(51) Int. Cl.$^7$ .................................. H04N 7/167
(52) U.S. Cl. .................. 380/279; 380/278; 380/283; 380/28; 380/45
(58) Field of Search .................. 380/279, 278, 380/283, 284, 45, 28, 30

(56) References Cited

FOREIGN PATENT DOCUMENTS

| JP | 5-46731 | 7/1993 |
| JP | 09-212089 | 8/1997 |
| JP | 10-022991 | 1/1998 |
| JP | 10-107832 | 4/1998 |
| JP | 10-336745 | 12/1998 |
| JP | 11-220463 | 8/1999 |

OTHER PUBLICATIONS

Cramer, R. et al., "Practical Public Key Crytosystem Provably Secure Against Adaptive Chosen Ciphertext Attack", *Advances in Crytology*, 1998, pp. 13–25.

Menezes, P. et al., *Handbook of Applied Cryptography*, 1997, p. 526.

Pedersen, T., "Distributed Provers with Applications to Undeniable Signatures", *Proc. Of Eurocrypt'*, pp. 221–242.

[1]Cramer, Ronald and [1]Shoup, Victor. "A Practical Public Key Cryptosystem Provably Secure against Adaptive Chosen Ciphertext Attack" *from Lecture Notes in "Computer Science: vol. 1462(Aug. 1998)"*, [1]Institute for Theoretical Computer Science, ETH Zurich, 8092 Zurich, Switzerland, cramer@inf.ethz.ch, [2]IBM Zurich Research Laboratory, Säumestr. 4, 8803 Rüschlikon, Switzerland, sho@zurich.ibm.com, pp. 13–25.

(List continued on next page.)

Primary Examiner—Thomas R. Peeso
(74) Attorney, Agent, or Firm—Morgan, Lewis & Bockius, LLP

(57) ABSTRACT

In a set-up phase, the base station formulates the secret key S and holds it in secret. The secret information Si which are obtained by dividing the secret key S are distributed in secret to respective terminals 1 to 5 by using cryptographic communication means. In a preparatory phase, the base station 0 broadcasts the preparatory information $C1(=g^k \bmod p)$, the exclusive information $C2(=y5^k \bmod p)$, the ciphertext $C3(= M \times K \bmod p)$, and the particular terminal number 5 to all terminals. In a key sharing phase, the terminal 1 calculates a product of $C1^{\wedge}(\lambda(1, \Lambda) \bmod q) \bmod p$ and $C2^{\wedge}(\lambda(5, \Lambda) \bmod q) \bmod p$ by using the preparatory information C1 and the exclusive information C2 to obtain K and then calculates M, which are common data to the base station 0, by dividing the ciphertext C3 by K. The terminals 2 to 4 execute similar calculations. As a result, the terminals 1 to 4 can share mutually the common data M.

66 Claims, 32 Drawing Sheets

OTHER PUBLICATIONS

[1]Nyber, Kaisa and [2]Rueppel, Rainer A. "Message Recovery for Signature Schemes based on the Discrete Logarithm Problem" *from Lecture Notes in "Computer Science: vol. 950 (May 1994)"*, (1998), ©Springer–Verlag, [1]Vienna, Austria, [2]R[3] Security Engineering AG, Switzerland, pp. 182–193.

Zheng, Yuliang and Seberry, "Practical Approaches to Attaining Security against Adaptively Chosen Ciphertext Attacks (Extended Abstract)" *from Lecture Notes in "Computer Science: vol. 740 (Aug. 1992)"*, The Centre for Computer Security Research, Department of Computer Science, University of Wollongong, Locked Bag 8844, Wollongong, NSW 2521, Australia, E–mail: {yuliang, jennie}@cs.uow.edu.au, ©Springer–Verlag (1998), pp. 292–304.

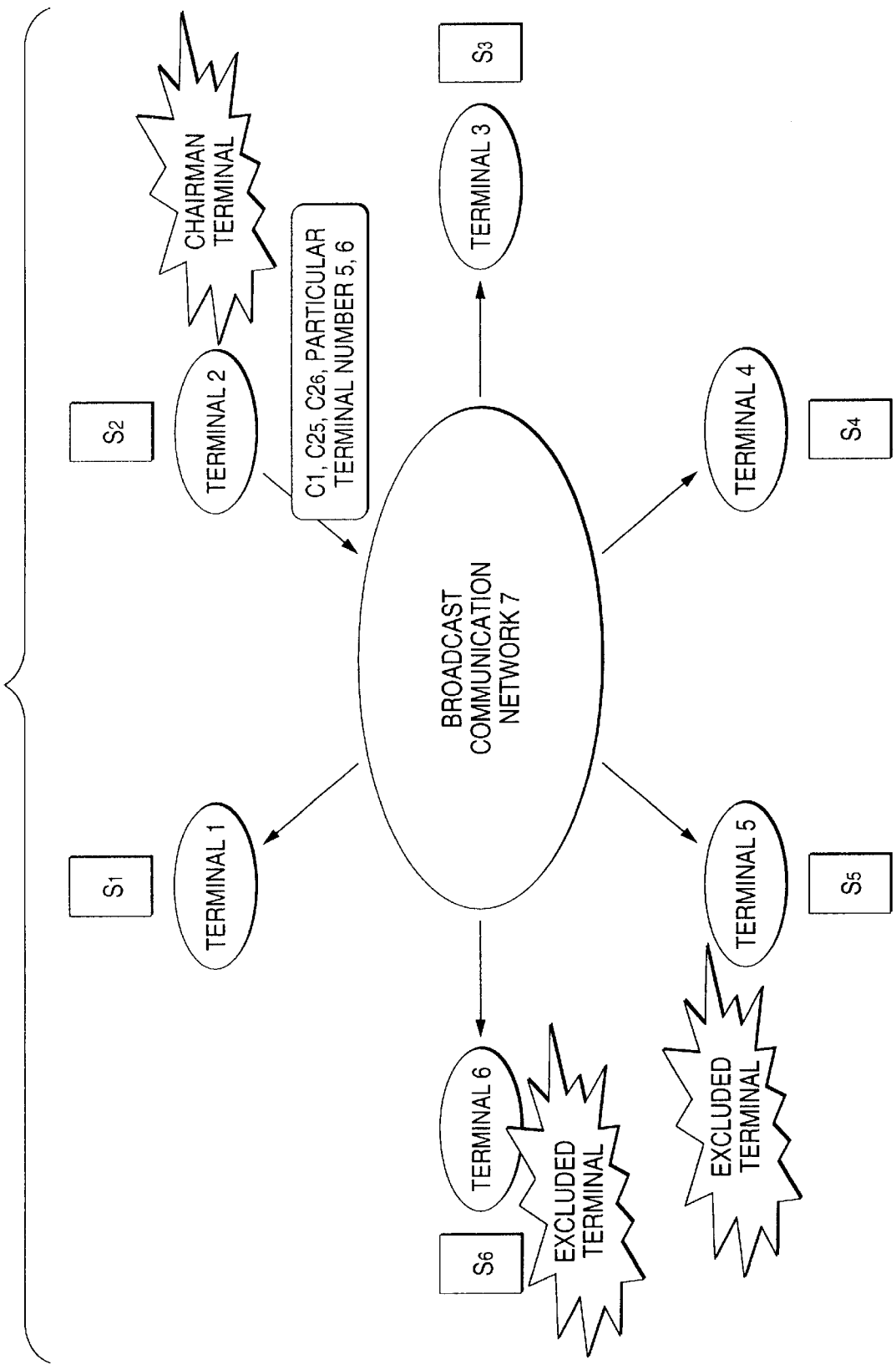

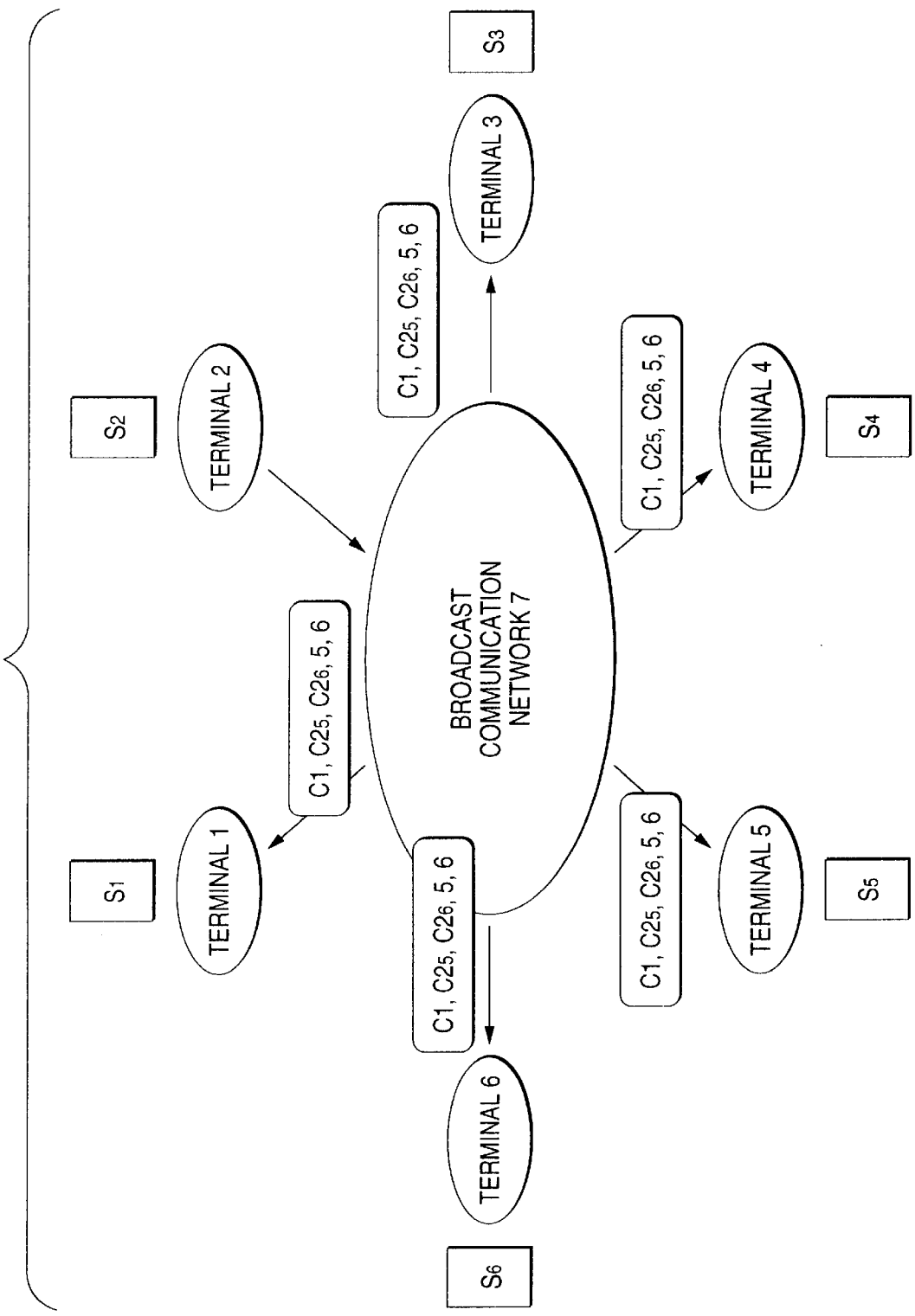

EXCLUSIVE KEY SHARING METHOD

TECHNICAL FIELD

The present invention relates to a cryptographic key sharing method employed in a star communication system consisting of a base station and a plurality of terminals or a communication system consisting of only a system manager and a plurality of terminals and, more particularly, a key sharing method which is capable of safely distributing a common secret key to all terminals except terminals specified by the base station, and a key sharing method which is capable of safely distributing the common secret key only to particular terminals.

BACKGROUND ART

In the star communication system in which the base station manages a plurality of terminals, the case is discussed where the base station and a plurality of subsidiary terminals constitute a group and then the same group secret key is shared with the group members to broadcast the cipher communication. Information encrypted by using the group secret key can be decrypted only by the terminals which have the same secret key in the group.

Meanwhile, the case where particular terminals should be excluded from this group will occur. There are cases where, for example, a certain terminal in the group is robbed and thus illegal practices such as the eavesdrop of the cipher communication, the transmission of false information, etc. are conducted by using the terminal. At this time, the base station which manages this secret key must exclude the stolen terminal as soon as possible and update the group secret key, and only remaining terminals must share a new secret key.

Also, it is necessary to construct another group newly. There are cases where the out-of-group terminal is entered into the group, the terminals which belong to different groups are combined into one group, etc. At this time, the base station must share a new group key as soon as possible with the terminals constituting the group.

FIG. 29 shows a key updating method to share the key data with terminals other than the terminals specified by the base station, according to the first example in the prior art. In FIG. 29, five terminals $T_1$ to $T_5$ hold inherent keys $k_1$ to $k_5$ respectively, and the base station manages the inherent keys of all terminals. At this time, the case where, for example, the base station excludes the terminal $T_1$ and distributes a new common secret key to other terminals $T_2$ to $T_5$ will be explained hereunder.

First, the base station generates the secret key K, encrypts this secret key K by using $k_2$ to $k_5$ as keys respectively, and distributes them to the terminals $T_2$ to $T_5$ respectively. Respective terminals except the excluded terminal $T_1$ decrypt the encrypted keys by using the inherent keys to obtain the secret key K. In FIG. 29, for example, $Ek_2(K)$ is the ciphertext which is obtained by encrypting K by using the inherent key $k_2$. Since data on this communication line are encrypted by the inherent keys of the terminals $T_2$ to $T_5$ respectively, the terminal $T_1$ cannot obtain the secret key K generated by the base station even if such terminal $T_1$ can intercept this communication data.

However, according to this method, in order to exclude one terminal from N terminals, normally the base station must perform (N−1) time the encryption and transmit (N−1) pieces of data. If a size of the group is increased, this operation becomes extremely a burden on the base station. In addition, the services such as the cipher communication, etc. in the group must be stopped until all station have been updated. In this case, if the service suspending term which is required until distribution of data to (N−1) terminals has been finished is prolonged, the weighty problem has arisen.

FIG. 30 shows a key updating method, which is disclosed in Patent Application Publication (KOKOKU) Hei 5-46731, according to the second example in the prior art. In this second example in the prior art, the public key cryptosystem is employed. In FIG. 30, five terminals $T_1$ to $T_5$ hold intrinsic secret keys $(e_1, d_1)$ to $(e_5, d_5)$ respectively. Here, suppose that $e_i \cdot d_i \bmod(p-1)=1$ ($p$ is a prime number of the system publication)

can be satisfied in each secret key $(e_i, d_i)$. The base station 1 manages the public keys $$p_1=g^{e1} \bmod p, \ldots, p_5=g^{e5} \bmod p$$

of all terminals. Where g is an integer of the system publication. To calculate the secret key $(e_i, d_i)$ of each terminal based on the public key $p_i$ of each terminal and information g, p of the system publication is difficult because it arrives at the discrete logarithm problem if the bit length is set long. Like the example 1 in the prior art, if the terminal $T_1$ should be excluded, first the base station generates a random number R and generates a key $$K=g^R \bmod p$$

and thus calculates $$Z_2=p_2^R \bmod p, \ldots, Z_5=p_5^R \bmod p$$

and then distributes them to $T_2$ to $T_5$ except the terminal $T_1$. The respective terminals i except the terminal $T_1$ obtain the updated keys K $$K=Z_i^{di} \bmod p (=(p_i^R)^{di} \bmod p=((g^{ei})^{di})^R \bmod p=g^R \bmod p),$$

which are common to the base station, by using the received $Z_i$ and the secret key $d_i$.

However, according to the key sharing method in the prior art, in order to exclude one terminal from N terminals, the base station must perform (N−1) time the encryption and transmit (N−1) pieces of data. For example, the case will be considered where one terminal is excluded from 1000 terminals and then a new common secret key is shared with remaining 999 terminals. At this time, in the first and second examples in the prior art, the encryption process must be carried out 999 times and also 999 ciphertexts must be transmitted. At any rate, these operations put the heavy burden onto the base station side.

Further, normally the terminal has not so high computational capability since it must be implemented small in size at low cost. Such terminal must update the key at high speed. In the second example in the prior art, the terminal must perform the power residue calculation of long bit length to obtain the key. Such calculation puts the considerable burden onto the terminal which has not the high computational capability, so that the processing time becomes long until the key sharing can be achieved.

The present invention has been made in light of such points and it is an object of the present invention to achieve a key sharing method of sharing distributed key information with other terminals and a key sharing method of sharing the distributed key information only with particular terminals and having following features.

(1) An amount of communication from the base station to the terminal is small. An amount of data transmission at the base station is small. The service suspending term required until all terminals complete the key sharing is short.

(2) The terminal whose computational capability is not high can achieve the key sharing at high speed. The process in the terminal can be reduced.

In addition, an object of the present invention is to overcome the above problems in the prior art, and to achieve a key sharing method which is secure against the faking attack and the tampering attack by adding a signature function without increase in the communication amount. Also, an object of the present invention is to achieve a key sharing method which is secure against the adaptive chosen ciphertext attack on the basis of the Cramer-Shoup cipher.

However, three following problems exist in the above key sharing method.

(1) It is preferable that the secret information of the terminal should be updated periodically to improve the security. In this case, if the new secret information is distributed to terminal by terminal, an amount of communication and a time needed until the update is completed are increased. In addition, normally the update of the public information is also needed when the secret information are updated. Thus, since the public book and the public information which are saved locally in the terminals are updated, an update time is increased.

(2) In order to exclude continuously the terminals, which have been excluded in the preceding exclusive key sharing, in succeeding all exclusive key sharings, the excluding process is needed every exclusive key sharing.

(3) In order to execute the exclusive key sharing in the system consisting of only the terminal, either all terminals must hold the public information of other terminals or the public book for opening them publicly is needed. Besides, since any terminal can act as the chairman terminal, the method cannot correspond to the case where the chairman terminal must be fixed to a certain terminal in practical use.

In order to overcome the above subjects, the present invention intends to update the secret information in all terminals while suppressing an amount of communication and an update time to the lowest minimum, to exclude continuously the terminals which have been excluded once not to execute the process every exclusive key sharing, to enable each terminal not to hold the public information of all terminals and to eliminate the public book, and to allow only a certain terminal to be appointed as the chairman terminal.

Furthermore, the above exclusive key sharing method contains such a problem that the exponent part employed in the power residue calculation is assumed as about 160 bits and thus the calculation time is long.

In order to overcome further such problem, an object of the present invention is to reduce a size of the exponent part by executing collectively the inverse element calculation, which causes the extension of the exponent part, to thus perform the calculation at high speed in the exclusive key sharing method.

DISCLOSURE OF THE INVENTION

In order to overcome the above subjects, in the present invention, the exclusive key sharing method for the communication system which consists of the base station and N terminals connected to the base station to allow broadcast communication, wherein the secret keys are S, the prime number which is larger than S and N or the power number of the prime number is p, the measure of (p−1) is q, and the number of terminals which can be specified by the base station is 1, respective terminals i ($1 \leq i \leq N$) hold secret information Si in secret to satisfy $S = \Sigma \lambda(i, \Lambda) \times Si$ (sum of $i \in \Lambda$ is calculated)

where $Si = S + f_1 \times i \bmod q$ ($f_1$ is a non-zero element of GF(q))

$\lambda(i, \Lambda) = \Pi \{L/(L-i)\}$ (product of $L \in \Lambda - \{i\}$ is calculated)

$\Lambda$ is a set of any two terminals out of the N terminals), the base station holds (S, p, g, S1, ..., SN), (1) the base station calculates preparatory information $C1 = g^k \bmod p$ if the element of GF(p) is g and the non-zero element of GF(q) is k, and (2) the base station calculates exclusive information $C2 = g^{\wedge}(k \times Sa \bmod q) \bmod p)$ based on the secret information Sa of the particular terminal a and then broadcasts it together with the particular terminal number a and the preparatory information C1 to all terminals, (3) the base station calculates the common key $K = g^{\wedge}(k \times S \bmod q) \bmod p)$ shared with all terminals j ($j \neq a$) except the particular terminal a and (4) respective terminals j ($j \neq a$) calculate $C1^{\wedge}(Sj \times \lambda(j, \Lambda) \bmod q) \times C2^{\wedge}(\lambda(a, \Lambda) \bmod q) \bmod p$ to thus obtain the common key K shared with the base station.

According to such configuration, since the key sharing can be achieved by broadcasting from the base station to all terminals, the service suspending term for the key sharing can be reduced and the process in the terminal can be reduced. Therefore, the terminal which has not high computational capability can achieve the key sharing at high speed.

Also, the exclusive key sharing method for the communication system which consists of N terminals (N is an integer of more than 2) connected mutually to allow broadcast communication is constructed such that the secret keys are S, the prime number which is larger than S and N or the power number of the prime number is p, the measure of (p−1) is q, and the particular terminal number which can be specified by the chairman terminal $\phi$ (to which any terminal can be appointed) d ($1 \leq d \leq N-1$), respective terminals i ($1 \leq i \leq N$) hold secret information Si in secret to satisfy $S = \Sigma \lambda(i, \Lambda) \times S_i$ (sum of $i \in \Lambda$ is calculated)

$\lambda(i, \Lambda) = \Pi \{L/(L-i)\}$ (product of $L \in \Lambda - \{i\}$ is calculated)

$Si = S + f_1 \times i^1 + \ldots, + f_d \times i^d \bmod q$ (where $f_1, \ldots, f_d$ are d elements of GF(q), $f_d \neq 0$, and $\Lambda$ is a set of any (d+1) terminals out of the N terminals), and can use the public key of the system $y = g^s \bmod p$, public information $y_1 = g^{S1} \bmod p, y_2 = g^{S2} \bmod p, \ldots, y_N = g^{SN} \bmod p$, the prime number p, the measure q, and the element g, and (1) the chairman terminal generates arbitrarily the non-zero element k of GF(q) and then calculates exclusive information $C2_{i1} = y_{i1}^k \bmod p, \ldots, C2_{id} = y_{id}^k \bmod p$ based on the public information $y_{i1}, \ldots, y_{id}$ of the d terminals $i_1, \ldots, i_d$, (2) the chairman terminal calculates a signature $$Z = C2_{i1} \times \ldots \times C2_{id} \times (-S_\phi) + k \bmod q$$

by using own secret information $S_\phi$, and broadcasts the signature Z together with the exclusive information $C2_{i1}, \ldots, C2_{id}$, the particular terminal numbers $i_1, \ldots, i_d$ and own terminal number $\phi$ to all terminals, (3) the chairman terminal calculates a common key $$K = y^k \bmod p,$$

(4) the respective terminals j ($j \neq i_1, \ldots, i_d, \phi$) calculate $$C1 = g^Z \times y_\phi{}^\wedge(C2_{i1} \times \ldots \times C2_{id} \bmod q) \bmod p$$

(if a signer is surely the chairman terminal $\phi$ and also the signature Z, the exclusive information $C2_{i1}, \ldots, C2_{id}$, the particular terminal numbers $i_1, \ldots, i_d$, and the terminal number $\phi$ of the chairman terminal are not tampered, $C1 = g^k \bmod p$ is calculated) by using the public information y, of the chairman terminal, (5) the respective terminals j calculate $\lambda(j, \Lambda)$ and $\lambda(i_1, \Lambda), \ldots, (i_d, \Lambda)$ where $\Lambda = \{j, i_1, \ldots, i_d\}$, and calculate $C1^\wedge(S_j \times \lambda(j, \Lambda) \bmod q) \times C2_{i1}{}^\wedge(\lambda(i_1, \Lambda) \bmod q) \times \ldots \times C2_{id}{}^\wedge(\lambda(i_d, \Lambda) \bmod q) \bmod p$ by using the C1, the exclusive information $C2_{i1}, \ldots, C2_{id}$, and own secret information $S_j$ to thus obtain the common key K.

According to such configuration, only the particular terminal can be excluded by a small amount of communication, other terminals can share the distributed key information, and the distributed key information can be shared with the particular terminals only.

Moreover, in order to overcome the above subjects, in the present invention, the exclusive key sharing method for a communication system which consists of the base station and N terminals (N is an integer of more than 2) connected to the base station to allow broadcast communication is constructed such that the secret keys are S, the prime number which is larger than S and N or the power number of the prime number is p, the measure of (p−1) is q, and the number of terminals which can be specified by the base station (referred to as the "particular terminal number" hereinafter) is 1, respective terminals i ($1 \leq i \leq N$) hold secret information Si in secret to satisfy $$S = \Sigma \lambda(i, \Lambda) \times S_i \text{ (sum of } i \in \Lambda \text{ is calculated)}$$

(where $S_i = S + f_1 \times i \bmod q$ (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of the N terminals), and the base station holds (S, p, g, $S_1, \ldots, S_N$), (1) the base station calculates preparatory information $$C1 = g^k \bmod p$$

where an element of GF(p) is g and a non-zero element of GF(q) is k, (2) the base station calculates exclusive information $$C_2 = g^\wedge(k \times S_a \bmod q) \bmod p,$$

based on the secret information $S_a$ of the particular terminal a, and broadcasts the exclusive information together with the particular terminal number a and the preparatory information $C_1$ to all terminals, and (3) the base station calculates a common key $$K = g^\wedge(k \times S \bmod q) \bmod p$$

which is shared with all terminals j ($j \neq a$) except the particular terminal a, (4) the respective terminals j ($j \neq a$) calculate a product $$C_1{}^\wedge(S_j \times \lambda(j, \Lambda) \bmod q) \times C_2{}^\wedge(\lambda(a, \Lambda) \bmod q) \bmod p$$

of a power residue value of $C_1$ $$C_1{}^\wedge(S_j \times \lambda(j, \Lambda) \bmod q) \bmod p$$

which uses a product of $S_j$ and $\lambda(j, \Lambda)$ to the modulus q as an exponent and a power residue value of $C_2$ $$C_2{}^\wedge(\lambda(a, \Lambda) \bmod q) \bmod p$$

which uses $\lambda(a, \Lambda)$ calculated to the modulus p as the exponent by using the preparatory information $C_1$, the exclusive information $C_2$, and own secret information $S_j$ to thus obtain the common key K which is shared with the base station, and (i) the base station generates arbitrarily the non-zero element e of GF(q), and broadcasts the e to all terminals, (ii) the base station calculates the new element $$g' = g^{1/e \bmod q} \bmod p$$

and replaces it with the managed element g, (iii) the respective terminals i calculate the new secret information $$S_i' = S_i \times e \bmod q$$

(at this time, $(g')^{Si'} \bmod p = (g)^{Si} \bmod p$ is satisfied).

According to such configuration, since an amount of communication required for the base station is small such as the e and the public information other than the system parameter element g are not changed, such an advantage can be achieved that update of the secret information can be performed at high speed.

Also, the exclusive key sharing method for the communication system which consists of N terminals (N is an integer of more than 2) connected mutually to allow broadcast communication is constructed such that (i) the system manager generates arbitrarily the non-zero element e of GF(q), and broadcasts the e to all terminals, (ii) the system manager calculates the new element $$g' = g^{1/e \bmod q} \bmod p$$

and replaces the managed element g with it, and (iii) the respective terminals i calculate the new secret information $$S_i' = S_i \times e \bmod q$$

(at this time, $(g')^{Si'} \bmod p = (g)^{Si} \bmod p$ is satisfied).

According to such configuration, since an amount of communication required for the system manager is small such as the e and the public information other than the system parameter element g are not changed, such an advantage can be achieved that update of the secret information can be performed at high speed.

Also, the exclusive key sharing method for the communication system which consists of the base station and the N terminals (N is an integer of more than 2) connected to the base station to allow broadcast communication is constructed such that (i) the base station generates arbitrarily the non-zero element e of GF(q), and broadcasts the encrypted e encrypted by using the common key K to all terminals, (ii) the base station calculates the new element $$g'=g^{1/e \bmod q} \bmod p$$

and replaces it with the managed element g, and (iii) the respective terminals i decrypt the encrypted e by using the common key K, and calculate the new secret information $$S_i'=S_i \times e \bmod q$$

According to such configuration, since the secret information of the terminals can be updated by using the random number which is distributed using the common key which is shared by the exclusive key sharing, the excluded terminal cannot be restored in the succeeding exclusive key sharing.

Also, the exclusive key sharing method for a communication system which consists of the N terminals (N is an integer of more than 2) connected mutually to allow broadcast communication is constructed such that (i) the chairman terminal generates arbitrarily the non-zero element e of GF(q), and broadcasts the encrypted e which is encrypted by using the common key K to all terminals, (ii) the chairman terminal calculates the new element $$g'=g^{1/e \bmod q} \bmod p$$

and replaces it with the element g, (iii) the respective terminals j decrypt the encrypted e by using the common key K, and calculate the new secret information $$S_i'=S_i \times e \bmod q$$

According to such configuration, since the secret information of the terminals can be updated by using the random number which is distributed using the common key which is shared by the exclusive key sharing, the excluded terminal cannot be restored in the succeeding exclusive key sharing.

Also, the exclusive key sharing method for the communication system which consists of N terminals (N is an integer of more than 2) connected mutually to allow broadcast communication is constructed such that the secret keys are S, the prime number which is larger than S and N or the power number of the prime number is p, the measure of (p−1) is q, elements of GF(p) are g, and the particular terminal number which can be specified by the chairman terminal b is 1, respective terminals i ($1 \leq i \leq N$) hold secret information Si in secret to satisfy $$S = \Sigma \lambda(i, \Lambda) \times S_i \text{ (sum of } i \in \Lambda \text{ is calculated)}$$

(where $S_i = S + f_1 \times i \bmod q$ (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of the N terminals), and the chairman terminal b can use the public key for all terminals $$y=g^S \bmod p$$

and the public information $$y_1=g^{S_1} \bmod p, y_2=g^{S_2} \bmod p, \ldots, y_N=g^{S_N} \bmod p,$$

(1) the chairman terminal b generates the non-zero element k of GF(q), and calculates the preparatory information $$C_1=g^k \bmod p,$$

(2) the chairman terminal b calculates the exclusive information $$C_2=y_a^k \bmod p$$

based on the public information $y_a$ of the particular terminal a, and broadcasts the exclusive information together with the particular terminal number a and the preparatory information $C_1$ to all terminals, and (3) the chairman terminal b calculates the common key $$K=y^k \bmod p,$$

(4) the respective terminals j ($j \neq a, b$) calculate $\lambda(j, \Lambda)$ and $\lambda(a, \Lambda)$ where $\Lambda=\{j, a\}$, and calculate $$C_1^{\char`\^}(S_j \times \lambda(j, \Lambda) \bmod q) \times C_2^{\char`\^}(\lambda(a, \Lambda) \bmod q) \bmod p$$

by using the preparatory information $C_1$, the exclusive information $C_2$, and own secret information S, to thus obtain the common key K.

According to such configuration, since the terminals except the chairman terminal are not requested to hold the public information of other terminals and only the chairman terminal can use the public information of other terminals, such an advantage can be achieved that other terminals cannot be designated as the chairman terminal.

Further, in order to overcome the above subjects, in the present invention, the exclusive key sharing method for the communication system which consists of N terminals (N is an integer of more than 2) connected mutually to allow broadcast communication is constructed such that the secret keys are S, the prime number which is larger than S and N or the power number of the prime number is p, the measure of (p−1) is q, elements of GF(p) are g, and the particular terminal number which can be specified by the chairman terminal φ is d ($1 \leq d < N-1$), respective terminals i ($1 \leq i \leq N$) hold secret information Si in secret to satisfy $$S = \Sigma \lambda(i, \Lambda) \times S_i$$

(where $f_1, \ldots, f_d$ are d elements of GF(q), $f_d \neq 0$), $\lambda(i, \Lambda) = \Pi\{L/(L-i)\}$ (product of $L \in \Lambda - \{i\}$ is calculated), and $\Lambda$ is a set of any (d+1) terminals out of the N terminals), the respective terminals i and the chairman terminal φ can use the public key of the system $$y=g^S \bmod p,$$

the public information $$y_1=g^{S_1} \bmod p, y_2=g^{S_2} \bmod p, \ldots, y_N=g^{S_N} \bmod p,$$

and the p, q, and g, (1) the chairman terminal calculates the preparatory information $$C1=g^k \bmod p \text{ (}k \text{ is a non-zero element of } GF(q)\text{)},$$

(2) the chairman terminal calculates the exclusive information $$C2_{i1}=y_{i1}{}^{\wedge}(k\times\lambda(i_1,\alpha)\bmod q)\bmod p,\ldots,C2_{id}=id{}^{\wedge}(k\times\lambda(i_d,\alpha)\bmod q)\bmod p$$

based on a set $\alpha$ of the d particular terminals $i_1,\ldots,i_d$, $\lambda(i_1,\alpha),\ldots,\lambda(i_d,\alpha)$, and the public information $y_{i1},\ldots,y_{i1}$, and broadcasts the exclusive information $C2_{i1},\ldots,C2_{id}$ together with the preparatory information C1 and the particular terminal number $i_1,\ldots,i_d$ to all terminals, and (3) the chairman terminal calculates the common key $$K=y^k\bmod p,$$

(4) the respective terminals j (j≠$i_1,\ldots,i_d$, $\phi$) calculate $$\lambda(j,\Lambda_j),\lambda(i_1,\{j,i_1\}),\ldots,\lambda(i_d,\{j,i_d\}),j\text{ where }\Lambda_j=\{j,i_1,\ldots,i_d\}\text{ and}$$

$$T_j=\{\Pi(j-L)\}/(\text{product of }L\in\Lambda-\{i\}\text{ is calculated}),$$

and calculate cession keys $$K_j=C1{}^{\wedge}(S_j\times\lambda(j,\Lambda_j)\times T_j\bmod q)\times C2_{i1}{}^{\wedge}(\lambda(i_1,\{j,i_1\})\times T_j\bmod q)\times\ldots\times C2_{id}{}^{\wedge}(\lambda(i_d,\{j,i_d\})\times T_j\bmod q)\bmod p$$

by using the preparatory information C1, the exclusive information $C2_{i1},\ldots,C2_{id}$, and own secret information $S_j$, and calculates $$K_j{}^{\wedge}(1/T_j\bmod q)\bmod p$$

to thus obtain the common key.

According to such configuration, the operation can be performed at high speed by reducing a size of the exponent part and thus the key sharing can be implemented at high speed. Also, since the chairman terminal bears the calculation of the terminal side, respective terminals can perform the key sharing at high speed.

In the present invention, higher speed of the exclusive key sharing method is intended by using the following approach. Expansion in size of the modulus due to the inverse element of the exponent part can be prevented by calculating collectively the inverse elements of the exponent part in the power residue calculation of the exclusive information of respective terminals in the key sharing at the end. The same values exist as the coefficient concerning the excluded terminal number in the exponent part in the power residue calculation of the exclusive information executed by respective terminals in the key sharing. Therefore, the exponent part in the key sharing can be reduced if the base station or the chairman terminal calculates previously this value into the power residue value in the exclusive information.

There is the case where a negative value of the exponent part is present in the power residue calculation of the exclusive information performed by the respective terminals at the time of key sharing. In this case, the exponent part is expanded up to the size of the modulus even by the above countermeasure. Therefore, in the case of the negative exponent part, the reduction effect can also be achieved if the respective terminals calculate in advance the inverse elements of the exclusive information and then power-residue-calculate the absolute value of the exponent part into the inverse elements of the exclusive information.

BRIEF DESCRIPTION OF THE DRAWINGS

FIG. 32 is a view showing a preparatory phase in the key sharing method according to the eleventh embodiment; and FIG. 33 is a view showing a key sharing phase in the key sharing method according to the eleventh embodiment.

BEST MODES FOR CARRYING OUT THE INVENTION

Embodiments of the present invention will be explained in detail with reference to FIG. 1 to FIG. 28 and FIG. 31 and FIG. 33 hereinafter.

(First Embodiment)

A first embodiment of the present invention is an exclusive key sharing method in which, in a system consisting of a base station and five terminals, the base station broadcasts preparatory information ($g^k$ modp), exclusive information ($g^{kS5}$ modp), a ciphertext (M×K modp) and the excluded terminal number (5) to respective terminals by using secret information Si which are generated by distributing a secret key S by the secret distribution method, while respective terminals calculates a product of $C1^{\wedge}(\lambda(i, \Lambda)$ modq) modp and $C2^{\wedge}(\lambda(5, \Lambda)$ modq) modp to obtain K and then calculate M by dividing the ciphertext (M×K modp) by K to obtain common data to the base station 0, whereby other terminals except the terminal 5 can share the key with the base station.

Figure 1:
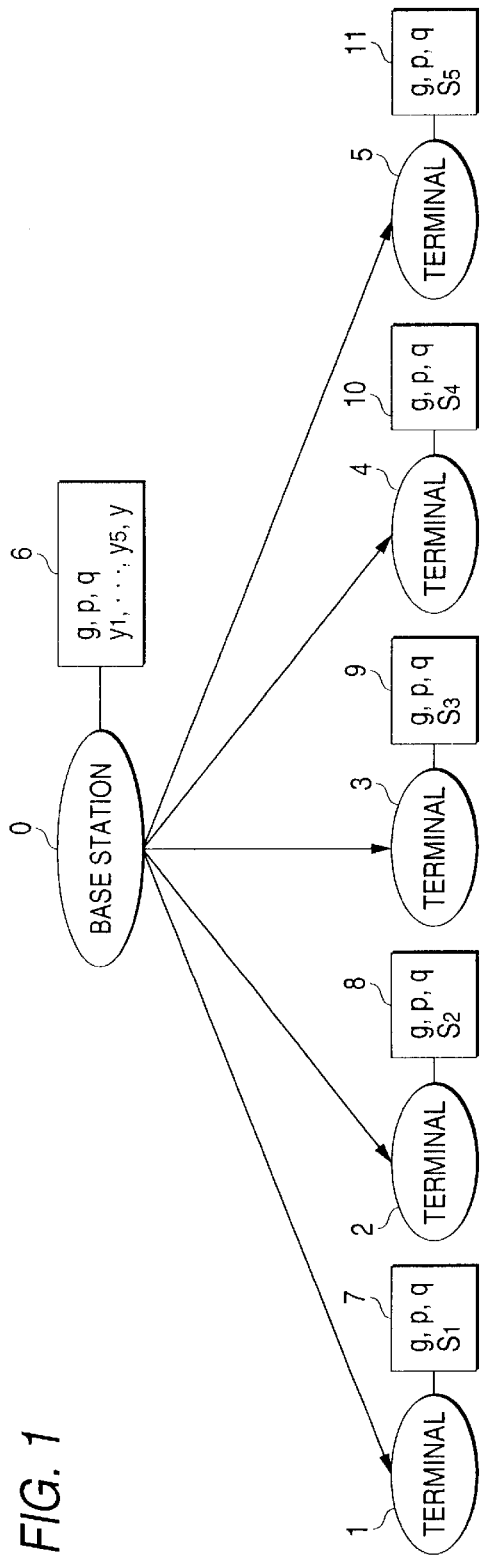
FIG. 1 is a view showing a set-up phase in a key sharing method according to a first embodiment of the present invention.

FIG. 1 is a view showing a set-up phase in a key sharing method according to the first embodiment of the present invention. In FIG. 1, 0 denotes the base station, and 1 to 5 denotes terminals which are managed by the base station. 15 denotes a storing portion in the base station, and 7 to 11 are storing portions in respective terminals, which cannot be observed and tampered from the outside.

Figure 2:
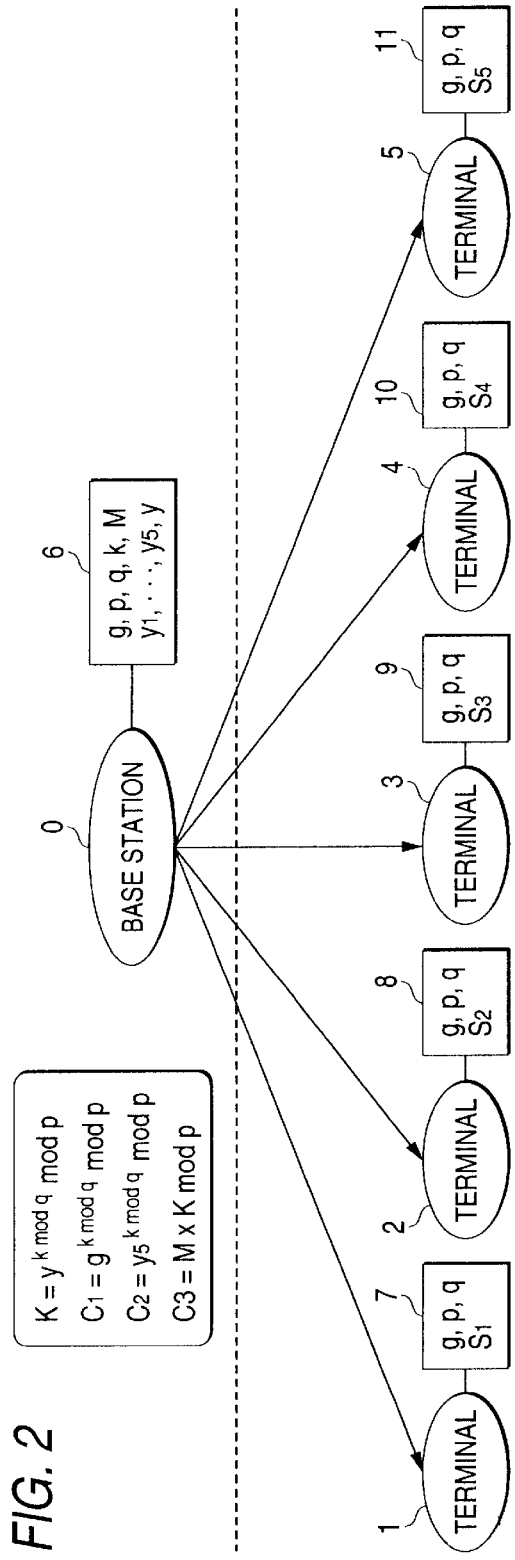
FIG. 2 is a view showing a preparatory phase in the key sharing method according to the first embodiment.

FIG. 2 is a view showing a preparatory phase according to the first embodiment of the present invention.

Figure 3:
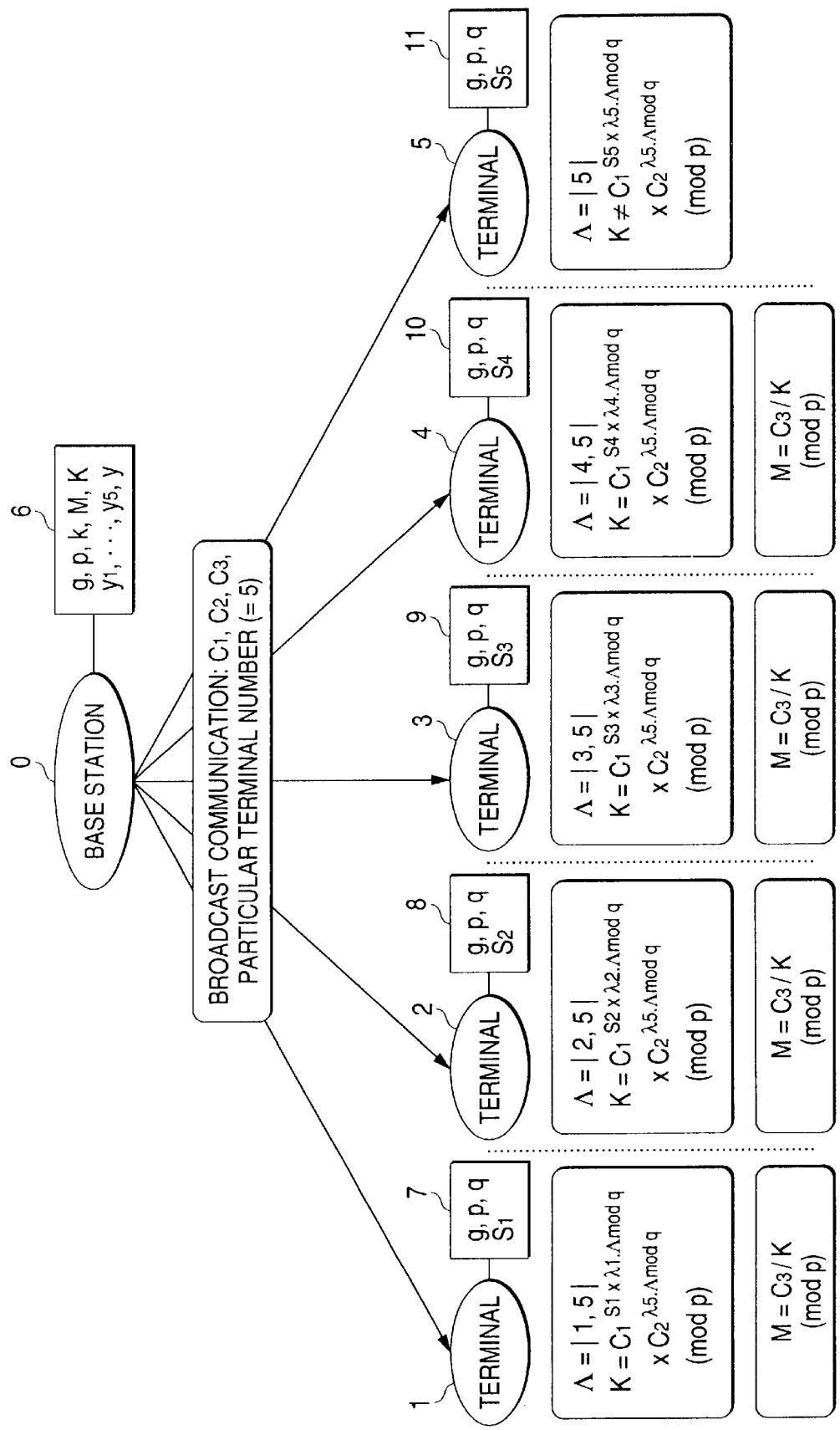
FIG. 3 is a view showing a key sharing phase in the case where a key is shared with all terminals except a terminal 5, in the key sharing method according to the first embodiment.

FIG. 3 is a view showing a key sharing phase in the case where the key is shared with all terminals 1, . . . , 4 except the terminal 5.

Figure 4:
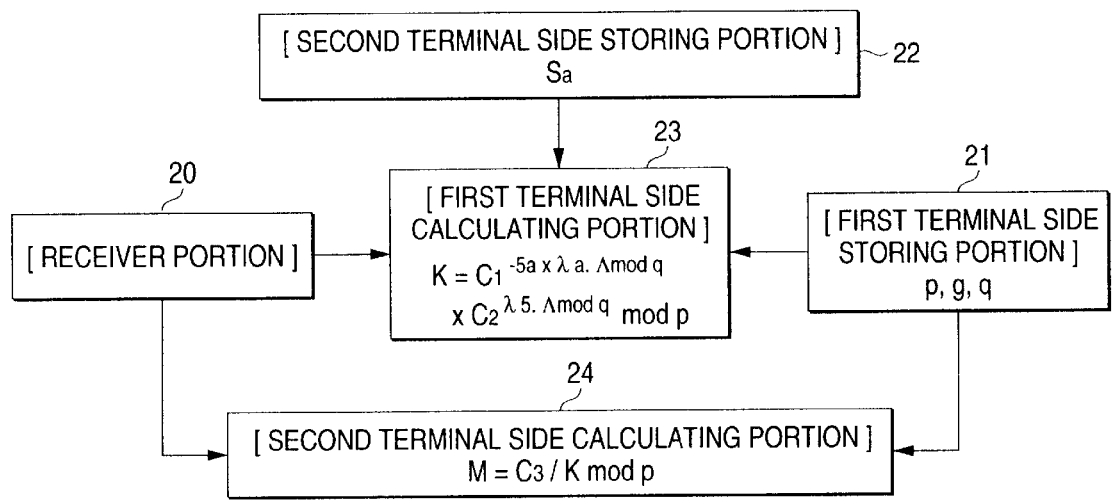
FIG. 4 is a view showing a configuration of respective terminals and a base station in the key sharing method according to the first embodiment.
Figure 4:
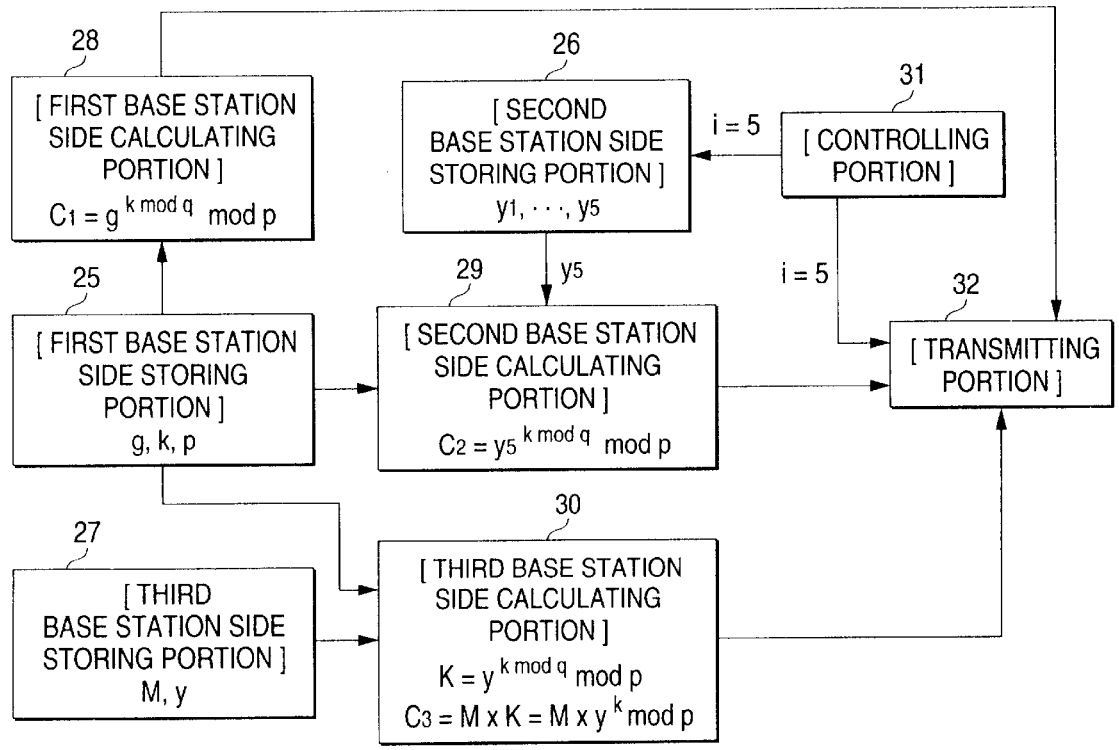

FIG. 4 is a view showing a configuration of the base station and respective terminals i ($1 \leq i \leq N$) in the key sharing method according to the first embodiment.

Figure 20:
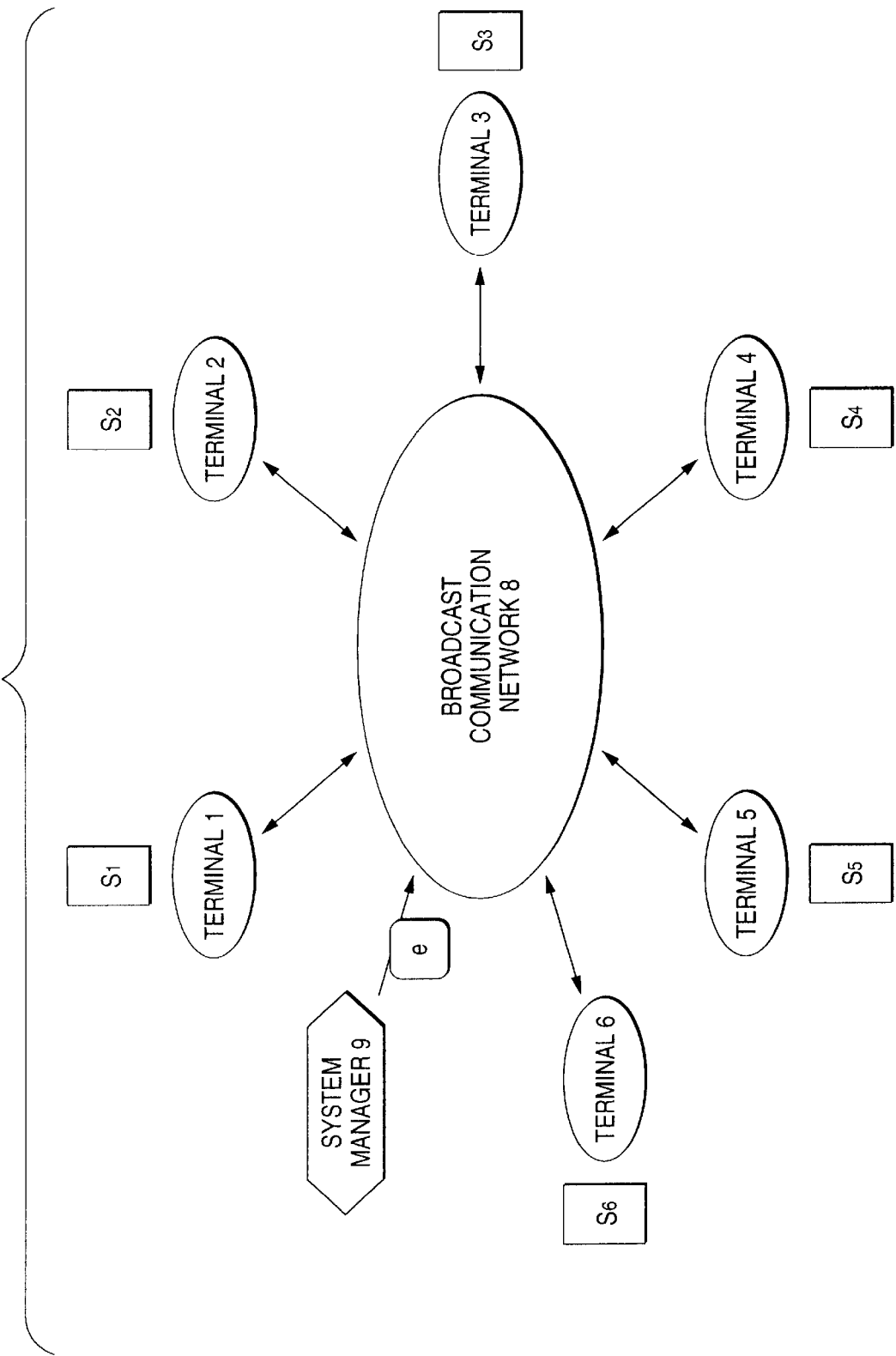
FIG. 20 is a view showing a method of updating an element g in the key sharing method according to the seventh embodiment.
Figure 25:
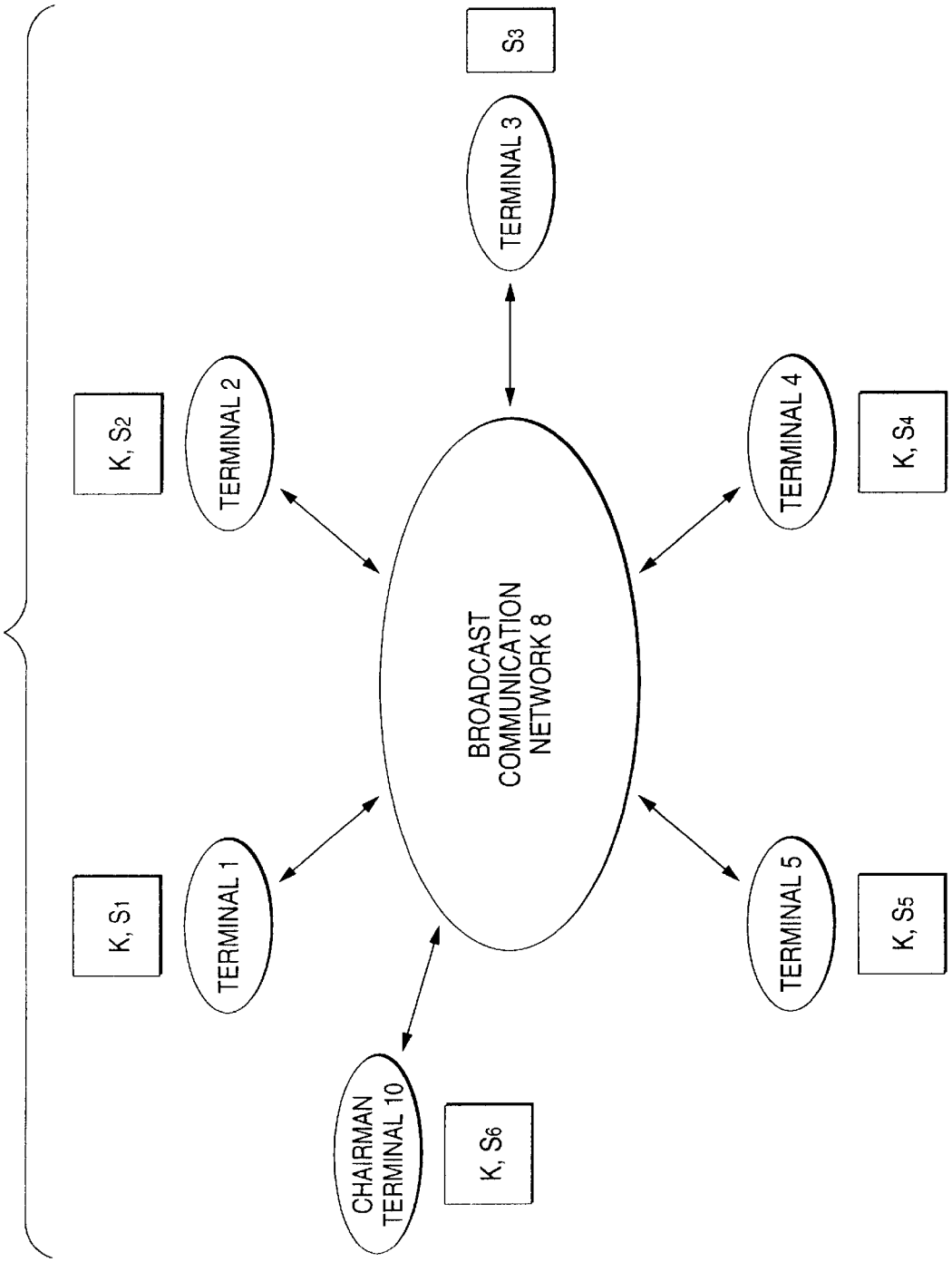
FIG. 25 is a view showing a state where a terminal 3 is excluded in a key sharing method according to a ninth embodiment of the present invention.

FIG. 4(a) is a block diagram of the terminal. In FIG. 4(a), 20 denotes a receiver portion for receiving data from the base station; 21, a first terminal side storing portion for holding moduli p, q and a base g; and 22, a second terminal side storing portion for holding secret information Si. Also, 23 denotes a first terminal side calculating portion for calculating the common key K based on preparatory information C1 and exclusive information C2 distributed from the base station in the key sharing phase, and 24 denotes a second terminal side calculating portion for calculating common data M based on a ciphertext C3 distributed from the base station and K. FIG. 4(b) is a block diagram of the base station. In FIG. 4(b), 25 denotes a first base station side storing portion for holding the moduli p, q, the base g, and an integer k; 26, a second base station side storing portion for holding public information y1, . . . , y5 of respective terminals; and 27, a third base station side storing portion for storing the common data M and the public key y of all terminals. Also, 28 denotes a first base station side calculating portion for calculating the preparatory information C1; 29, a second base station side calculating portion for calculating the exclusive information C2; and 30, a third base station side calculating portion 30 for calculating the common key K and calculating the ciphertext C3 based on the common key K and the common data M. Also, 31 denotes a controlling portion for selecting public information based on the particular terminal number and then transmitting the particular terminal number to a transmitting portion 32, and 32 denotes a transmitting portion for broadcasting the preparatory information, the exclusive information, the ciphertext, and the particular terminal number to all terminals.

Figure 5:
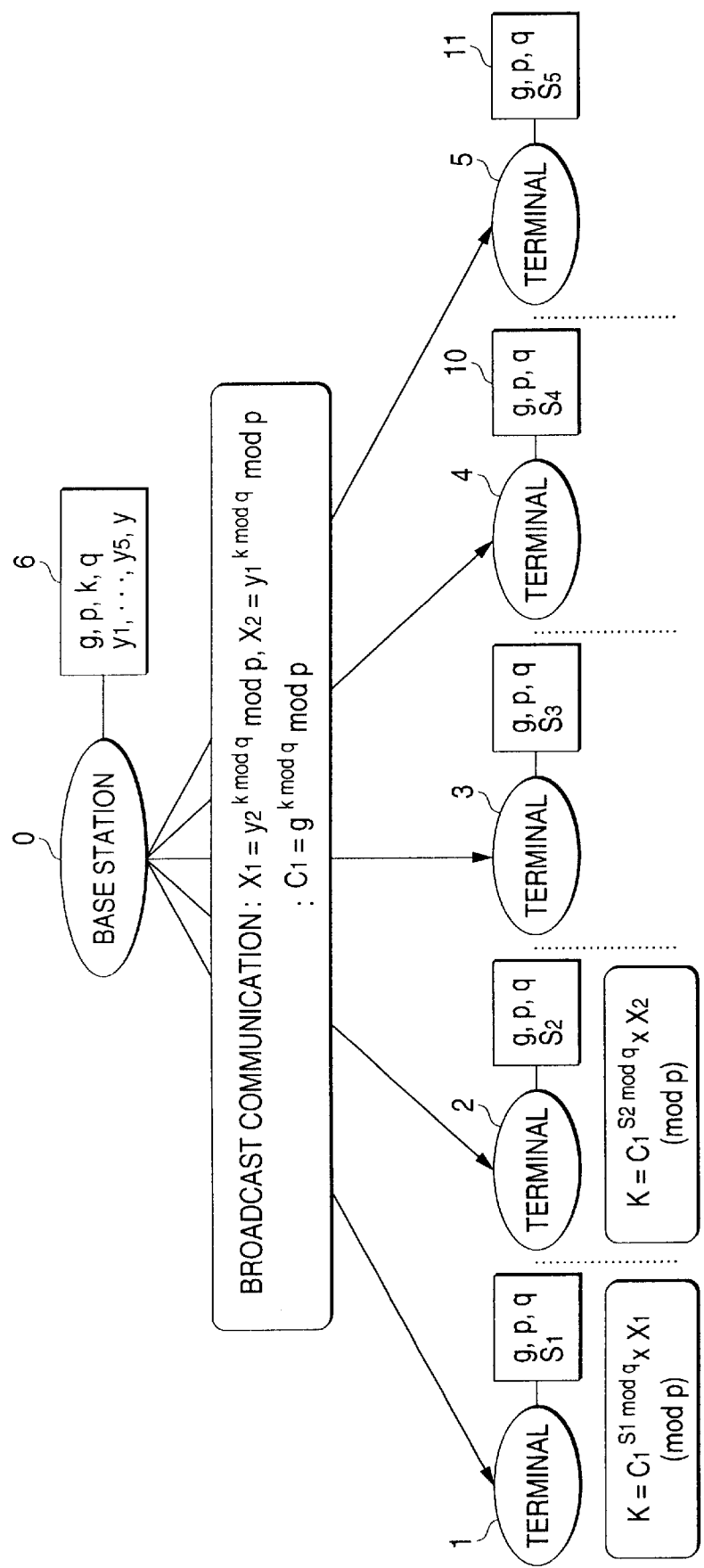
FIG. 5 is a view showing a key sharing phase in the case where a key is shared with terminals which do not exceed a half of all terminals, in the key sharing method according to the first embodiment.

FIG. 5 is a view showing a key sharing phase in the case where key sharing is performed only by the particular terminals.

The key sharing method according to the first embodiment of the present invention is classified into three phases, i.e., set-up phase, preparatory phase, and key sharing phase. The case where the base station manages five terminals will be explained every phase hereunder.

The set-up phase in the key sharing method according to the first embodiment of the present invention will be explained with reference to FIG. 1 hereunder. The base station 0 formulates the secret key S and holds it in secret. The base station formulates a prime number p which is larger than the secret key S and 6 or a power number p of the prime number and holds it, and calculates one measure q of (p−1) and holds it, and calculates a non-zero element f1 of GF(q).

The base station distributes in secret the secret information Si, which are formulated by calculating Si=f(i) by using $$f(z) = S + f1 \times z \bmod q,$$

to respective terminals i ($1 \leq i \leq 5$) via the cipher communication means.

Suppose that $\Lambda$ is a set of any two terminals out of five terminals, the secret information Si can satisfy $$S = \Sigma \lambda(i, \Lambda) \times S_i \text{ (sum of } i \in \Lambda \text{ is calculated)}$$

$$\lambda(i, \Lambda) = \Pi\{L/(L-i)\} \text{ (product of } L \in \Lambda - \{i\} \text{ is calculated.}$$

Where the set $\Lambda - \{i\}$ is a set which is obtained by subtracting a set $\{i\}$ from a set $\Lambda$. For example, if $\Lambda = \{1, 2\}$ is assumed, $$\lambda(1, \Lambda) = \Pi\{L/(L-i)\}(L \in \{2\})$$

$$= 2/(2-1) = 2$$

$$\lambda(2, \Lambda) = \Pi\{L/(L-2)\}(L \in \{1\})$$

$$= 1/(1-2) = -1$$

$$\Sigma\lambda(i, \Lambda) \times Si(i \in \Lambda)$$

$$= \lambda(1, \Lambda) \times S1 + \lambda(2, \Lambda) \times S2$$

$$= 2 \times f(1) - f(2)$$

$$= 2 \cdot (S + f1) - (S + 2 \cdot f1)$$

$$= S$$

can be calculated.

The respective terminals 1, ..., 5 hold the secret information Si in storing portions 7, ..., 11. The base station 0 holds the modulus p, the element g of GF(p) in a storing portion 6. The base station 0 calculates public information y1 (=$g^{S1}$ modp), y2 (=$g^{S2}$ modp), ..., y5 (=$g^{S6}$ modp), which use the secret information $S_1$, ..., $S_6$ as exponents respectively, p as the modulus, and g as the base, and then holds them in the storing portion 6. The secret information $S_1$, ..., $S_6$ are cleared from the base station after the calculation. The base station 0 calculates the public keys y (=$g^S$ modp) of all terminals, which use the secret key S of all terminals 1, ..., 5 as the exponent, p as the modulus, and g as the base, and then holds them in the storing portion 6. The secret key S is cleared from the base station after the calculation.

The preparatory phase in the first embodiment of the present invention will be explained with reference to FIG. 2 hereunder. The base station 0 generates arbitrarily a non-zero element k of GF(q), and calculates the preparatory information C1 (=$g^k$ modp) which uses k as the exponent, p as the modulus, and g as the base. The base station calculates the exclusive information C2 (=$y_5^k$ modp), which uses the integer k as the exponent, p as the modulus, and the public information $y_5$ of the terminal 5 specified by the base station 0 as the base. The base station calculates the common key K (=$y^k$ modp=$g^{(S\times k)}$ modp), which uses the integer k as the exponent, p as the modulus, and the public key y of all terminals 1, ..., 5 as the base. At the same time, the base station generates common data M to all terminals j (j=1, ..., 4) except the particular terminal 5, and then calculates the ciphertext C3 (=M×K modp) which is a product of M and K to the modulus p. The base station broadcasts the preparatory information $C_1$, the exclusive information $C_2$, the ciphertext C3 and the particular terminal number 5 to all terminals.

The key sharing phase executed in the case where all terminals 1, ..., 4 except the terminal 5 share the common key will be explained with reference to FIG. 3 hereunder. The terminal 1 calculates $$\lambda(1, \Lambda) = 5/(5-1) = 5/4$$

$$\lambda(5, \Lambda) = 1/(1-5) = -1/4$$

where $\Lambda = \{1, 5\}$ based on own terminal number 1 and the excluded terminal number 5 which has been received. The terminal 1 calculate a product $$C1^{\wedge}(S1 \times \lambda(1, \Lambda) \bmod q) \times C2^{\wedge}(\lambda(5, \Lambda) \bmod q) \bmod p$$

$$= g^{\wedge}(k \times S1 \times \lambda(1, \Lambda) \bmod q) \times g^{\wedge}(k \times S5 \times \lambda(5, \Lambda) \bmod q) \bmod p$$

$$= g^{\wedge}(k \times (S1 \times \lambda(1, \Lambda) + S5 \times \lambda(5, \Lambda) \bmod q)) \bmod p$$

$$= g^{\wedge}(k \times S \bmod q) \bmod p$$

$$= K$$

of a power residue value $$C1^{\hat{}}(\lambda(1, \Lambda) \bmod q) \bmod p$$

which uses a product of Si and $\lambda(1, \Lambda)$ as an exponent and C1 as the base and a power residue value $$C2^{\hat{}}(\lambda(5, \Lambda) \bmod q) \bmod p$$

which uses $\lambda(5, \Lambda)$ as the exponent and C2 as the base, by using the preparatory information C1 (=$g^k$ modp) and the exclusive information C2 (=$y_5^k$ modp) to thus obtain the common key K. In addition, the terminal 1 calculates a value $$C3/K = M \times K/K \bmod p = M,$$

which is derived by dividing the ciphertext C3 (=M×K modp) by K to the modulus P, as the common data to the base station 0.

The terminals 2 to 4 can also perform the above calculations similarly. As a result, the terminals 1 to 4 can share the common key K.

In contrast, the terminal 5 cannot decide that the exclusive information C2 (=$y_5^k$=$g^{(k \times S5)}$ modp) which is broadcasted from the base station 0 is equal to the power residue value (=$C1^{S5}$ modp=$g^{(k \times S5)}$ modp) which can be calculated based on the held information, and also cannot calculate $\lambda(5, \Lambda)$ because of $\Lambda = \{5\}$. Therefore, the terminal 5 cannot calculate the common key K in the above key sharing phase. As a result, the terminal 5 cannot calculate the common data M.

Since the respective terminals cannot calculate the secret key S based on $$K = g^{\hat{}}(S \times k) \bmod p,$$

$$C1 = g^k \bmod p, \text{ and}$$

$$y = g^S \bmod p,$$

respective divided secret information $S_a$ can be reused. For this reason, the set-up is not needed in the following key sharing and thus merely the preparatory phase and the key sharing phase must be repeated.

The configuration of the base station and the respective terminals i ($1 \leq i \leq N$) employed to execute the above process is shown in FIG. 4.

Next, explanation of the security in the first embodiment will be made hereunder.

(1) It is difficult for all terminals to calculate the common key K in the preparatory phase. In the preparatory phase, information held by the terminal 1, for example, are two following information, secret information: S1 preparatory information: C1 (=$g^k$ modp)

In order to calculate the common key K based on the above information, the secret key S should be calculated from S. However, since the secret key S of all terminals are divided by using the Shamir threshold method (please see Menezes, van Oorschot, Vanstone, "HANDBOOK OF APPLIED CRYPTOGRAPHY", CRC Publishing Co. concerning details of the Shamir threshold method), the secret key S cannot be calculated based on S1. In this case, the size of the secret key S of all terminals must be set to the large number to such extent that it is secure against round robin attack.

(2) It is difficult for the excluded terminal 5 to calculate the common key K and the common data M in the key sharing phase. Information held by the terminal 5 excluded in the key sharing phase are exclusive information: C2 $(=y^{S5}=g\hat{}(k \times S5))$ modp)

ciphertext: C3 $(=M \times K=M \times g\hat{}(k \times S))$ modp)

in addition to the above (1). These are equal to the ciphertext in the ElGamal cipher. Accordingly, if the moduli p, q and the integer k are set sufficiently large, this ciphertext results in the ElGamal cipher and thus it becomes difficult to calculate the common key K and the common data M based on them. More particularly, it is preferable that p should be set to 1024 bits or more and k, q be set to 160 bits or more.

In the preparatory phase after the key sharing has been completed while excluding the terminal 5, it is possible to exclude the terminal 5 continuously. This is the case that, for example, during when the cipher communication is carried out by five terminals which can share the common secret key in the group, first the terminal 5 is lost or robbed and then four remaining terminals share a new common secret key correspondingly.

Then, if the terminal 4 is also lost or robbed, remaining terminals must share a next common key while excluding both the terminals 4, 5. For this purpose, in the key sharing preparatory phase after the terminal 5 has been excluded, the base station and the terminals 1 to 3 formulate new common data M' (simply an exclusive logical sum of M1 and M2 may be calculated, or a Hash value of a sum of M1 and M2 may be calculated by using the Hash function) based on the common data M1 used in excluding the terminal 5 and the common data M2 used in excluding the terminal 4. According this method, the terminal 5 which cannot obtain the common data M1 and the terminal 4 which cannot obtain the common data M2 cannot formulate the new common data M'. Similarly, the preparatory information, the exclusive information, and the ciphertext, which are used to share the common data M2, may be distributed in secret by using the common data M1. According this method, the terminal 5 which cannot obtain the common data M1 and the terminal 4 cannot obtain the common data M4.

Also, in case the terminals 4, 5 conspire with each other to obtain the new common data M', there is such a method that, in the key sharing phase in excluding the terminal 4 after the terminal 5 has been excluded, the exclusive information C2 corresponding to the terminal 5 is also distributed and then the terminals 1 to 3 share the new common data. This method is substantially identical to a method explained in a second embodiment.

In the first embodiment, the case where remaining terminals except any one terminal share the common key in the system consisting of the base station and five terminals is discussed. But the number of terminals may be set to any integer.

The secret information Si which is obtained by calculating Si=f(i) by using the above $f(z)=S+f1 \times z$ modp may be utilized as the secret information of respective terminals i. Also, the number of excluded terminals may also be set to any integer. For example, if, the number of excluded terminals is set to d, the secret information Si which is obtained by calculating Si=f(i) by using $f(z)=S+f1 \times z1+f2 \times z2+ \ldots +fd \times zd$ modp may be utilized as the secret information of respective terminals i.

In the first embodiment, the base station divides the secret information Sa of respective terminals and then distributes it via the cipher communication means. However, the trusted third party other than the base station and the terminals may conduct these operations, otherwise the secret information Sa may be allocated previously to the terminals without distribution.

In addition, the cipher communication means using either the secret key cipher or the public key cipher may be employed. In this case, if the public key cipher is used, the security against the illegality of the base station can be improved since the base station holds only the public keys of respective terminals.

If a digital signature of the base station is added to all data distributed from the base station to the respective terminals, the terminals can authenticate the base station and detect the tampering by the third party, so that the security can be improved.

Besides, in order to decide whether or not the secret information Sa of respective terminals is properly divided in the first embodiment, Pedersen's share verification protocol (see the preprint "Distributed Provers with Applications to Undeniable Signature", T. P. Pedersen, Proc. of Eurocrypt' 91, Springer-Verlag) can be applied. If the secret acceptors open publicly verification information $\{g^S$ modp, $g^{f1}$ modp, $\ldots , g^{fd}$ modp$\}$, respective terminals can check the validity of own secret information and thus the security can be improved.

In the above, the base station distributes the secret information Sa of respective terminals in secret to respective terminals by using the cipher communication means and also distributes the preparatory information C1 to respective terminals. However, the base station may calculate C1$^{Sa}$ modp and then distributes them in secret to respective terminals via the cipher communication means. Since respective terminals cannot directly know Sa by this method, the terminals cannot calculate S even if they are in collusion with each other. However, in this case, the set-up must be performed every key sharing.

Although the base station distributes the exclusive information C2 to exclude the terminal 5 in the key sharing phase, such base station may calculate C2$\hat{}(=(5, \Lambda)$ modq) modp and distribute them. According to this method, computational complexity in the terminal can be reduced extremely but an amount of communication is increased since $\Lambda$ is different every terminal.

Although the ElGamal cipher-based method is implemented in the first embodiment, a method may be implemented on the basis of the Nyberg-Rueppel signature. According to this method, the terminals can verify the digital signature of the base station applied to the common data M. As for details of the Nyberg-Rueppel signature, please see Menezes, van Oorschot, Vanstone, "HANDBOOK OF APPLIED CRYPTOGRAPHY" (CRC Publishing Co.). The Nyberg-Rueppel signatures of six types (much more types if positive and negative are considered) have been proposed according to the configuration of the method. All six types can be applied to the present invention.

Further, the base station holds the public information y1, $\ldots$, y5 of respective terminals. However, if the base station can be trusted, it may hold the secret information S1, $\ldots$, S5 in place of the public information.

Furthermore, in the first embodiment, the common data M is employed as the common key. Alternatively, the common key itself may be utilized as the common key between the base station and the terminals.

Moreover, if the terminal is newly incorporated into the system in which the set-up has been completed like the first embodiment, the secret information may be calculated by using the new terminal number and then this secret information may be distributed in secret to the new terminal.

Besides, in the first embodiment, one piece of secret information is held in every terminal. But it is possible to change the authority every terminal by adjusting the number of the secret information in response to the strength of the authority of the terminal. For example, such a method can be employed that the terminals which hold only one secret information cannot share the key, whereas the terminals which hold more than two secret information can share the key.

Also, in the first embodiment, the difficulty of the discrete logarithm problem to the finite field GF(p) is employed. Normally this can be extended to the discrete logarithm problem on the elliptic curve to any finite field (field of definition). In this case, since the bit number of the field of definition can be reduced to about 160 bits, for example, data communication amount and a size of the storing area in the terminal or the base station can be reduced.

If first, second, and third base station side storing portions of the base station and first, second, and third terminal side storing portions of the terminal are constructed as areas which cannot be observed nor changed, the base station, the user of the terminals, and the third party cannot observe nor change the secret information and thus the security can be improved. If the terminals are in collusion with each other, it is difficult for them to calculate the secret key S of all terminals.

Although the key sharing is conducted to exclude the particular terminal in the first embodiment, conversely such a method that the base station can share the key only with the particular terminal will be explained hereunder. In this method, the same infra as that in the first embodiment can be employed. If the key sharing method in the first embodiment and a following key sharing method may be switched automatically according to a size of the group, the base station can perform the key sharing effectively unconsciously. FIG. 5 shows the key sharing phase in the method in which only the particular terminals can share the key.

The base station $0$ calculates common information X1 ($=y2^k$ modp) and X2 ($=y1^k$ modp) which use the public information y1 and y2 of the particular terminals $1$ and $2$ as the base, p as the modulus, and k as the exponent and broadcasts the common information X1, X2 together with the preparatory information C1 ($=g^k$ modp) to all terminals $1, \ldots, 5$.

The base station $0$ calculates the common key $$K = (y1 \times y2)^k$$
$$= g^{\wedge}(k \times (S1 + S2) \bmod q) \bmod p.$$

which uses the integer k as the exponent, and a product of y1 and y2 as a base by using the public information y1, y2 of the particular terminals $1, 2$.

The particular terminal $1$ calculates a product $$C1^{S1} \times X1 = g^{\wedge}(k \times (S1+S2) \bmod q) \bmod p$$

of the power residue value, which uses p as the modulus and the preparatory information C1 as the base and the secret key S1 as the exponent, and the common information X1 to thus obtain the common key K. According to this method, the particular terminal $2$ can calculate the common key K by the similar calculation. Since the set-up phase and the preparatory phase of the system are similar to those in the first embodiment, the key sharing method in the first embodiment and the particular terminals may be switched according to the number of particular terminals in the key sharing phase.

As described above, according to the first embodiment of the present invention, the exclusive key sharing method in the system consisting of the base station and five terminals is constructed such that the base station broadcasts preparatory information ($g^k$ modp), exclusive information ($g^{kS5}$ modp), a ciphertext (M×K modp) and the excluded terminal number (5) to respective terminals by using secret information Si which are generated by distributing a secret key S by the secret distribution method, while respective terminals calculates a product of $Ci^{\wedge}(\lambda(i, \Lambda) \bmod q)$ modp and $C2^{\wedge}(\lambda(5, \Lambda) \bmod q)$ modp to obtain K and then calculate M by dividing the ciphertext (M×K modp) by K to obtain common data to the base station $0$, whereby other terminals except the terminal $5$ can share the key with the base station. Therefore, other terminals except the terminal $5$ can share the key with the base station in small communication amount at high speed.

(Second Embodiment)

A second embodiment of the present invention is an exclusive key sharing method in which, in a system consisting of a base station and five terminals, the base station broadcasts the preparatory information ($g^k$ modp), the exclusive information ($y4^k$ modp, $y5^k$ modp), the ciphertext (M×K modp) together with the particular terminal numbers (4, 5) to all terminals, while respective terminals calculates $g^{\wedge}(k \times S1 \times \lambda(1, \Lambda) \bmod q) \times g^{\wedge}(S4 \times k \times \lambda(4, \Lambda) \bmod q) \times g^{\wedge}(S5 \times k \times \lambda(5, \Lambda) \bmod q)$ modp to obtain K and then divide it by the ciphertext K to obtain common data M to the base station, whereby other terminals except the terminal $4$ and the terminal $5$ can share the key with the base station.

Figure 6:
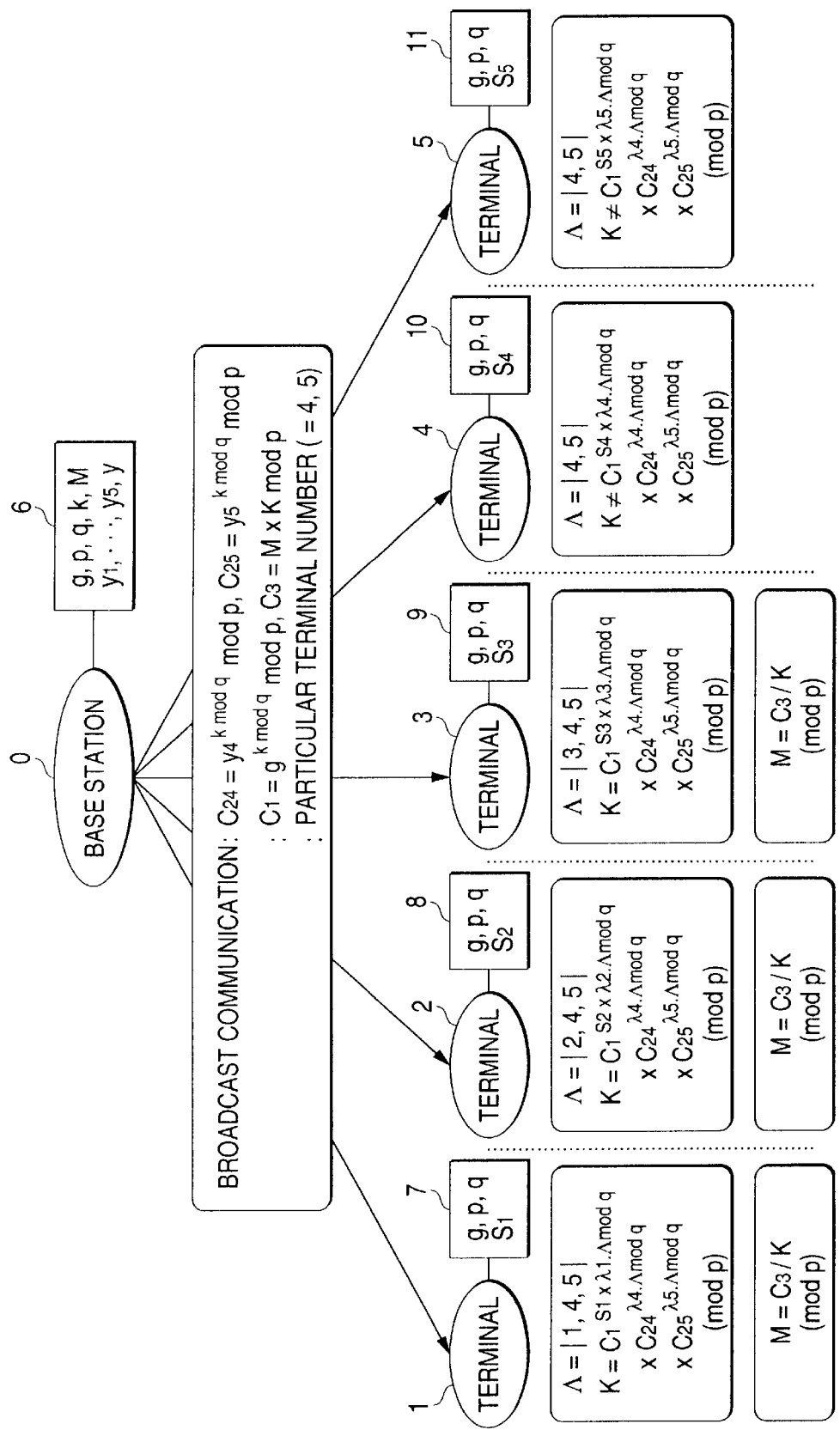
FIG. 6 is a view showing a key sharing phase in the case where a common key is shared with all terminals except particular terminals 4 and 5, in the key sharing method according to a second embodiment of the present invention.

FIG. 6 is a view showing a key sharing phase executed in the case where the common data are shared with all terminals $1, 2, 3$ except the particular terminals $4$ and $5$, in the key sharing method according to the second embodiment of the present invention. The set-up phase and the preparatory phase in the second embodiment of the present invention are similar to those in the first embodiment.

The key sharing phase executed in the case where common data are shared with all terminals $1, 2, 3$ except the particular terminals $4$ and $5$ will be explained with reference to FIG. 6 hereunder. The base station $0$ broadcasts the preparatory information C1 ($=g^k$ modp) which uses k as the exponent, p as the modulus, and g as the base, the exclusive information C24 ($=y4^k$ modp) and C25 ($=y5^k$ modp) which uses the integer k as the exponent, p as the modulus, and g as a base by using the public information y4, y5 of two particular terminals $4, 5$, a ciphertext C3 (=M×K modp) which is a product of the common data M and the common key K to the modulus p together with the particular terminal numbers (=4, 5) to all terminals.

The terminal $1$ calculates $\lambda(1, \Lambda), \lambda(4, \Lambda), \lambda(5, \Lambda)$ where $\Lambda = \{1, 4, 5\}$, then calculates a power residue value $$C1^{\wedge}(S1 \times \lambda(1, \Lambda) \bmod q) \bmod p$$
$$= g^{\wedge}(k \times S1 \times \lambda(1, \Lambda) \bmod q) \bmod p$$

which uses a product of Sj and $\lambda(j, \Lambda)$ to the modulus q as the exponent and the C1 as the base, by using the preparatory information C1 and the exclusive information C24, C25. Then, the terminal $1$ calculates a power residue value $$C24^{\wedge}(\lambda(4, \Lambda) \bmod q) \bmod p$$
$$= y4^{\wedge}(k \times \lambda(4, \Lambda) \bmod q) \bmod p$$
$$= g^{\wedge}(S4 \times k \times \lambda(4, \Lambda) \bmod q) \bmod p$$

which uses $\lambda(4, \Lambda)$ to the modulus q as the exponent and the C24 as the base, by using the exclusive information C24. Also, the terminal 1 calculates a power residue value $$C25^{\wedge}(\lambda(5, \Lambda) \bmod q) \bmod p$$
$$= y5^{\wedge}(k \times \lambda(5, \Lambda) \bmod q) \bmod p$$
$$= g^{\wedge}(S5 \times k \times \lambda(5, \Lambda) \bmod q) \bmod p$$

which uses $\lambda(4, \Lambda)$ to the modulus q as the exponent and the C24 as the base, by using the exclusive information C24. Then, the terminal 1 calculates a product of them $$C1^{\wedge}(S1 \times \lambda(1, \Lambda) \bmod q) \times C24^{\wedge}(\lambda(4, \Lambda) \bmod q) \times$$
$$C25^{\wedge}(\lambda(5, \Lambda) \bmod q) \bmod p$$
$$= g^{\wedge}(k \times S1 \times \lambda(1, \Lambda) \bmod q) \times g^{\wedge}(S4 \times k \times \lambda(4, \Lambda) \bmod q) \times$$
$$g^{\wedge}(S5 \times k \times \lambda(5, \Lambda) \bmod q) \bmod p$$
$$= g^{\wedge}(k \times (S1 \times \lambda(1, \Lambda) + S4 \times \lambda(4, \Lambda) \bmod q) +$$
$$S5 \times \lambda(5, \Lambda) \bmod q) \bmod p$$
$$= g^{\wedge}(k \times S \bmod q) \bmod p$$

to obtain K. In addition, the terminal 1 calculates a value $$C3/K \bmod p = M \times K/K \bmod p = M$$

which is obtained by dividing the ciphertext C3 by K to the modulus p to obtain the common data M to the base station.

The terminals 2, 3 can also perform the above calculations similarly. As a result, the terminals 1 to 3 can share the common data M. The set-up phase is not needed in succeeding key sharing.

In contrast, the terminals 4, 5 cannot decide that the exclusive information $C24(=y4^k=g^{\wedge}(k \times S4) \bmod p)$, $C25(=y5^k=g^{\wedge}(k \times S5) \bmod p)$ which are broadcasted from the base station are equal to the power residue value $(C1^{S4} \bmod p = g^{\wedge}(k \times S4) \bmod p$, $C1^{S5} \bmod p = g^{\wedge}(k \times S5) \bmod p)$ which can be calculated based on the held information, and also cannot calculate $\lambda(4, \Lambda), \lambda(5, \Lambda)$ because of $\Lambda = \{4, 5\}$. Therefore, the terminals 4, 5 cannot calculate the common key K in the above key sharing phase.
As a result, the terminals 4, 5 cannot calculate the common data M.
Not only the predetermined number d of particular terminals but also any number of terminals can be excluded. The base station holds e sets of secret information which are obtained by dividing the secret key S to any e particular terminal numbers d1, . . . , de (e is an integer) respectively, while respective terminals hold the secret information corresponding to own terminal numbers out of respective sets.

If the base station performs the key sharing, it selects the particular terminal number dw ($1 \leq w \leq e$) which is equal to the actual particular terminal number D from d1, . . . , de, then calculates the exclusive information by using the secret information divided to the selected particular terminal number dw, and then distributes it to all terminals. Thus, any terminals can be excluded if the number is within d.

In addition, if the actual particular terminal number D is smaller than the particular terminal number d, the secret key S of all terminals is divided into the number which is larger than the normal number by (d−1). The base station holds such SN+1, . . . , SN+d−1 which are in excess of the normal number as dummy secret information. According to this method, if the base station selects v (=d−D) pieces, which is difference between the actual particular terminal number D and the particular terminal number d, of secret information Sb1, . . . , Sbv from such SN+1, . . . , SN+d−1, then calculates the exclusive information, and then distributes them to all terminals excessively, it can exclude any terminals if they are within d. In the case of this method, the secret information can be reduced rather than the method which employs e sets of secret information corresponding to the d1, d2, . . . , de.

As described above, according to the second embodiment of the present invention, the exclusive key sharing method in the system consisting of the base station and five terminals is constructed such that the base station broadcasts the preparatory information ($g^k$ modp), the exclusive information ($y4^k$ modp, $y5^k$ modp), the ciphertext (M×K modp) together with the particular terminal numbers (4,5) to all terminals, while respective terminals calculates $g^{\wedge}(k \times S1 \times \lambda(1, \Lambda) \bmod q) \times g^{\wedge}(S4 \times k \times \lambda(4, \Lambda) \bmod q) \times g^{\wedge}(S5 \times k \times \lambda(5, \Lambda) \bmod q)$ modp to obtain K and then divide it by the ciphertext K to obtain common data M to the base station, whereby other terminals except the terminal 4 and the terminal 5 can share the key with the base station. Therefore, other terminals except the terminal 4 and the terminal 5 can share the key with the base station in small communication amount at high speed.

(Third Embodiment)

A third embodiment of the present invention is an exclusive key sharing method in which, in a system consisting of six terminals, the preparatory information C1($g^k$ modp), the exclusive information C2($g^{kS5}$ modp), the ciphertext K($g^{kS}$ modp), and the excluded terminal number (5) are broadcasted from the chairman terminal to other terminals with use of the secret information Si, to which the secret key S is distributed by the secret distribution method, while respective terminals calculate $C1^{\wedge}(\lambda(i, \Lambda) \bmod q) \times C2^{\wedge}(\lambda(5, \Lambda) \bmod q)$ modp to obtain K, whereby the terminals except the terminal 5 can share a group key K.

Figure 7:
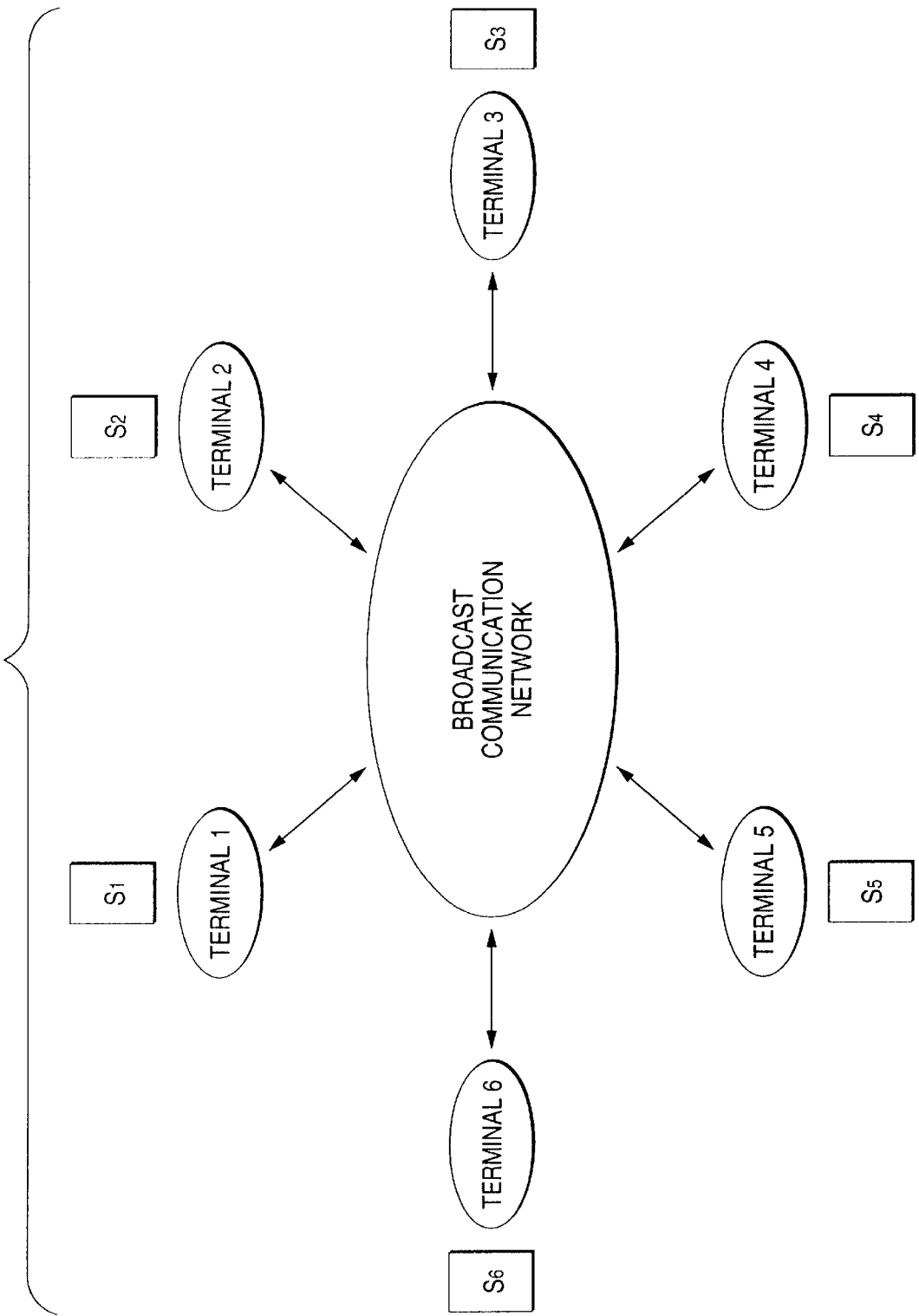
FIG. 7 is a view showing a set-up phase in a key sharing method according to a third embodiment of the present invention.
Figure 8:
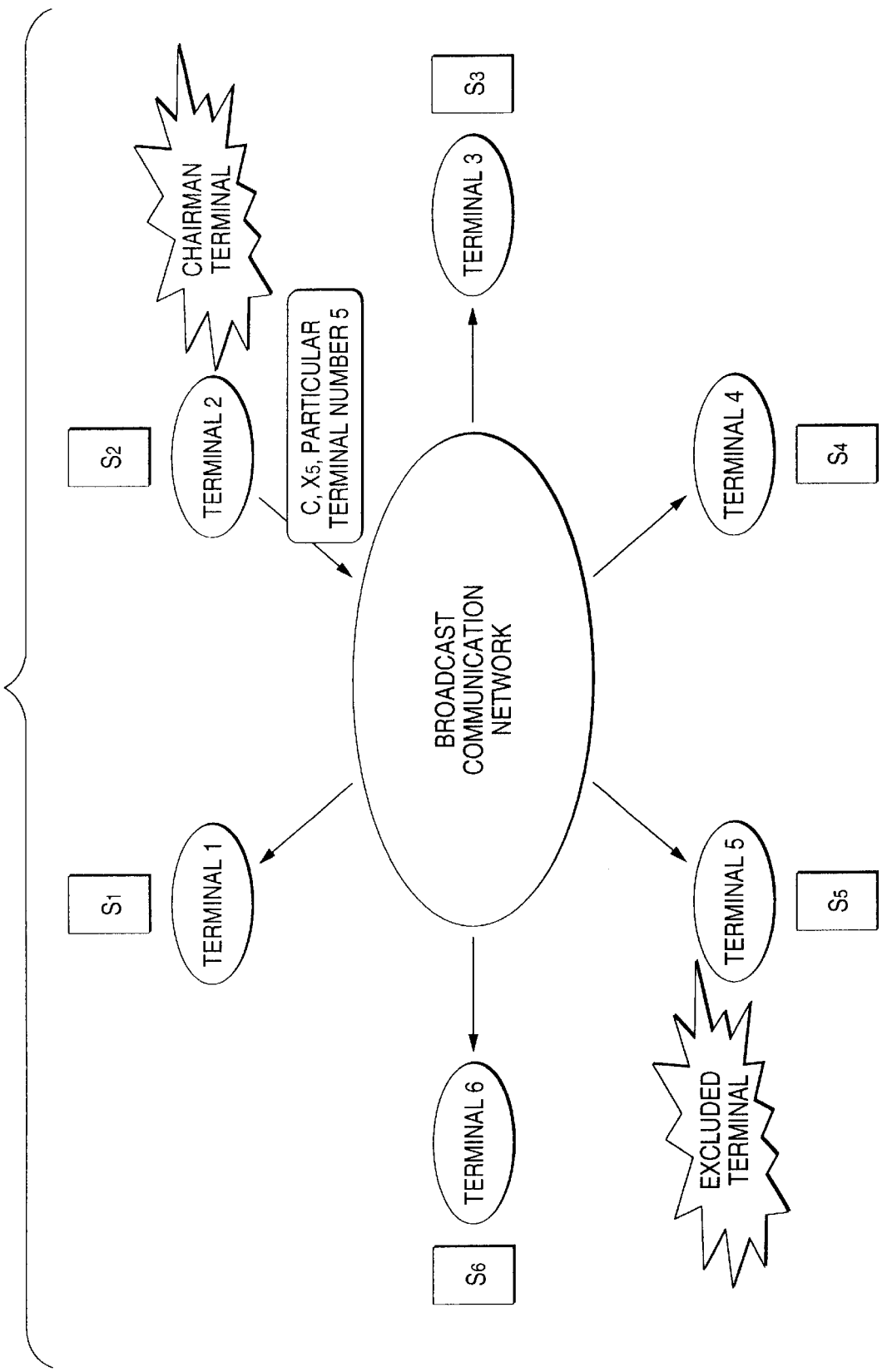
FIG. 8 is a view showing a preparatory phase in the key sharing method according to the third embodiment.
Figure 9:
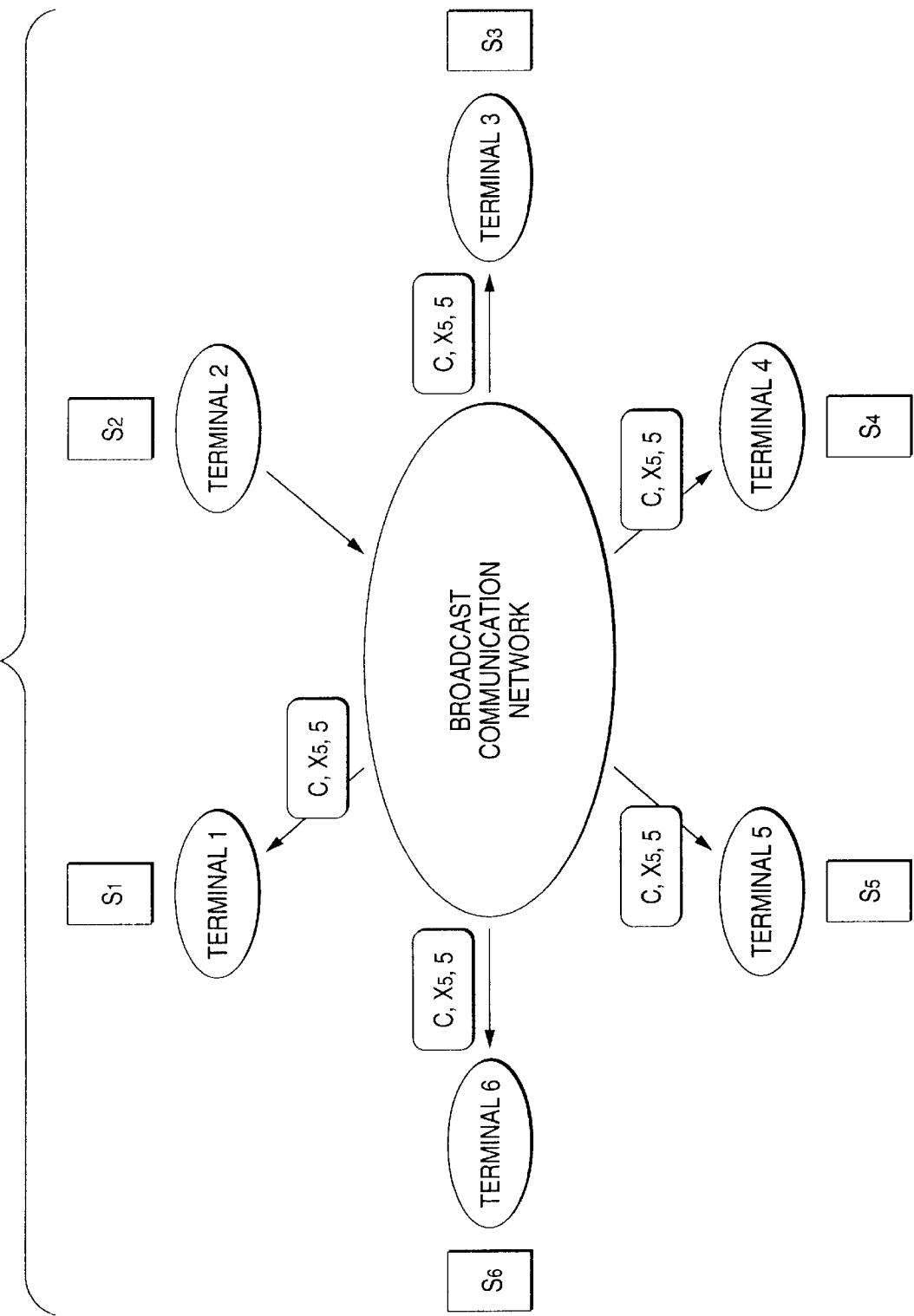
FIG. 9 is a view showing a key sharing phase in the key sharing method according to the third embodiment.

FIG. 7 is a view showing a set-up phase in a key sharing method according to a third embodiment of the present invention. FIG. 8 is a view showing a preparatory phase in the key sharing method according to the third embodiment. FIG. 9 is a view showing a key sharing phase in the case where the common key is shared with all terminals except the terminal 5.

The key sharing method according to the third embodiment of the present invention is roughly classified into three phases, i.e., the set-up phase, the preparatory phase, and the key sharing phase. The case where the terminal 2 is appointed to the chairman and the terminals share the group key K to exclude the terminal 5 will be explained phase by phase.

The set-up of the key sharing method according to the third embodiment of the present invention will be explained with reference to FIG. 7. The chairman terminal formulates the secret key S and holds it in secret. The chairman terminal formulates the prime number p which is larger than the secret key S and the terminal number 6 or the power number p of the prime number and opens it publicly, and calculates one measure q of (p−1) and opens it publicly, and calculates an element g of GF(q) and opens it publicly.

The chairman terminal calculates a non-zero element f1 of GF(q) and holds it.

The chairman terminal distributes in secret the secret information Si, which are obtained by calculating $S_i=f(i)$ by using $$f(i)=S+f_1 \times i \bmod q,$$

to respective terminals i ($1 \leq i \leq 6$) via the cipher communication means.

Suppose that $\Lambda$ is a set of any two terminals out of six terminals, the secret information Si can satisfy $$S=\Sigma \lambda(i, \Lambda) \times S_i \text{ (sum of } i \in \Lambda \text{ is calculated)}$$

$$\lambda(i, \Lambda)=\Pi\{L/(L-i)\} \text{ (product of } L \in \Lambda-\{i\} \text{ is calculated.)}$$

Where the set $\Lambda-\{i\}$ is a set which is obtained by subtracting a set $\{i\}$ from a set $\Lambda$.

The respective terminals 1, ..., 6 hold the secret information Si in storing portions.

The chairman terminal calculates the public information $y1(=g^{S1} \bmod p)$, $y2(=g^{S2} \bmod p)$, ..., $y6(=g^{S6} \bmod p)$, which use the secret information S1, ..., S6 as exponents respectively, p as the modulus, and g as the base, and then opens them publicly. The public information y1, y2, ..., y6 may be saved locally in respective terminals, or may be put up on the public area on the network to which any terminal can access. After the calculation, the secret information S1, ..., S6 are cleared from the chairman terminal. The chairman terminal calculates the public keys $y(=g^S \bmod p)$ of all terminals, which use the secret key S of all terminals 1, ..., 6 as the exponent, p as the modulus, and g as the base, and then opens them publicly. After the calculation, the secret key S is cleared from the chairman terminal.

The preparatory phase in the third embodiment of the present invention will be explained with reference to FIG. 8 hereunder. The chairman terminal generates arbitrarily a non-zero element k of GF(q) and calculates the preparatory information $C1(=g^k \bmod p)$ which uses an integer k as the exponent, p as the modulus, and g as the base. The chairman terminal calculates the exclusive information $C2(=y_5^k \bmod p)$, which uses an integer k as the exponent, p as the modulus, and the public information y5 of the terminal 5 specified by the chairman terminal as the base. The chairman terminal broadcasts the preparatory information C1, the exclusive information C2, and the particular terminal number 5 to all terminals.

The key sharing phase executed in the case where all terminals 1, ..., 4, 6 except the terminal 5 share the common key will be explained with reference to FIG. 9 hereunder. The chairman terminal calculates a group key $$K=y^k \bmod p$$

by using the system public key y.

The terminal 1 calculate a product $$C1\wedge(S1 \times \lambda(1, \Lambda) \bmod q) \times C2\wedge(\lambda(5, \Lambda) \bmod q) \bmod p$$

$$= g\wedge(k \times S1 \times \lambda(1, \Lambda) \bmod q) \times g\wedge(k \times S5 \times \lambda(5, \Lambda) \bmod q) \bmod p$$

$$= g\wedge(k \times (S1 \times \lambda(1, \Lambda) + S5 \times \lambda(5, \Lambda) \bmod q)) \bmod p$$

$$= g\wedge(k \times S \bmod q) \bmod p$$

$$= K$$

of a power residue value $$C1\widehat{\ }(\lambda(1, \Lambda) \bmod q) \bmod p$$

which uses a product of Si and $\lambda(1, \Lambda)$ as an exponent and $C_1$ as the base and a power residue value $$C2\widehat{\ }(\lambda(5, \Lambda) \bmod q) \bmod p$$

which uses $\lambda(5, \Lambda)$ as the exponent and C2 as the base, by using the preparatory information $C1(=g^k \bmod p)$ and the exclusive information $C2(=y_5^k \bmod p)$ to thus obtain the common key K.

The terminals 3 to 4, 6 can perform the above calculations similarly. As a result, the terminals 1 to 4, 6 can share the common key K.

In contrast, the terminal 5 cannot decide that the exclusive information $C2(=y_5^k=g\widehat{\ }(k \times S5) \bmod p)$ which is broadcasted from the chairman terminal is equal to the power residue value $(=C1^{S5} \bmod p=g\widehat{\ }(k \times S5) \bmod p)$ which can be calculated based on the held information, and also cannot calculate $\lambda(5, \Lambda)$ because of $\Lambda=\{5\}$. Therefore, the terminal 5 cannot calculate the common key K in the above key sharing phase.

Since respective terminals cannot calculate the secret key S based on K, C1, and y, respective divided secret information Si can be reused. For this reason, the set-up is not needed in the following key sharing and therefore only the preparatory phase and the key sharing phase may be repeated.

In the event that the new subscription terminal is present, $Si=f(i)$ may be distributed in secret to the new subscription terminal.

A method of updating periodically the common key will be explained hereunder. For example, if the third terminal tries to change its key, it generates the random number k to formulate C1 and then broadcasts it to other terminals. The chairman terminal formulates C2 which is employed to exclude the third terminal by using the public key y3 of the third terminal and then broadcasts it to other terminals. The terminals other than the third terminal can share the same key. The third terminal can calculate the common key to other terminals by using both the public key y of all terminals and the random number k generated by its own terminal. The broadcast key can be changed simultaneously if any terminal transmits above two information.

In other words, the key sharing proposer (terminal 3) performs the key sharing operation to exclude own terminal like the base station and finally own terminal itself generates the common key based on the public key of all terminals.

A method of grading the terminals will be explained hereunder. Suppose that each terminal among the terminals has the different authority according to its user and the chairman is present. It is intended to constitute the group consisting of only the chairmen and to limit the receiver based on the communication contents. As the particular method, this can be achieved by changing the number of share Si (weight) between the chairman terminal and other terminals.

For example, in the set-up phase, the chairman has two shares with a threshold value 3, while other terminals have one share with the threshold value 3 similarly. In the key sharing phase, the chairman formulates one dummy share and distributes the exclusive information. As a result, the chairman can share the key, but other terminals cannot share the key.

For another example, in the set-up phase, the chairman has three shares with a threshold value 4 and the vice-chairman has two shares with the threshold value 4, while other terminals have similarly one share with the threshold value 4. In the key sharing phase, the chairman formulates one dummy share and distributes the exclusive information. As a result, the chairman can share the key, but the vice-chairman and other terminals cannot share the key. If the chairman formulates two dummy shares and distributes the exclusive information, the chairman and the vice-chairman can share the key, but other terminals cannot share the key.

In the third embodiment, the chairman terminal generates the secret information and the public information of other terminals and distributes the exclusive information of other terminals. But any terminal may distribute the exclusive information. Such any terminal generates the exclusive information by using the public information of the excluded terminal, which is saved locally or acquired from the public area, and then distributes it.

As described above, in the third embodiment of the present invention, the exclusive key sharing method is constructed such that, in the system consisting of six terminals, the preparatory information $C1(g^k \bmod p)$, the exclusive information $C2(g^{kS5} \bmod p)$, the ciphertext $K(g^{kS} \bmod p)$, and the excluded terminal number (5) are broadcasted from the chairman terminal to other terminals with use of the secret information Si, to which the secret key S is distributed by the secret distribution method, while respective terminals calculate $C1^{\wedge}(\lambda(i, \Lambda) \bmod q) \times C2^{\wedge}(\lambda(5, \Lambda) \bmod q) \bmod p$ to obtain K, whereby the terminals except the terminal 5 can share a group key K. Therefore, in the system consisting of no base station, other terminals except the terminal 5 can share the key with the base station in small communication amount at high speed.

(Fourth Embodiment)

A fourth embodiment of the present invention is an exclusive key sharing method in which, in a communication system consisting of six terminals connected mutually to allow broadcast communication, the chairman terminal broadcasts a signature together with the exclusive information, the particular terminal number, and own terminal number to all terminals, while respective terminals check that a signer is surely the chairman terminal and also the signature, the exclusive information, the particular terminal numbers, and the chairman terminal number are not tampered and then calculate the common key by using the exclusive information and own secret information.

Figure 10:
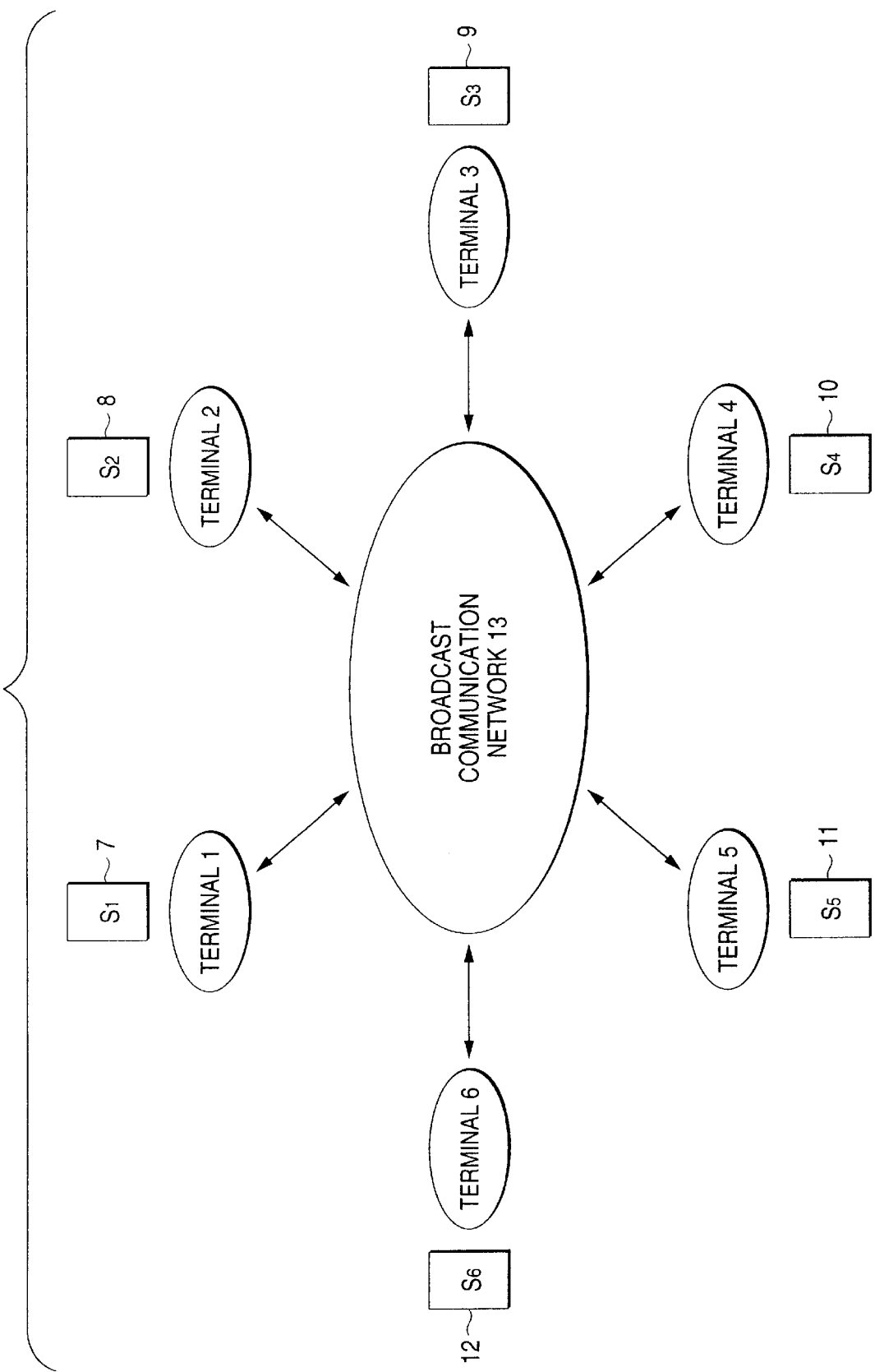
FIG. 10 is a view showing a set-up phase in a key sharing method according to a fourth embodiment of the present invention.
Figure 11:
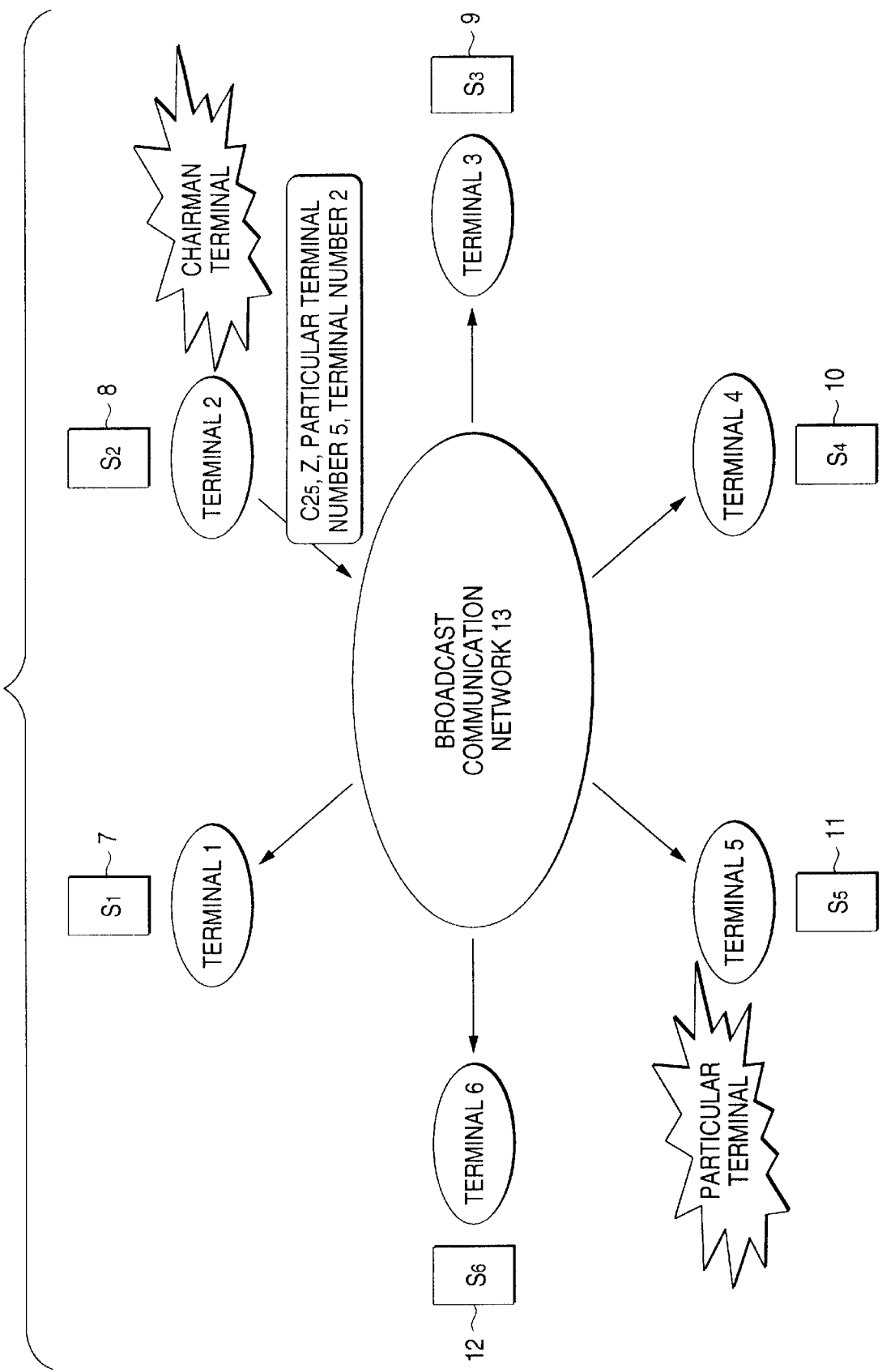
FIG. 11 is a view showing a preparatory phase in the key sharing method according to the fourth embodiment.
Figure 12:
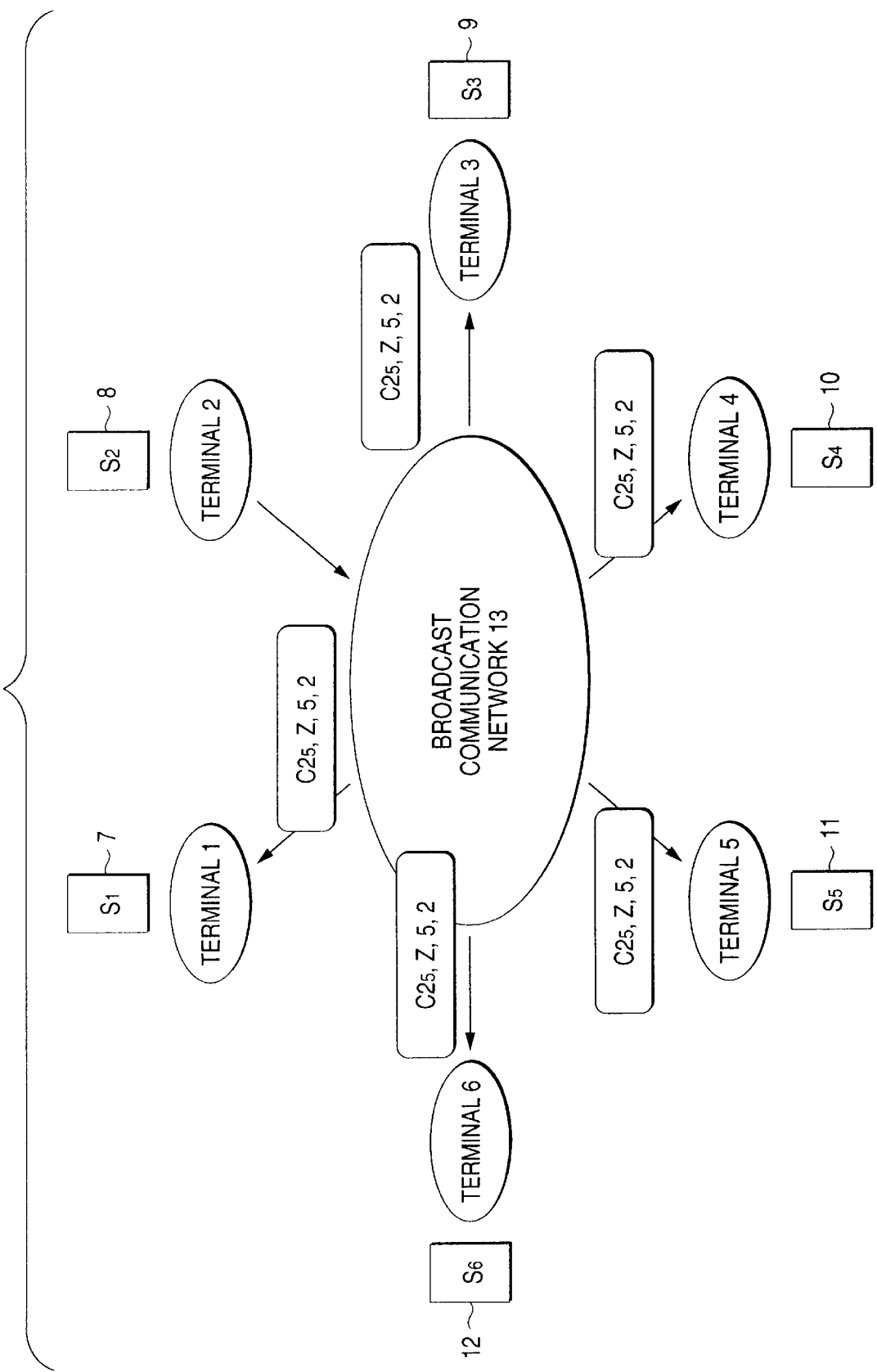
FIG. 12 is a view showing a key sharing phase in the case where a key is shared with all terminals except a terminal 5, in the key sharing method according to the fourth embodiment.

FIG. 10 is a view showing a set-up phase in the exclusive key sharing method according to the fourth embodiment of the present invention. In FIG. 10, terminals 1 to 6 are radio communication terminals. The broadcast communication network 13 is a radio communication network which enables the broadcast communication. Storing portions 7 to 12 are storing portions in the terminals 1 to 6. FIG. 11 is a view showing a preparatory phase in the exclusive key sharing method according to the fourth embodiment of the present invention. In FIG. 11, the terminal 2 is the chairman terminal. The terminal 5 is a particular terminal as the excluded object. FIG. 12 is a view showing a key sharing phase in the exclusive key sharing method according to the fourth embodiment of the present invention.

An operation of the exclusive key sharing method according to the fourth embodiment of the present invention as constructed above will be explained hereunder. At first, the set-up phase will be explained with reference to FIG. 10.

In the communication system which consists of six terminals 1 to 6 mutually via a broadcast communication network 13, the system secret key is S and managed in secret by the system manager. Suppose that a prime number which is larger than S and 6 (terminal number N) or a power number of the prime number is p, and a measure of (p−1) is q. As sizes of p and q, $|p|=1024$ bit or more and $|q|=160$ bit or more are preferable from the security aspect respectively. The element of GF(p) is g and opened publicly.

Also, the chairman terminal opens publicly the public key of the system $y = g^S \bmod p$.

This y is not always opened publicly. The chairman terminal opens publicly $y_1 = g^{S1} \bmod p, y_2 = g^{S2} \bmod p, \ldots, y_N = g^{SN} \bmod p$ as the public information of the terminals.

Meanwhile, the chairman terminal calculates $S_1, \ldots, S_6$ as the secret information of the terminals and distributes them in secret to the respective terminals. The respective terminals hold the secret information $S_1, \ldots, S_6$ in secret in the storing portions 7 to 12. The secret information $S_1, \ldots, S_6$ satisfy $S = \Sigma \lambda(i, \Lambda) \times S_i$ (sum of $i \in \Lambda$ is calculated)

$S_i = S + f_1 \times i \bmod q$ $\lambda(i, \Lambda) = \Pi\{L/(L-i)\}$ (product of $L \in \Lambda - \{i\}$ is calculated)

(where f1 is a non-zero element of GF(q)), and $\Lambda$ is a set of any two terminals out of six terminals).

Then, the preparatory phase will be explained with reference to FIG. 11. The chairman terminal 2 generates arbitrarily a non-zero element k of GF(q), and then calculates the exclusive information $C2_5 = y_5^k \bmod p$, based on the public information $y_5$ of the particular terminal 5. The chairman terminal 2 calculates a signature $Z = C2_5 \times (-S_2) + k \bmod q$ by using own secret information $S_2$, and then broadcasts the signature together with the exclusive information $C2_5$, the particular terminal number 5, and own terminal number 2 to all terminals.

Third, the key sharing phase will be explained with reference to FIG. 12 hereunder. The chairman terminal 2 calculates the common key $K = y^k \bmod p$.

If y is not opened publicly, the chairman terminal 2 calculates K in the same manner as other terminals.

The respective terminals 1, 3, 4, 6 calculate $C1 = g^z \times y_2^{\wedge}(C2_5) \bmod p$ by using the public information $y_2$ of the chairman terminal 2. If a signer is surely the chairman terminal 2 and also the signature Z, the exclusive information $C2_5$, the particular terminal numbers 5, and the terminal number 2 of the chairman terminal are not tampered, $C1 = g^k \bmod p$ is calculated.

The respective terminals j (j=1, 3, 4, 6) calculate $\lambda(j, \Lambda)$ and $\lambda(5, \Lambda)$ where $\Lambda = \{j, 5\}$ and also calculate $C1^{\wedge}(S_j \times \lambda(j, \Lambda) \bmod q) \times C2_5^{\wedge}(\lambda(5, \Lambda) \bmod q) \bmod p$ by using the preparatory information C1, the exclusive information $C2_5$, and own secret information $S_j$ to thus obtain the common key K. However, the terminal 5 cannot calculate the common key K. In this manner, the terminals other than the terminal 5 can share the common key K.

In this case, other processes correspond to those in the first to third embodiments. In addition, the chairman terminal may calculate a hash value $$H=\text{hash}(C2_5)$$

which is obtained by compressing the exclusive information $C2_5$ by using the Hash function hash ( ), and may also calculate a signature $$Z=H\times(-S_2)+k \bmod q$$

by using own secret information $S_2$, and then may broadcast the signature Z together with the exclusive information $C2_5$, the particular terminal number 5, and own terminal number 2 to all terminals. The bit number of the hash value is set equal to the bit number of q, or a residue of q is employed if such bit number is larger than q. Not only the exclusive information $C2_5$ but also the particular terminal number or the chairman terminal number may be calculated as the hash function.

In this case, the respective terminals j (j≠5,2) calculate a hash value H' which is obtained by compressing the exclusive information $C2_5$ by using the Hash function hash ( ), and also calculate $$C1=g^z \times y_2^{H'} \bmod p$$

by using public information $y_2$ of the chairman terminal. If the signer is surely the chairman terminal 2 and also the signature Z, the exclusive information $C2_5$, the particular terminal numbers 5, and the terminal number 2 of the chairman terminal are not tampered, $C1=g^k \bmod p$ and $H'=H$ are calculated.

The respective terminals j calculate $\lambda(j, \Lambda)$ and $\lambda(5, \Lambda)$ where $\Lambda=\{j,5\}$ and also calculate $C1^{\wedge}(S_j \times \lambda(j, \Lambda) \bmod q) \times C2_5^{\wedge}(\lambda(5, \Lambda) \bmod q) \bmod p$ by using the preparatory information $C1$, the exclusive information $C2_5$, and own secret information $S_j$ to thus obtain the common key K.

As described above, according to the fourth embodiment of the present invention, the exclusive key sharing method is constructed such that, in the communication system consisting of six terminals to allow broadcast communication, the chairman terminal broadcasts a signature together with the exclusive information, the particular terminal number, and own terminal number to all terminals, while respective terminals check that a signer is surely the chairman terminal and also the signature, the exclusive information, the particular terminal numbers, and the chairman terminal number are not tampered and then calculate the common key by using the exclusive information and own secret information. Therefore, while excluding the particular terminals by checking the signature, other terminals can share the key information.

(Fifth Embodiment)

A fifth embodiment of the present invention is an exclusive key sharing method in which, in a communication system which consists of six terminals connected mutually to allow broadcast communication, the chairman terminal calculates the verification information and then broadcasts the verification information together with the exclusive information and the particular terminal numbers to all terminals, while respective terminals calculate the verification equation by using the public key of the system and own secret information, and then suspends the key sharing if the verification information are not satisfied whereas calculate the common key by using the preparatory information, the exclusive information, and own secret information if the verification information are satisfied.

Figure 13:
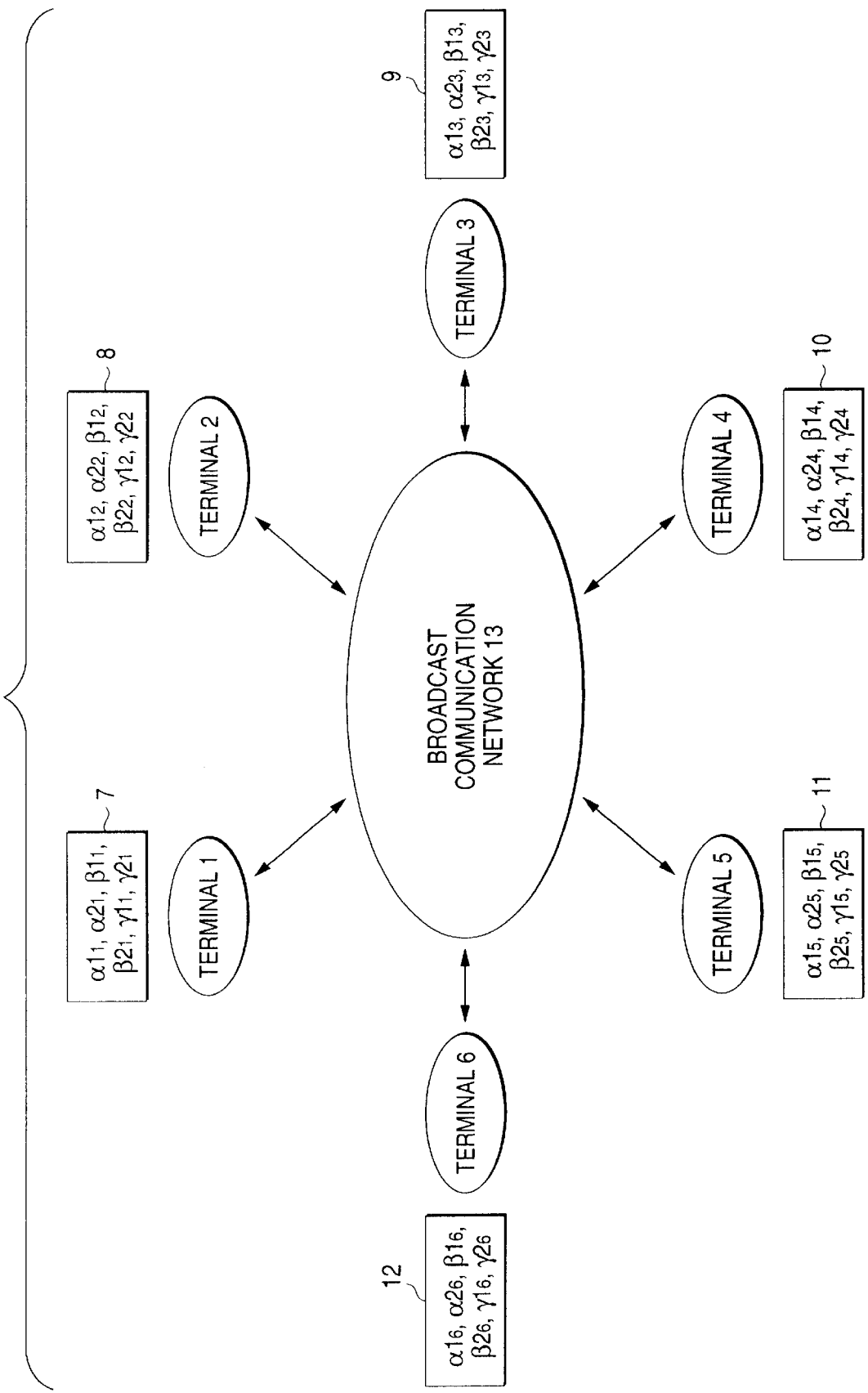
FIG. 13 is a view showing a set-up phase in a key sharing method according to a fifth embodiment of the present invention.
Figure 14:
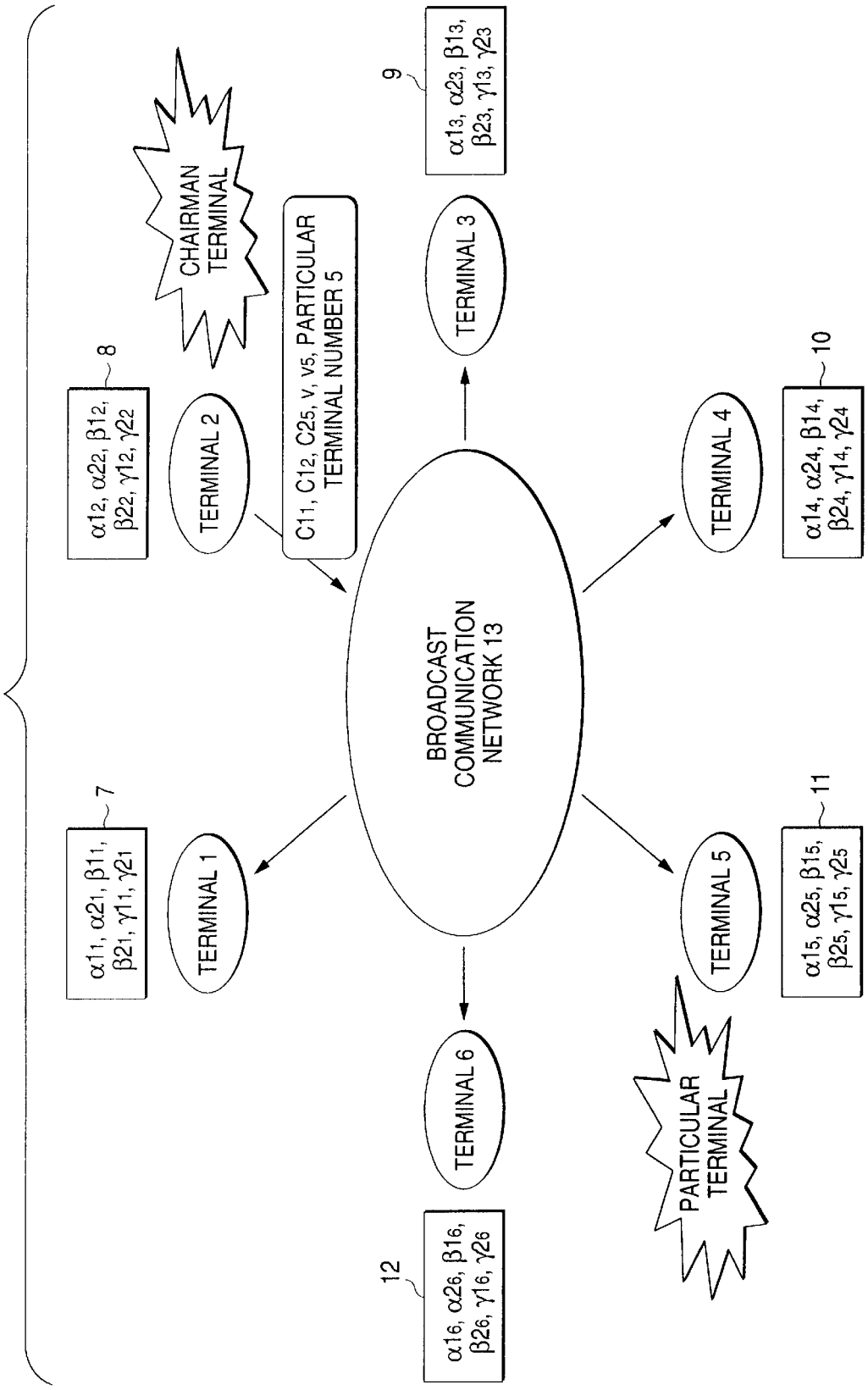
FIG. 14 is a view showing a preparatory phase in the key sharing method according to the fifth embodiment.
Figure 15:
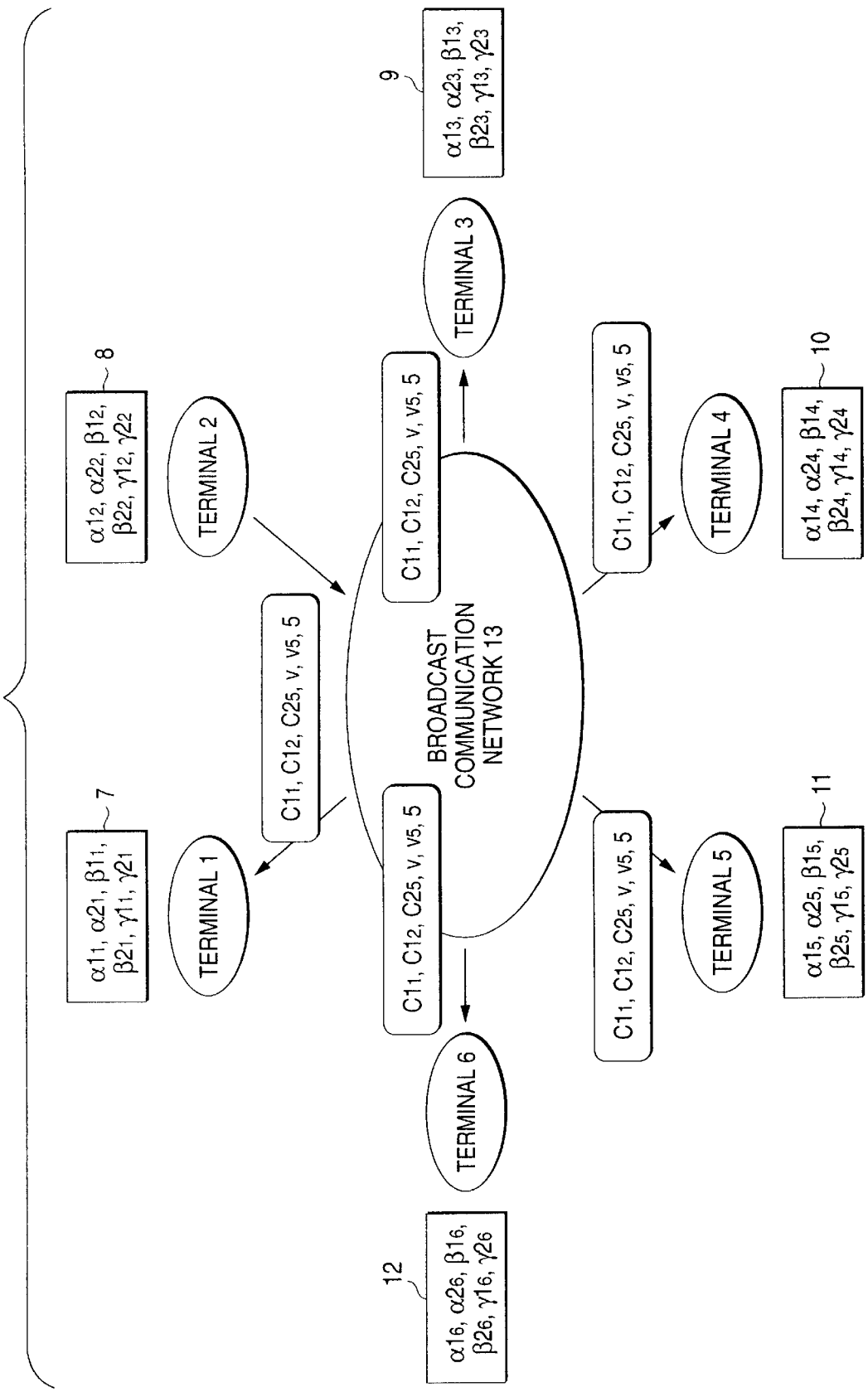
FIG. 15 is a view showing a key sharing phase in the case where a key is shared with all terminals except a terminal 5, in the key sharing method according to the fifth embodiment.

FIG. 13 is a view showing the set-up phase in the exclusive key sharing method according to the fifth embodiment of the present invention. In FIG. 13, the terminal 1 to the terminal 6 are radio communication terminals, the broadcast communication network 13 is a radio communication network to enable the broadcast communication, and storing portions 7 to 12 are storing portions provided in the terminal 1 to the terminal 6. FIG. 14 is a view showing the preparatory phase in the exclusive key sharing method according to the fifth embodiment of the present invention. In FIG. 14, the terminal 2 is the chairman terminal and the terminal 5 is the particular terminal as the excluded object. FIG. 15 is a view showing the key sharing phase in the exclusive key sharing method according to the fifth embodiment of the present invention.

The exclusive key sharing method according to the fifth embodiment of the present invention is constructed based on the Cramer-Shoup cipher. The Cramer-Shoup cipher is the public key cryptosystem which is able to prove the secure against the adaptive chosen ciphertext attack which is the strongest attacking approach to the public key cryptosystem. The outline of such cipher is given in the following, but please refer to the paper "A Practical Public Key Cryptosystem Provably Secure against Adaptive Chosen Ciphertext Attack", LNCS1462, Advances in Cryptology-CRYPTO'98, Springer to know the details.

The Cramer-Shoup cipher will be outlined hereunder. Suppose that the secret keys are $x_1, x_2, y_1, y_2, z$, the public keys are $X(=g_1^{x_1} g_2^{x_2})$, $Y(=g_1^{y_1} g_2^{y_2})$, $Z(=g_1^z)$, $g_1, g_2$, m is a message, r is a random number, and p is a prime number. Suppose that, if not mentioned particularly, all calculations are made to Zp. Then, q is a measure of q $|(p-1)$, h is a Hash function, and $g_1, g_2$ are elements of GF(p).

In the case of encryption, the ciphertext is assumed as $\{u_1, u_2, v, w\}$, where $u_1=g_1^r$, $u_2=g_2^r$, $v=X^r Y^{cr}$, $w=mZ^r$ (c=h($u_1, u_2$) modq). The verification is made based on whether or not $u1 \times 1+y1 \times cu2 \times 2+y2 \times c=u_1^{x_1} u_2^{x_2}(u_1^{y_1} u_2^{y_2})^c=v$ is satisfied. The decryption is carried out only when the verified result is correct. The decryption is carried out by using $m=w/u_1^z$.

An operation of the exclusive key sharing method according to the fifth embodiment of the present invention as constructed above will be explained. At first, the set-up phase will be explained with reference to FIG. 13.

In the communication system which consists of six terminals 1 to 6 mutually via the broadcast communication network 13 to allow the broadcast communication, the system secret keys are $\alpha1, \alpha2, \beta1, \beta2, \gamma1, \gamma2$ and managed in secret by the system manager. Suppose that a prime number which is larger than $\alpha1, \alpha2, \beta1, \beta2, \gamma1, \gamma2$ and 6 (terminal number) or a power number of the prime number is p, and a measure of (p-1) is q. It is preferable from the security aspect that a size of p is set to $|p|=1024$ bit or more and that a size of q is set to $|q|=160$ bit or more respectively. The elements of GF(p) are $g_1, g_2$, and opened publicly as the system public information.

The respective terminals i ($1 \leq i \leq 6$) hold secret information $\alpha1_i, \alpha2_i, \beta1_i, \beta2_i, \gamma1_i, \gamma2_i$ in secret in respective memory portions 7 to 12 to satisfy $\alpha1=\Sigma\lambda(i, \Lambda)\times\alpha1_i$ (sum of $i\in\Lambda$ is calculated)

(where $\alpha1_i=\alpha1+f_{1\times i}^1 \bmod q$)

$\alpha2=\Sigma\lambda(i, \Lambda)\times\alpha2_i$ (sum of $i\in\Lambda$ is calculated)

(where $\alpha2_i=\alpha2+f_1\times i^1 \bmod q$)

$\beta1=\Sigma\lambda(i, \Lambda)\times\beta1_i$ (sum of $i\in\Lambda$ is calculated)

(where $\beta 1_i = \beta 1 + f_1 \times i^1 \bmod q$)

$\beta 2 = \Sigma \lambda(i, \Lambda) \times \beta 2_i$ (sum of $i \in \Lambda$ is calculated)

(where $\beta 2_i = \beta 2 + f_1 \times i^1 \bmod q$)

$\gamma 1 = \Sigma \lambda(i, \Lambda) \times \gamma 1_i$ (sum of $i \in \Lambda$ is calculated)

(where $\gamma 1_i = \gamma 1 + f_1 \times i^1 \bmod q$)

$\gamma 2 = \Sigma \lambda(i, \Lambda) \times \gamma 2_i$ (sum of $i \in \Lambda$ is calculated)

(where $\gamma 2_i = \gamma 2 + f_1 \times i^1 \bmod q$)

$\lambda(i, \Lambda) = \Pi\{L/(L-i)\}$ (product of $L \in \Lambda - \{i\}$ is calculated)

(where $f_1$ is a non-zero element of GF(q), and $\Lambda$ is a set of any two terminals out of six terminals).

The respective terminals 1 to 6 can use the public keys of the system $A = g_1 \alpha^1 g_2 \alpha^2 \bmod p,\ B = g_1 \beta^1 g_2 \beta^2 \bmod p,\ \Gamma = g_1 \gamma^1 g_2 \gamma^2 \bmod p,$ the public information $A_1 = g_1 \alpha^{11} g_2 \alpha^{21} \bmod p, \ldots, A_6 = g_1 \alpha^{16} g_2 \alpha^{26} \bmod p$ $B_1 = g_1 \beta^{11} g_2 \beta^{21} \bmod p, \ldots, B_6 = g_1 \beta^{16} g_2 \beta^{26} \bmod p$ $\Gamma_1 = g_1 \gamma^{11} g_2 \gamma^{21} \bmod p, \ldots, \Gamma_6 = g_1 \gamma^{16} g_2 \gamma^{26} \bmod p$ which are calculated by the secret information $\alpha 1_i, \alpha 2_i, \beta 1_i, \beta 2_i, \gamma 1_i, \gamma 2_i$, and a Hash function hash ( ). The bit number of the hash value is set to the same bit number as q, and a residue of q is calculated if the bit number is larger than q.

Then, the preparatory phase will be explained with reference to FIG. 14 hereunder. The chairman terminal 2 generates arbitrarily a non-zero element k of GF(q), and then calculates the preparatory information $C1_1 = g_1^k \bmod p,\ C1_2 = g_2^k \bmod p.$ Also, the chairman terminal calculates the exclusive information $C2_5 = \Gamma_5^k \bmod p$ based on the public information $\Gamma_5$ of the particular terminal 5.

The chairman terminal 2 calculates the verification information $v = A^k B\hat{\ }\{(c \times k) \bmod q\} \bmod p\ (c = \text{hash}(C1_1, C1_2) \bmod q),$ $v_5 = A_{i1}^k B_5\hat{\ }\{(c \times k) \bmod q\} \bmod p$ and then broadcasts the verification information together with the exclusive information $C2_5$ and the particular terminal number 5 to all terminals.

Third, the key sharing phase will be explained with reference to FIG. 15 hereunder. The chairman terminal 2 calculates the common key $K = \Gamma^k \bmod p.$ The respective terminals j ($j \neq 2,5$) calculate $\lambda(j, \Lambda), \lambda(5, \Lambda)$ where $\Lambda = \{j, 5\}$, and then calculate the verification equation $(C1_1 \alpha^{1j} C1_2 \alpha^{2j} (C1_1 \beta^{1j} C1_2 \beta^{2j})^c)\hat{\ }\{\lambda(j, \Lambda) \bmod q\} \times v_5\hat{\ }\{\lambda(5, \Lambda) \bmod q\} \bmod p = v(c = \text{hash}(C1_1, C1_2) \bmod q)$ by using the public keys A, B of the system and own secret information $\alpha 1_j, \alpha 2_j, \beta 1_j, \beta 2_j$, and then suspends the key sharing unless the verification equation is satisfied.

If the verification equation is satisfied, the respective terminals j calculate $(C1_1 \gamma^{1j} C1_2 \gamma^{2j})\hat{\ }\{\lambda(j, \Lambda) \bmod q\} \times C2_5\hat{\ }(\lambda(5, \Lambda) \bmod q) \bmod p$ by using $\lambda(j, \Lambda), \lambda(5, \Lambda)$, the preparatory information $C1_1, C1_2$, the exclusive information $C2_5$, and the own secret information $\gamma 1_j, \gamma 2_j$ to thus obtain the common key K. The terminal 5 cannot calculate the common key K.

As described above, in the fifth embodiment of the present invention, the exclusive key sharing method for the communication system which consists of six terminals connected mutually to allow broadcast communication is constructed such that the chairman terminal calculates the verification information and then broadcasts the verification information together with the exclusive information and the particular terminal numbers to all terminals, while respective terminals calculate the verification equation by using the public key of the system and own secret information, and then suspends the key sharing if the verification information are not satisfied whereas calculate the common key by using the preparatory information, the exclusive information, and own secret information if the verification information are satisfied. Therefore, the respective terminals can calculate the common key after they verify the exclusive information issued by the chairman terminal. Remaining processes are applied correspondingly to the first to third embodiments. In this case, the common key K may be calculated by replacing two secret keys $\gamma 1, \gamma 2$ with one secret key $\gamma$, replacing the secret keys $\gamma 1i, \gamma 2i$ with $\gamma_i$, replacing the public key of the system $\Gamma = g_1 \gamma 1 g_2 \gamma 2 \bmod p$ with $\Gamma = g_1 \gamma \bmod p$, replacing the public information $\Gamma 1 = g_1 \gamma 11 g_2 \gamma 21 \bmod p, \ldots, \Gamma N = g_1 \gamma 1N g_2 \gamma 2N \bmod p$ with $\Gamma 1 = g_1 \gamma 1 \bmod p, \ldots, \Gamma N = g_1 \gamma N \bmod p$, and replacing $C11 \gamma 1j C12 \gamma 2j\hat{\ }\{\lambda(j, \Lambda) \bmod q\} \times C2i1\hat{\ }(\lambda(i1, \Lambda) \bmod q) \times \ldots \times C2id\hat{\ }\{\lambda(id, \Lambda) \bmod q\} \bmod p$ with $C11\hat{\ }\{\gamma j \times (\lambda(j, \Lambda) \bmod q)\} \times C2i1\hat{\ }(\lambda(i1, \Lambda) \bmod q) \times \ldots \times C2id\hat{\ }(\lambda(id, \Lambda) \bmod q) \bmod p$.

(Sixth Embodiment)

A sixth embodiment of the present invention is an exclusive key sharing method in which, in a communication system which consists of the base station and a plurality of terminals to allow broadcast communication, the base station generates arbitrarily a non-zero element k of GF(q) and broadcasts it to all terminals, calculates a new element $g'(=g^{1/e\ \bmod q} \bmod p)$ and replaces the managed element g with it, while the respective terminals i calculate new secret information $S_i'(=S_i \times e \bmod q)$.

Figure 16:
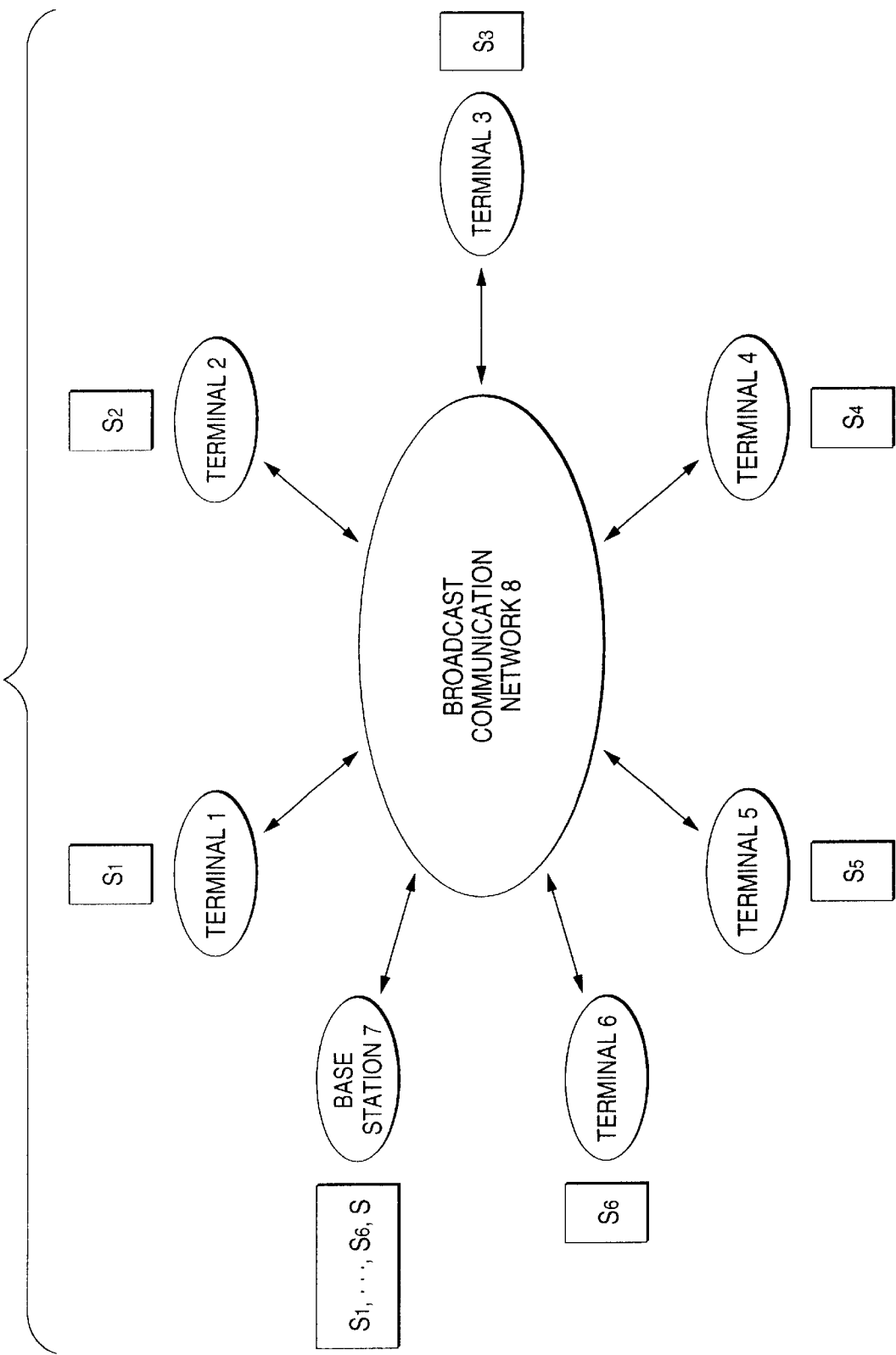
FIG. 16 is a view showing a normal condition in a key sharing method according to a sixth embodiment of the present invention.
Figure 17:
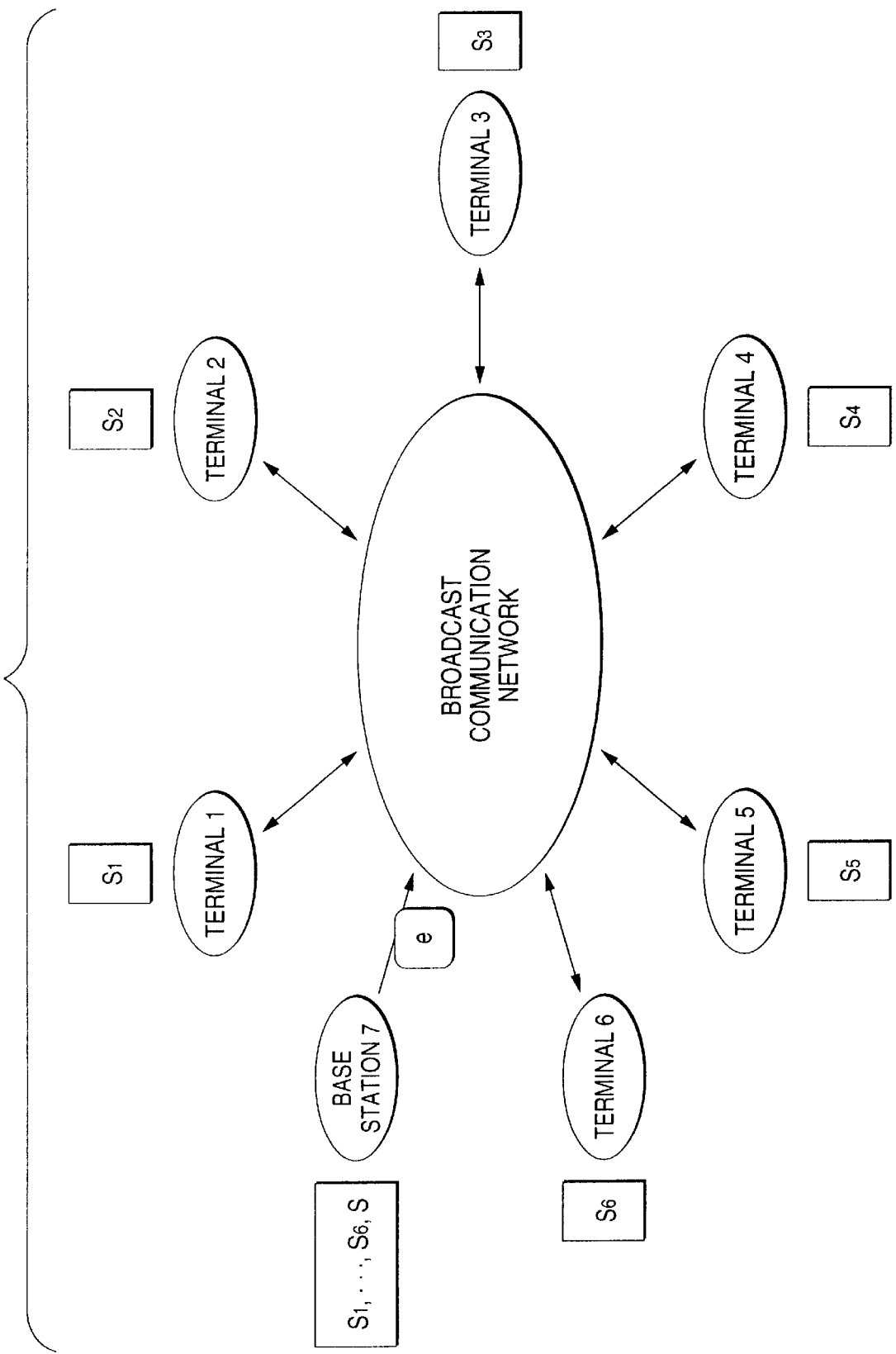
FIG. 17 is a view showing a method of updating an element g in the key sharing method according to the sixth embodiment.
Figure 18:
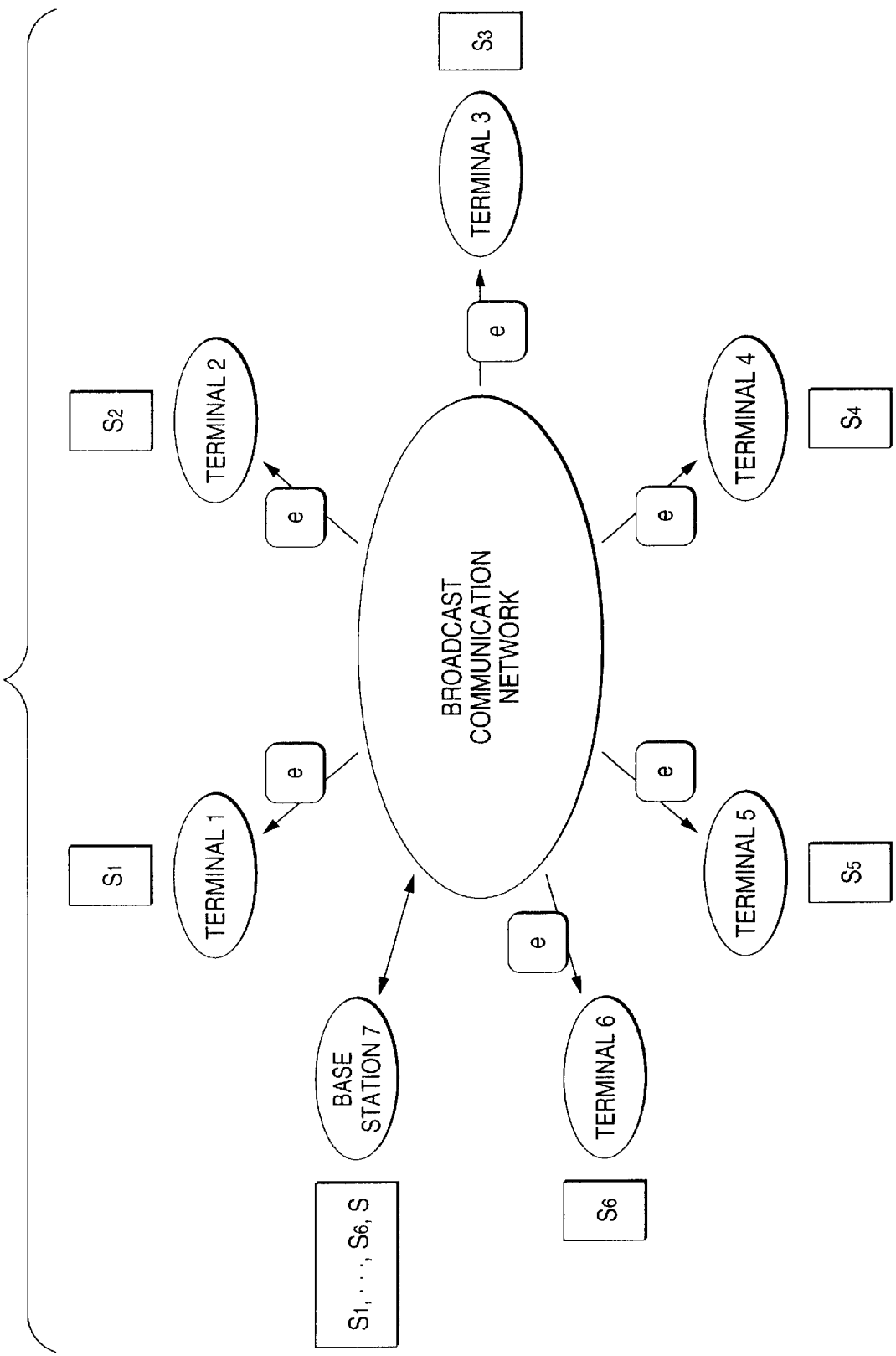
FIG. 18 is a view showing a method of updating a secret key in the key sharing method according to the sixth embodiment.

FIG. 16 is a view showing a normal condition of the communication system in the exclusive key sharing method according to a sixth embodiment of the present invention. In FIG. 16, 7 denotes the base station and 1 to 6 denote terminals under the management of the base station. A broadcast communication network 80 is a communication path which can broadcast via a radio, etc. FIG. 17 is a view showing a method of updating the element g in the exclusive key sharing method according to the sixth embodiment of the present invention. FIG. 18 is a view showing a method of updating the secret key in the exclusive key sharing method according to the sixth embodiment of the present invention.

The exclusive key sharing method according to the sixth embodiment of the present invention will be explained with reference to FIG. 16 to FIG. 18 hereunder. As shown in FIG. 16, the base station 7 formulates the secret key S and holds it in secret. The base station formulates a prime number p which is larger than the secret key S and 6 or a power number p of the prime number and holds it, and calculates one measure q of (p−1) and holds it, and calculates a non-zero element $f_1$ of GF(q).

The base station distributes in secret the secret information Si, which are detected by calculating $S_i$=f(i) by using $$f(z)=S+f_1 \times z \bmod q,$$

to respective terminals i ($1 \leq i \leq 6$) via the cipher communication means.

Suppose that $\Lambda$ is a set of any two terminals out of six terminals, the secret information Si can satisfy $$S=\Sigma\lambda(i, \Lambda) \times S_i \text{ (sum of } i \in \Lambda \text{ is calculated)}$$

$$(i, \Lambda)=\Pi\{L/(L-i)\} \text{ (product of } L \in \Lambda-\{i\} \text{ is calculated.}$$

Where the set $\Lambda-\{i\}$ is a set which is obtained by subtracting a set $\{i\}$ from a set $\Lambda$. For example, if $\Lambda=\{1,2\}$ is assumed, $$\lambda(1, \Lambda) = \Pi\{L/(L-i)\}(L \in \{2\})$$

$$= 2/(2-1) = 2$$

$$\lambda(2, \Lambda) = \Pi\{L/(L-2)\}(L \in \{1\})$$

$$= 1/(1-2) = -1$$

$$\Sigma\lambda(i, \Lambda) \times S_i (i \in \Lambda)$$

$$= \lambda(1, \Lambda) \times S_1 + \lambda(2, \Lambda) \times S_2$$

$$= 2 \times f(1) - f(2)$$

$$= 2 \cdot (S+f1) - (S+2 \cdot f1)$$

$$= S$$

can be calculated.

The respective terminals 1, ..., 6 hold the secret information Si in storing portions. The base station 7 holds the modulus p, the element g of GF(p) in a storing portion. The base station 7 calculates the public information $y_1(=g^{S_1}$ modp), $y_2(=g^{S_2}$ modp), ..., $y_6(=g^{S_6}$ modp), which use the secret information $S_1, \ldots, S_6$ as exponents respectively, p as the modulus, and g as the base, and then holds them in the storing portion. The base station 7 calculates the public keys $y(=g^S$ modp) of all terminals, which use the secret key S of all terminals 1, ..., 6 as the exponent, p as the modulus, and g as the base, and then holds them in the storing portion.

The case where the terminal 5 is excluded will be explained. The base station generates arbitrarily a non-zero element k of GF(q) and calculates the preparatory information $C_1(=g^k$ modp) which uses k as the exponent, p as the modulus, and g as the base. The base station calculates the exclusive information $C_2(=y_5^k$ modp), which uses the integer k as the exponent, p as the modulus, and the public information $y_5$ of the terminal 5 specified by the base station 7 as the base. The base station 7 calculates the common key K(=$y^k$ modp=$g^{(S \times k)}$ modp), which uses the integer k as the exponent, p as the modulus, and the public key y of all terminals 1, ..., 6 as the base. Then, the base station 7 broadcasts the preparatory information $C_1$, the exclusive information $C_2$, and the particular terminal number 5 to all terminals.

The key sharing phase executed in the case where all terminals 1, ..., 4, 6 except the terminal 5 share the common key will be explained hereunder. The terminal 1 calculates $$\lambda(1, \Lambda)=5/(5-1)=5/4$$

$$\lambda(5, \Lambda)=1/(1-5)=-1/4$$

where $\Lambda=\{1,5\}$ based on own terminal number 1 and the excluded terminal number 5 which has been received. The terminal 1 calculate a product $$C_1 \wedge (S_j \times \lambda(1, \Lambda) \bmod q) \times C_2 \wedge (\lambda(5, \Lambda) \bmod q) \bmod p$$

$$= g \wedge (k \times S_1 \times \lambda(1, \Lambda) \bmod q) \times g \wedge (k \times S_5 \times \lambda(5, \Lambda) \bmod q) \bmod p$$

$$= g \wedge (k \times (S_1 \times \lambda(1, \Lambda) + S_5 \times \lambda(5, \Lambda) \bmod q)) \bmod p$$

$$= g \wedge (k \times S \bmod q) \bmod p$$

$$= K$$

of a power residue value $$C_1\hat{}(\lambda(1, \Lambda) \bmod q) \bmod p$$

which uses a product of Si and $\lambda(1, \Lambda)$ as an exponent and $C_1$ as the base and a power residue value $$C_2\hat{}(\lambda(5, \Lambda) \bmod q) \bmod p$$

which uses $\lambda(5, \Lambda)$ as the exponent and $C_2$ as the base, by using the preparatory information $C_1(=g^k$ modp) and the exclusive information $C_2(=y_5^k$ modp) to thus obtain the common key K.

The terminals 2 to 4, 6 can perform the above calculations similarly. As a result, the terminals 1 to 4, 6 can share the common key K.

In contrast, the terminal 5 cannot decide that the exclusive information $C_2(=_5^k=g\hat{}(k \times S_5)$ modp) which is broadcasted from the base station 7 is equal to the power residue value (=$C_1^{S5}$ modp=$g\hat{}(k \times S_5$ modp) which can be calculated based on the held information, and also cannot calculate $\lambda(5, \Lambda)$ because of $A=\{5\}$. Therefore, the terminal 5 cannot calculate the common key K in the above key sharing phase.

Since respective terminals cannot calculate the secret key S based on $$K=g\hat{}(S \times k) \bmod p,$$

$$C_1=g^k \bmod p, \text{ and}$$

$$y=g^S \bmod p,$$

respective divided secret information $S_i$ can be reused. For this reason, the set-up is not needed in the following key sharing and therefore only the preparatory phase and the key sharing phase may be repeated.

A method of updating the element g by the base station 7 will be explained with reference to FIG. 17 hereunder. The base station generates arbitrarily a non-zero element e (random number) of GF(q), and broadcasts the e to all terminals. The base station calculates a new element $$g'=g^{1/e \bmod q} \bmod p$$

and replaces the managed element g with it.

A method of updating the secret key by the terminal will be explained with reference to FIG. 18 hereunder. The respective terminals i calculate new secret information $$S_i'=S_i \times e \bmod q$$

and then hold it. At this time, $(g')^{Si'}$ modp=$(g)^{Si}$ modp is satisfied.

As described above, in the sixth embodiment of the present invention, the exclusive key sharing method is constructed such that the base station generates arbitrarily the non-zero element e of GF(q) and broadcasts it to all terminals, calculates the new element $g^{1/e \bmod q}$ modp and replaces the managed element g with it, while the respective terminals i calculate new secret information $S_i \times e$ modq. Therefore, the secret key can be updated in a small communication amount and small computational complexity.

(Seventh Embodiment)

A seventh embodiment of the present invention is an exclusive key sharing method in which, in a communication system which consists of six terminals connected mutually to allow broadcast communication, the system manager generates arbitrarily a non-zero element e of GF(q) and broadcasts it to all terminals, calculates a new element $g^{1/e \bmod q}$ modp and replaces the managed element g with it, while the respective terminals i calculate new secret information $S_i \times e$ modq.

Figure 19:
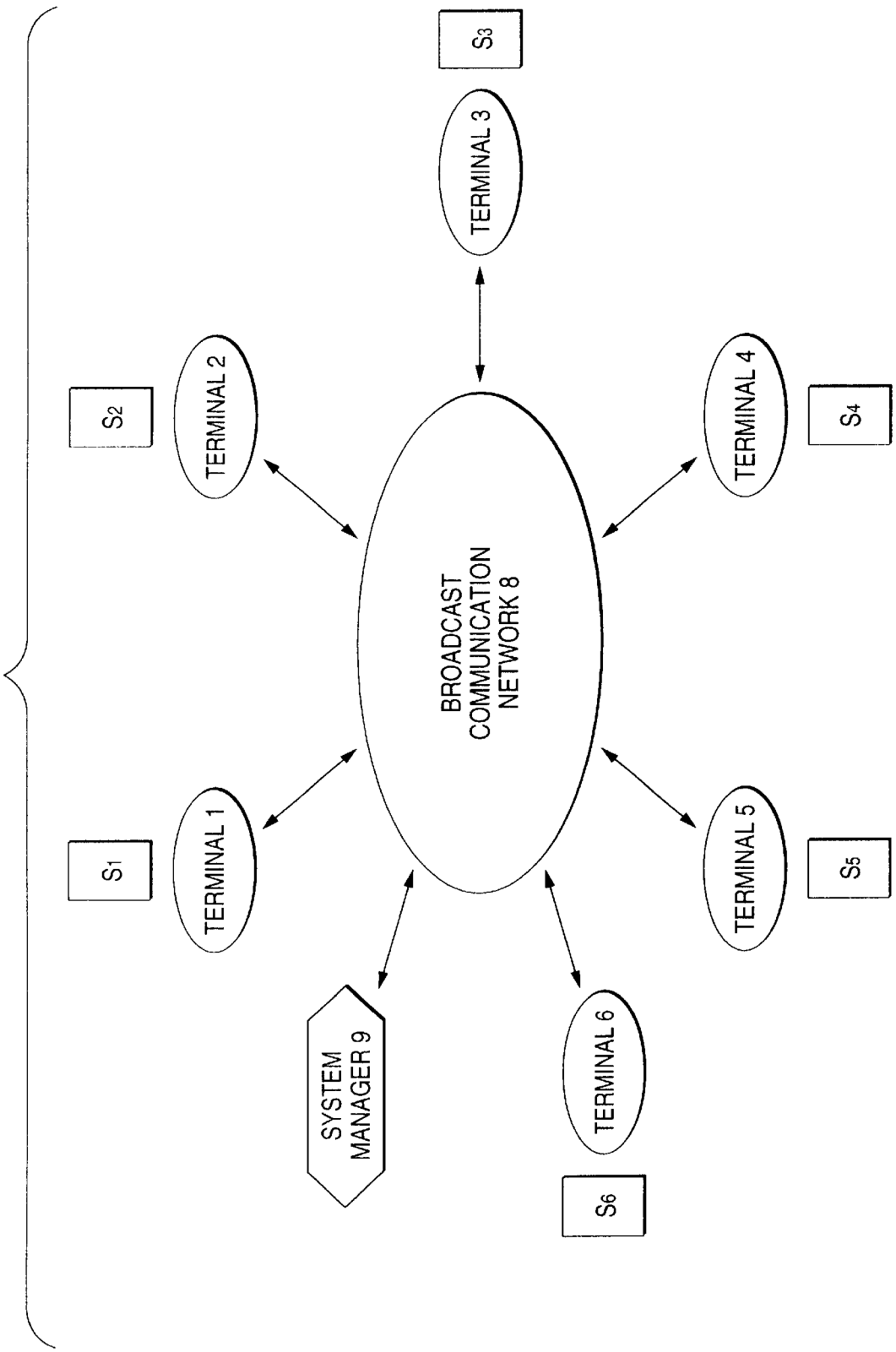
FIG. 19 is a view showing a normal condition in a key sharing method according to a seventh embodiment of the present invention.
Figure 21:
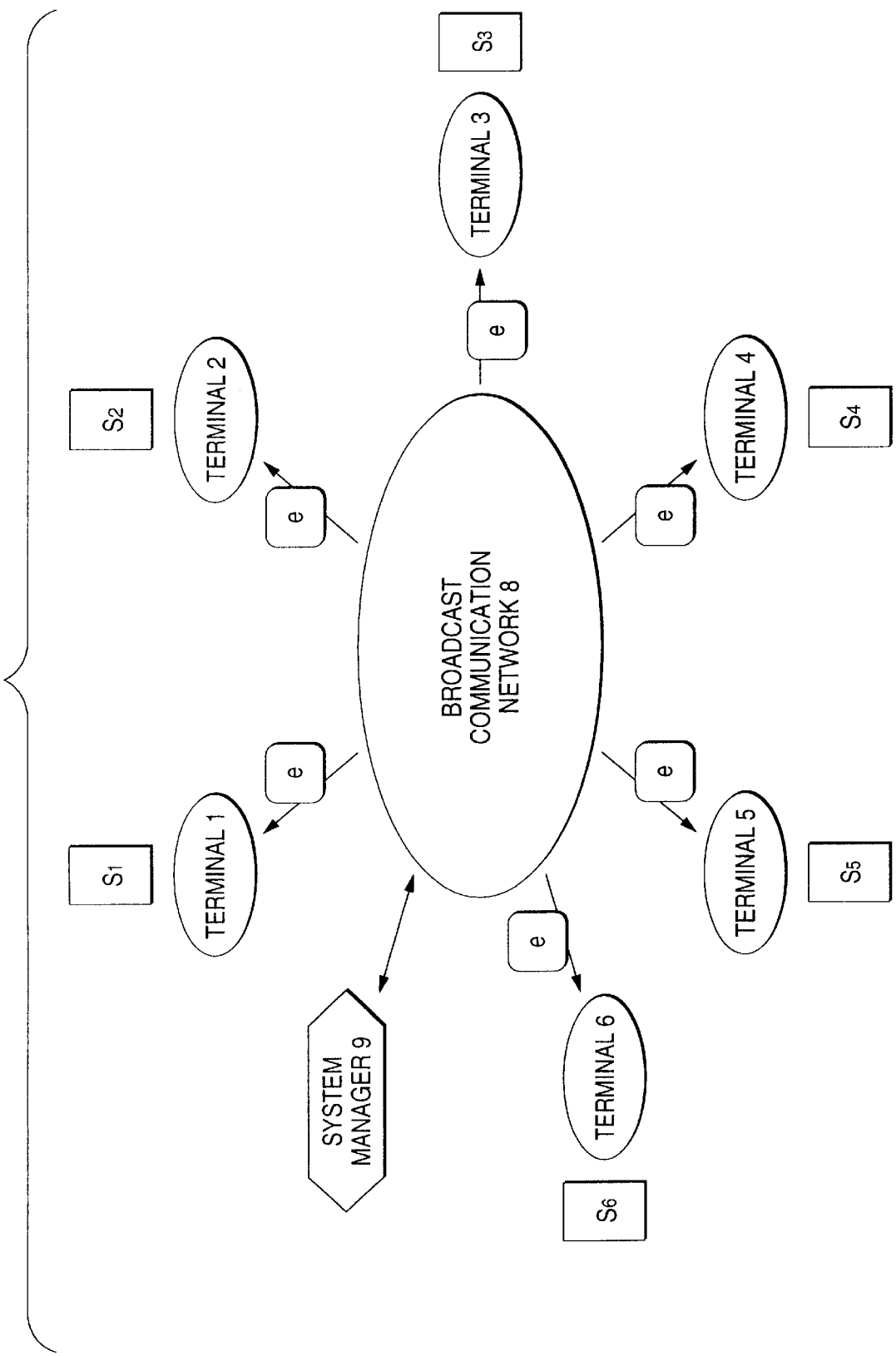
FIG. 21 is a view showing a method of updating a secret key in the key sharing method according to the seventh embodiment.

FIG. 19 is a view showing a normal condition in the exclusive key sharing method according to the seventh embodiment of the present invention. In FIG. 19, the system manager 9 is a trusted party which can access the communication system, and formulates the public book to provide it to the terminals. FIG. 20 is a view showing a method of updating the element g in the exclusive key sharing method according to the seventh embodiment of the present invention. FIG. 21 is a view showing a method of updating the secret key in the exclusive key sharing method according to the seventh embodiment of the present invention.

The exclusive key sharing method according to the seventh embodiment of the present invention will be explained with reference to FIG. 19 to FIG. 21 hereunder. As shown in FIG. 19, in the exclusive key sharing method for the communication system which consists of six terminals connected mutually to allow the broadcast communication, the secret keys are S, the prime number which is larger than S and N or the power number of the prime number is p, the measure of (p−1) is q, elements of GF(p) are g, and the particular terminal number which can be specified by the chairman terminal (to which any terminal can be appointed) is 1.

The respective terminals i ($1 \leq i \leq 6$) hold the secret information Si in secret to satisfy $$S = \Sigma \lambda(i, \Lambda) \times S_i \text{ (sum of } i \in \Lambda \text{ is calculated)}$$

(where $S_i = S + f_1 \times i$ modq (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of six terminals). Since the prime number p, the measure q, and the elements g, which are managed by a system manager, and the public key for all terminals $$y = g^S \bmod p$$

which is managed by the system manager and the public information $$y_1 = g^{S_1} \bmod p, y_2 = g^{S_2} \bmod p, \ldots, y_N = g^{S_N} \bmod p$$

which are managed by the system manager are opened publicly by listing them on the public book, the respective terminals can use them.

The chairman terminal generates arbitrarily a non-zero element k of GF(q) and calculates the preparatory information $$C_1 = g^k \bmod p,$$

calculates the exclusive information $$C_2 = y_n^k \bmod p,$$

based on the public information $y_n$ of the particular terminal a, and broadcasts the exclusive information $C_2$ together with the particular terminal number a and the preparatory information $C_1$ to all terminals. The chairman terminal calculates the common key $$K = y^k \bmod p.$$

The respective terminals j (j≠a) calculated $\lambda(j, \Lambda)$ and $\lambda(a, \Lambda)$ where $\Lambda = \{j, a\}$ and calculate $$C_1^{\hat{}}(S_j \times \lambda(j, \Lambda) \bmod q) \times C_2^{\hat{}}(\lambda(a, \Lambda) \bmod q) \bmod p$$

by using the preparatory information $C_1$, the exclusive information $C_2$, and own secret information $S_j$ to thus obtain the common key K which is shared with the chairman terminal.

A method of updating the element g will be explained with reference to FIG. 20 hereunder. The system manager 9 generates arbitrarily a non-zero element e (random number) of GF(q), and then broadcasts the e to all terminals. The system manager calculates the new element $$g' = g^{1/e \bmod q} \bmod p$$

and replaces the managed element g with it.

A method of updating the secret key will be explained with reference to FIG. 21 hereunder. The respective terminals i calculate the new secret information $$S_i' = S_i \times e \bmod q$$

and then hold it. At this time, $(g')^{S_i'} \bmod p = (g)^{S_i} \bmod p$ is satisfied.

As described above, in the seventh embodiment of the present invention, the exclusive key sharing method is constructed such that the system manager generates arbitrarily the non-zero element e of GF(q) and broadcasts it to all terminals, calculates the new element $g^{1/e \bmod q}$ modp and replaces the managed element g with it, while the respective terminals i calculate new secret information $S_i \times e$ modq. Therefore, the secret key can be updated in a small communication amount and small computational complexity.

(Eighth Embodiment)

An eighth embodiment of the present invention is an exclusive key sharing method in which, in a communication system consisting of the base station and 6 terminals connected to the base station to allow broadcast communication, the base station generates arbitrarily a non-zero element e of GF(q), broadcasts the encrypted e which is encrypted by using the common key K to all terminals, calculates the new element $g^{1/e \bmod q}$ modp, and replaces the element g with it, while respective terminals j decrypt the encrypted e by using the common key K and calculate new secret information $S_j \times e$ modq.

Figure 22:
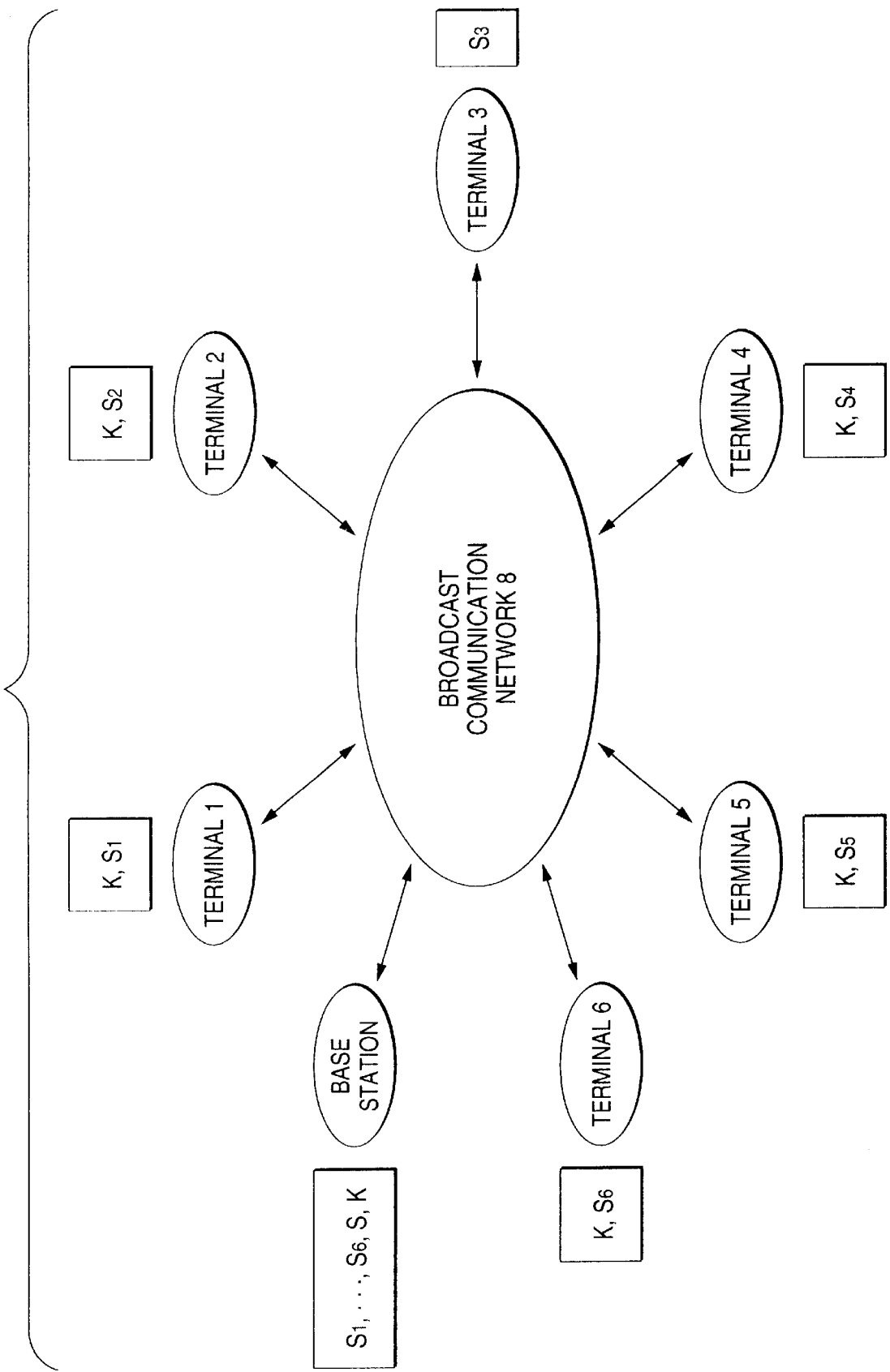
FIG. 22 is a view showing a state where a terminal 3 is excluded in a key sharing method according to an eighth embodiment of the present invention.
Figure 23:
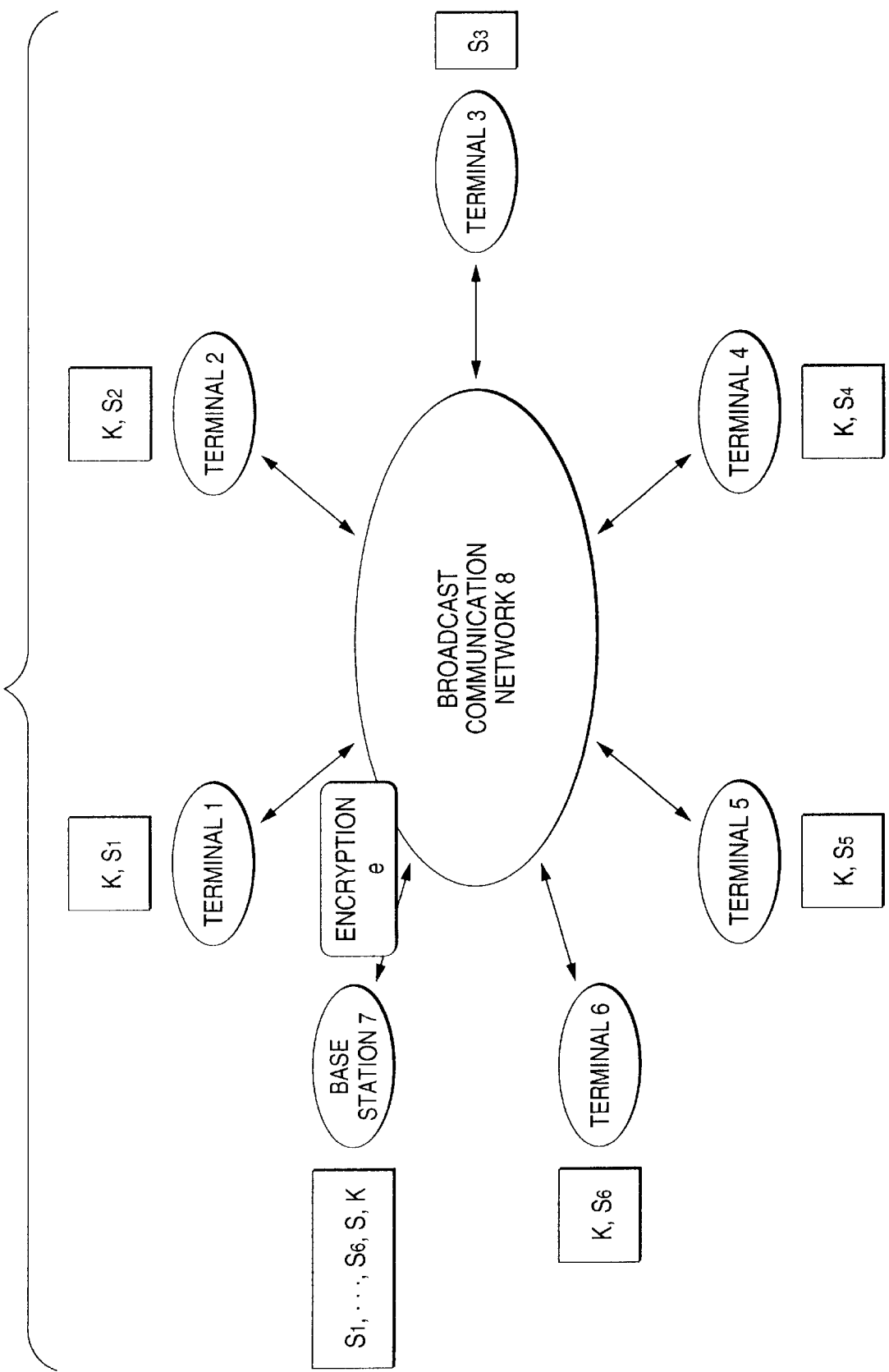
FIG. 23 is a view showing a method of distributing a random number in a key sharing method according to the eighth embodiment.
Figure 24:
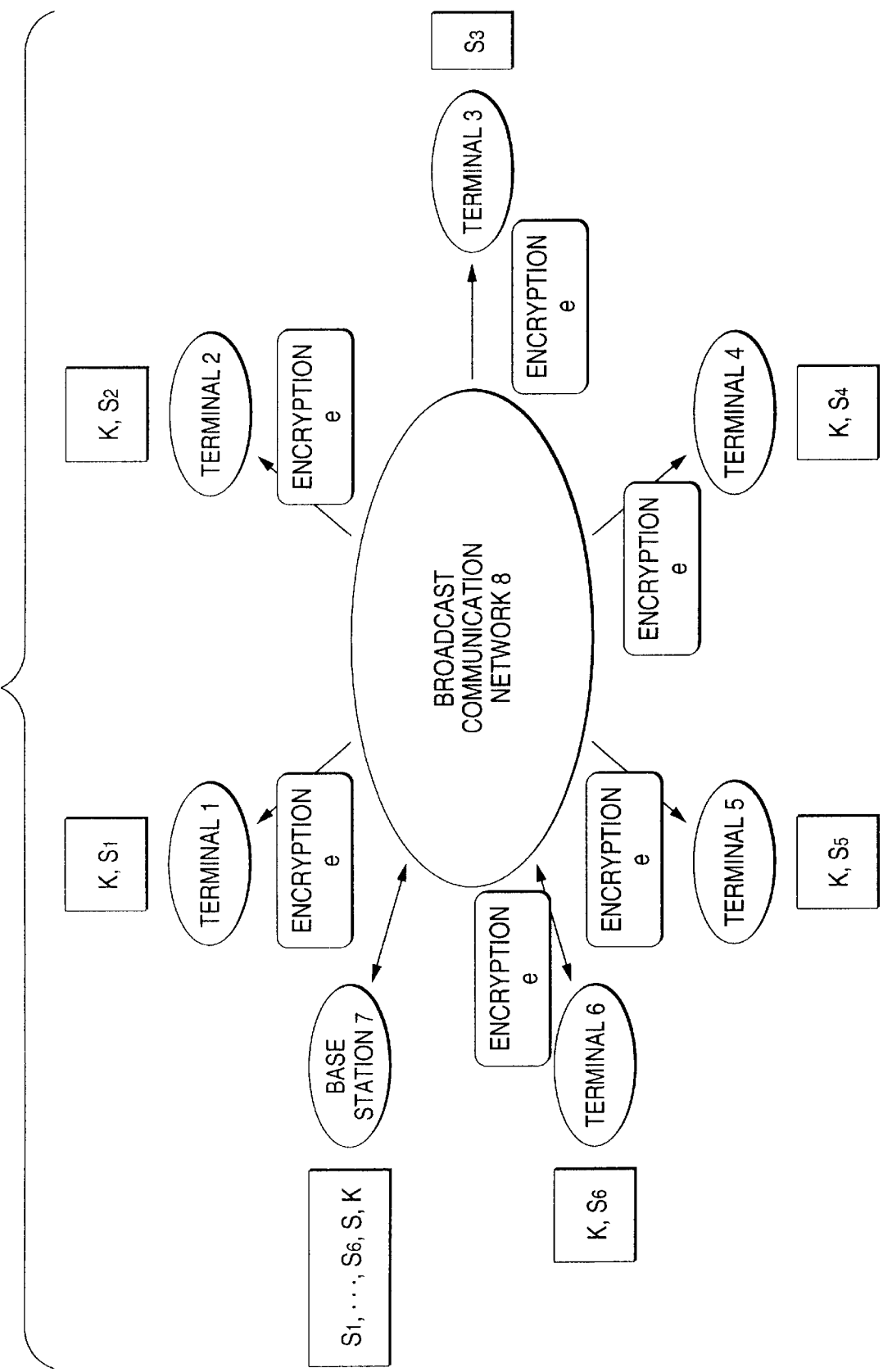
FIG. 24 is a view showing a method of excluding continuously the terminal in the key sharing method according to the eighth embodiment.

FIG. 22 is a view showing an exclusive key sharing method according to an eighth embodiment of the present invention. FIG. 23 is a view showing a method of distributing a random number in the key sharing method according to the eighth embodiment. FIG. 24 is a view showing a method of excluding continuously the terminal in the key sharing method according to the eighth embodiment.

The exclusive key sharing method according to the eighth embodiment of the present invention will be explained with reference to FIG. 22 to FIG. 24 hereunder. As shown in FIG. 22, in the communication system which consists of the base station 7 and 6 terminals connected to the base station 7 to allow broadcast communication, it is assumed that the secret keys are S, the prime number which is larger than S and 6 or a power number of the prime number is p, the measure of (p−1) is q, and the number of terminals which can be specified by the base station (referred to as the "particular terminal number" hereinafter) is 1.

Respective terminals i ($1 \leq i \leq 6$) hold secret information Si in secret to satisfy $$S = \Sigma \lambda(i, \Lambda) \times S_i \text{ (sum of } i \in \Lambda \text{ is calculated)}$$

(where $S_i = S + f_1 \times i$ modq (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of the six terminals).

The base station holds (S, p, g, $S_1$, ..., $S_6$. If the element of GF(p) is assumed to g and the non-zero element of GF(q) is assumed to k, the base station calculates the preparatory information $$C_1 = g^k \bmod p.$$

Then, the base station calculates the exclusive information $$C_2 = g^\wedge(k \times S_3 \bmod q) \bmod p,$$

based on the secret information $S_3$ of the particular terminal 3, and broadcasts the exclusive information together with the particular terminal number 3 and the preparatory information $C_1$ to all terminals. Then, the base station calculates the common key $$K = g^\wedge(k \times S \bmod q) \bmod p$$

which is shared with all terminals j (j≠3) except the particular terminal 3.

The respective terminals j (j≠3) calculate a product $$C_1^\wedge(S_j \times \lambda(j, \Lambda) \bmod q) \times C_2^\wedge(\lambda(3, \Lambda) \bmod q) \bmod p$$

of a power residue value of $C_1$ $$C_1^\wedge(S_j \times \lambda(j, \Lambda) \bmod q) \bmod p$$

which uses a product of Si and $\lambda(j, \Lambda)$ to the modulus q as an exponent and a power residue value of $C_2$ $$C_2^\wedge(\lambda(3, \Lambda) \bmod q) \bmod p$$

which uses $\lambda(a, \Lambda)$ calculated to the modulus p as the exponent by using the preparatory information $C_1$, the exclusive information $C_2$, and own secret information $S_j$ to thus obtain and hold the common key K which is shared with the base station.

A method of distributing the random number e will be explained with reference to FIG. 23 hereunder. The base station 7 generates arbitrarily the non-zero element e (random number) of GF(q), and broadcasts the encrypted e which is encrypted by using the common key K to all terminals. The base station calculates the new element $$g' = g^{1/e \bmod q} \bmod p$$

and replaces the element g with it.

A method of continuously excluding the terminal will be explained with reference to FIG. 24 hereunder. The respective terminals j decrypt the encrypted e by using the common key K, and calculate and hold the new secret information $S_j' = S_j \times e$ modq. At this time, $(g')^{S_j'}$ modp=$(g)^{S_j}$ modp is satisfied.

As described above, in the eighth embodiment of the present invention, the exclusive key sharing method is constructed such that the base station generates arbitrarily the non-zero element e of GF(q), broadcasts the encrypted e which is encrypted by using the common key K to all terminals, calculates the new element $g^{1/e \bmod q}$ modp, and replaces the element g with it, whereas the respective terminals j decrypt the encrypted e by using the common key K and calculate the new secret information $S_j \times e$ modq. Therefore, the secret key can be updated with a small amount of communication and less computational complexity, and the particular terminal can be excluded successively.

(Ninth Embodiment)

A ninth embodiment of the present invention is an exclusive key sharing method in which, in a communication system consisting of 6 terminals connected mutually to allow broadcast communication, the chairman terminal generates arbitrarily a non-zero element e of GF(q), broadcasts the encrypted e which is encrypted by using the common key K to all terminals, calculates the new element $g^{1/e \bmod q}$ modp, and replaces the element g with it, while respective terminals j decrypt the encrypted e by using the common key K and then calculate new secret information $S_j \times e$ modq.

Figure 26:
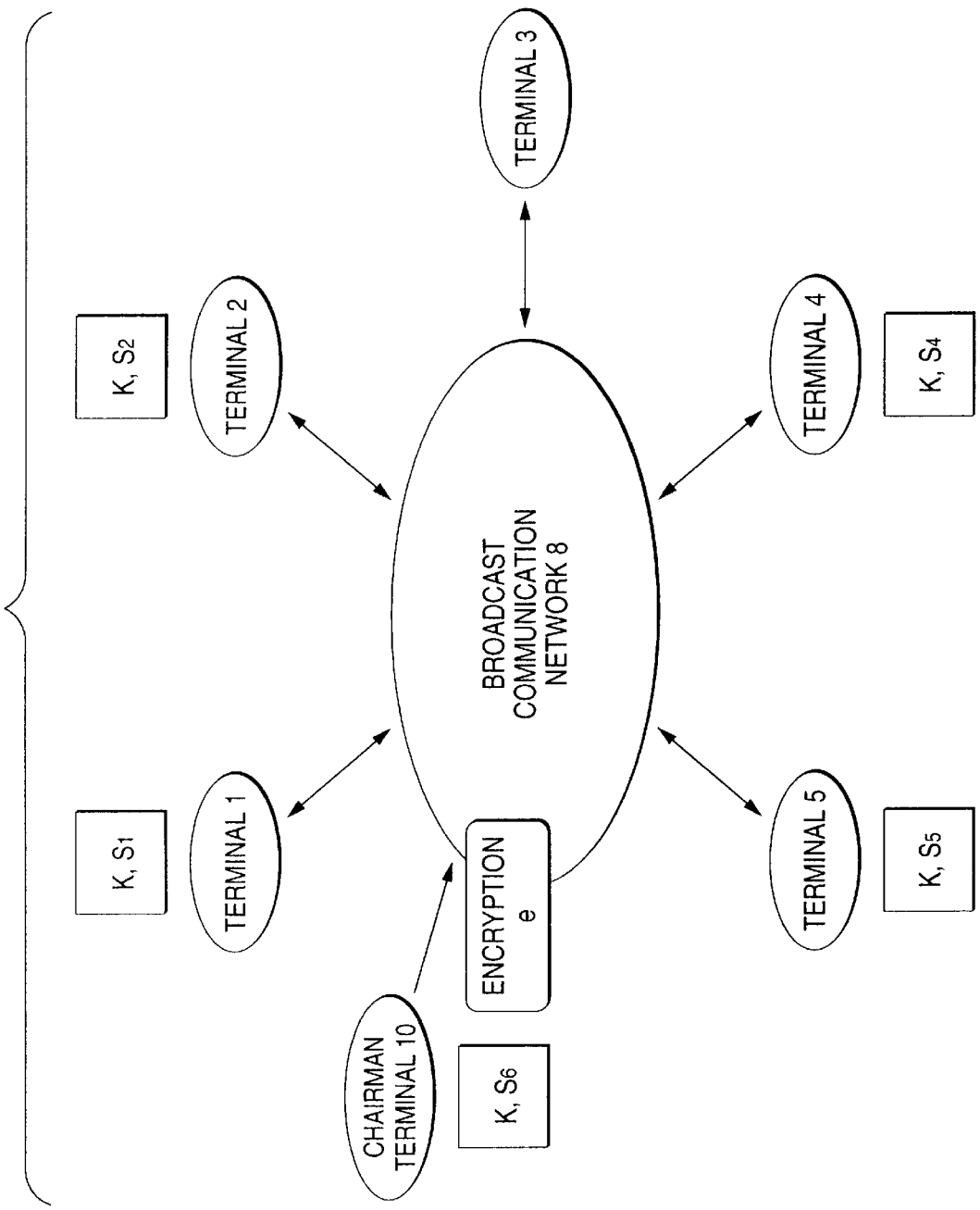
FIG. 26 is a view showing a method of distributing a random number in a key sharing method according to the ninth embodiment.
Figure 27:
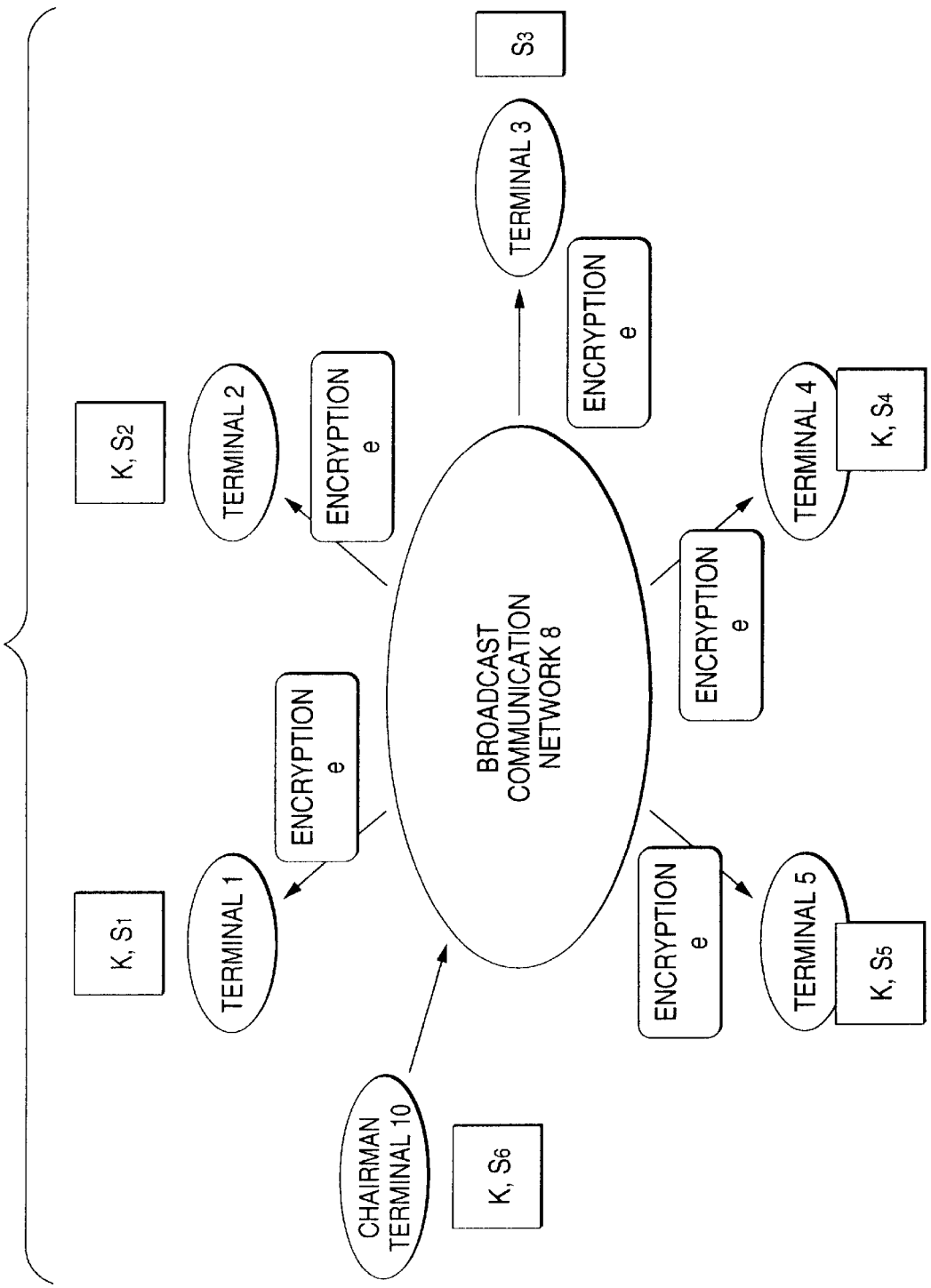
FIG. 27 is a view showing a method of excluding continuously the terminal in the key sharing method according to the eighth embodiment.

FIG. 25 is a view showing an exclusive key sharing method according to a ninth embodiment of the present invention. FIG. 26 is a view showing a method of distributing a random number in the key sharing method according to the ninth embodiment. FIG. 27 is a view showing a method of excluding continuously the terminal in the key sharing method according to the eighth embodiment.

The exclusive key sharing method according to the ninth embodiment of the present invention will be explained with reference to FIG. 25 to FIG. 27 hereunder. As shown in FIG. 25, in the communication system consisting of 6 terminals connected mutually to allow broadcast communication, it is assumed that the secret keys are S, the prime number which is larger than S and N or the power number of the prime number is p, the measure of (p−1) is q, the elements of GF(p) are g, and the particular terminal number which can be specified by the chairman terminal (to which any terminal can be appointed. Here, the terminal 6 is appointed as the chairman terminal.) is 1.

Respective terminals i ($1 \leq i \leq 6$) hold the secret information Si in secret to satisfy $$S = \Sigma \lambda(i, \Lambda) \times S_i \text{ (sum of } i \in \Lambda \text{ is calculated)}$$

(where $S_i = S + f_1 \times i$ modq (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of six terminals). Since the public key for all terminals $$y = g^S \bmod p,$$

and the public information $$y_1 = g^{S_1} \bmod p, \ y_2 = g^{S_2} \bmod p, \ \ldots, \ y_6 = g^{S_6} \bmod p$$

are publicly opened by listing them on the public book, the respective terminals i can use them.

The chairman terminal generates the non-zero element k of GF(q) and calculates the preparatory information $$C_1 = g^k \bmod p.$$

Then, the chairman terminal calculates exclusive information $$C_2 = y_3^k \bmod p$$

based on the public information $y_3$ of the particular terminal 3, and then broadcasts the exclusive information together with the particular terminal number 3 and the preparatory information $C_1$ to all terminals. Then, the chairman terminal calculates the common key $$K = y^k \bmod p.$$

The respective terminals j (j≠3) calculate λ(j, Λ) and λ(3, Λ) where Λ={j,3}, and calculate $$C_1\hat{\ }(S_j \times \lambda(j, \Lambda) \bmod q) \times C_2\hat{\ }(\lambda(3, \Lambda) \bmod q) \bmod p$$

by using the preparatory information $C_1$, the exclusive information $C_2$, and own secret information $S_j$ to thus obtain the common key K which is shared with the chairman terminal.

Then, the method of distributing the random number will be explained with reference to FIG. 26 hereunder. The chairman terminal generates arbitrarily the non-zero element e (random number) of GF(q), and then broadcasts the encrypted e which is encrypted by using the common key K to all terminals. Then, the chairman terminal calculates the new element $$g' = g^{1/e \bmod q} \bmod p$$

and replaces the element g with it.

Then, the method of excluding continuously the terminal will be explained with reference to FIG. 27 hereunder. The respective terminals j decrypt the encrypted e by using the common key K, and calculate and hold the new secret information $$S_j' = S_j \times e \bmod q.$$

At this time, $(g')^{S_j'} \bmod p = (g)^{S_j} \bmod p$ is satisfied.

As described above, in the ninth embodiment of the present invention, the exclusive key sharing method is constructed such that the chairman terminal generates arbitrarily the non-zero element e of GF(q), broadcasts the encrypted e which is encrypted by using the common key K to all terminals, calculates the new element $g^{1/e \bmod q} \bmod p$, and replaces the element g with it, whereas respective terminals j decrypt the encrypted e by using the common key K and then calculate the new secret information $S_j \times e \bmod q$. Therefore, the secret key can be updated with a small amount of communication and less computational complexity, and the particular terminal can be excluded continuously.

In this case, in order to restore the continuously excluded terminal, a pair of the secret key and the public key must be newly formulated. Although the preceding public key cannot be employed, the continuously excluded terminal can be restored without the formulation of a new pair of the secret key and the public key. For such purpose, the following procedures may be requested.

The base station or the chairman terminal distributes the element e to the particular terminal 3. Then, the particular terminal 3 calculates the new secret information $$S_3' = S_3 \times e \bmod q.$$

(At this time, $(g')^{S_3'} \bmod p = (g)^{S_3} \bmod p$ is satisfied.) In this manner, the preceding public key can be employed as it is in place of formulating newly a pair of the secret key and the public key. In the event that only several terminals out of a plurality of particular terminals should be restored, the element e may be distributed in secret only to the restored terminals.

(Tenth Embodiment)

A tenth embodiment of the present invention is an exclusive key sharing method in which, in a communication system consisting of 6 terminals connected mutually to allow broadcast communication, the chairman terminal generates arbitrarily a non-zero element k of GF(q), calculates the preparatory information $C_1$, calculates the exclusive information $C_2$ based on the public information $y_a$ of the particular terminal a, broadcasts it together with the particular terminal number a and the preparatory information $C_1$ to all terminals to obtain the common key K, while respective terminals j calculate the common key K by using the preparatory information $C_1$, the exclusive information $C_2$, and own secret information $S_j$.

Figure 28:
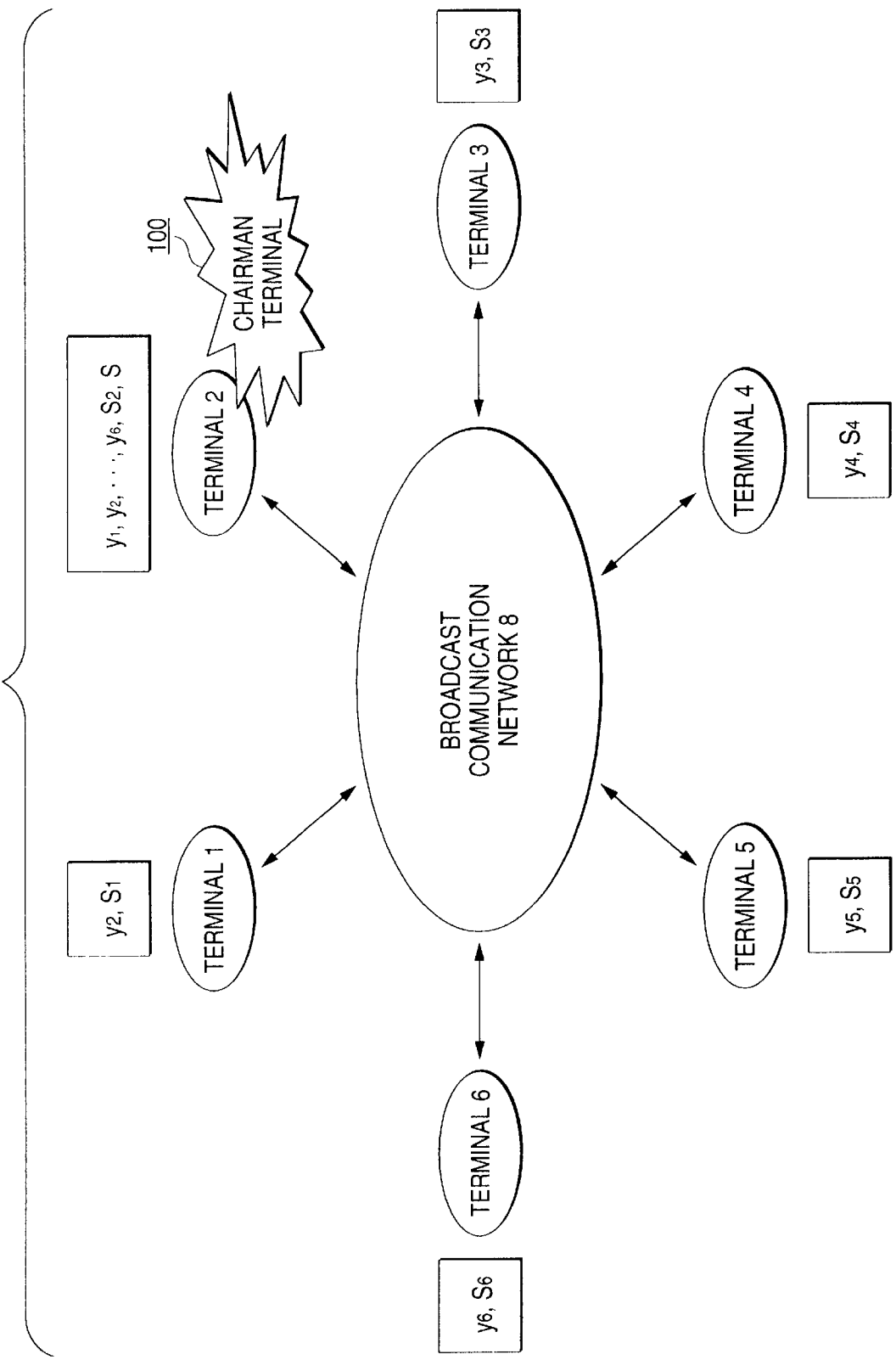
FIG. 28 is a view showing a method of fixing a chairman terminal in a key sharing method according to a tenth embodiment of the present invention.
Figure 29:
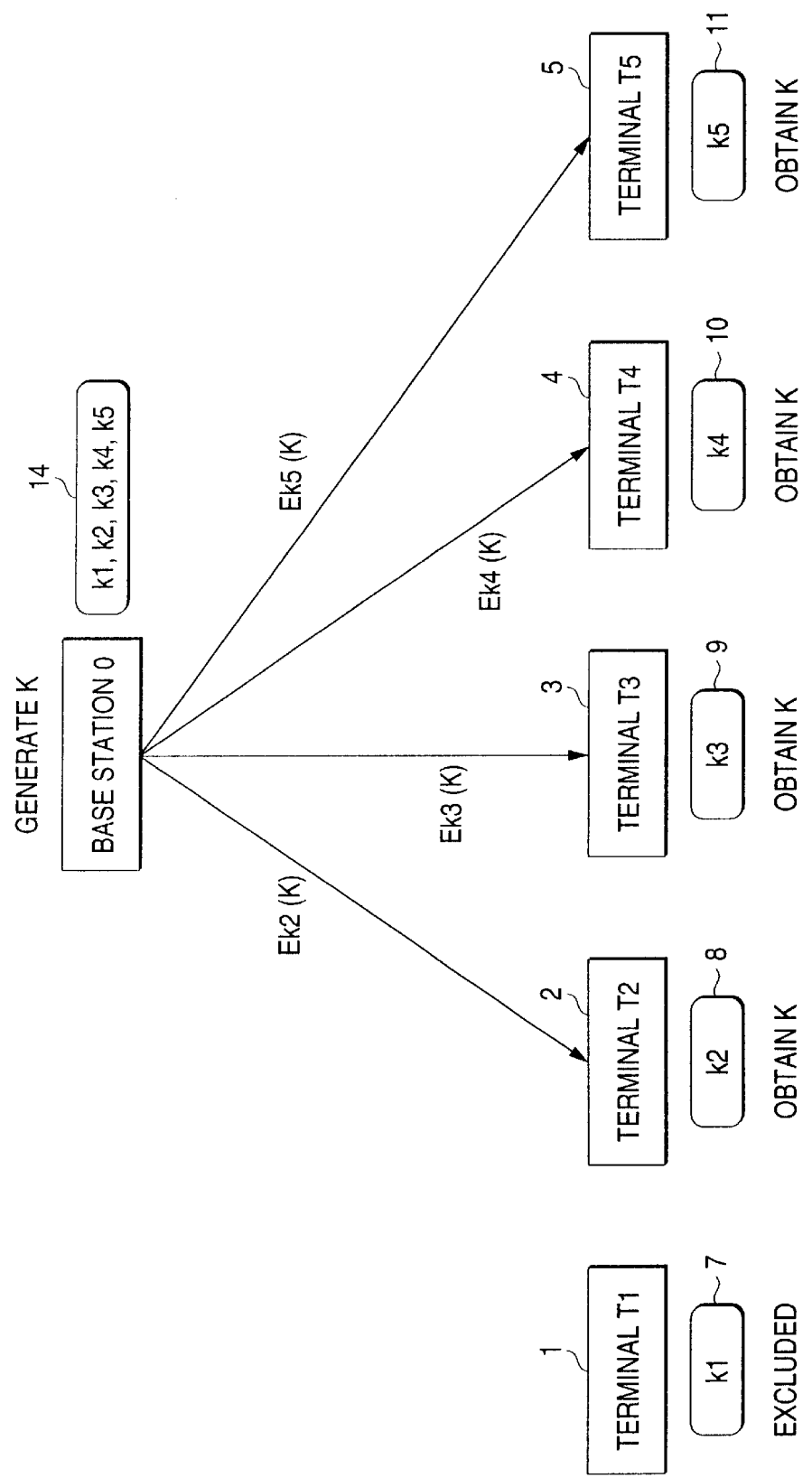
FIG. 29 is a view showing a key sharing method according to the first example in the prior art.
Figure 30:
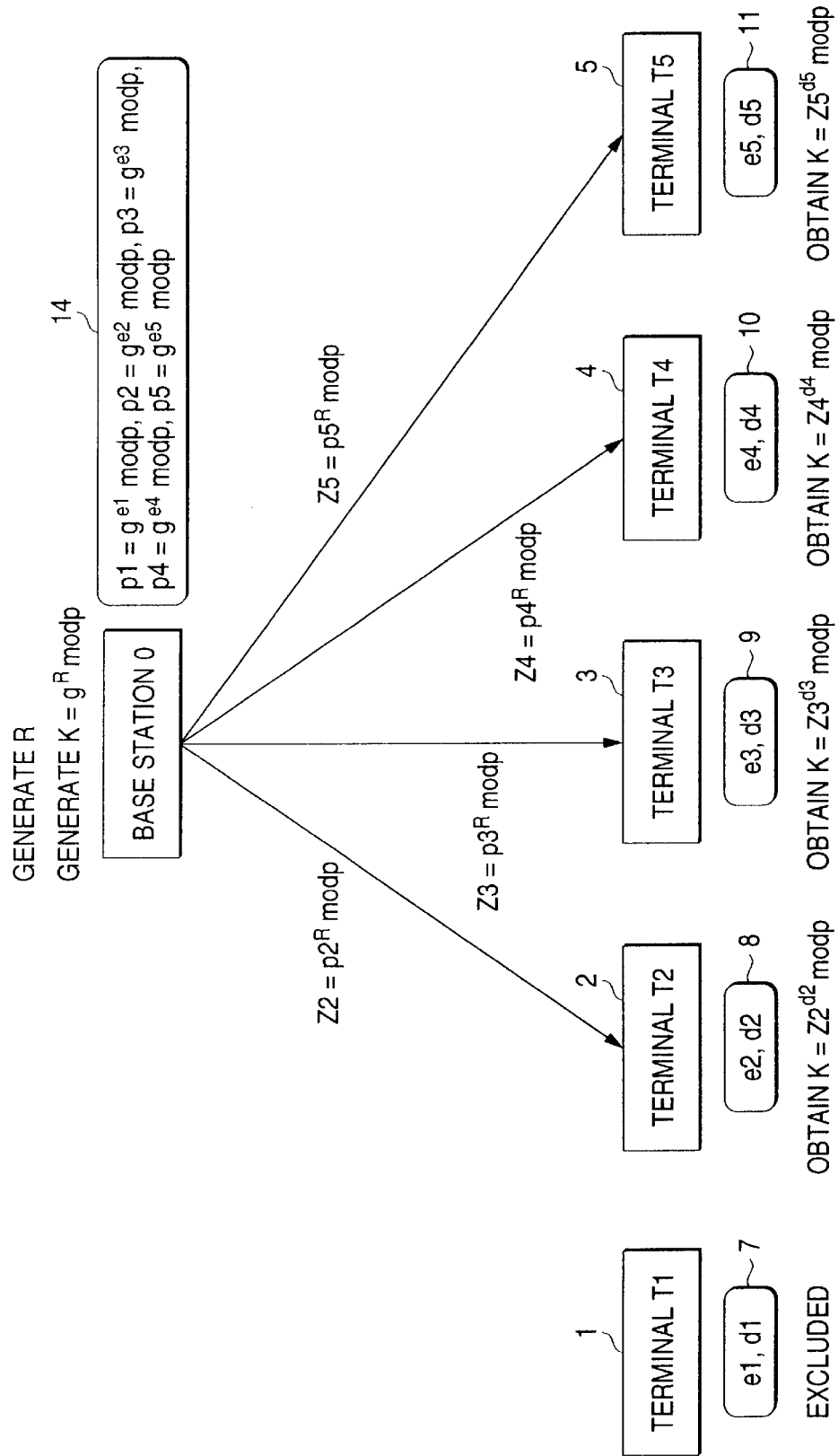
FIG. 30 is a view showing a key sharing method according to the second example in the prior art.

FIG. 28 is a view showing an exclusive key sharing method according to a tenth embodiment of the present invention. The key sharing method according to the tenth embodiment of the present invention will be explained with reference to FIG. 28 hereunder. In a communication system which consists of 6 terminals connected mutually to allow broadcast communication, it is assumed that secret keys are S, the prime number which is larger than S and N or the power number of the prime number is p, the measure of (p−1) is q, elements of GF(p) are g, and the particular terminal number which can be specified by a chairman terminal 100 is 1, Respective terminals i (1≦i≦6) hold the secret information Si in secret to satisfy $$S = \Sigma \lambda(i, \Lambda) \times S_i \text{ (sum of } i \in \Lambda \text{ is calculated)}$$

(where $S_i = S + f_1 \times i \bmod q$ ($f_1$ is a non-zero element of GF(q), $\lambda(i, \Lambda) = \Pi\{L/(L-i)\}$ (product of L∈Λ--{i} is calculated), and Λ is a set of any two terminals out of six terminals). Since the chairman terminal 100 publicly opens the public key for all terminals $$y = g^S \bmod p,$$

the public information $$y_1 = g^{S1} \bmod p, y_2 = g^{S2} \bmod p, \ldots, y_6 = g^{S6} \bmod p$$

by listing them on the public book, respective terminals i can use them.

The chairman terminal 100 generates arbitrarily a non-zero element k of GF(q) and calculates preparatory information $$C1 = g^k \bmod p.$$

The chairman terminal calculates the exclusive information $$C_2 = y_a^k \bmod p,$$

based on the public information $y_a$ of the particular terminal a, and then broadcasts the exclusive information together with the particular terminal number a and the preparatory information $C_1$ to all terminals. The chairman terminal calculates the common key $$K=y^k \bmod p.$$

The respective terminals j (j≠a, b) calculate λ(j, Λ) and λ(a, Λ) where Λ={j,a}, and calculate $$C_1\hat{}(S_j \times \lambda(j, \Lambda) \bmod q) \times C_2\hat{}(\lambda(a, \Lambda) \bmod q) \bmod p$$

by using the preparatory information $C_1$, the exclusive information $C_2$, and own secret information $S_j$ to obtain the common key K.

In this case, if all terminals except the chairman terminal can use the public information $$y_b = g^{Sb} \bmod p$$

of the chairman terminal and the chairman terminal can add a digital signature to the particular terminal number a, the preparatory information $C_1$, and the exclusive information $C_2$, which are distributed to all terminals, by using the secret information $S_b$ of the chairman terminal, the respective terminals j can verify the signature by using the public information $y_b$ of the chairman terminal.

As described above, in the tenth embodiment of the present invention, the exclusive key sharing method is constructed such that the chairman terminal generates arbitrarily a non-zero element k of GF(q), calculates the preparatory information $C_1$, calculates the exclusive information $C_2$ based on the public information $y_a$ of the particular terminal a, broadcasts it together with the particular terminal number a and the preparatory information $C_1$ to all terminals to obtain the common key K, while the respective terminals calculate the common key K by using the preparatory information $C_1$, the exclusive information $C_2$, and own secret information $S_j$. Therefore, the particular terminal can be excluded while fixing the chairman terminal.

In this case, if the base station or the chairman terminal distributes the element e to the particular terminal a and the particular terminal a calculates the new secret information $$S_a' = S_a \times e \bmod q$$

(at this time, $(g')\hat{}S_a' \bmod p = (g)\hat{}S_a \bmod p$ is satisfied), the excluded terminal can be restored.

In addition, if the multiplication operation can be set to correspond to the addition operation on a curve such as an elliptic curve in any finite field, etc., the operation can be performed at high speed.

(Eleventh Embodiment)

An eleventh embodiment of the present invention is an exclusive key sharing method based on ElGamal cipher in which, since the number of figure of the exponent can be reduced by canceling the denominator of the exponent part in the power calculation and thus the power of the denominator is calculated collectively, the power calculation can be reduced and accelerated.

Figure 31:
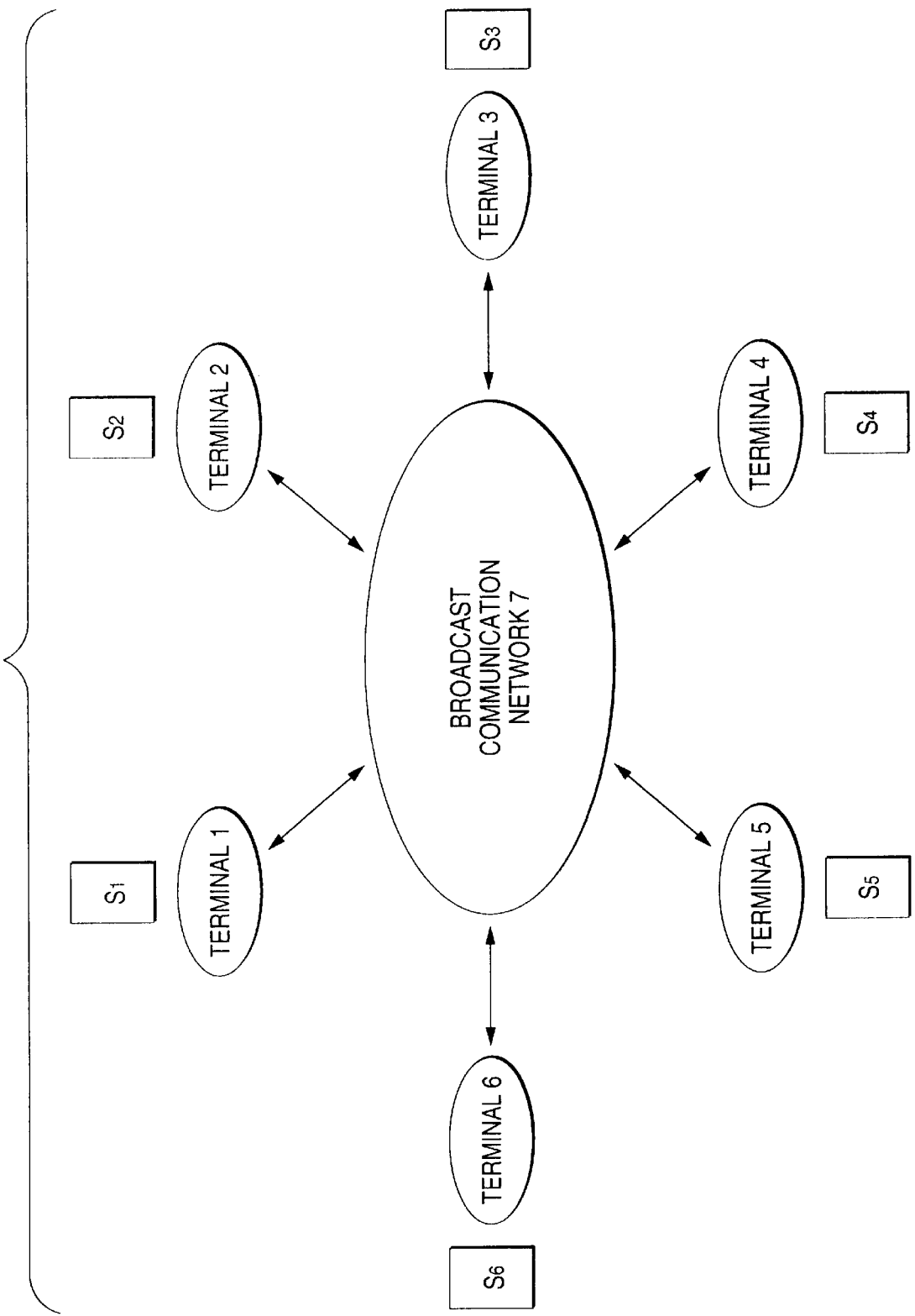
FIG. 31 is a view showing a set-up phase in a key sharing method according to an eleventh embodiment of the present invention.

FIG. 31 is a view showing a set-up phase in the exclusive key sharing method according to the eleventh embodiment of the present invention. In FIG. 31, terminals 1 to 6 are mobile communication terminals and a broadcast network 13 is a radio communication network to enable the broadcast communication. FIG. 32 is a view showing a preparatory phase in the exclusive key sharing method according to the eleventh embodiment of the present invention. FIG. 33 is a view showing a key sharing phase in the exclusive key sharing method according to the eleventh embodiment of the present invention.

In the set-up phase shown in FIG. 31, the system manager generates the secret keys S, the prime number p which is larger than S and the terminal number 6 (or the power number p of the prime number), the measure q of (p−1), and elements g of GF(p), and open publicly p, q, and g. The system manager generates the public key of the system $$y = g^S \bmod p$$

and opens it publicly. The system manager generates elements $f_1, f_2$ ($f_2 \neq 0$) of GF(q) and distributes the secret information $$S_i = S + f_1 \times i + f_2 \times i^2 \bmod q \quad (i=1 \text{ to } 6)$$

in secret to respective terminals i. The secret information Si satisfies $$S = \Sigma \lambda(i, \Lambda) \times S_i \quad \text{(sum of } i \in \Lambda \text{ is calculated)}$$

where Λ is a set of any three terminals out of the terminals 1 to 6, and $$\lambda(i, \Lambda) = \Pi\{(L/L-i)\} \quad \text{(product of } L \in \Lambda - \{i\} \text{ is calculated)}.$$

Although any terminal can be appointed to the chairman terminal, the terminal 2 is appointed to the chairman terminal herein. Suppose that the number of terminals which the chairman terminal 2 can exclude is 2. The case where the terminals 5, 6 are excluded will be explained. Respective terminals 1 to 6 generate the public information $$y_1 = g^{S1} \bmod p, \; y_2 = g^{S2} \bmod p, \ldots, y_N = g^{SN} \bmod p$$

and open them publicly.

In the preparatory phase shown in FIG. 32, the chairman terminal generates a random number k which is a non-zero element of GF(q), and calculates the preparatory information $$C1 = g^k \bmod p.$$

The chairman terminal 2 calculates exclusive information $C2_5, C2_6$ by using the public keys $y_5, y_6$ of the excluded terminals 5, 6. That is, the chairman terminal 2 calculates the exclusive information $$C2_5 = y_5\hat{}(k \times \lambda(5, \{5,6\}) \bmod q) \bmod p$$

$$C2_6 = y_6\hat{}(k \times \lambda(6, \{5,6\}) \bmod q) \bmod p$$

based on λ(5,{5,6}), λ(6,{5,6}) where a set of the particular terminals 5, 6 is α={5,6} and the public keys $y_5, y_6$, and then broadcasts the exclusive information $C2_5, C2_6$ together with the preparatory information C1 and the particular terminal numbers 5, 6 to all terminals.

In the key updating phase shown in FIG. 33, the chairman terminal 2 calculates the common key $$K = y^k \bmod p$$

which is shared with all terminals 1, 3, 4 except the particular terminals 5, 6. Respective terminals j (1, 3, 4) calculate $$\lambda(j, \Lambda_j) = 5/(5-j) \times 6/(6-j)$$

$$\lambda(5, \{j, 5,6\}) = j/(j-5) \times 6/(6-5)$$

$$\lambda(6, \{j, 5,6\}) = j/(j-6) \times 5/(5-6)$$

where $\Lambda_j = \{j, 5, 6\}$ and $T_j = \{\Pi(j-L)\}/j$ (product of $L \in \Lambda - \{i\}$ is calculated) $= (j-5) \times (j-6)/j$, and then calculate cession keys $$K_j = C1^{\wedge}(S_j \times \lambda(j, \Lambda_j) \times T_j \bmod q) \times$$
$$C2_5^{\wedge}(\lambda(5, \{j, 5, 6\}) \times T_j \bmod q) \times$$
$$C2_6^{\wedge}(\lambda(6, \{j, 5, 6\}) \times T_j \bmod q) \bmod p$$
$$= C1^{\wedge}(S_j \times 5/(5-j) \times 6/(6-j) \times (j-5) \times (j-6)/j \bmod q) \times$$
$$C2_5^{\wedge}(j/(j-5) \times 6/(6-5) \times (j-5) \times (j-6)/j \bmod q) \times$$
$$C2_6^{\wedge}(j/(j-6) \times 5/(5-6) \times (j-5) \times (j-6)/j \bmod q) \bmod p$$
$$= C1^{\wedge}(S_j \times 5 \times 6/j \bmod q) \times C2_5^{\wedge}(6 \times (j-6) \bmod q) \times$$
$$C2_6^{\wedge}(-5 \times (j-5) \bmod q) \bmod p$$

by using the preparatory information C1, the exclusive information $C2_5$, $C2_6$, and own secret information $S_j$.

Finally, the respective terminals j (1, 3, 4) calculate a power residue value of $K_j$ $$K_j\widehat{\ }(1/T_j \bmod q) \bmod p = K_j\widehat{\ }[j/\{(j-5)(j-6)\} \bmod q] \bmod p$$

which has $1/T_j$ as an exponent and p as a modulus to thus obtain the common key K. However, the terminals 5, 6 cannot calculate the common key K since they have merely $S_5$, $S_6$.

In this manner, a total computational complexity can be reduced by simplifying the calculation of the power of the exclusive information $C2_5$, $C2_6$.

If the terminal number of respective terminals is assumed as about D bits, the exponent part of the power residue calculation of the exclusive information, which is performed by respective terminals in the key sharing of the present invention, is D×(h−1) bits. Now, under the conditions that D is 10 bits, h is the number of the excluded terminals, and B_w is the bit number of the exponent part, the power residue calculation between the prior art and the present invention is evaluated by transforming an amount of calculation of the power residue calculation into the number of times of multiplication. In this case, since a numerical value put between parentheses indicates a percentage % of the amount of calculation of the present invention to the prior art, it can be understood that, if such percentage is smaller than 100%, the present invention can achieve the key sharing at higher speed.

h=1: the present invention: B_160×2+B_10 //the number of times of multiplication 495 (increased up to 103%)
the prior art: B_160×2 //the number of times of multiplication 480 h=2: the present invention: B_160×2+B_10×2 //the number of times of multiplication 510 (reduced to 71%)
the prior art: B_160×2+B_160×1 //the number of times of multiplication 720 h=3: the present invention: B_160×2+B_20×3 //the number of times of multiplication 570 (reduced to 60%)
the prior art: B_160×2+B_160×2 //the number of times of multiplication 960 h=4: the present invention: B_160×2+B_30×4 //the number of times of multiplication 660 (reduced to 55%)
the prior art: B_160×2+B_160×3 //the number of times of multiplication 1200 h=5: the present invention: B_160×2+B_40×5 //the number of times of multiplication 780 (reduced to 54%)
the prior art: B_160×2+B_160×4 //the number of times of multiplication 1440 h=6: the present invention: B_160×2+B_50×6 //the number of times of multiplication 930 (reduced to 55%)
the prior art: B_160×2+B_160×5 //the number of times of multiplication 1680 h=7: the present invention: B_160×2+B_60×7 //the number of times of multiplication 1110 (reduced to 58%)
the prior art: B_160×2+B_160×6 //the number of times of multiplication 1920 h=8: the present invention: B_160×2+B_70×8 //the number of times of multiplication 1320 (reduced to 61%)
the prior art: B_160×2+B_160×7 //the number of times of multiplication 2160 h=9: the present invention: B_160×2+B_80×9 //the number of times of multiplication 1560 (reduced to 65%)
the prior art: B_160×2+B_160×8 //the number of times of multiplication 2400 h=10: the present invention: B_160×2+B_90×10 //the number of times of multiplication 1830 (reduced to 69%)
the prior art: B_160×2+B_160×9 //the number of times of multiplication 2640 h=11: the present invention: B_160×2+B_100×11 //the number of times of multiplication 2130 (reduced to 74%)
the prior art: B_160×2+B_160×10 //the number of times of multiplication 2880 h=12: the present invention: B_160×2+B_110×12 //the number of times of multiplication 2220 (reduced to 71%)
the prior art: B_160×2+B_160×11 //the number of times of multiplication 3120 h=13: the present invention: B_160×2+B_120×13 //the number of times of multiplication 2580 (reduced to 77%)
the prior art: B_160×2+B_160×12 //the number of times of multiplication 3360 h=14: the present invention: B_160×2+B_130×14 //the number of times of multiplication 3210 (reduced to 89%)
the prior art: B_160×2+B_160×13 //the number of times of multiplication 3600 h=15: the present invention: B_160×2+B_140×15 //the number of times of multiplication 3630 (reduced to 94%)
the prior art: B_160×2+B_160×14 //the number of times of multiplication 3840 h=16: the present invention: B_160×2+B_150×16 //the number of times of multiplication 4080 (100%, not reduced)
the prior art: B_160×2+B_160×15 //the number of times of multiplication 4080

Accordingly, in the event that the terminal number is 10 bits, i.e., the terminal number is about 1000, the effective range of the excluded terminal number of the present invention becomes 2 to 15. It is of course that, in the system having the smaller terminal number, the effective range of the excluded terminal number can be expanded rather than the above. In this case, the number of times of multiplication per power residue calculation=the bit number of the exponent part in the power residue calculation×1.5 is assumed. This corresponds to the number of times of calculation obtained when the normal binary notation is employed.

In addition, since the table is not needed in the present invention, the present invention is effective for the hardware such as the mobile terminal in which a memory capacity is limited.

(Twelfth Embodiment)

A twelfth embodiment of the present invention is an exclusive key sharing method in which the increase in the calculation amount can be suppressed by calculating inverse elements of the exclusive information when the exponent of the power is minus and also the calculation of the reciprocal number can be reduced by calculating the denominators of the exponents in a lump.

A configuration of the communication system and an operation in the set-up phase in the twelfth embodiment of the present invention are similar to those in the eleventh embodiment. An example in which the chairman terminal excludes the terminals 5, 6 will be explained hereunder.

In the preparatory phase, the chairman terminal 2 generates the random number k which is a non-zero element of GF(q), and calculates the preparatory information $$C1 = g^k \bmod p.$$

The chairman terminal 2 calculates exclusive information $$C2_5 = y_5^k \bmod p, \quad C2_6 = y_6^k \bmod p$$

by using the public keys $y_5$, $y_6$ of the excluded terminals 5, 6, and then broadcasts the exclusive information $C2_5$, $C2_6$ together with the preparatory information C1 and the particular terminal numbers 5, 6 to all terminals.

In the key updating phase, the respective terminals j except the chairman terminal and the excluded terminals calculate inverse elements $$F_5 = C2_5^{(-1)} \bmod p, \quad F_6 = C2_6^{(-1)} \bmod p$$

of the exclusive information $C2_5$, $C2_6$. The respective terminals j calculate $$\lambda(j, \Lambda_j) = \{5/(5-j)\} \times \{6/(6-j)\}$$

$$\lambda(5, \Lambda_j) = \{j/(j-5)\} \times \{6/(6-5)\}$$

$$\lambda(6, \Lambda_j) = \{j/(j-6)\} \times \{5/(5-6)\}$$

where $\Lambda_j = \{j, 5, 6\}$ and then calculate cession keys $$K_j = C1 \wedge (S_j \times \lambda(j, \Lambda_j) \times t_j \bmod q) \times C2_5 \wedge (\lambda(5, \Lambda_j) \times t_j \bmod q) \times$$

$$C2_6 \wedge (\lambda(6, \Lambda_j) \times t_j \bmod q) \bmod p$$

$$= C1 \wedge \{S_j \times 5/(5-j) \times 6/(6-j) \times |5-j| \times |6-j| \bmod q\} \times$$

$$C2_5 \wedge \{j/(j-5) \times 6/(6-5) \times |5-j| \times |6-j| \bmod q\} \times$$

$$C2_6 \wedge \{j/(j-6) \times 5/(5-6) \times |5-j| \times |6-j| \bmod q\} \bmod p$$

$$= C1 \wedge \{S_j \times 5 \times 6 \times sgn(5-j) \times sgn(6-j) \bmod q\} \times$$

$$C2_5 \wedge \{j \times sgn(j-5) \times 6 \times |6-j| \bmod q\} \times$$

$$C2_6 \wedge (-j \times sgn(j-6) \times 5 \times |5-j| \bmod q) \bmod p$$

by using a positive square root of an absolute value of a product of these denominators $$t_j = |5-j| \times |6-j| \times |6-5|$$

$$= |5-j| \times |6-j|,$$

the preparatory information C1, the exclusive information $C2_5$, $C2_6$, and own secret information $S_j$. Where sgn(x)=x/|x|.

In this case, if $\lambda(5, \Lambda_j) < 0$, i.e., sgn(j−5)=−1, the respective terminals j replace $\lambda(5, \Lambda_j)$ with $|\lambda(5, \Lambda_j)|$ and replace $C2_5$ with $F_5$, and then calculate $$C2_5 \wedge \{j \times (-1) \times 6 \times |6-j| \bmod q\} = F_5 \wedge \{j \times 6 \times |6-j| \bmod q\}.$$

If $\lambda(6, \Lambda_j) < 0$, i.e., −sgn(j−6)=−1, the respective terminals j replace $\lambda(6, \Lambda_j)$ with $|\lambda(6, \Lambda_j)|$ and replace $C2_6$ with $F_6$, and then calculate $$C2_6 \wedge \{-j \times 5 \times |5-j| \bmod q\} \bmod p = F_6 \wedge \{j \times 5 \times |5-j| \bmod q\} \bmod p.$$

Finally, the respective terminals j calculate a power residue value of $K_j$ $$K_j \wedge (1/t_j \bmod q) \bmod p = K_j \wedge \{1/(|5-j| \times |6-j|) \bmod q\} \bmod p$$

which has $1/t_j$ as an exponent and p as a modulus to thus obtain the common key K.

In this example, the respective terminals calculate the inverse elements of the exclusive information. But the chairman terminal may calculate the inverse elements of the exclusive information and then broadcast them to all terminals.

In this fashion, since the bit number of the exponent can be reduced by canceling the denominators of the exponents as positive numbers, an amount of calculation of the power can be reduced.

(Thirteenth Embodiment)

A thirteenth embodiment of the present invention is an exclusive key sharing method in which the increase in the calculation amount can be suppressed by calculating inverse elements of the exclusive information when the exponent of the power is minus and also the calculation of the reciprocal number can be reduced by calculating the denominators of the exponents in a lump.

A configuration of the communication system and an operation in the set-up phase and the preparatory phase in the thirteenth embodiment of the present invention are similar to those in the eleventh embodiment. An example in which the chairman terminal 2 excludes the terminals 5, 6 will be explained hereunder.

In the key updating phase, the respective terminals j (j≠2, 5, 6) calculate inverse elements $$F_5 = C2_5^{(-1)} \bmod p, \quad F_6 = C2_6^{(-1)} \bmod p$$

of the exclusive information $C2_5$, $C2_6$. The respective terminals j calculate $$\lambda(j, \Lambda_j) = 5/(5-j) \times 6/(6-j)$$

$$\lambda(5, \{j, 5\}) = j/(j-5)$$

$$\lambda(6, \{j, 6\}) = j/(j-6)$$

where $\Lambda_j = \{j, 5, 6\}$ and $$T_j = \{\Pi(j-L)\}/j \text{ (product of } L \in \Lambda - \{i\} \text{ is calculated)}$$

-continued $$= (j-5) \times (j-6)/j$$

and then calculate cession keys $$K_j = C1\wedge(S_j \times \lambda(j, \Lambda_j) \times T_j \bmod q) \times$$

$$C2_5\wedge(\lambda(5, \{j, 5\}) \times T_j \bmod q) \times$$

$$C2_6\wedge(\lambda(6, \{j, 6\}) \times T_j \bmod q) \bmod p$$

$$= C1\wedge(S_j \times 5/(5-j) \times 6/(6-j) \times (j-5) \times (j-6)/j \bmod q) \times$$

$$C2_5\wedge(j/(j-5) \times (j-5) \times (j-6)/j \bmod q) \times$$

$$C2_6\wedge(j/(j-6) \times (j-5) \times (j-6) \bmod q\} \bmod p$$

$$= C1\wedge(S_j \times 5 \times 6 \times /j \bmod q) \times$$

$$C2_5\wedge((j-6) \bmod q) \times C2_6\wedge((j-5) \bmod q) \bmod p$$

by using the preparatory information C1, the exclusive information $C2_5$, $C2_6$, and own secret information $S_j$.

In this case, if $\lambda(5, \{j, 5\}) \times T_j < 0$, i.e., $(j-6) < 0$, the respective terminals j replace $\lambda(5, \{j, 5\}) \times T_j$ with $|\lambda(5, \{j, 5\}) \times T_j|$ and replace $C2_5$ with $F_5$, and then calculate $$C2_5\hat{\,}((j-6) \bmod q) = F_5\hat{\,}((6-j) \bmod q).$$

If $\lambda(6, \{j, 6\}) \times T_j < 0$, i.e., $(j-5) < 0$, the respective terminals j replace $\lambda(6, \{j, 6\}) \times T_j$ with $|\lambda(6, \{j, 6\}) \times T_j|$ and replace $C2_6$ with $F_6$, and then calculate $$C2_6\hat{\,}((j-5) \bmod q) = F_6\hat{\,}((5-j) \bmod q).$$

Finally, the respective terminals j calculate a power residue value of $K_j$ $$K_j\hat{\,}(1/T_j \bmod q) \bmod p = K_j\hat{\,}(j/\{(j-5) \times (j-6)\} \bmod q) \bmod p$$

which has $1/T_j$ as an exponent and p as a modulus to thus obtain the common key K.

In this example, the respective terminals calculate the inverse elements of the exclusive information. However, the chairman terminal may calculate the inverse elements of the exclusive information and then broadcast them to all terminals.

In this way, since the bit number of the exponent can be reduced by canceling the denominators of the exponents as positive numbers, an amount of calculation of the power can be reduced.

(Fourteenth Embodiment)

A fourteenth embodiment of the present invention is an exclusive key sharing method based on the recovery type signature, in which authentication of the chairman terminal can be performed and the calculation of power can be reduced by reducing the number of figure of the exponent part.

A configuration of the communication system in the fourteenth embodiment of the present invention is similar to that in the eleventh embodiment. An example in which the chairman terminal excludes the terminals 5, 6 will be explained hereunder.

In the set-up phase, the Hash function hash ( ) is publicly opened. Other processes are similar to those in the eleventh embodiment.

In the preparatory phase, the chairman terminal calculates a hash value $$H = \text{hash}(C2_5, C2_6)$$

which is obtained by compressing the exclusive information $C2_5$, $C2_6$ by using the Hash function hash ( ).

The chairman terminal calculates a signature $$Z = H \times (-S_2) + k \bmod q$$

by using own secret information $S_2$, and then broadcasts the signature Z together with the exclusive information $C2_5$, $C2_6$, the particular terminal number 5, 6, and own terminal number 2 to all terminals.

In the key updating phase, the respective terminals j ($j \ne 2$, 5, 6) calculate a hash value H' which is obtained by compressing the exclusive information $C2_5$, $C2_6$ by using the Hash function hash ( ). The respective terminals j calculate $$C1 = g^z \times y_2^{H'} \bmod p$$

(if a signer is surely the chairman terminal 2 and also the signature Z, the exclusive information $C2_5$, $C2_6$, the particular terminal numbers 5, 6, and the terminal number 2 of the chairman terminal are not tampered, $C1 = g^k$ modp and H'=H are calculated) by using public information $y_2$ of the chairman terminal. Other calculations are identical to the eleventh embodiment. In this case, the same advantages can be achieved if other processes are performed in the same way as the second and thirteenth embodiments.

In this manner, respective terminals can authenticate the chairman terminal.

(Fifteenth Embodiment)

A fifteenth embodiment of the present invention is an exclusive key sharing method based on Cramaer-Shoup cipher in which, since the number of figure of the exponent can be reduced by canceling the denominator of the exponent part in the power calculation and thus the power of the denominator is calculated collectively, the power calculation can be reduced and accelerated.

A configuration of the communication system in the fifteenth embodiment of the present invention is similar to that in the eleventh embodiment. An example in which the chairman terminal excludes the terminals 5, 6 will be explained hereunder.

In the set-up phase, the chairman terminal distributes the secret keys are $\alpha 1$, $\alpha 2$, $\beta 1$, $\beta 2$, $\gamma 1$, $\gamma 2$ to respective terminals. The respective terminals i ($1 \le i \le 6$) hold secret information $\alpha 1_i$, $\alpha 2_i$, $\beta 1_i$, $\beta 2_i$, $\gamma 1_i$, $\gamma 2_i$ in secret to satisfy $$\alpha 1 = \Sigma \lambda(i, \Lambda) \times \alpha 1_i \text{ (sum of } i \in \Lambda \text{ is calculated)}$$

(where $\alpha 1_i = \alpha 1 + f_1 \times i^1 + f_2 \times i^2$ modq)

$$\alpha 2 = \Sigma \lambda(i, \Lambda) \times \alpha 2_i \text{ (sum of } i \in \Lambda \text{ is calculated)}$$

(where $\alpha 2_i = \alpha 2 + f_1 \times i^1 + f_2 \times i^2$ modq)

$$\beta 1 = \Sigma \lambda(i, \Lambda) \times \beta 1_i \text{ (sum of } i \in \Lambda \text{ is calculated)}$$

(where $\beta 1_i = \beta 1 + f_1 \times i^1 + \ldots + f_2 \times i^2$ modq)

$$\beta 2 = \Sigma \lambda(i, \Lambda) \times \beta 2_i \text{ (sum of } i \in \Lambda \text{ is calculated)}$$

(where $\beta 2_i = \beta 2 + f_1 \times i^1 + f_2 \times i^2$ modq)

$$\gamma 1 = \Sigma \lambda(i, \Lambda) \times \gamma 1_i \text{ (sum of } i \in \Lambda \text{ is calculated)}$$

(where $\gamma 1_i = \gamma 1 + f_1 \times i^1 + f_2 \times i^2$ modq)

$$\gamma 2 = \Sigma \lambda(i, \Lambda) \times \gamma 2_i \text{ (sum of } i \in \Lambda \text{ is calculated)}$$

(where $\gamma 2_i = \gamma 2 + f_1 \times i^1 + f_2 \times i^2$ modq)

$$\lambda(i, \Lambda) = \Pi\{L/(L-i)\} \text{ (product of } L \in \Lambda - \{i\} \text{ is calculated)}$$

(where $f_1$, $f_2$ are elements of GF(q), $f_2 \neq 0$, and $\Lambda$ is a set of any three terminals out of six terminals). The respective terminals i open publicly public keys of the system $$A = g_1^{\alpha 1} g_2^{\alpha 2} \bmod p, \ B = g_1^{\beta 1} g_2^{\beta 2} \bmod p, \ \Gamma = g_1^{\gamma 1} g_2^{\gamma 2} \bmod p,$$

the public information $$A_1 = g_1^{\alpha 11} g_2^{\alpha 21} \bmod p, \ldots, A_6 = g_1^{\alpha 16} g_2^{\alpha 26} \bmod p$$

$$B_1 = g_1^{\beta 11} g_2^{\beta 21} \bmod p, \ldots, B_6 = g_1^{\beta 16} g_2^{\beta 26} \bmod p$$

$$\Gamma_1 = g_1^{\gamma 11} g_2^{\gamma 21} \bmod p, \ldots, \Gamma_6 = g_1^{\gamma 16} g_2^{\gamma 26} \bmod p$$

which are calculated by the secret information $\alpha 1_i$, $\alpha 2_i$, $\beta 1_i$, $\beta 2_i$, $\gamma 1_i$, $\gamma 2_i$ the prime number p, the measure q, the elements g1, g2, and the Hash function hash ( ).

In the preparatory phase, the chairman terminal generates arbitrarily the non-zero element k of GF(q), and then calculates the preparatory information $$C1_1 = g_1^k \bmod p, \ C1_2 = g_2^k \bmod p,$$

The chairman terminal calculates the exclusive information $$C2_5 = \Gamma_5\hat{}(k \times \lambda(5, \alpha) \bmod q) \bmod p = \Gamma_5\hat{}(k \times 6) \bmod q) \bmod p$$

$$C2_6 = \Gamma_6\hat{}(k \times \lambda(6, \alpha) \bmod q) \bmod p = \Gamma_6\hat{}(-k \times 5) \bmod q) \bmod p$$

based on a set $\alpha = \{5, 6\}$ of two particular terminals 5, 6, $$\lambda(5, \alpha) = 6/(6-5) = 6,$$

$$\lambda(6, \alpha) = 5/(5-6) = 5,$$

and the public information $\Gamma_5$, $\Gamma_6$,

The chairman terminal calculates the verification information $$v = A^k B\hat{}\{(c \times k) \bmod q\} \bmod p \ (c = \text{hash}(C1_1, C1_2) \bmod q),$$

$$v_5 = [A_5^k B_5\hat{}\{(c \times k) \bmod q\}]\hat{}\{\lambda(5, \alpha) \bmod q\} \bmod p,$$

$$v_6 = [A_6^k B_6\hat{}\{(c \times k) \bmod q\}]\hat{}\{\lambda(6, \alpha) \bmod q\} \bmod p,$$

and then broadcasts the verification information together with the exclusive information $C2_5$, $C2_6$, and the particular terminal numbers 5, 6 to all terminals, The chairman terminal calculates the common key $$K = \Gamma^k \bmod p.$$

In the key updating phase, the respective terminals j ($\neq 2$, 5, 6) calculate $$\lambda(j, \Lambda_j) = 5/(5-j) \times 6/(6-j)$$

$$\lambda(5, \{j, 5\}) = j/(j-5)$$

$$\lambda(6, \{j, 6\}) = j/(j-6)$$

where $\Lambda = \{j, 5, 6\}$ and $$T_j = \{\Pi(j - L)\}/j \ (\text{product of } L \in \Lambda_j - \{j\} \text{ is calculated})$$

$$= (j-5) \times (j-6)/j.$$

Then, the respective terminals j calculate a verification equation $$(C l_1 \alpha^{1j} C l_2 \alpha^{2j} (C l_1 \beta^{1j} C l_2 \beta^{2j})^c) \hat{} \{\lambda(j, \Lambda_j) \times T_j \bmod q\} \times$$

$$v_5 \hat{} \{\lambda(5, \{j, 5\}) \times T_j \bmod q\} \times v_6 \hat{} \{\lambda(6, \{j, 6\}) \times T_j \bmod q\} \bmod p$$

$$= (C l_1 \alpha^{1j} C l_2 \alpha^{2j} (C l_1 \beta^{1j} C l_2 \beta^{2j})^c) \hat{} \{5/(5-j) \times 6/(6-j) \times$$

$$(j-5) \times (j-6)/j \bmod q\} \times v_5 \hat{} \{j/(j-5) \times (j-5) \times$$

$$(j-6)/j \bmod q\} \times v_6 \hat{} \{j/(j-6) \times (j-5) \times$$

$$(j-6)/j \bmod q\} \bmod p$$

$$= (C l_1 \alpha^{1j} C l_2 \alpha^{2j} (C l_1 \beta^{1j} C l_2 \beta^{2j})^c) \hat{} \{5 \times 6/j \bmod q\} \times$$

$$v_5 \hat{} \{(J-6) \bmod q\} \times v_6 \hat{} \{(j-5) \bmod q\} \bmod p$$

$$(c = \text{hash}(C1, C1_2) \bmod q)$$

by using the public keys A, B of the system and own secret information $\alpha 1_j$, $\alpha 2_j$, $\beta 1_j$, $\beta 2_j$, and then stop key sharing if coincidence between the verification equation and $v\hat{}\{(j-5) \times (j-6)/j \bmod q\}$ modp is not satisfied.

If the verification equation is satisfied, the respective terminals j calculate the cession keys $$K_j = (C l_1 \gamma^{1j} C l_2 \gamma^{2j}) \hat{} \{\lambda(j, \Lambda_j) \times T_j \bmod q\} \times$$

$$C2_5 \hat{} \{\lambda(5, \{j, 5\}) \times T_j \bmod q\} \times C2_6 \hat{} \{\lambda(6, \{j, 6\}) \times$$

$$T_j \bmod q\} \bmod p$$

$$= (C l_1 \gamma^{1j} C l_2 \gamma^{2j}) \hat{} \{5/(5-j) \times 6/(6-j) \times (j-5) \times$$

$$(j-6)/j \bmod q\} \times C2_5 \hat{} \{j/(j-5) \times (j-5) \times$$

$$(j-6)/j \bmod q\} \times C2_6 \hat{} \{j/(j-6) \times (j-5) \times$$

$$(j-6)/j \bmod q\} \bmod p$$

$$= (C l_1 \gamma^{1j} C l_2 \gamma^{2j}) \hat{} \{5 \times 6/j \bmod q\} \times$$

$$C2_5 \hat{} \{(j-6) \bmod q\} \times C2_6 \hat{} \{(j-5) \bmod q\} \bmod p$$

by using the $T_j$, $\lambda(j, \Lambda_j)$, $\lambda(5, \{j, 5\})$, $\lambda(6, \{j, 6\})$, the preparatory information $C1_1$, $C1_2$, the exclusive information $C2_5$, $C2_6$, and own secret information $\gamma 1_j$, $\gamma 2_j$.

Finally, the respective terminals j calculate a power residue value of $K_j$ $$K_j\hat{}(1/T_j \bmod q) \bmod p = K_j\hat{}(j/\{(j-5) \times (j-6)\} \bmod q) \bmod p$$

which has $1/T_j$ as an exponent and p as a modulus to thus obtain the common key K.

In the exclusive key sharing method based on Cramaer-Shoup cipher, since the number of figure of the exponent can be reduced by canceling the denominator of the exponent part in the power calculation of the verification information and exclusive information and thus the power of the denominator is calculated collectively, the power calculation can be reduced and accelerated.

(Sixteenth Embodiment)

A sixteenth embodiment of the present invention is an exclusive key sharing method based on the Cramaer-Shoup cipher in which, since the number of figure of the exponent can be reduced by canceling the denominator of the exponent part in the power calculation, the power of the denominator is calculated collectively, and the calculation is carried out by using the inverse elements if the exponent becomes minus, the power calculation can be reduced and accelerated.

A configuration of the communication system in the sixteenth embodiment of the present invention is similar to that in the eleventh embodiment. An operation in the set-up phase is identical to that in the fifteenth embodiment. An example in which the chairman terminal excludes the terminals 5, 6 will be explained hereunder.

In the preparatory phase, the chairman terminal calculates the exclusive information $$C2_5=\Gamma_5{}^k \bmod p,\ C2_6=\Gamma_6{}^k \bmod p$$

based on the public information $\Gamma_5$, $\Gamma_6$ of two particular terminals 5, 6. Then, the chairman terminal calculates the verification information $$v=A^k B\hat{\ }\{(c\times k)\bmod q\}\bmod p\ (c=\text{hash}(C1_1, C1_2)\bmod q),$$

$$v_5=A_5{}^k B_5\hat{\ }\{(c\times k)\bmod q\}\bmod p$$

$$v_6=A_6{}^k B_6\hat{\ }\{(c\times k)\bmod q\}\bmod p$$

and then broadcasts the verification information together with the exclusive information $C2_5$, $C2_6$, and the particular terminal numbers 5, 6 to all terminals.

In the key updating phase, the respective terminals j (j≠2, 5, 6) calculate inverse elements $$E_5=v_5{}^{(-1)}\bmod p,\ E_6=v_6{}^{(-1)}\bmod p$$

of the verification information $v_5$, $v_6$, and calculate $$\lambda(j, \Lambda_j), \lambda(5, \Lambda_j), \lambda(6, \Lambda_j)$$

where $\Lambda_j=\{j, 5, 6\}$. Then, the respective terminals j calculate a verification equation $$(C1_1\alpha^{1/j}C1_2\alpha^{2/j}(C1_1\beta^{1/j}C1_2\beta^{2/j})^c)\hat{\ }\{\lambda(j, \Lambda_j)\times t_j\bmod q)\}$$

$$\times v_5\hat{\ }\{\lambda(5, \Lambda_j)\times t_j\bmod q\}\times v_6\hat{\ }\{\lambda(6, \Lambda_j)\times t_j\bmod q\}\bmod p=v\hat{\ }\{t_j\bmod q\}\bmod p$$

by using the positive square root $t_j$ of the absolute value of the product of these denominators, the public keys A, B of the system and own secret information $\alpha 1_j$, $\alpha 2_j$, $\beta 1_j$, $\beta 2_j$, where c=hash ($C1_1$, $C1_2$) modq. Then, the respective terminals j calculate the verification equation by replacing $\lambda(5, \Lambda_j)$ with $|\lambda(5, \Lambda_j)|$ and replacing $v_5$ with $E_5$ if $\lambda(5, \Lambda_j)<0$ and replacing $\lambda(6, \Lambda_j)$ with $|\lambda(6, \Lambda_j)|$ and replacing $v_6$ with $E_6$ if $\lambda(6, \Lambda_j)<0$, and then stop the key sharing if the verification equation is not satisfied.

If the verification equation is satisfied, the respective terminals j calculate inverse elements $$F_5=C2_5{}^{(-1)}\bmod p,\ F_6=C2_6{}^{(-1)}\bmod p$$

of the exclusive information $C2_5$, $C2_6$, and then calculate the cession keys $$K_j = (Cl_1\gamma^{1/j}Cl_2\gamma^{2/j})\hat{\ }\{\lambda(j, \Lambda_j)\times t_j\bmod q\}\times C2_5\hat{\ }\{\lambda(5, \Lambda_j)\times t_j\bmod q\}\times C2_6\hat{\ }\{\lambda(6, \Lambda_j)\times t_j\bmod q\}\bmod p$$

by using the $t_j$, $\lambda(j, \Lambda_j)$, $\lambda(5, \Lambda_j)$, $\lambda(6, \Lambda_j)$, the preparatory information $C1_1$, $C1_2$, the exclusive information $C2_5$, $C2_5$, and own secret information $\gamma 1_j$, $\gamma 2_j$. In this case, the respective terminals j calculate $$C2_5\hat{\ }(-6\times j\times|6-j|\bmod q)=F_5\hat{\ }(6\times j\times|6-j|\bmod q)$$

by replacing $\lambda(5, \Lambda_j)$ with $|\lambda(5, \Lambda_j)|$ and replacing $C2_5$ with $F_5$ if $\lambda(5, \Lambda_j)<0$ and calculate $$C2_6\hat{\ }(-5\times j\times|5-j|\bmod q)\bmod p=F_6\hat{\ }(5\times j\times|5-j|\bmod q)\bmod p$$

by replacing $\lambda(6, \Lambda_j)$ with $|\lambda(6, \Lambda_j)|$ and replacing $C2_6$ with $F_6$ if $\lambda(6, \Lambda_j)<0$.

Finally, the respective terminals j calculate a power residue value of $K_j$ $$K_j\hat{\ }(1/t\bmod q)\bmod p$$

which has $1/t_j$ as an exponent and p as a modulus to thus obtain the common key K.

In this example, the respective terminals calculate the inverse elements of the exclusive information. But the chairman terminal may calculate the inverse elements of the exclusive information and then broadcast them to all terminals.

In this manner, even if the exponent part of the power calculation of the verification information is negative, the power calculation can be reduced and accelerated by utilizing the inverse element.

(Seventeenth Embodiment)

A sixteenth embodiment of the present invention is an exclusive key sharing method based on the Cramaer-Shoup cipher in which, since the number of figure of the exponent can be reduced by canceling the denominator of the exponent part in the power calculation of the verification information and the exclusive information, the power of the denominator is calculated collectively, and the calculation is carried out by using the inverse elements if the exponent becomes minus, the power calculation can be reduced and accelerated.

A configuration of the communication system in the seventeenth embodiment of the present invention is similar to that in the eleventh embodiment. Operations in the set-up phase and the preparatory phase are identical to that in the fifteenth embodiment. An example in which the chairman terminal 2 excludes the terminals 5, 6 will be explained hereunder.

In the key updating phase, the respective terminals j (j≠2, 5, 6) calculate the inverse elements $$E_5=v_5{}^{(-1)}\bmod p,\ E_6=v_6{}^{(-1)}\bmod p$$

of the verification information $v_5$, $v_6$, and calculate $$\lambda(j, \Lambda_j), \lambda(5, \{j, 5\}), \lambda(6, \{j, 6\})$$

where $\Lambda_j=\{j, 5, 6\}$ and $$T_j=\{\Pi(j-L)\}/j\ (\text{product of } L\in\Lambda_j-\{i\}\ \text{is calculated}).$$

Then, the respective terminals j calculate the verification equation $$(C1_1\alpha^{1/j}C1_2\alpha^{2/j}(C1_1\beta^{1/j}C1_2\beta^{2/j})^c)\hat{\ }\{\lambda(j, \Lambda_j)\times T_j\bmod q)\}$$

$$\times v_5\{\lambda(5, \{j, 5\})\times T_j\bmod q\}\times v_6\hat{\ }\{\lambda(6, \{j, 6\})\times T_j\bmod q\}\bmod p=$$

$$v\hat{\ }\{T_j\bmod q\}\bmod p$$

by using the public keys A, B of the system and own secret information $\alpha 1_j$, $\alpha 2_j$, $\beta 1_j$, $\beta 2_j$, where c=hash ($C1_1$, $C1_2$) modq. Then, the respective terminals j calculate the verification equation by replacing $\lambda(5, \{j, 5\})\times T_j$ with $|\lambda(5, \{j, 5\})\times T_j|$ and replacing $v_5$ with $E_5$ if $\lambda(5, \{j, 5\})\times T_j<0$ and replacing $\lambda(6, \{j, 6\})\times T_j$ with $|\lambda(6, \{j, 6\})\times T_j|$ and replacing $v_6$ with $E_6$ if $\lambda(6, \{j, 6\})\times T_j<0$, and then stop the key sharing if the verification equation is not satisfied.

If the verification equation is satisfied, the respective terminals j calculate the inverse elements $$F_5=C2_5{}^{(-1)}\bmod p,\ F_6=C2_6{}^{(-1)}\bmod p$$

of the exclusive information $C2_5$, $C2_6$, and then calculate the cession keys $$K_j = (C1_1 \gamma^{1j} C1_2 \gamma^{2j})^{\{\lambda(j, \Lambda_j) \times T_j \bmod q\}} \times C2_5^{\{\lambda(5, \{j, 5\}) \times T_j \bmod q\}} \times C2_6^{\{\lambda(6, \{j, 6\}) \times T_j \bmod q\}} \bmod p$$

by using the $T_j$, $\lambda(j, \Lambda_j)$, $\lambda(5, \{j, 5\})$, $\lambda(6, \{j, 6\})$, the preparatory information $C1_1$, $C1_2$, the exclusive information $C2_5$, $C2_6$, and own secret information $\gamma 1_j$, $\gamma 2_j$. In this case, the respective terminals j calculate the cession keys by replacing $\lambda(5, \{j, 5\}) \times T_j$ with $|\lambda(5, \{j, 5\}) \times T_j|$ and replacing $C2_5$ with $F_5$ if $\lambda(5, \{j, 5\}) \times T_j < 0$ and replacing $\lambda(6, \{j, 6\}) \times T_j$ with $|\lambda(6, \{j, 6\}) \times T_j|$ and replacing $C2_6$ with $F_6$ if $\lambda(6, \{j, 6\}) \times T_j < 0$.

Finally, the respective terminals j calculate a power residue value of $K_j$ $$K_j^{\wedge}(1/T) \bmod q) \bmod p$$

which has $1/T_j$ as an exponent and p as a modulus to thus obtain the common key K.

In this example, the respective terminals calculate the inverse elements of the verification information and the exclusive information. But the system may be constructed such that the chairman terminal may calculate the inverse elements of the verification information and the exclusive information and then broadcast them to all terminals.

In this manner, even if the exponent part of the power calculation of the verification information and the exclusive information becomes minus, the power calculation can be reduced and accelerated by utilizing the inverse element.

Industrial Applicability

As described above, according to the present invention, the exclusive key sharing method for the communication system which consists of the base station and N terminals connected to the base station to allow broadcast communication is constructed such that the secret keys are S, respective terminals i hold secret information Si in secret to satisfy $S = \Sigma \lambda(i, \Lambda) \times Si$, the base station broadcasts preparatory information C1 ($g^k \bmod p$) and exclusive information C2 ($g^{\wedge}(k \times Sa \bmod q) \bmod p$) together with the particular terminal number a to all terminals, and respective terminals j (j≠a) calculate $C1^{\wedge}(Sj \times \lambda(j, \Lambda) \bmod q) \times C2^{\wedge}(\lambda(a, \Lambda) \bmod q) \bmod p$ to thus obtain the common key K which is common to the base station. Therefore, simplification of the process and improvement in the security can be implemented.

Also, the exclusive key sharing method is constructed such that the secret keys are S, the particular terminal number is d, respective terminals i hold secret information Si in secret to satisfy $S = \Sigma \lambda(i, \Lambda) \times Si$, the base station broadcasts the preparatory information $C1 = g^k \bmod p$ and the together with the preparatory information C1 and exclusive information $C21(g^{\wedge}(k \times Si1 \bmod q) \bmod p), \ldots, C2d(g^{\wedge}(k \times Sid \bmod q) \bmod p)$ together with the particular terminal numbers $i1, \ldots, id$ to all terminals, and respective terminals j calculate $C1^{\wedge}(Sj \times \lambda(j, \Lambda) \bmod q) \times C21^{\wedge}(\lambda(i1, \Lambda) \bmod q) \times \ldots \times C2d^{\wedge}(\lambda(id, \Lambda) \bmod q) \bmod p$ to thus obtain the common key K which is common to the base station. Therefore, two terminals can be excluded simultaneously by only broadcasting C1, C2a, C2b and the particular terminal numbers (a, b) from the base station to all terminals.

Also, the exclusive key sharing method for the communication system which consists of N terminals (N is an integer of more than 2) connected mutually to allow broadcast communication is constructed such that the secret keys are S, the prime number which is larger than S and N or the power number of the prime number is p, the measure of (p−1) is q, and the particular terminal number which can be specified by the chairman terminal φ (to which any terminal can be appointed) d (1≦d<N−1), respective terminals i (1≦i≦N) hold secret information Si in secret to satisfy $$S = \Sigma \lambda(i, \Lambda) \times S_i \text{ (sum of } i \in \Lambda \text{ is calculated)}$$

$$\lambda(i, \Lambda) = \Gamma\{L/(L-i)\} \text{ (product of } L \in \Lambda - \{i\} \text{ is calculated)}$$

$$S_i = S + f_1 \times i^1 + \ldots + f_d \times i^d \bmod q$$

(where $f_1, \ldots, f_d$ are d elements of GF(q), $f_d \neq 0$, and $\Lambda$ is a set of any two terminals out of the N terminals), and can use the public key of the system $$y = g^s \bmod p,$$

public information $$y_1 = g^{S1} \bmod p, y_2 = g^{S2} \bmod p, \ldots, y_N = g^{SN} \bmod p,$$

the prime number p, the measure q, and the element g, and (1) the chairman terminal generates arbitrarily the non-zero element k of GF(q) and then calculates exclusive information $$C2_{i1} = y_{i1}^k \bmod p, \ldots, C2_{id} = y_{id}^k \bmod p$$

based on the public information $y_{i1}, \ldots, y_{id}$ of the d terminals $i_1, \ldots, i_d$, (2) the chairman terminal calculates a signature $$Z = C2_{i1} \times \ldots \times C2_{id} \times (-S_\phi) + k \bmod q$$

by using own secret information $S_\phi$, and broadcasts the signature Z together with the exclusive information $C2_{i1}, \ldots, C2_{id}$, the particular terminal numbers $i_1, \ldots, i_d$ and own terminal number φ to all terminals, (3) the chairman terminal calculates a common key $$K = y^k \bmod p,$$

(4) the respective terminals j (j≠$i_1, \ldots, i_d$, φ) calculate $$C1 = g^Z \times y_\phi^{\wedge}(C2_{i1} \times \ldots \times C2_{id} \bmod q) \bmod p$$

(if a signer is surely the chairman terminal φ and also the signature Z, the exclusive information $C2_{i1}, \ldots, C2_{id}$, the particular terminal numbers $i_1, \ldots, i_d$ and the terminal number φ of the chairman terminal are not tampered, $C1 = g^k \bmod p$ is calculated) by using the public information $y_\phi$ of the chairman terminal, (5) the respective terminals j calculate $\lambda(j, \Lambda)$ and $\lambda(i_1, \Lambda), \ldots, \lambda(i_d, \Lambda)$ where $\Lambda = \{j, i_1, \ldots, i_d\}$, and calculate $C1^{\wedge}(S_j \times \lambda(j, \Lambda) \bmod q) \times C2_{i1}^{\wedge}(\lambda(i_1, \Lambda) \bmod q) \times \ldots \times C2_{id}^{\wedge}(\lambda(i_d, \Lambda) \bmod q) \bmod p$ by using the C1, the exclusive information $C2_{i1}, \ldots, C2_{id}$, and own secret information $S_j$ to thus obtain the common key K. Therefore, only the particular terminal can be excluded by a small amount of communication and a short service suspending term and remaining terminals can be shared with the distributed key information.

Also, the exclusive key sharing method for a communication system which consists of N terminals (N is an integer of more than 2) connected mutually to allow broadcast communication is constructed such that the secret keys are α1, α2, β1, β2, γ, the prime number which is larger than α1, α2, β1, β2, γ and N or the power number of the prime number is p, the measure of (p−1) is q, elements of GF(p) are g1, g2, and the particular terminal number which can be specified by a chairman terminal φ (to which any terminal can be appointed) is d (1≦d<N−1), respective terminals i ($1 \leq i \leq N$) hold secret information $\alpha1_i, \alpha2_i, \beta1_i, \beta2_i, \gamma1_i, \gamma2_i$ in secret to satisfy $\alpha1 = \Sigma\lambda(i, \Lambda) \times \alpha1_i$ (sum of $i \in \Lambda$ is calculated)

(where $\alpha1_i = \alpha1 + f_1 \times i^1 + \ldots + f_d \times i^d$ modq)

$\alpha2 = \Sigma\lambda(i, \Lambda) \times \alpha2_i$ (sum of $i \in \Lambda$ is calculated)

(where $\alpha2_i = \alpha2 + f_1 \times i^1 + \ldots + f_d \times i^d$ modq)

$\beta1 = \Sigma\lambda(i, \Lambda) \times \beta1_i$ (sum of $i \in \Lambda$ is calculated)

(where $\beta1_i = \beta1 + f_1 \times i^1 + \ldots + f_d \times i^d$ modq)

$\beta2 = \Sigma\lambda(i, \Lambda) \times \beta2_i$ (sum of $i \in \Lambda$ is calculated)

(where $\beta2_i = \beta2 + f_1 \times i^1 + \ldots + f_d \times i^d$ modq)

$\gamma1 = \Sigma\lambda(i, \Lambda) \times \gamma1_i$ (sum of $i \in \Lambda$ is calculated)

(where $\gamma1_i = \gamma1 + f_1 \times i^1 + \ldots + f_d \times i^d$ modq)

$\gamma2 = \Sigma\lambda(i, \Lambda) \times \gamma2_i$ (sum of $i \in \Lambda$ is calculated)

(where $\gamma2_i = \gamma2 + f_1 \times i^1 + \ldots + f_d \times i^d$ modq)

$\lambda(i, \Lambda) = \Pi\{L/(L-i)\}$ (product of $L \in \Lambda - \{i\}$ is calculated)

(where $f_1, \ldots, f_d$ are d elements of GF(q), $f_d \neq 0$, and $\Lambda$ is a set of any (d+1) terminals out of the N terminals), and can use public keys of the system $A = g_1^{\alpha1} g_2^{\alpha2}$ modp, $B = g_1^{\beta1} g_2^{\beta2}$ modp, $\Gamma = g_1^{\gamma1} g_2^{\gamma2}$ modp, public information $A_1 = g_1^{\alpha11} g_2^{\alpha21}$ modp, $\ldots$, $A_N = g_1^{\alpha1N} g_2^{\alpha2N}$ modp $B_1 = g_1^{\beta11} g_2^{\beta21}$ modp, $\ldots$, $B_N = g_1^{\beta1N} g_2^{\beta2N}$ modp $\Gamma_1 = g_1^{\gamma11} g_2^{\gamma21}$ modp, $\ldots$, $\Gamma_N = g_1^{\gamma1N} g_2^{\gamma2N}$ modp which are calculated by the secret information $\alpha1_i, \alpha2_i, \beta1_i, \beta2_i, \gamma_i$, the prime number p, the measure q, the elements $g_1$, $g_2$, and a Hash function hash ( ), and (1) the chairman terminal generates arbitrarily a non-zero element k of GF(q), and calculates preparatory information $C1_1 = g_1^k$ modp, $C1_2 = g_2^k$ modp, (2) the chairman terminal calculates exclusive information $C2_{i1} = \Gamma_{i1}^k$ modp, $\ldots$, $C2_{id} = \Gamma_{id}^k$ modp based on the public information $\Gamma_{i1}, \ldots, \Gamma_{id}$ of the d particular terminals $i_1, \ldots, i_d$, (3) the chairman terminal calculates verification information $v = A^k B^{\{(c \times k) \bmod q\}}$ modp ($c$=hash($C1_1, C1_2$) modq), $v_{i1} = A_{i1}^k B_{i1}^{\{(c \times k) \bmod q\}}$ modp, $\ldots$, $v_{id} = A_{i1}^k B_{id}^{\{(c \times k) \bmod q\}}$ modp and then broadcasts them together with the exclusive information $C2_{i1}, \ldots, C2_{id}$, and the particular terminal numbers $i_1, \ldots, i_d$ to all terminals, (4) the chairman terminal calculates a common key $K = \Gamma^k$ modp, (5) the respective terminals j ($j \neq i_1, \ldots, i_d, \phi$) calculate $\lambda(j, \Lambda), \lambda(i_1, \Lambda), \ldots, \lambda(i_d, \Lambda)$ where $\Lambda = \{j, i_1, \ldots, i_d\}$, and then calculate a verification equation $(C1_1^{\alpha1j} C1_2^{\alpha2j} (C1_1^{\beta1j} C1_2^{\beta2j})^c)^{\lambda(j, \Lambda)}$ modq}

$\times v_{i1}^{\{\lambda(i_1, \Lambda) \bmod q\}} \times \ldots \times v_{id}^{\{\lambda(i_d, \Lambda) \bmod q\}}$ modp=v (c=hash($C1_1, C1_2$) modq)

by using the public keys A, B of the system and own secret information $\alpha1_j, \alpha2_j, \beta1_j, \beta2_j$, and then stop key sharing unless the verification equation is satisfied and, if the verification equation is satisfied, (6) the respective terminals j calculate $(C1_1^{\gamma1j} C1_2^{\gamma2j})^{\{\lambda(j, \Lambda) \bmod q\}} \times C2_{i1}^{\{\lambda(i_1, \Lambda) \bmod q\}} \times \ldots \times C2_{id}^{\{\lambda(i_d, \Lambda) \bmod q\}}$ modp by using $\lambda(j, \Lambda), (\lambda(i_1, \Lambda), \ldots, \lambda(i_d, \Lambda)$, the preparatory information $C1_1, C1_2$, the exclusive information $C2_{i1}, \ldots, C2_{id}$, and the own secret information $\gamma1_j, \gamma2_j$, to thus obtain the common key K. Therefore, the terminals except the particular terminals can perform the key sharing while keeping the higher security.

In addition, as described above, according to the present invention, the exclusive key sharing method for a communication system which consists of the base station and N terminals (N is an integer of more than 2) connected to the base station to allow broadcast communication is constructed such that the secret keys are S, the prime number which is larger than S and N or the power number of the prime number is p, the measure of (p−1) is q, and the number of terminals which can be specified by the base station (referred to as a "particular terminal number" hereinafter) is 1, respective terminals i ($1 \leq i \leq N$) hold secret information Si in secret to satisfy $S = \Sigma\lambda(i, \Lambda) \times S_i$ (sum of $i \in \Lambda$ is calculated)

(where $S_i = S + f_1 \times i$ modq (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of the N terminals), and the base station holds ($S, p, g, S_1, \ldots, S_N$), (1) the base station calculates preparatory information $C_1 = g^k$ modp where an element of GF(p) is g and a non-zero element of GF(q) is k, (2) the base station calculates exclusive information $C_2 = g^{\{k \times S_a \bmod q\}}$ modp, based on the secret information $S_a$ of the particular terminal a, and broadcasts the exclusive information together with the particular terminal number a and the preparatory information $C_1$ to all terminals, and (3) the base station calculates a common key $K = g^{\{k \times S \bmod q\}}$ modp which is shared with all terminals j ($j \neq a$) except the particular terminal a, (4) the respective terminals j (j $\neq$ a) calculate a product $C_1\hat{}(S_j \times \lambda(j, \Lambda) \bmod q) \times C_2\hat{}(\lambda(a, \Lambda) \bmod q) \bmod p$ of a power residue value of $C_1$ $C_1\hat{}(S_j \times \lambda(j, \Lambda) \bmod q) \bmod p$ which uses a product of $S_j$ and $\lambda(j, \Lambda)$ to the modulus q as an exponent and a power residue value of $C_2$ $C_2\hat{}(\lambda(a, \Lambda) \bmod q) \bmod p$ which uses $\lambda(a, \Lambda)$ calculated to the modulus p as the exponent by using the preparatory information $C_1$, the exclusive information $C_2$, and own secret information $S_j$ to thus obtain the common key K which is shared with the base station, and
- (i) the base station generates arbitrarily the non-zero element e of GF(q), and broadcasts the e to all terminals,
- (ii) the base station calculates the new element $g'=g^{1/e \bmod q} \bmod p$ and replaces the managed element g with it,
- (iii) the respective terminals i calculate the new secret information $S_i'=S_i \times e \bmod q$ (at this time, $(g')^{S_i'} \bmod p = (g)^{S_i} \bmod p$ is satisfied). Therefore, since an amount of communication required for the base station is small such as the e and the public information other than the system parameter element g are not changed, such an advantage can be achieved that update of the secret information can be performed at high speed.

Also, the exclusive key sharing method for the communication system which consists of N terminals (N is an integer of more than 2) connected mutually to allow broadcast communication is constructed such that
- (i) the system manager generates arbitrarily the non-zero element e of GF(q), and broadcasts the e to all terminals,
- (ii) the system manager calculates the new element $g'=g^{1/e \bmod q} \bmod p$ and replaces the managed element g with it, and
- (iii) the respective terminals i calculate the new secret information $S_i'=S_i \times e \bmod q$ (at this time, $(g')^{S_i'} \bmod p = (g)^{S_i} \bmod p$ is satisfied). Therefore, since an amount of communication required for the system manager is small such as the e and the public information other than the system parameter element g are not changed, such an advantage can be achieved that update of the secret information can be performed at high speed.

Also, the exclusive key sharing method for the communication system which consists of the base station and the N terminals (N is an integer of more than 2) connected to the base station to allow broadcast communication is constructed such that
- (i) the base station generates arbitrarily the non-zero element e of GF(q), and broadcasts the encrypted e encrypted by using the common key K to all terminals,
- (ii) the base station calculates the new element $g'=g^{1/e \bmod q} \bmod p$ and replaces the managed element g with it, and
- (iii) the respective terminals i decrypt the encrypted e by using the common key K, and calculate the new secret information $S_i'=S_i \times e \bmod q$ Therefore, since the secret information of the terminals can be updated by using the random number which is distributed using the common key which is shared by the exclusive key sharing, the excluded terminal cannot be returned in the succeeding exclusive key sharing.

Also, the exclusive key sharing method for a communication system which consists of the N terminals (N is an integer of more than 2) connected mutually to allow broadcast communication is constructed such that
- (i) the chairman terminal generates arbitrarily the non-zero element e of GF(q), and broadcasts the encrypted e which is encrypted by using the common key K to all terminals,
- (ii) the chairman terminal calculates the new element $g'=g^{1/e \bmod q} \bmod p$ and replaces the element g with it,
- (iii) the respective terminals j decrypt the encrypted e by using the common key K, and calculate the new secret information $S_j'=S_j \times e \bmod q$ Therefore, since the secret information of the terminals can be updated by using the random number which is distributed using the common key which is shared by the exclusive key sharing, the excluded terminal cannot be returned in the succeeding exclusive key sharing.

Also, the exclusive key sharing method for the communication system which consists of N terminals (N is an integer of more than 2) connected mutually to allow broadcast communication is constructed such that the secret keys are S, the prime number which is larger than S and N or the power number of the prime number is p, the measure of (p−1) is q, elements of GF(p) are g, and the particular terminal number which can be specified by the chairman terminal b is 1, respective terminals i ($1 \leq i \leq N$) hold secret information Si in secret to satisfy $S=\Sigma \lambda(i, \Lambda) \times S_i$ (sum of $i \in \Lambda$ is calculated)

(where $S_i=S+f_1 \times i \bmod q$ (f1 is a non-zero element of GF(q)), $\lambda(i, \Lambda)=\Pi\{L/(L-i)\}$ (product of $L \in \Lambda - \{i\}$ is calculated), and $\Lambda$ is a set of any two terminals out of the N terminals), and
- the chairman terminal b can use the public key for all terminals $y=g^S \bmod p$ and the public information $y_1=g^{S1} \bmod p, y_2=g^{S2} \bmod p, \ldots, y_N=g^{SN} \bmod p,$ (1) the chairman terminal b generates the non-zero element k of GF(q), and calculates the preparatory information $C_1=g^k \bmod p,$ (2) the chairman terminal b calculates the exclusive information $$C_2 = y_a^k \bmod p$$

based on the public information $y_a$ of the particular terminal a, and broadcasts the exclusive information together with the particular terminal number a and the preparatory information $C_1$ to all terminals, and (3) the chairman terminal b calculates the common key $$K = y^k \bmod p,$$

(4) the respective terminals j (j≠a, b) calculate λ(j, Λ) and λ(a, Λ) where Λ={j, a}, and calculate $$C_1{}^{\wedge}(S_j \times \lambda(j, \Lambda) \bmod q) \times C_2{}^{\wedge}(\lambda(a, \Lambda) \bmod q) \bmod p$$

by using the preparatory information $C_1$, the exclusive information $C_2$, and own secret information $S_j$ to thus obtain the common key K. Therefore, the terminals except the chairman terminal are not requested to hold the public information of other terminals and only the chairman terminal can use the public information of other terminals, such an advantage can be achieved that other terminals cannot be designated as the chairman terminal.

Further, as apparent from the above explanation, according to the present invention, the exclusive key sharing method for the communication system which consists of N terminals (N is an integer of more than 2) connected mutually to allow broadcast communication is constructed such that the secret keys are S, the prime number which is larger than S and N or the power number of the prime number is p, the measure of (p−1) is q, elements of GF(p) are g, and the particular terminal number which can be specified by the chairman terminal φ is d (1≦d<N−1), respective terminals i (1≦i≦N) hold secret information Si in secret to satisfy $S = \Sigma \lambda(i, \Lambda) \times S_i$, the respective terminals i and the chairman terminal φ can use the public key of the system $y = g^S \bmod p$, the public information $y_1 = g^{S1} \bmod p$, $y_2 = g^{S2} \bmod p$, ..., $y_N = g^{SN} \bmod p$, and the p, q, and g, (1) the chairman terminal calculates the preparatory information $C1 = g^k \bmod p$, (2) the chairman terminal calculates the exclusive information $C2_{i1} = y_{i1}{}^{\wedge}(k \times \lambda(i_1, \alpha) \bmod q) \bmod p$, ..., $C2_{id} = y_{id}{}^{\wedge}(k \times \lambda(i_d, \alpha) \bmod q) \bmod p$ based on a set α of the d particular terminals $i_1, ..., i_d$, $\lambda(i_1, \alpha), ..., \lambda(i_d, \alpha)$ and the public information $y_{i1}, ..., y_{id}$, and broadcasts the exclusive information $C2_{i1}, ..., C2_{id}$ together with the preparatory information C1 and the particular terminal number $i_1, ..., i_d$ to all terminals, and (3) the chairman terminal calculates the common key $K = y^k \bmod p$, (4) the respective terminals j (j≠$i_1, ... i_d$, φ) calculate λ(j, $\Lambda_j$), λ($i_1$, {j, $i_1$}), ..., λ($i_d$, {j, $i_d$}) and $T_j = \{\Pi(j-L)\}/j$ where $\Lambda_j = \{j, i_1, ..., i_d\}$, calculate cession keys $K_j = C1{}^{\wedge}(S_j \times \lambda(j, \Lambda_j) \times T_j \bmod q) \times C2_{i1}{}^{\wedge}(\lambda(i_1, \{j, i_1\}) \times T_j \bmod q) \times ... \times C2_{id}{}^{\wedge}(\lambda(i_d, \{j, i_d\}) \times T_j \bmod q) \bmod p$ by using the preparatory information C1, the exclusive information $C2_{i1}, ..., C2_{id}$, and own secret information $S_j$, and calculates $K_j{}^{\wedge}(1/T_j \bmod q) \bmod p$ to thus obtain the common key K ($=g^{k \times S} \bmod p$). Therefore, since the inverse element operation which causes increase of the exponent part can be carried out collectively to thus reduce a size of the exponent part, the operation can be performed at high speed.

What is claimed is:

1. An exclusive key sharing method for a communication system which consists of a base station and N terminals (N is an integer of more than 2) connected to the base station to allow broadcast communication, wherein secret keys are S, a prime number which is larger than S and N or a power number of the prime number is p, a measure of (p−1) is q, and a number of terminals which can be specified by the base station (referred to as a "particular terminal number" hereinafter) is 1, respective terminals i (1≦i≦N) hold secret information Si in secret to satisfy $S = \Sigma \lambda(i, \Lambda) \times Si$ (sum of i∈Λ is calculated)

(where $Si = S + f1 \times i \bmod q$ (f1 is a non-zero element of GF(q)), $\lambda(i, \Lambda) = \Pi\{L/(L-i)\}$ (product of L∈Λ−{i} is calculated), and Λ is a set of any two terminals out of the N terminals), the base station holds (S, p, g, S1, ..., SN), and (1) the base station calculates preparatory information $$C1 = g^k \bmod p$$

if an element of GF(p) is g and a non-zero element of GF(q) is k, (2) the base station calculates exclusive information $$C2 = g{}^{\wedge}(k \times Sa \bmod q) \bmod p,$$

based on secret information Sa of a particular terminal a and broadcasts it together with a particular terminal number a and the preparatory information C1 to all terminals, (3) the base station calculates a common key $$K = g{}^{\wedge}(k \times S \bmod q) \bmod p$$

which is shared with all terminals j (j≠a) other than the particular terminal a, and (4) respective terminals j (j≠a) calculate $$C1{}^{\wedge}(Sj \times \lambda(j, \Lambda) \bmod q) \times C2{}^{\wedge}(\lambda(a, \Lambda) \bmod q) \bmod p$$

which is a product of $$C1{}^{\wedge}(Sj \times \lambda(j, \Lambda) \bmod q) \bmod p,$$

which is a power residue value of C1 having a product of Sj and λ(j, Λ) to a modulus q as an exponent, and $$C2{}^{\wedge}(\lambda(a, \Lambda) \bmod q) \bmod p$$

which is a power residue value of C2 having the λ(a, Λ) calculated to the modulus q as an exponent, by using the preparatory information C1, the exclusive information C2, and own secret information Sj to thus obtain the common key K which is common to the base station.

2. An exclusive key sharing system for a communication system which consists of a base station and N terminals (N is an integer of more than 2) connected to the base station to allow broadcast communication, wherein the base station includes a first base station side storing portion for holding a modulus p which is a prime number which is larger than a secret key S and the N or a power number of the prime number, an element g of GF(p), and an element k of GF(q) having q as a measure of (p−1), a second base station side storing portion for holding secret information S1, ..., SN to satisfy $S = \Sigma \lambda(i, \Lambda) \times Si$ (sum of i∈Λ is calculated)

(where $Si=S+f1\times i$ modq (f1 is a non-zero element of GF(q)), $\lambda(i, \Lambda)=\Pi\{L/(L-i)\}$ (product of $L\in\Lambda-\{i\}$ is calculated), and $\Lambda$ is a set of any two terminals out of the N terminals), a third base station side storing portion for holding a secret key S, and respective terminals i include a first terminal side storing portion for holding (p, g), and a second terminal side storing portion for holding the secret information Si in secret, and (1) the base station also includes a first base station side calculating portion for calculating preparatory information $$C1=g^k \bmod p$$

by using (k, p, q, g) saved in the first base station side storing portion, (2) the base station also includes a controlling portion for designating a particular terminal a, a second base station side calculating portion for outputting secret information Sa saved in the second base station side storing portion under control of the controlling portion and then calculating exclusive information $$C2=g\char`\^(k\times Sa \bmod q) \bmod p$$

based on the secret information Sa and the (k, p, q, g), and a transmitting portion for broadcasting it together with the preparatory information C1 and a particular terminal number a to all terminals, (3) the base station also includes a third base station side calculating portion for calculating a common key $$K=g\char`\^(k\times S \bmod q) \bmod p$$

which is shared with all terminals j (j≠a) other than the particular terminal a by using the (k, p, q) and the secret key S saved in the third base station side storing portion, and (4) respective terminals j (j≠a) include a terminal side calculating portion for calculating $$C1\char`\^(Sj\times\lambda(j, \Lambda) \bmod q)\times C2\char`\^(\lambda(a, \Lambda) \bmod q) \bmod p$$

which is a product of a power residue value of C1

$$C1\char`\^(Sj\times\lambda(j, \Lambda) \bmod q) \bmod p$$

and a power residue value of C2

$$C2\char`\^(\lambda(a, \Lambda) \bmod q) \bmod p$$

to thus obtain the common key K which is common to the base station.

3. An exclusive key sharing method for a communication system which consists of a base station and N terminals (N is an integer of more than 2) connected to the base station to allow broadcast communication, wherein secret keys are S, a prime number which is larger than S and N or a power number of the prime number is p, a measure of (p−1) is q, and a particular terminal number is d ($1 \leq d < N-1$), and respective terminals i ($1 \leq i \leq N$) hold secret information Si in secret to satisfy $$S=\Sigma\lambda(i, \Lambda)\times Si \text{ (sum of } i\in\Lambda \text{ is calculated)}$$

(where $Si=S+f1\times i+ \ldots +fd\times i^d$ modq (f1, ..., fd are d elements of GF(q), fd≠0), $\lambda(i, \Lambda)=\Pi\{L/(L-i)\}$ (product of $L\in\Lambda-\{i\}$ is calculated), and $\Lambda$ is a set of any (d+1) terminals out of the N terminals), the base station holds (S, p, g, S1, ..., SN), and (1) the base station calculates preparatory information $$C1=g^k \bmod p \text{ ($k$ is a non-zero element of } GF(q)\text{)},$$

(2) the base station calculates exclusive information $$C21=g\char`\^(k\times Si1 \bmod q) \bmod p, \ldots,$$

$$C2d=g\char`\^(k\times Sid \bmod q) \bmod p$$

based on secret information Si1, ..., Sid of d particular terminals i1, ..., id, and then broadcasts them together with the preparatory information C1 and particular terminal numbers i1, ..., id to all terminals, (3) the base station calculates a common key $$K=g\char`\^(k\times S \bmod q) \bmod p$$

which is shared with all terminals j (j≠i1, ..., id) other than the particular terminals i1, ..., id, and (4) respective terminals j (j≠i1, ..., id) calculate $$\lambda(i, \Lambda), \lambda(i1, \Lambda), \ldots, \lambda(id, \Lambda)$$

where $\Lambda=\{j, i1, \ldots, id\}$, and calculate $$C1\char`\^(Sj\times\lambda(j, \Lambda) \bmod q)\times C21\char`\^(\lambda(i1, \Lambda) \bmod q)\times \ldots \times C2d\char`\^(\lambda(id, \Lambda) \bmod q) \bmod p$$

by using the preparatory information C1, the exclusive information C21, ..., C2d, and own secret information Sj to thus obtain the common key K which is common to the base station.

4. An exclusive key sharing method for a communication system which consists of a base station and N terminals (N is an integer of more than 2) connected to the base station to allow broadcast communication, wherein secret keys are S, a prime number which is larger than S and N or a power number of the prime number is p, a measure of (p−1) is q, a particular terminal number is d ($1 \leq d < N-1$), and a number D of terminals specified actually by the base station (referred to as "actual particular terminal number" hereinafter) in sharing a key is set to a number which is smaller than the particular terminal number d but more than 1, and respective terminals i ($1 \leq i \leq N$) hold secret information Si in secret to satisfy $$S=\Sigma\lambda(i, \Lambda)\times Si \text{ (sum of } i\in\Lambda \text{ is calculated)}$$

(where $Si=S+f1\times i+ \ldots +fd\times i^d$ modq (f1, ..., fd are d elements of GF(q), fd≠0), $\lambda(i, \Lambda)=\Pi\{L/(L-i)\}$ (product of $L\in\Lambda-\{i\}$ is calculated), and $\Lambda$ is a set of any (d+1) terminals out of the N terminals), and the base station holds secret information SN+1, ..., SN+d−1 which are divided by calculating $$SN+1=S+f1\times(N+1)+ \ldots +fd\times(N+1)^d \bmod q, \ldots,$$

$S_{N+d-1} = S + f1 \times (N+d-1) + \ldots + fd \times (N+d-1)^d \bmod q,$ secret information S1, ..., SN, the secret key S, the modulus p, and the element g of GF(p), and then (1) the base station calculates preparatory information $C1 = g^k \bmod p$ (k is a non-zero element of $GF(q)$), (2) the base station calculates exclusive information $C21 = g\char`^(k \times Si1 \bmod q) \bmod p, \ldots,$ $C2D = g\char`^(k \times SiD \bmod q) \bmod p,$ $C2b1 = g\char`^(k \times Sb1 \bmod q) \bmod p, \ldots,$ $C2bv = g\char`^(k \times Sbv \bmod q) \bmod p,$ based on secret information Si1, ..., SiD of D particular terminals i1, ..., iD and any v (=d−D) secret information Sb1, ..., Sbv out of the secret information SN+1, ..., SN+d−1, and then broadcasts the exclusive information C21, ..., C2D, and C2b1, ..., C2bv, the preparatory information C1, particular terminal numbers i1, ..., iD, and numbers b1, ..., bv of the secret information Sb1, ..., Sbv to all terminals, (3) the base station calculates a common key $K = g\char`^(k \times S \bmod q) \bmod p$ which is shared with all terminals j (j≠i1, ..., iD) other than the particular terminals i1, ..., iD, and (4) respective terminals j (j≠i1, ..., iD) calculate λ (j, Λ), λ(i1, Λ), ..., λ(iD, Λ), λ(ib1, Λ), ..., λ(ibv, Λ) where Λ={j, i1, ..., iD, b1, ..., bv}, and calculate a product $C1\char`^(Sj \times \lambda(j, \Lambda) \bmod q) \times C21\char`^(\lambda(i1, \Lambda) \bmod q) \times \ldots \times C2D\char`^(\lambda(iD, \Lambda) \bmod q) \times Cb1\char`^(\lambda(b1, \Lambda) \bmod q) \times \ldots \times Cbv\char`^(\lambda(bv, \Lambda) \bmod q) \bmod p$ of a power residue value $C1\char`^(Sj \times \lambda(j, \Lambda) \bmod q)$ and a power residue value $C21\char`^(\lambda(i1, \Lambda) \bmod q) \times \ldots \times C2D\char`^(\lambda(iD, \Lambda) \bmod q) \times Cb1\char`^(\lambda(b1, \Lambda) \bmod q) \times \ldots \times Cbv\char`^(\lambda(bv, \Lambda) \bmod q) \bmod p$ by using the preparatory information C1, the exclusive information C21, ..., C2D, C2b1, ..., C2bv, and own secret information Sj to thus obtain the common key K which is common to the base station.

5. An exclusive key sharing method according to claim 3, wherein the base station holds e sets of secret information which are obtained by dividing the secret key S into any e particular terminals d1, ..., de (e is an integer) respectively, the respective terminals hold e pieces of secret information out of respective sets which correspond to own terminal number, and when key sharing is carried out to exclude the particular terminals, the base station and the respective terminals j select a particular terminal number dw (1≦w≦e) which is equal to the actual particular terminal number D from the particular terminals d1, ..., de, and then the base station broadcasts the preparatory information and the exclusive information by using a set of secret information corresponding to the selected particular terminal number dw to obtain a common key K shared with the terminals, while the respective terminals j obtain the common key K shared with the base station by using the secret information corresponding to the particular terminal number dw.

6. An exclusive key sharing method according to claim 1, wherein the secret key S is set as a secret key for all terminals, and a power residue value of the g $y = g^S \bmod p$ which has S as the exponent and p as the modulus is set as a public key for all terminals, and the base station holds divided secret information S1, S2, ..., SN of all terminals in secret, and (1) the base station generates arbitrarily an integer k, and calculates preparatory information $C1 = g^k \bmod p$ (k is a non-zero element of $GF(q)$)

as a power residue value of the element g which has k as the exponent and p as the modulus (2) the base station calculates a product of the secret information Sa of the particular terminal a and the k, and then calculates exclusive information $C2 = g\char`^(k \times Sa \bmod q) \bmod p$ which has this information as the exponent, p as the modulus, and g as a base, (3) the base station calculates a common key $K = y^k \bmod p$ as a power residue value of the public key y for all terminals which has k as the exponent and p as the modulus and simultaneously generates arbitrarily common data M to the respective terminals j (j≠a), then calculates a product of M and the common key K to the modulus p (referred to as a "ciphertext" hereinafter)

$C3 = M \times K \bmod p,$ and then broadcasts this ciphertext together with the preparatory information C1 and the particular terminal number a to all terminals, (4) the respective terminals j (j≠a) calculate λ(j, Λ) and λ(a, Λ) where Λ={j,a}, then calculate a product $K = C1\char`^(Sj \times \lambda(j, \Lambda) \bmod q) \times C2\char`^(\lambda(a, \Lambda) \bmod q) \bmod p$ of a power residue value $C1\char`^(Sj \times \lambda(j, \Lambda) \bmod q) \bmod p$ which has a product of Sj and λ(j, Λ) to the modulus q as an exponent and the C1 as the base and a power residue value $C2\char`^(\lambda(a, \Lambda) \bmod q) \bmod p$ which has λ(a, Λ) to the modulus q as the exponent and the C2 as the base by using the preparatory information C1, the exclusive information C2, and own secret information Sj, and then calculate a value which is obtained by dividing the ciphertext C3 by K to the modulus p $C3/K \bmod p = M \times K/K \bmod p$ as the common data M to the base station.

7. An exclusive key sharing method according to claim 1, wherein a power residue value of the g $$y = g^S \bmod p$$

which has a secret key S for all terminals as an exponent and p as the modulus is set as a public key for all terminals, and the base station can use public information $$y1 = g^{S1} \bmod p, \; y2 = g^{S2} \bmod p, \ldots, \; yN = g^{SN} \bmod p$$

as power residue values of g which have divided secret information S1, S2, ..., SN of all terminals as the exponent respectively and p as the modulus, and (1) the base station generates arbitrarily an integer k and then calculates preparatory information $$C1 = g^k \bmod p \;\; (k \text{ is a non-zero element of } GF(q))$$

as a power residue value of g which has k as the exponent and p as the modulus (2) the base station calculates exclusive information $$C2 = ya^k \bmod p$$

as a power residue value of the public information ya of the particular terminal a which has k as the exponent and p as the modulus, (3) the base station calculates a common key $$K = y^k \bmod p = g^{\wedge}(S \times k) \bmod p$$

as a power residue value of the public key y for all terminals which has k as the exponent and p as the modulus, and simultaneously generates arbitrarily common data M to the respective terminals j (j≠a), then calculates a ciphertext $$C3 = M \times K \bmod p,$$

as a product of M and the K to the modulus p, and then broadcasts this ciphertext together with the preparatory information C1 and the particular terminal number a to all terminals, (4) the respective terminals j (j≠a) calculate λ(j, Λ) and λ(a, Λ) where Λ={j,a}, then calculate a product $$K = C1^{\wedge}(Sj \times \lambda(j, \Lambda) \bmod q) \times C2^{\wedge}(\lambda(a, \Lambda) \bmod q) \bmod p$$

of a power residue value of C1

$$C1^{\wedge}(Sj \times \lambda(j, \Lambda) \bmod q) \bmod p$$

which has a product of Sj and λ(j, Λ) to the modulus q as an exponent and a power residue value of C2

$$C2^{\wedge}(\lambda(a, \Lambda) \bmod q) \bmod p$$

which has λ(a, Λ) to the modulus q as the exponent by using the preparatory information C1, the exclusive information C2, and own secret information Sj, and then calculate a value which is obtained by dividing the ciphertext C3 by K to the modulus p $$C3/K = M \times K/K \bmod p$$

as the common data M to the base station.

8. An exclusive key sharing method according to claim 1, wherein the secret key S is set as a secret key for the base station, and a power residue value of the g $$y = g^S \bmod p$$

which has the S as an exponent and p as the modulus is set as a public key for the base station (this public key is not opened for terminals), and the respective terminals hold one of divided secret information S1, S2, ..., SN of the secret key S of the base station in secret, the base station can use public information $$y1 = g^{S1} \bmod p, \; y2 = g^{S2} \bmod p, \ldots, \; yN = g^{SN} \bmod p$$

as power residue values of g which have divided secret information S1, S2, ..., SN of all terminals as the exponent respectively and p as the modulus, and (1) the base station (1-a) generates arbitrarily an integer k, and calculates a power residue value of g $$C0 = g^{\wedge}(-k \bmod q) \bmod p$$

which has (−k) calculated to the modulus q as the exponent and the p as the modulus, (1-b) generates common data M to all terminals j (j≠a) other than the particular terminal a, and then calculates a product of the M and the C0 to the modulus p $$r = M \times C0 \bmod p,$$

(1-c) calculates a residue obtained by dividing the r by the q $$r' = r \bmod q,$$

(1-d) calculates a value s to satisfy $$k = s - r' \times S \bmod q$$

by using R', k, the secret key S of the base station, (1-e) calculates preparatory information $$C1 = g^{\wedge}(-r \bmod q) \bmod p$$

as a power residue value of g which has (−r) calculated to the modulus q as the exponent and p as the modulus, (1-f) calculates exclusive information $$C2 = ya^{\wedge}(-r \bmod q) \bmod p$$

as a power residue value of ya which has (−r) calculated to the modulus q as the exponent and p as the modulus by using a public information ya of the particular terminal a, and (1-g) broadcasts (r,s) together with C1, C2 to all terminals as a signature of M, (2) the respective terminals j (j≠a) calculate λ(j, Λ) and λ(a, Λ) where Λ={j,a}, then calculate a product $$K = C1^{\wedge}(Sj \times \lambda(j, \Lambda) \bmod q) \times C2^{\wedge}(\lambda(a, \Lambda) \bmod q) \bmod p$$

of a power residue value of C1

$$C1^{\wedge}(Sj \times \lambda(j, \Lambda) \bmod q) \bmod p$$

which has a product of Sj and λ(j, Λ) to the modulus q as an exponent and a power residue value of C2

$$C2^{\wedge}(\lambda(a, \Lambda) \bmod q) \bmod p$$

which has λ(a, Λ) to the modulus q as the exponent by using the preparatory information C1, the exclusive information C2, and own secret information Sj, and then calculate a product of a power residue value of g having s as the exponent, r, and K to the modulus p $$r \times g^s \times K \bmod p$$

to obtain the common data M.

9. An exclusive key sharing method according to claim 1, wherein a power residue value of the g $$y = g^S \bmod p$$

which has a secret key S for all terminals as an exponent and p as the modulus is set as a public key for all terminals, and the base station can use public information $$y1 = g^{S1} \bmod p, \ y2 = g^{S2} \bmod p, \ldots, \ yN = g^{SN} \bmod p$$

as power residue values of g which have divided secret information S1, S2, ..., SN of all terminals as the exponent respectively and p as the modulus, and (1) the base station generates arbitrarily an integer k and then calculates preparatory information $$C1 = g^k \bmod p \ (k \text{ is a non-zero element of } GF(q))$$

as a power residue value of the g which has k as the exponent and p as the modulus, (2) the base station calculates exclusive information $$C2 = ya^k \bmod p$$

as a power residue value of the public information ya of the particular terminal a which has k as the exponent and p as the modulus, (3) the base station calculates a power residue value of the public key y for all terminals, which has k as the exponent and p as the modulus, as a common key $$K = y^k \bmod p$$

to all terminals j (j≠a) other than the particular terminal a, (4) the respective terminals j calculate a product of a power residue value of C1, which has a product of Sj and λ(j, Λ) to the modulus q as an exponent, and a power residue value of C2, which has λ(a, Λ) calculated to the modulus q as the exponent $$C1^{\wedge}(Sj \times \lambda(j, \Lambda) \bmod q) \times C2^{\wedge}(\lambda(a, \Lambda) \bmod q) \bmod p,$$

by using the preparatory information C1, the exclusive information C2, and own secret information Sj to thus obtain the common key K to the base station.

10. An exclusive key sharing method according to claim 1, wherein the respective terminals hold secret information S1, ..., SN in secret, and a set of any t terminals (t is more than 2) out of the N terminals is assumed as Λ, and (1) the base station calculates preparatory information $$C1 = g^k \bmod p$$

which has an integer k as the exponent, p as the modulus, and g as a base, (2) the base station calculates shared information Xij which satisfy a following expression for any ij (j=1, ..., t) of t particular terminals i1, ..., it, $$Xij = \Pi(g^{\wedge}(Su \times k)) \bmod p \text{ (product of } u \in \Lambda - \{ij\} \text{ is calculated)}$$

and then broadcasts all shared information Xij and the preparatory information C1 to all terminals, (3) the base station calculates K which satisfies a following expression by using secret information Si1, ..., Sit of the particular terminals $$K = g^x \bmod p$$

$$x = k \times \Sigma Sij \bmod q \text{ (sum of } j=1 \text{ to } t \text{ is calculated)}$$

and then sets it as a common key K to the t particular terminals, and (4) the particular terminals ij calculate a product of Xij and a power residue value of C1

$$Xij \times C1^{Sij} \bmod p,$$

which has p as the modulus and own secret information Sij as the exponent, to the modulus p to thus obtain the common key K to the base station.

11. An exclusive key sharing method according to claim 1, wherein the base station executes division of the secret key S and then distributes divided the secret keys to corresponding terminals via cipher communicating means which are provided previously between the base station and the terminals.

12. An exclusive key sharing method according to claim 9, wherein a third party which is different from the base station executes division of the secret key S, calculation and publication of a power residue value and public information y1, y2, ..., yN, and allocation of corresponding Sa to the terminal a.

13. An exclusive key sharing method according to claim 1, wherein the respective terminals i (1≦i≦N) hold the secret information Si in secret, the respective terminals i can use power residue values of g which has integers f0(=S), f1, ..., fd as the exponent respectively and p as the modulus (referred to as "verification information" hereinafter) $g^{f0}$, $g^{f1}, \ldots, g^{fd}$, and the respective terminals a execute following calculation $$g^{Si} = \Pi(g^{\wedge}(fj \times a^i)) \bmod p \text{ (product of } j=0 \text{ to } d \text{ is calculated)}$$

by using the verification information and own secret information Si, and then check validity of own secret information Si by deciding whether or not both sides are equal to each other.

14. An exclusive key sharing method according to claim 1, wherein new terminal numbers I (I>N) are set to terminals which newly enter into the communication system which can execute the broadcast communication, and then secret information SI which are obtained by calculating $$SI = S + f1 \times I$$

are held in new terminal in secret.

15. An exclusive key sharing method according to claim 1, wherein the terminal i saves in secret a power residue of C1 (=C1$^{Si}$ modp) which has p in place of the secret information Si as the modulus and Si as the exponent.

16. An exclusive key sharing method according to claim 1, wherein the base station calculates $\lambda(j, \Lambda)$ for all $\Lambda$'s including the particular terminals, then calculates a power residue value of the exclusive information C2

$$C2\hat{}(\lambda(i, \Lambda) \bmod q) \bmod p$$

which has $\lambda(i, \Lambda)$ calculated to the modulus q as the exponent and p as the modulus, then broadcasts it in sharing the key, and all terminals j (j≠a) except the particular terminal a obtain the common key K by using the power residue value $$C2\hat{}(\lambda(i, \Lambda) \bmod q) \bmod p$$

in response to the $\Lambda$'s including the j.

17. An exclusive key sharing method according to claim 1, wherein all terminals j (j≠a) except the base station and the particular terminal a generate a new common key K2 based on the shared common key K and the common key K1 shared at a time of previous key sharing.

18. An exclusive key sharing method according to claim 1, wherein a digital signature of the base station is added to data which are distributed from the base station by a digital signature means provided previously to the base station and the terminals.

19. An exclusive key sharing method according to claim 2, wherein areas of the first, second, and third base station side storing portions of the base station and the first and second terminal side storing portions of the terminals are not observed and modified from an outside.

20. An exclusive key sharing method according to claims 1 or 10, wherein it can be selected automatically that the exclusive key sharing method set forth in claim 1 is applied if a scale of constituting groups exceeds half of all terminals and the exclusive key sharing method set forth in claim 10 is applied unless the scale of constituting groups exceeds half of all terminals.

21. An exclusive key sharing method according to claim 1, wherein a number of secret information held by the terminals is increased and decreased in response to authority of the terminals.

22. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal (to which any terminal can be appointed) is 1, respective terminals i ($1 \leq i \leq N$) hold secret information Si in secret to satisfy $$S = \Sigma \lambda(i, \Lambda) \times Si \text{ (sum of } i \in \Lambda \text{ is calculated)}$$

(where Si=S+f1×i modq (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of the N terminals), and the base station can use a public key for all terminals $$y = g^S \bmod p,$$

and public information $$y1 = g^{S1} \bmod p, y2 = g^{S2} \bmod p, \ldots, yN = g^{SN} \bmod p,$$

and (1) the chairman terminal generates arbitrarily a non-zero element k of GF(q) and then calculates preparatory information $$C1 = g^k \bmod p,$$

(2) the chairman terminal calculates exclusive information $$C2 = ya^k \bmod p$$

based on the public information ya of the particular terminal a, and broadcasts this exclusive information together with the particular terminal number a and the preparatory information C1 to all terminals, (3) the chairman terminal calculates a common key $$K = y^k \bmod p,$$

(4) the respective terminals j (j≠a) calculate $\lambda(j, \Lambda)$ and $\lambda(a, \Lambda)$ where $\Lambda = \{j,a\}$, and calculate $$C1\hat{}(Sj \times \lambda(j, \Lambda) \bmod q) \times C2\hat{}(\lambda(a, \Lambda) \bmod q) \bmod p$$

by using the preparatory information C1, the exclusive information C2, and own secret information Sj to thus obtain a common key K.

23. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, and elements of GF(p) are g, respective terminals i ($1 \leq i \leq N$) hold secret information Si in secret to satisfy $$S = \Sigma \lambda(i, \Lambda) \times Si \text{ (sum of } i \in \Lambda \text{ is calculated)}$$

(where Si=S+f1×i modq (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of the N terminals), and can use a public key for all terminals $$y = g^S \bmod p,$$

public keys for respective terminals $$y1 = g^{S1} \bmod p, y2 = g^{S2} \bmod p, \ldots, yN = g^{SN} \bmod p,$$

and (1) a certain terminal a generates arbitrarily a non-zero element k of GF(q) and then calculates preparatory information $$C1 = g^k \bmod p,$$

(2) the certain terminal a calculates exclusive information $$C2 = ya^k \bmod p$$

based on own public key ya, and broadcasts this exclusive information together with a terminal number a and the preparatory information C1 to all terminals, (3) the certain terminal a calculates a common key $$K=y^k \bmod p,$$

(4) the respective terminals j (j≠a) calculate λ(j, Λ) and λ(a, Λ) where Λ={j,a}, and calculate $$C1\char`\^(Sj\times\lambda(j, \Lambda) \bmod q)\times C2\char`\^(\lambda(a, \Lambda) \bmod q) \bmod p$$

by using the preparatory information C1, the exclusive information C2, and own secret information Sj to thus obtain the common key K.

24. An exclusive key sharing method according to claim 22, wherein respective terminals hold all public keys other than own public key.

25. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal φ (to which any terminal can be appointed) is d (1≦d<N−1), respective terminals i (1≦i≦N) hold secret information Si in secret to satisfy $$S=\Sigma\lambda(i, \Lambda)\times S_i \text{ (sum of } i\in\Lambda \text{ is calculated)}$$

$$\lambda(i, \Lambda)=\Pi\{L/(L-i)\} \text{ (product of } L\in\Lambda-\{i\} \text{ is calculated)}$$

$$S_i=S+f_1\times i^1+\ldots+f_d\times i^d \bmod q$$

(where $f_1, \ldots, f_d$ are d elements of GF(q), $f_d\neq 0$, and Λ is a set of any (d+1) terminals out of the N terminals), and can use a public key of the system $$y=g^S \bmod p,$$

public information $$y1=g^{S1} \bmod p, y2=g^{S2} \bmod p, \ldots, yN=g^{SN} \bmod p,$$

the prime number p, the measure q and the elements g, and (1) the chairman terminal generates arbitrarily a non-zero element k of GF(q) and then calculates exclusive information $$C2_{i1}=y_{i1}^k \bmod p, \ldots, C2_{id}=y_{id}^k \bmod p$$

based on the public information $y_{i1}, \ldots, y_{id}$ of the d terminals $i_1, \ldots, i_d$, (2) the chairman terminal calculates a signature $$Z=C2_{i1}\times\ldots\times C2_{id}\times(-S_\phi)+k \bmod q$$

by using own secret information $S_\phi$, and broadcasts the signature Z together with the exclusive information $C2_{i1}, \ldots, C2_{id}$, the particular terminal numbers $i_1, \ldots, i_d$ and own terminal number φ to all terminals, (3) the chairman terminal calculates a common key $$K=y^k \bmod p,$$

(4) the respective terminals j (j≠$i_1, \ldots, i_d$, φ) calculate $$C1=g^z\times y_\phi\char`\^(C2_{i1}\times\ldots\times C2_{id} \bmod q) \bmod p$$

(if a signer is surely the chairman terminal φ and also the signature Z, the exclusive information $C2_{i1}, \ldots, C2_{id}$, the particular terminal numbers $i_1, \ldots, i_d$, and the terminal number φ of the chairman terminal are not tampered, $C1=g^k \bmod p$ is calculated) by using the public information $y_\phi$ of the chairman terminal, (5) the respective terminals j calculate λ(j, Λ) and $\lambda(i_1, \Lambda), \ldots, \lambda(i_d, \Lambda)$ where Λ={j, $i_1, \ldots, i_d$}, and calculate $C1\char`\^(S_j\times\lambda(j, \Lambda) \bmod q)\times C2_{i1}\char`\^(\lambda(i_1, \Lambda) \bmod q)\times\ldots\times C2_{id}\char`\^(\lambda(i_d, \Lambda) \bmod q) \bmod p$ by using the C1, the exclusive information $C2_{i1}, \ldots, C2_{id}$, and own secret information $S_j$ to thus obtain the common key K.

26. An exclusive key sharing method for a communication system which consists of N terminals (N is an integer of more than 2) connected mutually to allow broadcast communication, according to claim 25, wherein secret keys are S, a prime number which is larger than S and N or a power number of the prime number is p, a measure of (p−1) is q, elements of GF(p) are g, and a particular terminal number which can be specified by a chairman terminal φ (to which any terminal can be appointed) is d (1≦d≦N−1), respective terminals i (1≦i≦N) hold secret information Si in secret to satisfy $$S=\Sigma\lambda(i, \Lambda)\times S_i \text{ (sum of } i\in\Lambda \text{ is calculated)}$$

$$\lambda(i, \Lambda)=\Pi\{L/(L-i)\} \text{ (product of } L\in\Lambda-\{i\} \text{ is calculated)}$$

$$S_i=S+f_1\times i^1+\ldots+f_d\times i^d \bmod q$$

(where $f_1, \ldots, f_d$ are d elements of GF(q), $f_d\neq 0$, and Λ is a set of any (d+1) terminals out of the N terminals), and can use a public key of the system $$y=g^S \bmod p,$$

public information $$y1=g^{S1} \bmod p, y2=g^{S2} \bmod p, \ldots, yN=g^{SN} \bmod p,$$

a Hash function hash ( ), the prime number p, the measure q, and the elements g, and (1) the chairman terminal generates arbitrarily a non-zero element k of GF(q) and then calculates exclusive information $$C2_{i1}=y_{i1}^k \bmod p, \ldots, C2_{id}=y_{id}^k \bmod p$$

based on the public information $y_{i1}, \ldots, y_{id}$ of the d terminals $i_1, \ldots, i_d$, (2) the chairman terminal calculates a hash value $$H=hash(C2_{i1}, \ldots, C2_{id})$$

which is obtained by compressing the exclusive information $C2_{i1}, \ldots, C2_{id}$ by using the Hash function hash( ), (3) the chairman terminal calculates a signature $$Z=H\times(-S_\phi)+k \bmod q$$

by using own secret information $S_\phi$, and then broadcasts the signature Z together with the exclusive information $C2_{i1}, \ldots, C2_{id}$, the particular terminal numbers $i_1, \ldots, i_d$ and own terminal number φ to all terminals, (4) the chairman terminal calculates a common key $$K = y^k \bmod p,$$

(5) the respective terminals j ($j \neq i_1, \ldots, i_d, \phi$) calculate a hash value H' which is obtained by compressing the exclusive information $C2_{i1}, \ldots, C2_{id}$ by using the Hash function hash ( ), (6) the respective terminals j calculate $$C1 = g^z \times y_\phi^{H'} \bmod p$$

(if a signer is surely the chairman terminal $\phi$ and also the signature Z, the exclusive information $C2_{i1}, \ldots, C2_{id}$, the particular terminal numbers $i_1, \ldots, i_d$, and the terminal number $\phi$ of the chairman terminal are not tampered, $C1 = g^k \bmod p$ and H'=H are calculated) by using the public information $y_\phi$ of the chairman terminal, (7) the respective terminals j calculate $\lambda(j, \Lambda)$ and $\lambda(i_1, \Lambda) \ldots \lambda(i_d, \Lambda)$ where $\Lambda = \{j, i_1, \ldots, i_d\}$, and calculate $C1^{\wedge}(S_j \times \lambda(j, \Lambda) \bmod q) \times C2_{i1}^{\wedge}(\lambda(i_1, \Lambda) \bmod q) \times \ldots \times C2_{id}^{\wedge}(\lambda(i_d, \Lambda) \bmod q) \bmod p$ by using the C1, the exclusive information $C2_{i1}, \ldots, C2_{id}$, and own secret information $S_j$ to thus obtain the common key K.

27. An exclusive key sharing method for a communication system which consists of N terminals (N is an integer of more than 2) connected mutually to allow broadcast communication, according to claims 25 or 26, wherein secret keys are S, a prime number which is larger than S and N or a power number of the prime number is p, a measure of (p−1) is q, elements of GF(p) are g, a particular terminal number which can be specified by a chairman terminal $\phi$ (to which any terminal can be appointed) is d ($1 \leq d < N-1$), and a number D of terminals which the chairman terminal actually specifies in sharing a key (referred to as an "actual particular terminal number" hereinafter) is a number which is smaller than the particular terminal number but larger than 1, respective terminals i ($1 \leq i \leq N$) hold secret information Si in secret to satisfy $$S = \Sigma \lambda(i, \Lambda) \times S_i \text{ (sum of } i \in \lambda \text{ is calculated)}$$

$$\lambda(i, \Lambda) = \Pi \{L/(L-i)\} \text{ (product of } L \in \Lambda - \{i\} \text{ is calculated)}$$

$$S_1 = S + f_1 \times i^1 + \ldots + f_d \times i^d \bmod q$$

(where $f_1, \ldots, f_d$ are d elements of GF(q), $f_d \neq 0$, and $\Lambda$ is a set of any (d+1) terminals out of the N terminals), and can use secret information $S_{N+1}, \ldots, S_{N+d-1}$ which are divided by calculating $$S_{N+1} = S + f_1 \times (N+1) + \ldots + f_d \times (N+1)^d \bmod q, \ldots,$$

$$S_{N+d-1} = S + f_1 \times (N+d-1)^1 + \ldots + f_d \times (N+d-1)^d \bmod q,$$

public information $$y_1 = g^{S1} \bmod p, \ldots, y_N = g^{SN} \bmod p, \ldots,$$

$$y_{N+1} = g^{SN+1} \bmod p, \ldots, y_{N+d-1} = g^{SN+d-1} \bmod p,$$

which are calculated by the secret information $S_1, \ldots, S_N$, a public key of the system $$y = g^S \bmod p,$$

the prime number p, the measure q, and the elements g, and (1) the chairman terminal calculates exclusive information $$C2_{i1} = y_{i1}^k \bmod p, \ldots, C2_{iD} = y_{iD}^k \bmod p,$$

$$C2_{b1} = y_{b1}^k \bmod p, \ldots, C2_{bv} = y_{bv}^k \bmod p$$

(k is a non-zero element of GF(q)) based on the public information $y_{i1}, \ldots, y_{iD}$ of the D particular terminals $i_1, \ldots, i_D$, and any $v (=d-D)$ public information $y_{b1}, \ldots, y_{bv}$ out of the public information $y_{N+1}, \ldots, y_{N+d-1}$, (2) the chairman terminal calculates a signature $$Z = C2_{i1} \times \ldots \times C2_{iD} \times C2_{b1} \times \ldots \times C2_{bv} \times (-S_\phi) + k \bmod q$$

by using own secret information $S_\phi$, and then broadcasts the signature Z together with the exclusive information $C2_{i1}, \ldots, C2_{iD}, C2_{b1}, \ldots, C2_{bv}$ the particular terminal numbers $i_1, \ldots, i_D$, the terminal numbers $b_1, \ldots, b_v$, and own terminal number $\phi$ to all terminals, (3) the chairman terminal calculates a common key $$K = y^k \bmod p$$

which is shared with all terminals j ($j \neq i_1, \ldots, i_D, b_1, \ldots, b_v, \phi$) except the particular terminals $i_1, \ldots, i_D$, (4) the respective terminals j calculate $$C1 = g^z \times y_\phi^{\wedge}(C2_{i1} \times \ldots \times C2_{iD} \times C2_{b1} \times \ldots \times C2_{bv} \bmod q) \bmod p$$

(if a signer is surely the chairman terminal $\phi$ and also the signature Z, the exclusive information $C2_{i1}, \ldots, C2_{iD}, C2_{b1}, \ldots, C2_{bv}$, the particular terminal numbers $i_1, \ldots, i_D$, the terminal numbers $b_1, \ldots, b_v$ corresponding to the public information $y_{b1}, \ldots, y_{bv}$, and the terminal number $\phi$ of the chairman terminal are not tampered, $C1 = g^k \bmod p$ is calculated) by using the public information $y_\phi$ of the chairman terminal, (5) the respective terminals j calculate $\lambda(j, \Lambda)$, $\lambda(i_1, \Lambda), \ldots, \lambda(i_D, \Lambda), \lambda(b_1, \Lambda), \ldots, \lambda(b_v, \Lambda)$ where $\Lambda = \{j, i_1, \ldots, i_d, b_1, \ldots, b_v\}$, and calculate a product $C1^{\wedge}(S_j \times \lambda(j, \Lambda) \bmod q) \times C2_{i1}^{\wedge}(\lambda(i_1, \Lambda) \bmod q) \times \ldots \times C2_{iD}^{\wedge}(\lambda(i_D, \Lambda) \bmod q) \times C2_{b1}^{\wedge}(\lambda(b_1, \Lambda) \bmod q) \times \ldots \times C2_{bv}^{\wedge}(\lambda(i_v, \Lambda) \bmod q) \bmod p$ of a power residue value $C1^{\wedge}(S_j \times \lambda(j, \Lambda) \bmod q)$ and a power residue value $C2_{i1}^{\wedge}(\lambda(i_1, \Lambda) \bmod q) \times \ldots \times C2_{iD}^{\wedge}(\lambda(i_D, \Lambda) \bmod q) \times C2_{b1}^{\wedge}(\lambda b_1, \Lambda) \bmod q) \times \ldots \times C2_{bv}^{\wedge}(\lambda(i_v, \Lambda) \bmod q)$ to the modulus p by using the C1, the exclusive information $C2_{i1}, \ldots, C2_{id}, C2_{b1}, \ldots, C2_{bv}$, and own secret information $S_j$ to thus obtain the common key K which is shared with the base station.

28. An exclusive key sharing method according to claims 25 or 26, wherein the chairman terminal can use public information formulated based on $\theta$ sets of secret information, which are derived by dividing the secret key S to the $\theta$ particular terminal numbers $d_1, \ldots, d_\theta$ ($\theta$ is any integer) respectively, and the terminal holds $\theta$ pieces of secret information, which correspond to own terminal number, out of respective sets, and when key sharing is carried out to exclude the particular terminals, the chairman terminal and the respective terminals j select a particular terminal number $d_w$ ($1 \leq w \leq \theta$), which is equal to the actual particular terminal number D, from the particular terminals $d_1, \ldots, d_\theta$, and then the chairman terminal broadcasts the signature, the exclusive information, the particular terminal number, and the own terminal number, by using a set of public information corresponding to the selected particular terminal number $d_w$ to obtain a common key K which is shared with the terminals, and the terminals j verify the signature and obtain the common key K which is shared with the chairman terminal by using the secret information corresponding to the $d_w$.

29. An exclusive key sharing method for a communication system which consists of base station and N terminals (N is an integer of more than 2) connected to the base station to allow broadcast communication, according to claims 25 or 26, wherein secret keys are S, a prime number which is larger than S and N or a power number of the prime number is p, a measure of (p−1) is q, elements of GF(p) are g, and a particular terminal number is d ($1 \leq d < N-1$), respective terminals i ($1 \leq i \leq N$) hold secret information Si in secret to satisfy $S = \Sigma \lambda(i, \Lambda) \times S_i$ (sum of $i \in \Lambda$ is calculated)

$\lambda(i, \Lambda) = \Pi\{L/(L-i)\}$ (product of $L \in \Lambda - \{i\}$ is calculated)

$S_i = S + f_1 \times i^1 + \ldots + f_d \times i^d \bmod q$ (where $f_1, \ldots, f_d$ are d elements of GF(q), $f_d \neq 0$, and $\Lambda$ is a set of any (d+1)terminals out of the N terminals), the base station $\mu$ holds all secret information $S_i$ in secret, the respective terminals i and the base station $\mu$ can use public information of the base station $y_\mu = g^{S\mu} \bmod p$, the prime number p, the measure q, and the elements g, and (1) the base station generates arbitrarily a non-zero element k of GF(q), and calculates exclusive information $C2_{i1} = y_{i1}^k \bmod p, \ldots, C2_{id} = y_{id}^k \bmod p$ based on the public information $y_{i1}, \ldots, y_{id}$ of the d particular terminals $i_1, \ldots, i_d$, (2) the base station calculates a signature $Z = C2_{i1} \times \ldots \times C2_{id} \times (-S_\mu) + k \bmod q$ by using own secret information $S_\mu$, and broadcasts the signature Z together with the exclusive information $C2_{i1}, \ldots, C2_{id}$ and the particular terminal numbers $i_1, \ldots, i_d$ to all terminals, (3) the base station calculates a common key $K = g^{\wedge}(k \times S \bmod q) \bmod p$, (4) the respective terminals j ($j \neq i_1, \ldots, i_d, \phi$) calculate $C1 = g^z \times y_\mu^{\wedge}(C2_{i1} \times \ldots \times C2_{id} \bmod q) \bmod p$ (if a signer is surely the base station $\mu$ and also the signature Z, the exclusive information $C2_{i1}, \ldots, C2_{id}$, and the particular terminal numbers $i_1, \ldots, i_d$ are not tampered, $C1 = g^k \bmod p$ is calculated) by using the public information $y_\mu$ of the base station, (5) the respective terminals j calculate $\lambda(j, \Lambda)$ and $\lambda(i_1, \Lambda), \ldots, \lambda(i_d, \Lambda)$ where $\Lambda = \{j, i_1, \ldots, i_d\}$, and calculate $C1^{\wedge}(S_j \times \lambda(j, \Lambda) \bmod q) \times C2_{i1}^{\wedge}(\lambda(i_1, \Lambda) \bmod q) \times \ldots \times C2_{id}^{\wedge}(\lambda(i_d, \Lambda) \bmod q) \bmod p$ by using the C1, the exclusive information $C2_{i1}, \ldots, C2_{id}$, and own secret information $S_j$ to thus obtain the common key K.

30. An exclusive key sharing method for a communication system which consists of N terminals (N is an integer of more than 2) connected mutually to allow broadcast communication, according to claim 25, wherein secret keys are $\alpha 1, \alpha 2, \beta 1, \beta 2, \gamma$, a prime number which is larger than $\alpha 1, \alpha 2, \beta 1, \beta 2, \gamma$ and N or a power number of the prime number is p, a measure of (p−1) is q, elements of GF(p) are g1, g2, and a particular terminal number which can be specified by a chairman terminal $\phi$ (to which any terminal can be appointed) is d ($1 \leq d < N-1$), respective terminals i ($1 \leq i \leq N$) hold secret information $\alpha 1_i, \alpha 2_i, \beta 1_i, \beta 2_i, \gamma_i$ in secret to satisfy $\alpha 1 = \Sigma \lambda(i, \Lambda) \times \alpha 1_i$ (sum of $i \in \Lambda$ is calculated)

(where $\alpha 1_i = \alpha 1 + f_1 \times i^1 + \ldots + f_d \times i^d \bmod q$)

$\alpha 2 = \Sigma \lambda(i, \Lambda) \times \alpha 2_i$ (sum of $i \in \Lambda$ is calculated)

(where $\alpha 2_i = \alpha 2 + f_1 \times i^1 + \ldots + f_d \times i^d \bmod q$)

$\beta 1 = \Sigma \lambda(i, \Lambda) \times \beta 1_i$ (sum of $i \in \Lambda$ is calculated)

(where $\beta 1_i = \beta 1 + f_1 \times i^1 + \ldots + f_d \times i^d \bmod q$)

$\beta 2 = \Sigma \lambda(i, \Lambda) \times \beta 2_i$ (sum of $i \in \Lambda$ is calculated)

(where $\beta 2_i = \beta 2 + f_1 \times i^1 + \ldots + f_d \times i^d \bmod q$)

$\gamma = \Sigma \lambda(i, \Lambda) \times \gamma_i$ (sum of $i \in \Lambda$ is calculated)

(where $\gamma_i = \gamma + f_1 \times i^1 + \ldots + f_d \times i^d \bmod q$)

$\lambda(i, \Lambda) = \Pi\{L/(L-i)\}$ (product of $L \in \Lambda - \{i\}$ is calculated)

(where $f_1, \ldots, f_d$ are d elements of GF(q), $f_d \neq 0$, and $\Lambda$ is a set of any (d+1) terminals out of the N terminals), and can use public keys of the system $A = g_1^{\alpha 1} g_2^{\alpha 2} \bmod p, B = g_1^{\beta 1} g_2^{\beta 2} \bmod p, \Gamma = g_1^{\gamma} \bmod p$, public information $A_1 = g_1^{\alpha 11} g_2^{\alpha 21} \bmod p, \ldots, A_N = g_1^{\alpha 1N} g_2^{\alpha 2N} \bmod p$, $B_1 = g_1^{\beta 11} g_2^{\beta 21} \bmod p, \ldots, B_N = g_1^{\beta 1N} g_2^{\beta 2N} \bmod p$, $\Gamma_1 = g_1^{\gamma 1} \bmod p, \ldots, \Gamma_N = g_1^{\gamma N} \bmod p$ which are calculated by the secret information $\alpha 1_i, \alpha 2_i, \beta 1_i, \beta 2_i, \gamma_i$, the prime number p, the measure q, the elements g1, g2, and a Hash function hash ( ), and (1) the chairman terminal generates arbitrarily a non-zero element k of GF(q), and calculates preparatory information $C1_1 = g_1^k \bmod p, C1_2 = g_2^k \bmod p$ (2) the chairman terminal calculates exclusive information $C2_{i1} = \Gamma_{i1}^k \bmod p, \ldots, C2_{iD} = \Gamma_{iD}^k \bmod p$, $C2_{b1} = \Gamma_{b1}^k \bmod p, \ldots, C2_{bv} = \Gamma_{bv}^k \bmod p$, based on the public information $\Gamma_{i1}, \ldots, \Gamma_{iD}$ of the D particular terminals $i_1, \ldots, i_D$, and any v(=d−D) public information $\Gamma_{b1}, \ldots, \Gamma_{bv}$ out of the public information $\Gamma_{N+1}, \ldots, \Gamma_{n+d-1}$, (3) the chairman terminal calculates verification information $$v = A^k B\hat{\ }\{(c \times k) \bmod q\} \bmod p \ (c = \text{hash}(C1_1, C1_2) \bmod q),$$

$$v_{i1} = A_{i1}{}^k B_{i1}\hat{\ }\{(c \times k) \bmod q\} \bmod p, \ldots,$$

$$v_{iD} = A_{iD}{}^k B_{iD}\hat{\ }\{(c \times k) \bmod q\} \bmod p$$

$$v_{b1} = A_{b1}{}^k B_{b1}\hat{\ }\{(c \times k) \bmod q\} \bmod p, \ldots,$$

$$v_{bv} = A_{bv}{}^k B_{bv}\hat{\ }\{(c \times k) \bmod q\} \bmod p$$

and then broadcasts the verification information v, $v_{i1}, \ldots, v_{iD}, v_{b1}, \ldots, v_{bv}$ together with the exclusive information $C2_{i1}, \ldots, C2_{iD}, C2_{b1}, \ldots, C2_{bv}$, the particular terminal numbers $i_1, \ldots, i_D$, and the terminal numbers $b_1, \ldots, b_v$ corresponding to the public information $\Gamma_{b1}, \ldots, \Gamma_{bv}$ to all terminals, (4) the chairman terminal calculates a common key $$K = \Gamma^k \bmod p$$

(5) the respective terminals j $(j \neq i_1, \ldots, i_D, b_1, \ldots, b_v, \phi)$ calculate $\lambda(j, \Lambda), \lambda(i_1, \Lambda), \ldots, \lambda(i_D, \Lambda), \lambda(b_1, \Lambda), \ldots, \lambda(b_v, \Lambda)$ where $\Lambda = \{j, i_1, \ldots, i_D, b_1, \ldots, b_v\}$, and then calculate a verification equation $$\{C1_1\hat{\ }((\alpha 1_j + \beta 1_j \times c)\lambda(j, \Lambda) \bmod q)\}\{C1_2\hat{\ }((\alpha 2_j + \beta 2_j \times c)\lambda$$
$$(j, \Lambda) \bmod q)\} \times v_{i1}\hat{\ }\{\lambda(i_1, \Lambda) \bmod q\} \times \ldots \times v_{iD}\hat{\ }\{\lambda(i_D, \Lambda) \bmod q\}$$
$$\bmod p = v(c = \text{hash}(C1_1, C1_2) \bmod q)$$

by using the public keys A, B of the system and own secret information $\alpha 1_j, \alpha 2_j, \beta 1_j, \beta 2_j$, and then stop key sharing unless the verification equation is satisfied and, if the verification equation is satisfied, (6) the respective terminals j calculate $$C1_1\hat{\ }\{\gamma_j \times (\lambda(j, \Lambda) \bmod q)\} \times C2_{i1}\hat{\ }(\lambda(i_1, \Lambda) \bmod q) \times \ldots \times C2_{id}\hat{\ }(\lambda(i_d, \Lambda) \bmod q) \bmod p$$

by using the $\lambda(j, \Lambda), (\lambda(i_1, \Lambda), \ldots, \lambda(i_d, \Lambda)$, the preparatory information $C1_1$, the exclusive information $C2_{i1}, \ldots, C2_{id}$, and the own secret information $\gamma_j$ to thus obtain the common key K.

31. An exclusive key sharing method for a communication system which consists of N terminals (N is an integer of more than 2) connected mutually to allow broadcast communication, according to claims 25 or 30, wherein secret keys are $\alpha 1, \alpha 2, \beta 1, \beta 2, \gamma$, a prime number which is larger than $\alpha 1, \alpha 2, \beta 1, \beta 2, \gamma$ and N or a power number of the prime number is p, a measure of (p–1) is q, elements of GF(p) are g1, g2, a particular terminal number which can be specified by a chairman terminal $\phi$ (to which any terminal can be appointed) is d ($1 \leq d < N-1$), and a number D of terminals which the chairman terminal actually specifies in sharing the keys (referred to as an "actual particular terminal number" hereinafter) is a number which is smaller than the particular terminal number d but larger than 1, respective terminals i ($1 \leq i \leq N$) hold secret information $\alpha 1_i, \alpha 2_i, \beta 1_i, \beta 2_i, \gamma_i$ in secret to satisfy $$\alpha 1 = \Sigma \lambda(i, \Lambda) \times \alpha 1_i \text{(sum of } i \in \Lambda \text{ is calculated)}$$

(where $\alpha 1_i = \alpha 1 + f_1 \times i^1 + \ldots + f_d \times i^d \bmod q$)

$$\alpha 2 = \Sigma \lambda(i, \Lambda) \times \alpha 2_i \text{(sum of } i \in \Lambda \text{ is calculated)}$$

(where $\alpha 2_i = \alpha 2 + f_1 \times i^1 + \ldots + f_d \times i^d \bmod q$)

$$\beta 1 = \Sigma \lambda(i, \Lambda) \times \beta 1_i \text{(sum of } i \in \Lambda \text{ is calculated)}$$

(where $\beta 1_i = \beta 1 + f_1 \times i^1 + \ldots + f_d \times i^d \bmod q$)

$$\beta 2 = \Sigma \lambda(i, \Lambda) \times \beta 2_i \text{(sum of } i \in \Lambda \text{ is calculated)}$$

(where $\beta 2_i = \beta 2 + f_1 \times i^1 + \ldots + f_d \times i^d \bmod q$)

$$\gamma = \Sigma \lambda(i, \Lambda) \times \gamma_i \text{(sum of } i \in \Lambda \text{ is calculated)}$$

(where $\gamma_i = \gamma + f_1 \times i^1 + \ldots + f_d \times i^d \bmod q$)

$$\lambda(i, \Lambda) = \Pi\{L/(L-i)\} \text{ (product of } L \in \Lambda - \{i\} \text{ is calculated)}$$

(where $f_1, \ldots, f_d$ are d elements of GF(q), $f_d \neq 0$, and $\Lambda$ is a set of any (d+1) terminals out of the N terminals), and can use public keys of the system $$A = g_1{}^{\alpha 1} g_2{}^{\alpha 2} \bmod p, \ B = g_1{}^{\beta 1} g_2{}^{\beta 2} \bmod p, \ \Gamma = g_1{}^{\gamma} \bmod p,$$

public information $$A_{N+1} = g_1{}^{\alpha 1 N+1} g_2{}^{\alpha 2 N+1} \bmod p,$$

$$A_{N+d-1} = g_1{}^{\alpha 1 N+d-1} g_2{}^{\alpha 2 N+d-1} \bmod p$$

$$B_{N+1} = g_1{}^{\beta 1 N+1} g_2{}^{\beta 2 N+1} \bmod p, \ldots,$$

$$B_{N+d-1} = g_1{}^{\beta 1 N+d-1} g_2{}^{\beta 2 N+d-1} \bmod p$$

$$\Gamma_{N+1} = g_1{}^{\gamma N+1} \bmod p, \ldots,$$

$$\Gamma_{N+d-1} = g_1{}^{\gamma N+d-1} \bmod p,$$

which are calculated by the secret information $\alpha 1_{N+1}, \ldots, \alpha 1_{N+d-1}, \alpha 2_{N+1}, \ldots, \alpha 2_{N+d-1}, \beta 1_{N+1}, \ldots, \beta 1_{N+d-1}, \beta 2_{N+1}, \ldots, \beta 2_{N+d-1}, \gamma_{N+1}, \ldots, \gamma_{N+d-1}$, which are divided by calculating $$\alpha 1_{N+1} = \alpha 1 + f_1 \times (N+1)^1 + \ldots + f_d \times (N+1)^d \bmod q, \ldots,$$

$$\alpha 1_{N+d-1} = \alpha 1 + f_1 \times (N+d-1)^1 + \ldots + f_d \times (N+d-1)^d \bmod q,$$

$$\beta 1_{N+1} = \beta 1 + f_1 \times (N+1)^1 + \ldots + f_d \times (N+1)^d \bmod q, \ldots,$$

$$\beta 1_{N+d-1} = \beta 1 + f_1 \times (N+d-1)^1 + \ldots + f_d \times (N+d-1)^d \bmod q,$$

$$\gamma_{N+1} = \gamma + f_1 \times (N+1)^1 + \ldots + f_d \times (N+1)^d \bmod q, \ldots,$$

$$\gamma_{N+d-1} = \gamma + f_1 \times (N+d-1)^1 + \ldots + f_d \times (N+d-1)^d \bmod q,$$

$$\alpha 2_{N+1} = \alpha 1 + f_1 \times (N+1)^1 + \ldots + f_d \times (N+1)^d \bmod q, \ldots,$$

$$\alpha 2_{N+d-1} = \alpha 1 + f_1 \times (N+d-1)^1 + \ldots + f_d \times (N+d-1)^d \bmod q,$$

$$\beta 2_{N+1} = \beta 1 + f_1 \times (N+1)^1 + \ldots + f_d \times (N+1)^d \bmod q, \ldots,$$

$$\beta 2_{N+d-1} = \beta 1 + f_1 \times (N+d-1)^1 + \ldots + f_d \times (N+d-1)^d \bmod q,$$

public information $$A_1 = g_1{}^{\alpha 11} g_2{}^{\alpha 21} \bmod p, \ldots, A_N = g_1{}^{\alpha 1N} g_2{}^{\alpha 2N} \bmod p$$

$$B_1 = g_1{}^{\beta 11} g_2{}^{\beta 21} \bmod p, \ldots, B_N = g_1{}^{\beta 1N} g_2{}^{\beta 2N} \bmod p$$

$$\Gamma_1 = g_1{}^{\gamma 1} \bmod p, \ldots, \Gamma_N = g_1{}^{\gamma N} \bmod p$$

which are calculated by the secret information $\alpha 1_i, \alpha 2_i, \beta 1_i, \beta 2_i, \gamma_i$, the prime number p, the measure q, the elements g1, g2, and a Hash function hash ( ), and (1) the chairman terminal generates arbitrarily a non-zero element k of GF(q), and calculates preparatory information $$C1_1 = g_1^k \bmod p, \quad C1_2 = g_2^k \bmod p$$

(2) the chairman terminal calculates exclusive information $$C2_{i1} = \Gamma_{i1}^k \bmod p, \ldots, C2_{id} = \Gamma_{id}^k \bmod p$$

based on the public information $\Gamma_{i1}, \ldots, \Gamma_{id}$ of the d particular terminals $i_1, \ldots, i_d$, (3) the chairman terminal calculates verification information $$v = A^k B^{\hat{}}\{(c \times k) \bmod q\} \bmod p \ (c = \text{hash}(C1_1, C1_2) \bmod q),$$

$$v_{i1} = A_{i1}^k B_{i1}^{\hat{}}\{(c \times k) \bmod q\} \bmod p, \ldots,$$

$$v_{id} = A_{i1}^k B_{id}^{\hat{}}\{(c \times k) \bmod q\} \bmod p$$

and then broadcasts them together with the exclusive information $C2_{i1}, \ldots, C2_{id}$ and the particular terminal numbers $i_1, \ldots, i_d$ to all terminals, (4) the chairman terminal calculates a common key $$K = \Gamma^k \bmod p$$

(5) the respective terminals j (j≠$i_1, \ldots, i_d$, ϕ) calculate $\lambda(j, \Lambda), \lambda(i_1, \Lambda), \ldots, \lambda(i_d, \Lambda)$ where $\Lambda = \{j, i_1, \ldots, i_d\}$, and calculate a verification equation $$\{C1_1^{\hat{}}((\alpha 1_j + \beta 1_j \times c)\lambda(j, \Lambda) \bmod q)\}\{C1_2^{\hat{}}((\alpha 2_j + \beta 2_j \times c)\lambda$$
$$(j, \Lambda) \bmod q)\} \times v_{i1}^{\hat{}}\{\lambda(i_1, \Lambda) \bmod q\} \times \ldots \times v_{id}^{\hat{}}\{\lambda(i_d, \Lambda) \bmod q\}$$
$$\bmod p = v(c = \text{hash}(C1_1, C1_2) \bmod q)$$

by using the public keys A, B of the system and own secret information $\alpha 1_j, \alpha 2_j, \beta 1_j, \beta 2_j$, and then stop key sharing unless the verification equation is satisfied and, if the verification equation is satisfied, (6) the respective terminals j calculate $$C1_1^{\hat{}}\{\gamma_j \times (\lambda(j, \Lambda) \bmod q)\} \times C2_{i1}^{\hat{}}(\lambda(i_1, \Lambda) \bmod q) \times \ldots \times$$
$$C2_{id}^{\hat{}}(\lambda(i_d, \Lambda) \bmod q) \times C2_{b1}^{\hat{}}\{(\lambda(b_1, \Lambda) \bmod q)\} \times \ldots \times$$
$$C2_{bv}^{\hat{}}(\lambda(b_v, \Lambda) \bmod q) \bmod p$$

by using $\lambda(j, \Lambda), (\lambda(i_1, \Lambda), \ldots, \lambda(i_D, \Lambda), \lambda(b_1, \Lambda), \ldots, \lambda(b_v, \Lambda)$, the preparatory information $C1_1$, the exclusive information $C2_{i1}, \ldots, C2_{iD}, C2_{b1}, \ldots, C2_{bv}$, and the own secret information $\gamma_j$ to thus obtain the common key K.

32. An exclusive key sharing method according to claims 25 or 26, wherein the chairman terminal can use public information formulated based on θ sets of secret information, which are derived by dividing the secret keys α1, α2, β1, β2, γ to the θ particular terminal numbers $d_1, \ldots, d_\theta$ (θ is any integer) respectively, and the terminal holds θ pieces of secret information, which correspond to own terminal number, out of respective sets, and when key sharing is carried out to exclude the particular terminals, the chairman terminal and the respective terminals j select a particular terminal number $d_w$ (1≤w≤θ), which is equal to the actual particular terminal number D, from the particular terminals $d_1, \ldots, d_\theta$, and then the chairman terminal broadcasts the verification information, the exclusive information, the particular terminal number, and the own terminal number, by using a set of public information corresponding to the selected particular terminal number $d_w$ to obtain a common key K which is shared with the terminals, and the terminals j confirm the verification equation and obtain the common key K which is shared with the chairman terminal by using the secret information corresponding to the $d_w$.

33. An exclusive key sharing method for a communication system which consists of a base station and N terminals (N is an integer of more than 2) connected to the base station to allow broadcast communication, according to claims 25 or 30, wherein secret keys are α1, α2, β1, β2, γ, a prime number which is larger than α1, α2, β1, β2, γ and N or a power number of the prime number is p, a measure of (p−1) is q, elements of GF(p) are g1, g2, and a particular terminal number is d (1≤d<N−1), respective terminals i (1≤i≤N) hold secret information $\alpha 1_i, \alpha 2_i, \beta 1_i, \beta 2_i, \gamma_i$ in secret to satisfy $$\alpha 1 = \Sigma \lambda(i, \Lambda) \times \alpha 1_i \text{(sum of } i \in \Lambda \text{ is calculated)}$$

(where $\alpha 1_i = \alpha 1 + f_1 \times i^1 + \ldots + f_d \times i^d \bmod q$)

$$\alpha 2 = \Sigma \lambda(i, \Lambda) \times \alpha 2_i \text{(sum of } i \in \Lambda \text{ is calculated)}$$

(where $\alpha 2_i = \alpha 2 + f_1 \times i^1 + \ldots + f_d \times i^d \bmod q$)

$$\beta 1 = \Sigma \lambda(i, \Lambda) \times \beta 1_i \text{(sum of } i \in \Lambda \text{ is calculated)}$$

(where $\beta 1_i = \beta 1 + f_1 \times i^1 + \ldots + f_d \times i^d \bmod q$)

$$\beta 2 = \Sigma \lambda(i, \Lambda) \times \beta 2_i \text{(sum of } i \in \Lambda \text{ is calculated)}$$

(where $\beta 2_i = \beta 2 + f_1 \times i^1 + \ldots + f_d \times i^d \bmod q$)

$$\gamma = \Sigma \lambda(i, \Lambda) \times \gamma_i \text{(sum of } i \in \Lambda \text{ is calculated)}$$

(where $\gamma_i = \gamma + f_1 \times i^1 + \ldots + f_d \times i^d \bmod q$)

$\lambda(i, \Lambda) = \Pi\{L/(L-i)\}$ (product of $L \in \Lambda - \{i\}$ is calculated)

(where $f_1, \ldots, f_d$ are d elements of GF(q), $f_d \neq 0$, and Λ is a set of any (d+1) terminals out of the N terminals), and can use public keys of the system $$A = g_1^{\alpha 1} g_2^{\alpha 2} \bmod p, \ B = g_1^{\beta 1} g_2^{\beta 2} \bmod p, \ \Gamma = g_1^{\gamma} \bmod p,$$

the prime number p, the measure q, the elements g1, g2, and a Hash function hash ( ), and the base station holds secret information $\alpha 1_1, \ldots, \alpha 1_N, \alpha 2_1, \ldots, \alpha 2_N, \beta 1_1, \ldots, \beta 1_N, \beta 2_1, \ldots, \beta 2_N, \gamma_1, \ldots, \gamma_N$, and (1) the base station generates arbitrarily a non-zero element k of GF(q), and calculates preparatory information $$C1_1 = g_1^k \bmod p, \quad C1_2 = g_2^k \bmod p$$

(2) the base station calculates exclusive information $$C2_{i1} = g_1^{\hat{}}\{\gamma_{i1} \times k \bmod q\} \bmod p, \ldots,$$

$$C2_{id} = g_1^{\hat{}}\{\gamma_{id} \times k \bmod q\} \bmod p$$

based on the secret information $\gamma_{i1}, \ldots, \gamma_{id}$ of the d particular terminals $i_1, \ldots, i_d$, (3) the base station calculates verification information $$v = A^k B \hat{} \{(c \times k) \bmod q\} \bmod p \ (c = \text{hash}(C1_1, C1_2) \bmod q),$$

$$v_{i1} = (g_1^{\alpha 1 i1} g_2^{\alpha 2 i1})^k (g_1^{\beta 1 i1} g_2^{\beta 2 i1})\hat{}\{(c \times k) \bmod q\} \bmod p, \ldots,$$

$$v_{id} = (g_1^{\alpha 1 id} g_2^{\alpha 2 id})^k (g_1^{\beta 1 id} g_2^{\beta 2 id})\hat{}\{(c \times k) \bmod q\} \bmod p, \ldots,$$

and then broadcasts them together with the exclusive information $C2_{i1}, \ldots, C2_{id}$, and the particular terminal numbers $i_1, \ldots, i_d$ to all terminals, (4) the base station calculates a common key $$K = \Gamma^k \bmod p,$$

(5) the respective terminals j ($j \neq i_1, \ldots i_d$) calculate $\lambda(j, \Lambda)$, $\lambda(i, \Lambda), \ldots, \lambda(i_d, \Lambda)$ where $\Lambda = \{j, i_1, \ldots, i_d\}$, and then calculate a verification equation $$\{C1_1\hat{}((\alpha 1_j + \beta 1_j \times c)\lambda$$
$$(j, \Lambda) \bmod q)\}\{C1_2\hat{}((\alpha 2_j + \beta 2_j \times c)\lambda(j, \Lambda) \bmod q)\} \times v_{i1}\hat{}\{\lambda(i_1, \Lambda) \bmod q\} \times \ldots \times v_{id}\hat{}\{\lambda(i_d, \Lambda) \bmod q\} \bmod p = v(c = \text{hash } (C1_1, C1_2) \bmod q)$$

by using the public keys A, B of the system and own secret information $\alpha 1_j, \alpha 2_j, \beta 1_j, \beta 2_j$, and then stop key sharing unless the verification equation is satisfied and, if the verification equation is satisfied, (6) the respective terminals j calculate $$C1_1\hat{}\{\gamma_j \times (\lambda(j, \Lambda) \bmod q)\} \times C2_{i1}\hat{}(\lambda(i_1, \Lambda) \bmod q) \times \ldots \times C2_{id}\hat{}(\lambda(i_d, \Lambda) \bmod q) \bmod p$$

by using $\lambda(j, \Lambda), (\lambda(i_1, \Lambda), \ldots, \lambda(i_d, \Lambda)$, the preparatory information $C1_1$, the exclusive information $C2_{i1}, \ldots, C2_{id}$, and the own secret information $\gamma_j$ to thus obtain the common key K.

34. An exclusive key sharing method for a communication system which consists of N terminals (N is an integer of more than 2) connected mutually to allow broadcast communication, according to claims 25 or 30, wherein secret keys are $\alpha 1, \alpha 2, \beta 1, \beta 2, \gamma$, a prime number which is larger than $\alpha 1, \alpha 2, \beta 1, \beta 2, \gamma$ and N or a power number of the prime number is p, a measure of (p−1) is q, elements of GF(p) are g1, g2, and a particular terminal number which can be specified by a chairman terminal $\phi$ (to which any terminal can be appointed) is d ($1 \leq d < N-1$), respective terminals i ($1 \leq i \leq N$) hold secret information $\alpha 1_i, \alpha 2_i, \beta 1_i, \beta 2_i, \gamma_i$ in secret, and can use public keys of the system $$A = g_1^{\alpha 1} g_2^{\alpha 2} \bmod p, \ B = g_1^{\beta 1} g_2^{\beta 2} \bmod p, \ \Gamma = g_1^{\gamma} \bmod p,$$

public information $$A_1 = g_1^{\alpha 11} g_2^{\alpha 21} \bmod p, \ldots, A_N = g_1^{\alpha 1N} g_2^{\alpha 2N} \bmod p,$$

$$B_1 = g_1^{\beta 11} g_2^{\beta 21} \bmod p, \ldots, B_N = g_1^{\beta 1N} g_2^{\beta 2N} \bmod p,$$

$$\Gamma_1 = g_1^{\gamma 1} \bmod p, \ldots, \Gamma_N = g_1^{\gamma N} \bmod p$$

which are calculated by the secret information $\alpha 1_i, \alpha 2_i, \beta 1_i, \beta 2_i, \gamma_i$, the prime number p, the measure q, the elements g1, g2, and a Hash function hash ( ), and (1) the chairman terminal generates arbitrarily a non-zero element k of GF(q), and calculates preparatory information $$C1_1 = g_1^k \bmod p,$$

$$C1_2 = g_2^k \bmod p,$$

(2) the chairman terminal calculates exclusive information $$C2_{i1} = \Gamma_{i1}^k \bmod p, \ldots, C2_{id} = \Gamma_{id}^k \bmod p$$

based on the public information $\Gamma_{i1}, \ldots, \Gamma_{id}$ of the d particular terminals $i_1, \ldots, i_d$, (3) the chairman terminal calculates a common key $$K = \Gamma^k \bmod p,$$

(4) the chairman terminal generates any group key M and formulates a ciphertext $$C = M \times K \bmod p$$

by using the common key K, (5) the chairman terminal calculates verification information $$v = A^k B \hat{} \{c \times k \bmod q\} \bmod p \ (c = \text{hash}(C1_1, C1_2) \bmod q),$$

$$v_{i1} = A_{i1}^k B_{i1}\hat{}\{c \times k \bmod q\} \bmod p, \ldots,$$

$$v_{id} = A_{i1}^k B_{id}\hat{}\{c \times k \bmod q\} \bmod p$$

and then broadcasts the ciphertext C and the verification information $v, v_{i1}, \ldots, v_{id}$ together with the exclusive information $C2_{i1}, \ldots, C2_{id}$ and the particular terminal numbers $i_1, \ldots, i_d$ to all terminals, (6) the respective terminals j ($j \neq i_1, \ldots, i_d, \phi$) calculate $\lambda(j, \Lambda), \lambda(i_1, \Lambda), \ldots, \lambda(i_d, \Lambda)$ where $\Lambda = \{j, i_1, \ldots, i_d\}$, and then calculate a verification equation $$\{C1_1\hat{}((\alpha 1_j + \beta 1_j \times c)\lambda$$
$$(j, \Lambda) \bmod q)\}\{C1_2\hat{}((\alpha 2_j + \beta 2_j \times c)\lambda(j, \Lambda) \bmod q)\} \times v_{i1}\hat{}\{\lambda(i_1, \Lambda) \bmod q\} \times \ldots \times v_{id}\hat{}\{\lambda(i_d, \Lambda) \bmod q\} \bmod p = v(c = \text{hash } (C, C1_1, C1_2) \bmod q)$$

by using the public keys A, B of the system and own secret information $\alpha 1_j, \alpha 2_j, \beta 1_j, \beta 2_j$, and then stop key sharing unless the verification equation is satisfied and, if the verification equation is satisfied, (7) the respective terminals j calculate $$C1_1\hat{}\{\gamma_j \times (\lambda(j, \Lambda) \bmod q)\} \times C2_{i1}\hat{}(\lambda(i_1, \Lambda) \bmod q) \times \ldots \times C2_{id}\hat{}(\lambda(i_d, \Lambda) \bmod q) \bmod p$$

by using $\lambda(j, \Lambda), (\lambda(i_d, \Lambda), \ldots, \lambda(i_d, \Lambda)$, the preparatory information $C1_1, C1_2$, the exclusive information $C2_{i1}, \ldots, C2_{id}$, and the own secret information $\gamma_j$ to thus obtain the common key K, (8) the respective terminals j calculate the group key $M = C/K \bmod p$ by the common key K and the ciphertext C.

35. An exclusive key sharing method according to claims 25 or 30, wherein the base station executes division of the secret key S or $\alpha 1, \alpha 2, \beta 1, \beta 2, \gamma 1, \gamma 2$, calculation and publication of the public key y or A, B, $\Gamma$, the public information $y_1, y_2, \ldots, y_N$ or $A_1, \ldots, A_N, B_1, \ldots, B_N, \Gamma_1, \ldots, \Gamma_N$, and allocation of the secret information $S_i$ or $\alpha 1_i, \alpha 2_i, \beta 1_i, \beta 2_i, \gamma 1_i, \gamma 2_i$ corresponding to the terminal i.

36. An exclusive key sharing method according to claim 9, wherein a third party which is different from the base station executes division of the secret key S or $\alpha 1, \alpha 2, \beta 1, \beta 2, \gamma 1, \gamma 2$, calculation and publication of the public key y or A, B, Γ, the public information $y_1$, $y_2$, $y_N$ or $A_1, \ldots, A_N$, $B_1, \ldots, B_N, \Gamma_1, \ldots, \Gamma_N$, and allocation of the secret information $S_i$ or $\alpha 1_i, \alpha 2_i, \beta 1_i, \beta 2_i, \gamma 1_i, \gamma 2_i$ corresponding to the terminal i.

37. An exclusive key sharing method according to claims 25 or 30, wherein new terminal numbers I (I>N) are set to terminals which newly enter into the communication system which can execute the broadcast communication, and then secret information $S_i$ or $$\alpha 1_1 = \alpha 1 + f_1 \times I^1 + \ldots + f_d \times I^d \bmod q$$

$$\alpha 2_1 = \alpha 2 + f_1 \times I^1 + \ldots + f_d \times I^d \bmod q$$

$$\beta 1_1 = \beta 1 + f_1 \times I^1 + \ldots + f_d \times I^d \bmod q$$

$$\beta 2_1 = \beta 2 + f_1 \times I^1 + \ldots + f_d \times I^d \bmod q$$

$$\gamma 1_1 = \gamma 1 + f_1 \times I^1 + \ldots + f_d \times I^d \bmod q$$

$$\gamma 2_1 = \gamma 2 + f_1 \times I^1 + \ldots + f_d \times I^d \bmod q$$

which are obtained by calculating $$S_1 = S + f_1 \times I^1 + \ldots + f_d \times I^d \bmod q$$

are held in secret in new terminals.

38. An exclusive key sharing method according to claims 25 or 30, wherein the terminal i saves in secret a power residue of $C_i$ or $C1_i$, $C1_2(=C1^{Si}$ modp or $C1_1^{\alpha 1 i}C1_2^{\alpha 2 i}$ modp, $C1_1^{\beta 1 i}C1_2^{\beta 2 i}$ modp, $C1_1^{\gamma 1 i}C1_2^{\gamma 2 i}$ modp) which has p in place of the secret information $S_i$ or $\alpha 1_i, \alpha 2_i, \beta 1_i, \beta 2_i, \gamma 1_i, \gamma 2_i$ as the modulus and $S_i$ or $\alpha 1_i, \alpha 2_i, \beta 1_i, \beta 2_i, \gamma 1_i, \gamma 2_i$ as the exponent.

39. An exclusive key sharing method according to claims 1 or 6, wherein the chairman terminal or the base station calculates $\lambda(j, \Lambda)$ for all $\Lambda$'s including the particular terminals, then calculates a power residue value of the exclusive information $C2_i$ $$C2_i{}^{\wedge}(\lambda(i, \Lambda) \bmod q) \bmod p$$

which has $\lambda(i, \Lambda)$ calculated to the modulus q as the exponent and p as the modulus, then broadcasts it in sharing the key, and all terminals j except the particular terminal obtain the common key K by using the power residue value in answer to the $\Lambda$'s including the j.

40. An exclusive key sharing method according to claims 25 or 30, wherein all terminals j except the base station and the particular terminal generate a new common key K2 based on the shared common key K and the common key K1 shared at a time of previous key sharing.

41. An exclusive key sharing method according to claim 30, wherein a digital signature of the base station is added to data which are distributed from the base station by a digital signature means provided previously to the base station and the terminals.

42. An exclusive key sharing method according to claims 25 or 30, wherein a number of secret information held by the terminals is increased and decreased in response to authority of the terminals.

43. An exclusive key sharing method according to claims 25 or 30, wherein the chairman terminal and the base station select only own terminal as the particular terminal, and broadcast information necessary for the key sharing by using an encrypted communication path using the common key K.

44. An exclusive key sharing method for a communication system which consists of N terminals (N is an integer of more than 2) connected mutually to allow broadcast communication, according to claim 25, wherein secret keys are S, a prime number which is larger than S and N or a power number of the prime number is p, a measure of (p−1) is q, elements of GF(p) are g, and a particular terminal number which can be specified by a chairman terminal φ (to which any terminal can be appointed) is d (1≦d<N−1), respective terminals i (1≦i≦N) hold secret information Si in secret to satisfy $$S = \Sigma \lambda(i, \Lambda) \times S_i \text{ (sum of } i \in \Lambda \text{ is calculated)}$$

$$\lambda(i, \Lambda) = \Pi\{L/(L-i)\} \text{ (product of } L \in \Lambda - \{i\} \text{ is calculated)}$$

$$S_i = S + f_1 \times i^1 + \ldots + f_d \times i^d \bmod q$$

(where $f_1, \ldots, f_d$ are d elements of GF(q), $f_d \neq 0$, and $\Lambda$ is a set of any (d+1) terminals out of the N terminals), and can use a public key of the system managed by a system manager $$y = g^s \bmod p,$$

public information $$y_1 = g^{S1} \bmod p, y_2 = g^{S2} \bmod p, \ldots, y_N = g^{SN} \bmod p,$$

the prime number p, the measure q, and the elements g, and (1) the chairman terminal generates arbitrarily a non-zero element k of GF(q), and calculates exclusive information $$C2_{i1} = y_{i1}{}^k \bmod p, \ldots, C2_{id} = y_{id}{}^k \bmod p$$

based on the public information $y_{i1}, \ldots, y_{id}$ of the d particular terminals $i_1, \ldots, i_d$, (2) the chairman terminal calculates a signature $$Z = C2_{i1} \times \ldots \times C2_{id} \times (-S_\phi) + k \bmod q$$

by using own secret information $S_\phi$, and broadcasts the signature Z together with the exclusive information $C2_{i1}, \ldots, C2_{id}$, the particular terminal numbers $i_1, \ldots, i_d$, and own terminal number φ to all terminals, (3) the chairman terminal calculates a common key $$K = y^k \bmod p,$$

(4) the respective terminals j (j≠$i_1, \ldots, i_d$, φ) calculate $$C1 = g^z \times y_\phi{}^{\wedge}(C2_{i1} \times \ldots \times C2_{id} \bmod q) \bmod p$$

(if a signer is surely the chairman terminal φ and also the signature Z, the exclusive information $C2_{i1}, \ldots, C2_{id}$, the particular terminal numbers $i_1, \ldots, i_d$, and the terminal number φ of the chairman terminal are not tampered, $C1 = g^k$ modp is calculated) by using the public information $y_\phi$ of the chairman terminal, (5) the respective terminals j calculate $\lambda(j, \Lambda)$ and $\lambda(i_1, \Lambda), \ldots, \lambda(i_d, \Lambda)$ where $\Lambda = \{j, i_1, \ldots, i_d\}$ and calculate $C1^{\wedge}(S_j \times \lambda(j, \Lambda) \bmod q) \times C2_{i1}{}^{\wedge}(\lambda(i_1, \Lambda) \bmod q) \times \ldots \times C2_{id}{}^{\wedge}(\lambda(i_d, \Lambda) \bmod q) \bmod p$ by using the C1, the exclusive information $C2_{i1}, \ldots, C2_{id}$, and own secret information $S_j$ to thus obtain the common key K, and (i) the system manager generates arbitrarily a non-zero element ϵ of GF(q), and broadcasts the ϵ to all terminals, (ii) the system manager calculates a new element $$g'=g\hat{\ }\{(1/\epsilon) \bmod q\} \bmod p,$$

and replaces the managed element g with it, (iii) the respective terminals i calculate new secret information $$S_i'=S_i\times\epsilon \bmod q$$

(at this time, $(g')^{Si} \bmod p = (g)^{Si} \bmod p$ is satisfied).

45. An exclusive key sharing method for a communication system which consists of N terminals (N is an integer of more than 2) connected mutually to allow broadcast communication, according to claim 30, wherein secret keys are $\alpha 1, \alpha 2, \beta 1, \beta 2, \gamma 1, \gamma 2$, a prime number which is larger than $\alpha 1, \alpha 2, \beta 1, \beta 2, \gamma 1, \gamma 2$, and N or a power number of the prime number is p, a measure of (p-1) is q, elements of GF(p) are g1, g2, and a particular terminal number which can be specified by a chairman terminal $\phi$ (to which any terminal can be appointed) is d ($1 \leq d < N-1$), respective terminals i ($1 \leq i \leq N$) hold secret information $\alpha 1_i, \alpha 2_i, \beta 1_i, \beta 2_i, \gamma 1_i, \gamma 2_i$ in secret to satisfy $$\alpha 1 = \Sigma \lambda(i, \Lambda) \times \alpha 1_i \text{ (sum of } i\in\Lambda \text{ is calculated)}$$

(where $\alpha 1_i = \alpha 1 + f_1 \times i^1 + \ldots + f_d \times i^d \bmod q$)

$$\alpha 2 = \Sigma \lambda(i, \Lambda) \times \alpha 2_i \text{ (sum of } i\in\Lambda \text{ is calculated)}$$

(where $\alpha 2_i = \alpha 2 + f_1 \times i^1 + \ldots + f_d \times i^d \bmod q$)

$$\beta 1 = \Sigma \lambda(i, \Lambda) \times \beta 1_i \text{ (sum of } i\in\Lambda \text{ is calculated)}$$

(where $\beta 1_i = \beta 1 + f_1 \times i^1 + \ldots + f_d \times i^d \bmod q$)

$$\beta 2 = \Sigma \lambda(i, \Lambda) \times \beta 2_i \text{ (sum of } i\in\Lambda \text{ is calculated)}$$

(where $\beta 2_i = \beta 2 + f_1 \times i^1 + \ldots + f_d \times i^d \bmod q$)

$$\gamma 1 = \Sigma \lambda(i, \Lambda) \times \gamma 1_i \text{ (sum of } i\in\Lambda \text{ is calculated)}$$

(where $\gamma 1_i = \gamma 1 + f_1 \times i^1 + \ldots + f_d \times i^d \bmod q$)

$$\gamma 2 = \Sigma \lambda(i, \Lambda) \times \gamma 2_i \text{ (sum of } i\in\Lambda \text{ is calculated)}$$

(where $\gamma 2_i = \gamma 2 + f_1 \times i^1 + \ldots + f_d \times i^d \bmod q$)

$$\lambda(i, \Lambda) = \Pi\{L/(L-i)\} \text{ (product of } L\in\Lambda-\{i\} \text{ is calculated)}$$

(where $f_1, \ldots, f_d$ are d elements of GF(q), $f_d \neq 0$ and $\Lambda$ is a set of any (d+1) terminals out of the N terminals), and can use public keys of the system $$A = g_1^{\alpha 1} g_2^{\alpha 2} \bmod p,$$

$$B = g_1^{\beta 1} g_2^{\beta 2} \bmod p,$$

$$\Gamma = g_1^{\gamma 1} g_2^{\gamma 2} \bmod p,$$

which are managed by a system manager, public information $$A_1 = g_1^{\alpha 11} g_2^{\alpha 21} \bmod p, \ldots, A_N = g_1^{\alpha 1N} g_2^{\alpha 2N} \bmod p$$

$$B_1 = g_1^{\beta 11} g_2^{\beta 21} \bmod p, \ldots, B_N = g_1^{\beta 1N} g_2^{\beta 2N} \bmod p$$

$$\Gamma_1 = g_1^{\gamma 11} g_2^{\gamma 21} \bmod p, \ldots, \Gamma_N = g_1^{\gamma 1N} g_2^{\gamma 2N} \bmod p$$

which are calculated by the secret information $\alpha 1_i, \alpha 2_i, \beta 1_i, \beta 2_i, \gamma 1_i, \gamma 2_i$, the prime number p, the measure q, the elements g1, g2, and a Hash function hash ( ), and (1) the chairman terminal generates arbitrarily a non-zero element k of GF(q), and calculates preparatory information $$C1_1 = g_1^k \bmod p, \ C1_2 = g_2^k \bmod p,$$

(2) the chairman terminal calculates exclusive information $$C2_{i1} = \Gamma_{i1}^k \bmod p, \ldots, C2_{id} = \Gamma_{id}^k \bmod p$$

based on the public information $\Gamma_{i1}, \ldots \Gamma_{id}$ of the d particular terminals $i_1, \ldots, i_d$, (3) the chairman terminal calculates verification information $$v = A^k B\hat{\ }\{(c\times k) \bmod q\} \bmod p \ (c = \text{hash}(C1_1, C1_2) \bmod q),$$

$$v_{i1} = A_{i1}^k B_{i1}\hat{\ }\{(c\times k) \bmod q\} \bmod p, \ldots,$$

$$v_{id} = A_{i1}^k B_{id}\hat{\ }\{(c\times k) \bmod q\} \bmod p$$

and then broadcasts them together with the exclusive information $C2_{i1}, \ldots, C2_{id}$ and the particular terminal numbers $i_1, \ldots, i_d$ to all terminals, (4) the chairman terminal calculates a common key $$K = \Gamma^k \bmod p$$

(5) the respective terminals j ($j \neq i_1, \ldots, i_d, \phi$) calculate $\lambda(j, \Lambda), \lambda(i_1, \Lambda), \ldots, \lambda(i_d, \Lambda)$ where $\Lambda = \{j, i_1, \ldots, i_d\}$, and calculate a verification equation $$\{C1_1^{\alpha 1j} C1_2^{\alpha 2j} (C1_1^{\beta 1j} C1_2^{\beta 2j})^c\}\hat{\ }\{\lambda(j, \Lambda) \bmod q\} \times$$

$$v_{i1}\hat{\ }\{\lambda(i_1, \Lambda) \bmod q\} \times \ldots \times v_{id}\hat{\ }\{\lambda(i_d, \Lambda) \bmod q\} \bmod p = v \ (c = \text{hash}(C1_1, C1_2) \bmod q)$$

by using the public keys A, B of the system and own secret information $\alpha 1_j, \alpha 2_j, \beta 1_j, \beta 2_j$, and then stop key sharing unless the verification equation is satisfied and, if the verification equation is satisfied, (6) the respective terminals j calculate $$(C1_1^{\gamma 1j} C1_2^{\gamma 2j})\hat{\ }\{(j, \Lambda) \bmod q\} \times C2_{i1}\hat{\ }\{\lambda(i_1, \Lambda) \bmod q\} \times \ldots \times C2_{id}\hat{\ }(\lambda(i_d, \Lambda) \bmod q) \bmod p$$

by using $\lambda(j, \Lambda), (\lambda(i_1, \Lambda), \ldots, \lambda(i_d, \Lambda)$ the preparatory information $C1_1, C1_2$, the exclusive information $C2_{i1}, \ldots, C2_{id}$, and the own secret information $\gamma 1_j, \gamma 2_j$, to thus obtain the common key K which is shared with the chairman terminal, and (i) the system manager generates arbitrarily a non-zero element ϵ of GF(q), and broadcasts the ϵ to all terminals, (ii) the system manager calculates new elements $$g_1' = g_1\hat{\ }\{(1/\epsilon) \bmod q\} \bmod p, \ g_2' = g_2\hat{\ }\{(1/\epsilon) \bmod q\} \bmod p$$

and replaces the managed element g with them, (iii) the respective terminals i calculate new secret information $$\alpha 1_i' = \alpha 1_i \times \epsilon \bmod q$$

$$\alpha 2_i' = \alpha 2_i \times \epsilon \bmod q$$

$\beta 1_i' = \beta 1_i \times \epsilon \bmod q$ $\beta 2_i' = \beta 2_i \times \epsilon \bmod q$ $\gamma 1_i' = \gamma 1_i \times \epsilon \bmod q$ $\gamma 2_i' = \gamma 2_i \times \epsilon \bmod q$ (at this time, $(g')^{\alpha 1 i'} \bmod p = (g)^{\alpha 1 i} \bmod p$ $(g')^{\alpha 2 i'} \bmod p = (g)^{\alpha 2 i} \bmod p$ $(g')^{\beta 1 i'} \bmod p = (g)^{\beta 1 i} \bmod p$ $(g')^{\beta 2 i'} \bmod p = (g)^{\beta 2 i} \bmod p$ $(g')^{\gamma 1 i'} \bmod p = (g)^{\gamma 1 i} \bmod p$ and $(g')^{\gamma 2 i'} \bmod p = (g)^{\gamma 2 i} \bmod p$ are satisfied).

46. An exclusive key sharing method according to claims 44 or 45, wherein the chairman terminal or the base station broadcasts an encrypted $\epsilon$ which is encrypted by using the common key K to all terminals.

47. An exclusive key sharing method according to claims 25 or 30, wherein only the chairman terminal can use the public information of respective terminals.

48. An exclusive key sharing method according to claims 25 or 30, wherein respective terminals hold all public information other than own public information.

49. An exclusive key sharing method for a communication system which consists of a base station and N terminals (N is an integer of more than 2) connected to the base station to allow broadcast communication, wherein secret keys are S, a prime number which is larger than S and N or a power number of the prime number is p, a measure of (p−1) is q, and a number of terminals which can be specified by the base station (referred to as a "particular terminal number" hereinafter) is 1, respective terminals i ($1 \leq i \leq N$) hold secret information Si in secret to satisfy $S = \Sigma \lambda(i, \Lambda) \times S_i$ (sum of $i \in \Lambda$ is calculated)

(where $S_i = S + f_1 \times i \bmod q$ (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of the N terminals), and the base station holds (S, p, g, $S_1, \ldots, S_N$), the base station calculates preparatory information $C_1 = g^k \bmod p$ where an element of GF(p) is g and a non-zero element of GF(q) is k, the base station calculates exclusive information $C_2 = g^{\wedge}(k \times S_a \bmod q) \bmod p$, based on the secret information $S_a$ of the particular terminal a, and broadcasts the exclusive information together with the particular terminal number a and the preparatory information $C_1$ to all terminals, and the base station calculates a common key $K = g^{\wedge}(k \times S \bmod q) \bmod p$ which is shared with all terminals j ($j \neq a$) except the particular terminal a, the respective terminals j ($j \neq a$) calculate a product $C_1^{\wedge}(S_j \times \lambda(j, \Lambda) \bmod q) \times C_2^{\wedge}(\lambda(a, \Lambda) \bmod q) \bmod p$ of a power residue value of $C_1$ $C_1^{\wedge}(S_j \times \lambda(j, \Lambda) \bmod q) \bmod p$ which uses a product of Si and $\lambda(j, \Lambda)$ to the modulus q as an exponent and a power residue value of $C_2$ $C_2^{\wedge}(\lambda(a, \Lambda) \bmod q) \bmod p$ which uses $\lambda(a, \Lambda)$ calculated to the modulus p as the exponent by using the preparatory information $C_1$, the exclusive information $C_2$, and own secret information $S_j$ to thus obtain the common key K which is shared with the base station, and (i) the base station generates arbitrarily a non-zero element e of GF(q), and broadcasts the e to all terminals, (ii) the base station calculates a new element $g' = g^{1/e \bmod q} \bmod p$ and replaces the managed element g with it, (iii) the respective terminals i calculate new secret information $S_i' = S_i \times e \bmod q$ (at this time, $(g')^{Si'} \bmod p = (g)^{Si} \bmod p$ is satisfied).

50. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal (to which any terminal can be appointed) is 1, respective terminals i ($1 \leq i \leq N$) hold secret information Si in secret to satisfy $S = \Sigma \lambda(i, \Lambda) \times S_i$ (sum of $i \in \Lambda$ is calculated)

(where $S_i = S + f_1 \times i \bmod q$ (f1 is a non-zero element of GF(q)), $\lambda(i, \Lambda) = \Pi\{L/(L-i)\}$ (product of $L \in \Lambda - \{i\}$ is calculated), and $\Lambda$ is a set of any two terminals out of the N terminals), and can use the prime number p, the measure q, and the elements g, which are managed by a system manager, a public key for all terminals which is managed by the system manager $y = g^S \bmod p$, and public information $y_1 = g^{S1} \bmod p, y_2 = g^{S2} \bmod p, \ldots, y_N = g^{SN} \bmod p$ which are managed by the system manager, and the chairman terminal generates arbitrarily a non-zero element k of GF(q) and calculates preparatory information $C_1 = g^k \bmod p$, the chairman terminal calculates exclusive information $C_2 = y_a^k \bmod p$, based on the public information $y_a$ of the particular terminal a, and broadcasts the exclusive information together with the particular terminal number a and the preparatory information $C_1$ to all terminals, and the chairman terminal calculates a common key $$K=y^k \bmod p,$$

and the respective terminals j (j≠a) calculate λ(j, Λ) and λ(a, Λ) where Λ={j, a} and calculate $$C_1\hat{}(S_j \times \lambda(j, \Lambda) \bmod q) \times C_2\hat{}(\lambda(a, \Lambda) \bmod q) \bmod p$$

by using the preparatory information $C_1$, the exclusive information $C_2$, and own secret information $S_j$ to thus obtain the common key K which is shared with the chairman terminal, and (i) the system manager generates arbitrarily a non-zero element e of GF(q), and broadcasts the e to all terminals, (ii) the system manager calculates a new element $$g'=g^{1/e} \bmod q \bmod p$$

and replaces the managed element g with it, and (iii) the respective terminals i calculate new secret information $$S_i'=S_i \times e \bmod q$$

(at this time, $(g')^{Si'} \bmod p = (g)^{Si} \bmod p$ is satisfied).

51. An exclusive key sharing method for a communication system which consists of a base station and N terminals (N is an integer of more than 2) connected to the base station to allow broadcast communication, wherein secret keys are S, a prime number which is larger than S and N or a power number of the prime number is p, a measure of (p−1) is q, and a number of terminals which can be specified by the base station (referred to as a "particular terminal number" hereinafter) is 1, respective terminals i ($1 \leq i \leq N$) hold secret information Si in secret to satisfy $$S = \Sigma \lambda(i, \Lambda) \times S_i \text{ (sum of } i \in \Lambda \text{ is calculated)}$$

(where $S_i=S+f_1 \times i \bmod q$ (f1 is a non-zero element of GF(q)), $\lambda(i, \Lambda)=\Pi\{L/(L-i)\}$ (product of $L \in \Lambda-\{i\}$ is calculated), and Λ is a set of any two terminals out of the N terminals), and the base station holds (S, p, g, $S_1, \ldots, S_N$), the base station calculates preparatory information $$C_1 = g^k \bmod p$$

where an element of GF(p) is g and a non-zero element of GF(q) is k, the base station calculates exclusive information $$C_2 = g\hat{}(k \times S_a \bmod q) \bmod p,$$

based on the secret information $S_a$ of the particular terminal a, and broadcasts the exclusive information together with the particular terminal number a and the preparatory information $C_1$ to all terminals, and the base station calculates a common key $$K = g\hat{}(k \times S \bmod q) \bmod p$$

which is shared with all terminals j (j≠a) except the particular terminal a, and the respective terminals j (j≠a) calculate a product $$C_1\hat{}(S_j \times \lambda(j, \Lambda) \bmod q) \times C_2\hat{}(\lambda(a, \Lambda) \bmod q) \bmod p$$

of a power residue value of $C_1$ $$C_1\hat{}(S_j \times \lambda(j, \Lambda) \bmod q) \bmod p$$

which uses a product of Si and λ(j, Λ) to the modulus q as an exponent and a power residue value of $C_2$ $$C_2\hat{}(\lambda(a, \Lambda) \bmod q) \bmod p$$

which uses λ(a, Λ) calculated to the modulus p as the exponent by using the preparatory information $C_1$, the exclusive information $C_2$, and own secret information $S_j$ to thus obtain the common key K which is shared with the base station, and (i) the base station generates arbitrarily a non-zero element e of GF(q), and broadcasts an encrypted e which is encrypted by using the common key K to all terminals, (ii) the base station calculates a new element $$g'=g^{1/e \bmod q} \bmod p$$

and replaces the element g with it, (iii) the respective terminals j decrypt the encrypted e by using the common key K, and calculate new secret information $$S_j'=S_j \times e \bmod q$$

(at this time, $(g')^{Sj'} \bmod p = (g)^{Sj} \bmod p$ is satisfied).

52. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal (to which any terminal can be appointed) is 1, respective terminals i ($1 \leq i \leq N$) hold secret information Si in secret to satisfy $$S = \Sigma \lambda(i, \Lambda) \times S_i \text{ (sum of } i \in \Lambda \text{ is calculated)}$$

(where $S_i=S+f_1 \times i \bmod q$ (f1 is a non-zero element of GF(q)), $\lambda(i, \Lambda)=\Pi\{L/(L-i)\}$ (product of $L \in \Lambda-\{i\}$ is calculated), and Λ is a set of any two terminals out of the N terminals), and can use a public key for all terminals $$y = g^S \bmod p$$

and public information $$y_1 = g^{S1} \bmod p, y_2 = g^{S2} \bmod p, \ldots, y_N = g^{SN} \bmod p,$$

the chairman terminal generates a non-zero element k of GF(q) and calculates preparatory information $C_1 = g^k \bmod p$, the chairman terminal calculates exclusive information $C_2 = y_a^k \bmod p$ based on the public information $y_a$ of the particular terminal a, and broadcasts the exclusive information together with the particular terminal number a and the preparatory information $C_1$ to all terminals, and the chairman terminal calculates a common key $K = y^k \bmod p$, the respective terminals j (j≠a) calculate λ(j, Λ) and λ(a, Λ) where Λ={j, a}, and calculate $C_1\hat{}(S_j \times \lambda(j, \Lambda) \bmod q) \times C_2\hat{}(\lambda(a, \Lambda) \bmod q) \bmod p$ by using the preparatory information $C_1$, the exclusive information $C_2$, and own secret information $S_j$ to thus obtain the common key K which is shared with the chairman terminal, and (i) the chairman terminal generates arbitrarily a non-zero element e of GF(q), and broadcasts an encrypted e which is encrypted by using the common key K to all terminals, (ii) the chairman terminal calculates a new element $g' = g^{1/e} \bmod q \bmod p$ and replaces the element g with it, (iii) the respective terminals j decrypt the encrypted e by using the common key K, and calculate new secret information $S_j' = S_j \times e \bmod q$ (at this time, $(g')^{S_j'} \bmod p = (g)^{S_j} \bmod p$ is satisfied).

53. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal b is 1, respective terminals i (1≤i≤N) hold secret information Si in secret to satisfy $S = \Sigma \lambda(i, \Lambda) \times S_i$ (sum of i∈Λ is calculated)

(where $S_i = S + f_1 \times i \bmod q$ (f1 is a non-zero element of GF(q)), $\lambda(i, \Lambda) = \Pi\{L/(L-i)\}$ (product of L∈Λ−{i} is calculated), and Λ is a set of any two terminals out of the N terminals), and the chairman terminal b can use a public key for all terminals $y = g^S \bmod p$ and public information $y_1 = g^{S1} \bmod p, y_2 = g^{S2} \bmod p, \ldots, y_N = g^{SN} \bmod p$, the chairman terminal b generates a non-zero element k of GF(q) and calculates preparatory information $C1_1 = g^k \bmod p$, the chairman terminal b calculates exclusive information $C_2 = y_a^k \bmod p$ based on the public information $y_a$ of the particular terminal a, and broadcasts the exclusive information together with the particular terminal number a and the preparatory information $C_1$ to all terminals, and the chairman terminal b calculates a common key $K = y^k \bmod p$, the respective terminals j (j≠a, b) calculate λ(j, Λ) and λ(a, Λ) where Λ={j, a}, and calculate $C_1\hat{}(S_j \times \lambda(j, \Lambda) \bmod q) \times C_2\hat{}(\lambda(a, \Lambda) \bmod q) \bmod p$ by using the preparatory information $C_1$, the exclusive information $C_2$, and own secret information $S_j$ to thus obtain the common key K.

54. An exclusive key sharing method according to claim 5, wherein all terminals except the chairman terminal b can use public information of the chairman terminal b $y_b = g^{Sb} \bmod p$, the chairman terminal b adds a digital signature to the particular terminal number a, the preparatory information $C_1$, the exclusive information $C_2$, which are delivered to all terminals, by using the secret information Sb of the chairman terminal b, and the respective terminals j verify the signature by using the public information $y_b$ of the chairman terminal.

55. An exclusive key sharing method according to claim 52 wherein the base station and the chairman terminal delivers the element e to the particular terminal number a, and the particular terminal number a calculates new secret information $S_a' = S_a \times e \bmod q$ (at this time, $(g')^{S_a'} \bmod p = (g)^{S_a} \bmod p$ is satisfied).

56. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal φ (to which any terminal can be appointed) is d (1≤d<N−1), respective terminals i (1≤i≤N) hold secret information Si in secret to satisfy $S = \Sigma \lambda(i, \Lambda) \times S_i$ (sum of i∈Λ is calculated)

(where $S_i = S + f_1 \times i + \ldots + f_d \times i^d \bmod q$ ($f_1, \ldots, f_d$ are d elements of GF(q) where $f_d \neq 0$), $\lambda(i, \Lambda) = \Pi\{L/(L-i)\}$ (product of L∈Λ−{i} is calculated), and Λ is a set of any (d+1) terminals out of the N terminals), and the respective terminals i and the chairman terminal φ can use a public key of the system $y = g^S \bmod p$ which is a power residue value of g having the secret key S as an exponent and p as a modulus, public information $$y_1 = g^{S1} \bmod p, \ y_2 = g^{S2} \bmod p, \ \ldots, \ y_N = g^{SN} \bmod p$$

which are power residue values of g having the secret information $S_1, S_2, \ldots, S_N$ allocated to terminals as exponents respectively and p as the modulus, and the p, q, and g, (1) the chairman terminal calculates preparatory information $$C1 = g^k \bmod p \ (k \text{ is a non-zero element of } GF(q)),$$

(2) the chairman terminal calculates exclusive information $$C2_{i1} = y_{i1} \hat{\ }(k \times \lambda(i_1, \alpha) \bmod q) \bmod p, \ \ldots,$$

$$C2_{id} = y_{id} \hat{\ }(k \times \lambda(i_d, \alpha) \bmod q) \bmod p$$

based on a set a of d particular terminals $i_1, \ldots, i_d, \lambda(i_1, \alpha), \ldots, \lambda(i_d, \alpha)$, and public information $y_{i1}, \ldots, y_{id}$, and broadcasts the exclusive information $C2_{i1}, \ldots, C2_{id}$ together with the preparatory information C1 and the particular terminal number $i_1, \ldots, i_d$ to all terminals, and (3) the chairman terminal calculates a common key $$K = y^k \bmod p$$

which is shared with all terminals j ($j \neq i_1, \ldots, i_d$) except the particular terminals $i_1, \ldots, i_d$, (4) the respective terminals j ($j \neq i_1, \ldots, i_d, \phi$) calculate $\lambda(j, \Lambda_j), \lambda(i_1, \{j, i_1\}), \ldots, \lambda(i_d, \{j, i_d\})$ and $$T_j = \{\Pi(j-L)\}/j \ (\text{product of } L \in \Lambda_j - \{j\} \text{ is calculated})$$

where $\Lambda_j = \{j, i_1, \ldots, i_d\}$, calculate cession keys $$K_j = C1 \hat{\ }(S_j \times \lambda(j, \Lambda_j) \times T_j \bmod q) \times$$

$$C2_{i1} \hat{\ }(\lambda(i_1, \{j, i_1\}) \times T_j \bmod q) \times \ldots \times$$

$$C2_{id} \hat{\ }(\lambda(i_d, \{j, i_d\}) \times T_j \bmod q) \bmod p$$

by using the preparatory information C1, the exclusive information $C2_{i1}, \ldots, C2_{id}$, and own secret information $S_j$, and calculates a power residue value of $K_j$ $$K_j \hat{\ }(1/T_j \bmod q) \bmod p$$

which has $1/T_j$ as an exponent and p as a modulus to thus obtain the common key K ($= g^{k \times S} \bmod p$).

57. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal $\phi$ (to which any terminal can be appointed) is d ($1 \leq d < N-1$), respective terminals i ($1 \leq i \leq N$) hold secret information Si in secret to satisfy $$S = \Sigma \lambda(i, \Lambda) \times S_i \ (\text{sum of } i \in \Lambda \text{ is calculated})$$

(where $S_i = S + f_1 \times i + \ldots + f_d \times i^d \bmod q$ ($f_1, \ldots, f_d$ are d elements of GF(q) where $f_d \neq 0$), $\lambda(i, \Lambda) = \Pi\{L/(L-i)\}$ (product of $L \in \Lambda - \{i\}$ is calculated), and $\Lambda$ is a set of any (d+1) terminals out of the N terminals), and the respective terminals i and the chairman terminal can use a public key of the system $$y = g^S \bmod p$$

which is a power residue value of g having the secret key S as an exponent and p as a modulus, public information $$y_1 = g^{S1} \bmod p, \ y_2 = g^{S2} \bmod p, \ \ldots, \ y_N = g^{SN} \bmod p$$

which are power residue values of g having the secret information $S_1, S_2, \ldots, S_N$ allocated to terminals as exponents respectively and p as the modulus, and the p, q, and g, (1) the chairman terminal calculates preparatory information $$C1 = g^k \bmod p \ (k \text{ is a non-zero element of } GF(q)),$$

(2) the chairman terminal calculates exclusive information $$C2_{i1} = y_{i1}^k \bmod p, \ \ldots, \ C2_{id} = y_{id}^k \bmod p$$

based on public information $y_{i1}, \ldots, y_{id}$ of the d particular terminals $i_1, \ldots, i_d$, and broadcasts the exclusive information $C2_{i1}, \ldots, C2_{id}$ together with the preparatory information C1 and the particular terminal number $i_1, \ldots, i_d$ to all terminals, and (3) the chairman terminal calculates a common key $$K = y^k \bmod p$$

which is shared with all terminals j ($j \neq i_1, \ldots, i_d$) except the particular terminals $i_1, \ldots, i_d$, (4) the respective terminals j ($j \neq i_1, \ldots, i_d, \phi$) calculate inverse elements $$F_{i1} = C2_{i1}^{(-1)} \bmod p, \ \ldots, \ F_{id} = C2_{id}^{(-1)} \bmod p$$

of the exclusive information $C2_{i1}, \ldots, C2_{id}$, calculate $\lambda(j, \Lambda_j), \lambda(i_1, \Lambda_j), \ldots, \lambda(i_d, \Lambda_j)$ where $\Lambda_j = \{j, i_1, \ldots, i_d\}$, calculate cession keys $$K_j = C1 \hat{\ }(S_j \times \lambda(j, \Lambda_j) \times t_j \bmod q) \times$$

$$C2_{i1} \hat{\ }(\lambda(i_1, \Lambda_j) \times t_j \bmod q) \times \ldots \times$$

$$C2_{id} \hat{\ }(\lambda(i_d, \Lambda_j) \times t_j \bmod q) \bmod p$$

by using a positive square root $t_j$ of an absolute value of a product of these denominators, the preparatory information C1, the exclusive information $C2_{i1}, \ldots, C2_{id}$, and own secret information $S_j$, replace $\lambda(i_1, \Lambda_j)$ with $|\lambda(i_1, \Lambda_j)|$ and replace $C2_{i1}$ with $F_{i1}$ if $\lambda(i_1, \Lambda_j) < 0$ while replace $\lambda(i_d, \Lambda_j)$ with $|\lambda(i_d, \Lambda_j)|$ and replace $C2_{id}$ with $F_{id}$ if $\lambda(i_d, \Lambda_j) < 0$, and calculates a power residue value of $K_j$ $$K_j \hat{\ }(1/t_j \bmod q) \bmod p$$

which has $1/t_j$ as an exponent and p as a modulus to thus obtain the common key K ($=g^{k \times S}$ modp).

58. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal φ (to which any terminal can be appointed) is d ($1 \leq d < N-1$), respective terminals i ($1 \leq i \leq N$) hold secret information Si in secret to satisfy $S = \Sigma \lambda(i, \Lambda) \times S_i$ (sum of $i \in \Lambda$ is calculated)

(where $S_i = S + f_1 \times i + \ldots + f_d \times i^d$ modq ($f_1, \ldots, f_d$ are d elements of GF(q) where $f_d \neq 0$), $\lambda(i, \Lambda) = \Pi\{L/(L-i)\}$ (product of $L \in \Lambda - \{i\}$ is calculated), and $\Lambda$ is a set of any (d+1) terminals out of the N terminals), and the respective terminals i and the chairman terminal can use a public key of the system $y = g^S$ modp which is a power residue value of g having the secret key S as an exponent and p as a modulus, public information $y_1 = g^{S1}$ modp, $y_2 = g^{S2}$ modp, $\ldots$, $y_N = g^{SN}$ modp which are power residue values of g having the secret information $S_1, S_2, \ldots, S_N$ allocated to terminals as exponents respectively and p as the modulus, and the p, q, and g, (1) the chairman terminal calculates preparatory information $C1 = g^k$ modp ($k$ is a non-zero element of $GF(q)$), (2) the chairman terminal calculates exclusive information $C2_{i1} = y_{i1}{}^\wedge(k \times \lambda(i_1, \alpha) \bmod q) \bmod p, \ldots,$ $C2_{id} = y_{id}{}^\wedge(k \times \lambda(i_d, \alpha) \bmod q) \bmod p$ based on a set α of d particular terminals $i_1, \ldots, i_d, \lambda(i_1, \alpha), \ldots, \lambda(i_d, \alpha)$, and public information $y_{i1}, \ldots y_{id}$, and broadcasts the exclusive information $C2_{i1}, \ldots, C2_{id}$ together with the preparatory information C1 and the particular terminal number $i_1, \ldots, i_d$ to all terminals, and (3) the chairman terminal calculates a common key $K = y^k$ modp which is shared with all terminals j ($j \neq i_1, \ldots, i_d$) except the particular terminals $i_1, \ldots, i_d$, (4) the respective terminals j ($j \neq i_1, \ldots, i_d, \phi$) calculate inverse elements $F_{i1} = C2_{i1}{}^{(-1)}$ modp, $\ldots$, $F_{id} = C2_{id}{}^{(-1)}$ modp of the exclusive information $C2_{i1}, \ldots, C2_{id}$, calculate $\lambda(j, \Lambda_j), \lambda(i_1, \{j, i_1\}), \ldots, \lambda(i_d, \{j, i_d\})$ and $T_j = \{\Pi(j-L)\}/j$ (product of $L \in \Lambda_j - \{j\}$ is calculated)

where $\Lambda_j = \{j, i_1, \ldots, i_d\}$, calculate cession keys $K_j = C1{}^\wedge(S_j \times \lambda(j, \Lambda_j) \times T_j \bmod q)$ $\times C2_{i1}{}^\wedge(\lambda(i_1, \{j,i_1\}) \times T_j \bmod q) \times \ldots$ $\times C2_{id}{}^\wedge(\lambda(i_d, \{j,i_d\}) \times T_j \bmod q) \bmod p$ by using the preparatory information $C_1$, the exclusive information $C2_{i1}, \ldots, C2_{id}$, and own secret information $S_j$, replace $\lambda(i_1, \{j, i_1\}) \times T_j$ with $|\lambda(i_1, \{j, i_1\}) \times T_j|$ and replace $C2_{i1}$ with $F_{i1}$ if $\lambda(i_1, \{j, i_1\}) \times T_j < 0$ while replace $\lambda(i_d, \{j, i_d\}) \times T_j$ with $|\lambda(i_d, \{j, i_d\}) \times T_j|$ and replace $C2_{id}$ with $F_{id}$ if $\lambda(i_d, \{j, i_d\}) \times T_j < 0$, and calculates a power residue value of $K_j$ $K_j{}^\wedge(1/T_j \bmod q) \bmod p$ which has $1/T_j$ as an exponent and p as a modulus to thus obtain the common key K ($=g^{k \times S}$ modp).

59. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal φ (to which any terminal can be appointed) is d ($1 \leq d < N-1$), respective terminals i ($1 \leq i \leq N$) hold secret information Si in secret to satisfy $S = \Sigma \lambda(i, \Lambda) \times S_i$ (sum of $i \in \Lambda$ is calculated)

$\lambda(i, \Lambda) = \Pi\{L/(L-i)\}$ (product of $L \in \Lambda - \{i\}$ is calculated)

$S_i = S + f_1 \times i + \ldots + f_d \times i^d$ modq (where $f_1, \ldots, f_d$ are d elements of GF(q), $f_d \neq 0$, and $\Lambda$ is a set of any (d+1) terminals out of the N terminals), and can use a public key of the system $y = g^S$ modp, public information $y_1 = g^{S1}$ modp, $y_2 = g^{S2}$ modp, $\ldots$, $y_N = g^{SN}$ modp, a Hash function hash ( ), and the prime number p, the measure q, and the element g, (1) the chairman terminal generates arbitrarily a non-zero element k of GF(q), and calculates exclusive information $C2_{i1} = y_{i1}{}^\wedge(k \times \lambda(i_1, \alpha) \bmod q) \bmod p, \ldots,$ $C2_{id} = y_{id}{}^\wedge(k \times \lambda(i_d, \alpha) \bmod q) \bmod p$ based on a set α of d particular terminals $i_1, \ldots, i_d, \lambda(i_1, \alpha), \ldots, \lambda(i_d, \alpha)$, and public information $y_{i1}, \ldots, y_{id}$, and (2) the chairman terminal calculates a hash value $H = \text{hash}(C2_{i1}, \ldots, C2_{id})$ which is obtained by compressing the exclusive information $C2_{i1}, \ldots, C2_{id}$ by using the Hash function hash ( ), (3) the chairman terminal calculates a signature $$Z = H \times (-S_\phi) + k \bmod q$$

by using own secret information $S_\phi$, and broadcasts the signature together with the exclusive information $C2_{i1}, \ldots, C2_{id}$, the particular terminal number $i_1, \ldots, i_d$, and own terminal number $\phi$ to all terminals, (4) the chairman terminal calculates a common key $$K = y^k \bmod p,$$

(5) the respective terminals j ($j \neq i_1, \ldots, i_d, \phi$) calculate a hash value H' which is obtained by compressing the exclusive information $C2_{i1}, \ldots, C2_{id}$ by using the Hash function hash ( ), (6) the respective terminals j calculate $$C1 = g^z \times y_\phi^{H'} \bmod p$$

(if a signer is surely the chairman terminal $\phi$ and also the signature Z, the exclusive information $C2_{i1}, \ldots, C2_{id}$, the particular terminal numbers $i_1, \ldots, i_d$, and the terminal number $\phi$ of the chairman terminal are not tampered, $C1 = g^k \bmod p$ and $H' = H$ are calculated) by using public information $y_\phi$ of the chairman terminal, (7) the respective terminals j calculate $\lambda(j, \Lambda_j)$, $\lambda(i_1, \{j, i_1\}), \ldots, \lambda(i_d, \{j, i_d\})$ and $$T_j = \{\Pi(j-L)\}/j \text{ (product of } L \in \Lambda_j - \{j\} \text{ is calculated)}$$

where $\Lambda_j = \{j, i_1, \ldots, i_d\}$ calculate cession keys $$K_j = C1^{\wedge}(S_j \times \lambda(j, \Lambda_j) \times T_j \bmod q) \times$$
$$C2_{i1}^{\wedge}(\lambda(i_1, \{j, i_1\}) \times T_j \bmod q) \times \ldots \times$$
$$C2_{id}^{\wedge}(\lambda(i_d, \{j, i_d\}) \times T_j \bmod q) \bmod p$$

by using the preparatory information C1, the exclusive information $C2_{i1}, \ldots, C2_{id}$, and own secret information $S_j$, and calculates a power residue value of $K_j$ $$K_j^{\wedge}(1/T_j \bmod q) \bmod p$$

which has $1/T_j$ as an exponent and p as a modulus to thus obtain the common key K ($= g^{k \times S} \bmod p$).

60. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p-1) is q, elements of GF(p) are g, and a particular terminal number which can be specified by a chairman terminal $\phi$ (to which any terminal can be appointed) is d ($1 \leq d < N-1$), respective terminals i ($1 \leq i \leq N$) hold secret information Si in secret to satisfy $$S = \Sigma \lambda(i, \Lambda) \times S_i \text{ (sum of } i \in \Lambda \text{ is calculated)}$$

$$\lambda(i, \Lambda) = \Pi \{L/(L-i)\} \text{ (product of } L \in \Lambda - \{i\} \text{ is calculated)}$$

$$S_i = S + f_1 \times i + \ldots + f_d \times i^d \bmod q$$

(where $f_1, \ldots, f_d$ are d elements of GF(q), $f_d \neq 0$, and $\Lambda$ is a set of any (d+1) terminals out of the N terminals), and can use a public key of the system $$y = g^S \bmod p,$$

public information $$y_1 = g^{S1} \bmod p, y_2 = g^{S2} \bmod p, \ldots, y_N = g^{SN} \bmod p,$$

a Hash function hash ( ), and the prime number p, the measure q, and the element g, (1) the chairman terminal generates arbitrarily a non-zero element k of GF(q), and calculates exclusive information $$C2_{i1} = y_{i1}^k \bmod p, \ldots, C2_{id} = y_{id}^k \bmod p$$

based on public information $y_{i1}, \ldots, y_{id}$ of the d particular terminals $i_1, \ldots, i_d$, and (2) the chairman terminal calculates a hash value $$H = \text{hash}(C2_{i1}, \ldots, C2_{id})$$

which is obtained by compressing the exclusive information $C2_{i1}, \ldots, C2_{id}$ by using the Hash function hash ( ), (3) the chairman terminal calculates a signature $$Z = H \times (-S_\phi) + k \bmod q$$

by using own secret information $S_\phi$, and broadcasts the signature Z together with the exclusive information $C2_{i1}, \ldots, C2_{id}$, the particular terminal number $i_1, \ldots, i_d$, and own terminal number $\phi$ to all terminals, (4) the chairman terminal calculates a common key $$K = y^k \bmod p,$$

(5) the respective terminals j ($j \neq i_1, \ldots, i_d, \phi$) calculate a hash value H' which is obtained by compressing the exclusive information $C2_{i1}, \ldots, C2_{id}$ by using the Hash function hash ( ), (6) the respective terminals j calculate $$C1 = g^z \times y_\phi^{H'} \bmod p$$

(if a signer is surely the chairman terminal $\phi$ and also the signature Z, the exclusive information $C2_{i1}, \ldots, C2_{id}$, the particular terminal numbers $i_1, \ldots, i_d$, and the terminal number $\phi$ of the chairman terminal are not tampered, $C1 = g^k \bmod p$ and $H' = H$ are calculated) by using public information $y_\phi$ of the chairman terminal, (7) the respective terminals j calculate inverse elements $$F_{i1} = C2_{i1}^{(-1)} \bmod p, \ldots, F_{id} = C2_{id}^{(-1)} \bmod p$$

of the exclusive information $C2_{i1}, \ldots, C2_{id}$, calculate $\lambda(j, \Lambda_j)$, $\lambda(i_1, \{j, i_1\}), \ldots, \lambda(i_d, \{j, i_d\})$ where $\Lambda_j = \{j, i_1, \ldots, i_d\}$, calculate cession keys $$K_j = C1^{\wedge}(S_j \times \lambda(j, \Lambda_j) \times t_j \bmod q) \times$$
$$C2_{i1}^{\wedge}(\lambda(i_1, \{j, i_1\}) \times t_j \bmod q) \times \ldots \times$$
$$C2_{id}^{\wedge}(\lambda(i_d, \{j, i_d\}) \times t_j \bmod q) \bmod p$$

by using a positive square root $t_j$ of an absolute value of a product of these denominators, the preparatory information C1, the exclusive information $C2_{i1}, \ldots,$ $C2_{id}$, and own secret information $S_j$, replace $\lambda(i_1, \Lambda_j)$ with $|\lambda(i_1, \Lambda_j)|$ and replace $C2_{i1}$ with $F_{i1}$ if $\lambda(i_1, \Lambda_j)<0$ while replace $\lambda(i_d, \Lambda_j)$ with $|\lambda(i_d, \Lambda_j)|$ and replace $C2_{id}$ with $F_{id}$ if $\lambda(i_d, \Lambda_j)<0$, and calculates a power residue value of $K_j$ $$K_j\char`\^(1/t_j\, \mathrm{mod}q)\, \mathrm{mod}p$$

which has $1/t_j$ as an exponent and p as a modulus to thus obtain the common key K ($=^{k\times S}$ modp).

61. An exclusive key sharing method for a communication system which consists of N terminals (N is an integer of more than 2) connected mutually to allow broadcast communication, wherein secret keys are S, a prime number which is larger than S and N or a power number of the prime number is p, a measure of (p−1) is q, elements of GF(p) are g, and a particular terminal number which can be specified by a chairman terminal $\phi$ (to which any terminal can be appointed) is d ($1 \leq d < N-1$), respective terminals i ($1 \leq i \leq N$) hold secret information Si in secret to satisfy $$S = \Sigma \lambda(i, \Lambda) \times S_i \text{ (sum of } i \in \Lambda \text{ is calculated)}$$

$$\lambda(i, \Lambda) = \Pi\{L/(L-i)\} \text{ (product of } L \in \Lambda - \{i\} \text{ is calculated)}$$

$$S_i = S + f_1 \times i + \ldots + f_d \times i^d \bmod q$$

(where $f_1, \ldots, f_d$ are d elements of GF(q), $f_d \neq 0$, and $\Lambda$ is a set of any (d+1) terminals out of the N terminals), and can use a public key of the system $$y = g^S \bmod p,$$

public information $$y_1 = g^{S1} \bmod p, y_2 = g^{S2} \bmod p, \ldots, y_N = g^{SN} \bmod p,$$

a Hash function hash ( ), and the prime number p, the measure q, and the element g, (1) the chairman terminal generates arbitrarily a non-zero element k of GF(q), and calculates exclusive information $$C2_{i1} = y_{i1}\char`\^(k \times \lambda(i_1, \alpha) \bmod q) \bmod p, \ldots,$$

$$C2_{id} = y_{id}\char`\^(k \times \lambda(i_d, \alpha) \bmod q) \bmod p$$

based on a set $\alpha$ of d particular terminals $i_1, \ldots, i_d$, $\lambda(i_1, \alpha), \ldots, \lambda(i_d, \alpha)$, and public information $y_{i1}, \ldots, y_{id}$, and (2) the chairman terminal calculates a hash value $$H = \mathrm{hash}(C2_{i1}, \ldots, C2_{id})$$

which is obtained by compressing the exclusive information $C2_{i1}, \ldots, C2_{id}$ by using the Hash function hash ( ), (3) the chairman terminal calculates a signature $$Z = H \times (-S_\phi) + k \bmod q$$

by using own secret information $S_\phi$, and broadcasts the signature Z together with the exclusive information $C2_{i1}, \ldots, C2_{id}$, the particular terminal number $i_1, \ldots, i_d$, and own terminal number $\phi$ to all terminals, (4) the chairman terminal calculates a common key $$K = y^k \bmod p,$$

(5) the respective terminals j ($j \neq i_1, \ldots, i_d, \phi$) calculate a hash value H' which is obtained by compressing the exclusive information $C2_{i1}, \ldots, C2_{id}$ by using the Hash function hash ( ), (6) the respective terminals j calculate $$C1 = g^Z \times y_\phi{}^{H'} \bmod p$$

(if a signer is surely the chairman terminal $\phi$ and also the signature Z, the exclusive information $C2_{i1}, \ldots, C2_{id}$, the particular terminal numbers $i_1, \ldots, i_d$, and the terminal number $\phi$ of the chairman terminal are not tampered, $C1 = g^k$ modp and H'=H are calculated) by using public information $y_\phi$ of the chairman terminal, (7) the respective terminals j calculate inverse elements $$F_{i1} = C2_{i1}{}^{(-1)} \bmod p, \ldots, F_{id} = C2_{id}{}^{(-1)} \bmod p$$

of the exclusive information $C2_{i1}, \ldots, C2_{id}$, calculate $\lambda(j, \Lambda_j), \lambda(i_1, \{j, i_1\}), \ldots, \lambda(i_d, \{j, i_d\})$ and $$T_j = \{\Pi(j-L)\}/j \text{ (product of } L \in \Lambda_j - \{j\} \text{ is calculated)}$$

where $\Lambda_j = \{j, i_1, \ldots, i_d\}$, calculate cession keys $$K_j = C1\char`\^(S_j \times \lambda(j, \Lambda_j) \times T_j \bmod q) \times$$

$$C2_{i1}\char`\^(\lambda(i_1, \{j, i_1\}) \times T_j \bmod q) \times \ldots \times$$

$$C2_{id}\char`\^(\lambda(i_d, \{j, i_d\}) \times T_j \bmod q) \bmod p$$

by using the preparatory information C1, the exclusive information $C2_{i1}, \ldots, C2_{id}$, and own secret information $S_j$, replace $\lambda(i_1, \{j, i_1\}) \times T_j$ with $|\lambda(i_1, \{j, i_1\}) \times T_j|$ and replace $C2_{i1}$ with $F_{i1}$ if $\lambda(i_1, \{j, i_1\}) \times T_j < 0$ while replace $\lambda(i_d, \{j, i_d\}) \times T_j$ with $|\lambda(i_d, \{j, i_d\}) \times T_j|$ and replace $C2_{id}$ with $F_{id}$ if $\lambda(i_d, \{j, i_d\}) \times T_j < 0$, and calculates a power residue value of $K_j$ $$K_j\char`\^(1/T_j\, \mathrm{mod}q)\, \mathrm{mod}p$$

which has $1/T_j$ as an exponent and p as a modulus to thus obtain the common key K ($=g^{k \times S}$ modp).

62. An exclusive key sharing method for a communication system which consists of N terminals (N is an integer of more than 2) connected mutually to allow broadcast communication, wherein secret keys are $\alpha 1, \alpha 2, \beta 1, \beta 2, \gamma$, a prime number which is larger than $\alpha 1, \alpha 2, \beta 1, \beta 2, \gamma$ and N or a power number of the prime number is p, a measure of (p−1) is q, elements of GF(p) are g1, g2, and a particular terminal number which can be specified by a chairman terminal $\phi$ (to which any terminal can be appointed) is d ($1 \leq d < N-1$), respective terminals i ($1 \leq i \leq N$) hold secret information $\alpha 1_i, \alpha 2_i, \beta 1_i, \beta 2_i, \gamma_i$ in secret to satisfy $$\alpha 1 = \Sigma \lambda(i, \Lambda) \times \alpha 1_i \text{ (sum of } i \in \Lambda \text{ is calculated)}$$

(where $\alpha 1_i = \alpha 1 + f_1 \times i^1 + \ldots + f_d \times i^d \bmod q$)

$$\alpha 2 = \Sigma \lambda(i, \Lambda) \times \alpha 2_i \text{ (sum of } i \in \Lambda \text{ is calculated)}$$

(where $\alpha 2_i = \alpha 2 + f_1 \times i^1 + \ldots + f_d \times i^d \bmod q$)

$\beta1 = \Sigma\lambda(i, \Lambda) \times \beta1_i$ (sum of $i \in \Lambda$ is calculated)

(where $\beta1_i = \beta1 + f_1 \times i^1 + \ldots + f_d \times i^d$ modq)

$\beta2 = \Sigma\lambda(i, \Lambda) \times \beta2_i$ (sum of $i \in \Lambda$ is calculated)

(where $\beta2_i = \beta2 + f_1 \times i^1 + \ldots + f_d \times i^d$ modq)

$\gamma = \Sigma\lambda(i, \Lambda) \times \gamma_i$ (sum of $i \in \Lambda$ is calculated)

(where $\gamma_i = \gamma + f_1 \times i^1 + \ldots + f_d \times i^d$ modq)

$\lambda(i, \Lambda) = \Pi\{L/(L-i)\}$ (product of $L \in \Lambda - \{i\}$ is calculated)

(where $f_1, \ldots, f_d$ are d elements of GF(q), $f_d \neq 0$, and $\Lambda$ is a set of any (d+1) terminals out of the N terminals), and can use public keys of the system $A = g_1^{\alpha1} g_2^{\alpha2}$ modp, $B = g_1^{\beta1} g_2^{\beta2}$ modp, $\Gamma = g_1^{\gamma}$ modp, public information $A_1 = g_1^{\alpha11} g_2^{\alpha21}$ modp, $\ldots$, $A_N = g_1^{\alpha1N} g_2^{\alpha2N}$ modp $B_1 = g_1^{\beta11} g_2^{\beta21}$ modp, $\ldots$, $B_N = g_1^{\beta1N} g_2^{\beta2N}$ modp $\Gamma_1 = g_1^{\gamma1}$ modp, $\ldots$, $\Gamma_N = g_1^{\gamma N}$ modp which are calculated by the secret information $\alpha1_i$, $\alpha2_i$, $\beta1_i$, $\beta2_i$, $\gamma_i$ the prime number p, the measure q, the elements g1, g2, and a Hash function hash ( ), and (1) the chairman terminal generates arbitrarily a non-zero element k of GF(q), and calculates preparatory information $C1_1 = g_1^k$ modp, $C1_2 = g_2^k$ modp, (2) the chairman terminal calculates exclusive information $C2_{i1} = \Gamma_{i1}^{\hat{}}(k \times \lambda(i_1, \alpha)$ modq) modp, $\ldots$, $C2_{id} = \Gamma_{id}^{\hat{}}(k \times \lambda(i_d, \alpha)$ modq) modp based on a set a of d particular terminals $i_1, \ldots, i_d, \lambda(i_1, \alpha), \ldots, \lambda(i_d, \alpha)$, and the public information $\Gamma_{i1}, \ldots, \Gamma_{iD}$, (3) the chairman terminal calculates verification information $v = A^k B^{\hat{}}\{(c \times k) \text{ modq}\}$ modp ($c$ =hash($C1_1$, $C1_2$) modq), $v_{i1} = [A_{i1}^k B_{i1}^{\hat{}}\{(c \times k) \text{ modq}\}]^{\hat{}}\{\lambda(i_1, \alpha) \text{ modq}\}$ modp, $\ldots$, $v_{iD} = [A_{id}^k B_{id}^{\hat{}}\{(c \times k) \text{ modq}\}]^{\hat{}}\{\lambda(i_d, \alpha) \text{ modq}\}$ modp and broadcasts the verification information together with the exclusive information $C2_{i1}, \ldots, C2_{id}$, the particular terminal numbers $i_1, \ldots, i_d$, to all terminals, (4) the chairman terminal calculates a common key $K = \Gamma^k$ modp (5) the respective terminals j ($j \neq i_1, \ldots, i_d, \phi$) calculate $\lambda(j, \Lambda_j), \lambda(i_1, \{j, i_1\}), \ldots, \lambda(i_d, \{j, i_d\})$ and $T_j = \{\Pi(j-L)\}/j$ (product of $L \in \Lambda_j - \{j\}$ is calculated)

where $\Lambda = \{j, i_1, \ldots, i_d\}$, and then calculate a verification equation $\{C1_1^{\hat{}}((\alpha1_j + \beta1_j \times c) \times \lambda(j, \Lambda_j) T_j \text{ mod} q)\}$ $\times \{C1_2^{\hat{}}((\alpha2_j + \beta2_j \times c) \times \lambda(j, \Lambda_j) T_j \text{ mod} q)\}$ $\times v_{i1}^{\hat{}}\{\lambda(i_1, \{j, i_1\}) \times T_j \text{ mod} q\} \times \ldots$ $\times v_{id}^{\hat{}}\{\lambda(i_d, \{j, i_d\}) \times T_j \text{ mod} q\}$ modp $= v^{\hat{}}\{T_j \text{ mod} q\}$ modp ($c$ =hash ($C1_1$, $C1_2$) modq)

by using the public keys A, B of the system and own secret information $\alpha1_j$, $\alpha2_j$, $\beta1_j$, $\beta2_j$, and then stop key sharing unless the verification equation is satisfied and, if the verification equation is satisfied, (6) the respective terminals j calculate cession keys $K_j = C1^{\hat{}}\{\gamma_j \times \lambda(j, \Lambda_j) \times T_j \text{ mod} q\} \times C2_{i1}^{\hat{}}\{\lambda(i_1, \{j, i_1 56\}) \times T_j \text{ mod} q\} \times \ldots \times C2_{id}^{\hat{}}\{\lambda(i_d, \{j, i_d 56\}) \times T_j \text{ mod} q\}$ modp by using the $T_j$, $\lambda(j, \Lambda_j), \lambda(i_1, \{j, i_1\}), \ldots, \lambda(i_d, \{j, i_d\})$, the preparatory information C1, the exclusive information $C2_{i1}, \ldots, C2_{id}$, and own secret information $\gamma_j$, and calculates a power residue value of $K_j$ $K_j^{\hat{}}(1/T_j \text{ mod} q)$ modp which has $1/T_j$ as an exponent and p as a modulus to thus obtain the common key K ($=(g_1^{\gamma})^k$ modp).

63. An exclusive key sharing method for a communication system which consists of N terminals (N is an integer of more than 2) connected mutually to allow broadcast communication, wherein secret keys are $\alpha1, \alpha2, \beta1, \beta2, \gamma$, a prime number which is larger than $\alpha1, \alpha2, \beta1, \beta2, \gamma$ and N or a power number of the prime number is p, a measure of (p–1) is q, elements of GF(p) are g1, g2, and a particular terminal number which can be specified by a chairman terminal $\phi$ (to which any terminal can be appointed) is d ($1 \leq d < N-1$), respective terminals i ($1 \leq i \leq N$) hold secret information $\alpha1_i$, $\alpha2_i$, $\beta1_i$, $\beta2_i$, $\gamma_i$ in secret to satisfy $\alpha1 = \Sigma\lambda(i, \Lambda) \times \alpha1_i$ (sum of $i \in \Lambda$ is calculated)

(where $\alpha1_i = \alpha1 + f_1 \times i^1 + \ldots + f_d \times i^d$ modq)

$\alpha2 = \Sigma\lambda(i, \Lambda) \times \alpha2_i$ (sum of $i \in \Lambda$ is calculated)

(where $\alpha2_i = \alpha2 + f_1 \times i^1 + \ldots + f_d \times i^d$ modq)

$\beta1 = \Sigma\lambda(i, \Lambda) \times \beta1_i$ (sum of $i \in \Lambda$ is calculated)

(where $\beta1_i = \beta1 + f_1 \times i^1 + \ldots + f_d \times i^d$ modq)

$\beta2 = \Sigma\lambda(i, \Lambda) \times \beta2_i$ (sum of $i \in \Lambda$ is calculated)

(where $\beta2_i = \beta2 + f_1 \times i^1 + \ldots + f_d \times i^d$ modq)

$\gamma = \Sigma\lambda(i, \Lambda) \times \gamma_i$ (sum of $i \in \Lambda$ is calculated)

(where $\gamma_i = \gamma + f_1 \times i^1 + \ldots + f_d \times i^d$ modq)

$\lambda(i, \Lambda) = \Pi\{L/(L-i)\}$ (product of $L \in \Lambda - \{i\}$ is calculated)

(where $f_1, \ldots, f_d$ are d elements of GF(q), $f_d \neq 0$, and $\Lambda$ is a set of any (d+1) terminals out of the N terminals), and can use public keys of the system $A = g_1^{\alpha1} g_2^{\alpha2}$ modp, $B = g_1^{\beta1} g_2^{\beta2}$ modp, $\Gamma = g_1^{\gamma}$ modp, public information $$A_1 = g_1^{\alpha 11} g_2^{\alpha 21} \bmod p, \ldots, A_N = g_1^{\alpha 1N} g_2^{\alpha 2N} \bmod p$$

$$B_1 = g_1^{\beta 11} g_2^{\beta 21} \bmod p, \ldots, B_N = g_1^{\beta 1N} g_2^{\beta 2N} \bmod p$$

$$\Gamma_1 = g_1^{\gamma 1} \bmod p, \ldots, \Gamma_N = g_1^{\gamma N} \bmod p$$

which are calculated by the secret information $\alpha 1_i$, $\alpha 2_i$, $\beta 1_i$, $\beta 2_i$, $\gamma_i$, the prime number p, the measure q, the elements g1, g2, and a Hash function hash ( ), and (1) the chairman terminal generates arbitrarily a non-zero element k of GF(q), and calculates preparatory information $$C1_1 = g_1^k \bmod p, \quad C1_2 = g_2^k \bmod p,$$

(2) the chairman terminal calculates exclusive information $$C2_{i1} = \Gamma_{i1}^k \bmod p, \ldots, C2_{id} = \Gamma_{id}^k \bmod p$$

based on the public information $\Gamma_{i1}, \ldots, \Gamma_{id}$ of the d particular terminals $i_1, \ldots, i_d$, (3) the chairman terminal calculates verification information $$v = A^k B^{\hat{}}(c \times k) \bmod q\} \bmod p \ (c = \text{hash}(C1_1, C1_2) \bmod q),$$

$$v_{i1} = A_{i1}^k B_{i1}^{\hat{}}\{(c \times k) \bmod q\} \bmod p, \ldots,$$

$$v_{id} = A_{id}^k B_{id}^{\hat{}}\{(c \times k) \bmod q\} \bmod p$$

and broadcasts the verification information together with the exclusive information $C2_{i1}, \ldots, C2_{id}$, the particular terminal numbers $i_1, \ldots, i_d$ to all terminals, (4) the chairman terminal calculates a common key $$K = \Gamma^k \bmod p,$$

(5) the respective terminals j ($j \neq i_1, \ldots, i_d, \phi$) calculate inverse elements $$E_{i1} = V_{i1}^{(-1)} \bmod p, \ldots, E_{id} = V_{id}^{(-1)} \bmod p$$

of the verification information $v_{i1}, \ldots, v_{id}$, calculate $\lambda(j, \Lambda_j)$, $\lambda(i_1, \{j, i_1\}), \ldots, \lambda(i_d, \{j, i_d\})$ where $\Lambda = \{j, i_1, \ldots, i_d\}$, calculate a verification equation $$\{C1_1^{\hat{}}((\alpha 1_j + \beta 1_j \times c) \times \lambda(j, \Lambda_j) \times t_j \bmod q)\}$$

$$\times C1_2^{\hat{}}((\alpha 2_j + \beta 2_j \times c) \times \lambda(j, \Lambda_j) \times t_j \bmod q)\}$$

$$\times v_{i1}^{\hat{}}\{\lambda(i_1, \Lambda_j) \times t_j \bmod q\} \times \ldots$$

$$\times v_{id}^{\hat{}}\{\lambda(i_d, \Lambda_j) \times t_j \bmod q\} \bmod p = v^{\hat{}}\{t_j \bmod q\} \bmod p \ (c = \text{hash} \ (C1_1, C1_2) \bmod q)$$

by using a positive square root $t_j$ of an absolute value of a product of these denominators, the public keys A, B of the system, and own secret information $\alpha 1_j$, $\alpha 2_j$, $\beta 1_j$, $\beta 2_j$, replace $\lambda(i_1, \Lambda_j)$ with $|\lambda(i_1, \Lambda_j)|$ and replace $V_{i1}$ with $E_{i1}$ if $\lambda(i_1, \Lambda_j) < 0$ while replace $\lambda(i_d, \Lambda_j)$ with $|\lambda(i_d, \Lambda_j)|$ and replace $V_{id}$ with $E_{id}$ if $\lambda(i_d, \Lambda_j) < 0$, and then stop key sharing unless the verification equation is satisfied and, if the verification equation is satisfied, (6) the respective terminals j calculate inverse elements $$F_{i1} = C2_{i1}^{(-1)} \bmod p, \ldots, F_{id} = C2_{id}^{(-1)} \bmod p$$

of the exclusive information $C2_{i1}, \ldots, C2_{id}$, calculates cession keys $$K_j = C1^{\hat{}}\{\gamma_j \times \lambda(j, \Lambda_j) \times t_j \bmod q\} \times C2_{i1}^{\hat{}}\{\lambda(i_1, \Lambda_j) \times t_j \bmod q\} \times \ldots \times C2_{id}^{\hat{}}\{\lambda(i_d, \{j, \Lambda_j\}) \times t_j \bmod q\} \bmod p$$

by using the $t_j$, $\lambda(j, \Lambda_j)$, $\lambda(i_1, \Lambda_j), \ldots, \lambda(i_d, \Lambda_j)$, the preparatory information C1, the exclusive information $C2_{i1}, \ldots, C2_{id}$, and own secret information $\gamma_j$, replace $\lambda(i_1, \Lambda_j)$ with $|\lambda(i_1, \Lambda_j)|$ and replace $C2_{i1}$ with $F_{i1}$ if $\lambda(i_1, \Lambda_j) < 0$ while replace $\lambda(i_d, \Lambda_j)$ with $|\lambda(i_d, \Lambda_j)|$ and replace $C2_{id}$ with $F_{id}$ if $\lambda(i_d, \Lambda_j) < 0$, and calculates a power residue value of $K_j$ $$K_j^{\hat{}}(1/t_j \bmod q) \bmod p$$

which has $1/t_j$ as an exponent and p as a modulus to thus obtain the common key $K \ (= (g_1^\gamma)^k \bmod p)$.

64. An exclusive key sharing method for a communication system which consists of N terminals (N is an integer of more than 2) connected mutually to allow broadcast communication, wherein secret keys are $\alpha 1$, $\alpha 2$, $\beta 1$, $\beta 2$, $\gamma$, a prime number which is larger than $\alpha 1$, $\alpha 2$, $\beta 1$, $\beta 2$, $\gamma$ and N or a power number of the prime number is p, a measure of (p−1) is q, elements of GF(p) are g1, g2, and a particular terminal number which can be specified by a chairman terminal $\phi$ (to which any terminal can be appointed) is d ($1 \leq d < N-1$), respective terminals i ($1 \leq i \leq N$) hold secret information $\alpha 1_i$, $\alpha 2_i$, $\beta 1_i$, $\beta 2_i$, $\gamma_i$ in secret to satisfy $$\alpha 1 = \Sigma \lambda(i, \Lambda) \times \alpha 1_i \ (\text{sum of } i \in \Lambda \text{ is calculated})$$

(where $\alpha 1_i = \alpha 1 + f_1 \times i^1 + \ldots + f_d \times i^d \bmod q$)

$$\alpha 2 = \Sigma \lambda(i, \Lambda) \times \alpha 2_i \ (\text{sum of } i \in \Lambda \text{ is calculated})$$

(where $\alpha 2_i = \alpha 2 + f_1 \times i^1 + \ldots + f_d \times i^d \bmod q$)

$$\beta 1 = \Sigma \lambda(i, \Lambda) \times \beta 1_i \ (\text{sum of } i \in \Lambda \text{ is calculated})$$

(where $\beta 1_i = \beta 1 + f_1 \times i^1 + \ldots + f_d \times i^d \bmod q$)

$$\beta 2 = \Sigma \lambda(i, \Lambda) \times \beta 2_i \ (\text{sum of } i \in \Lambda \text{ is calculated})$$

(where $\beta 2_i = \beta 2 + f_1 \times i^1 + \ldots + f_d \times i^d \bmod q$)

$$\gamma = \Sigma \lambda(i, \Lambda) \times \gamma_i \ (\text{sum of } i \in \Lambda \text{ is calculated})$$

(where $\gamma_i = \gamma + f_1 \times i^1 + \ldots + f_d \times i^d \bmod q$)

$$\lambda(i, \Lambda) = \Pi\{L/(L-i)\} \ (\text{product of } L \in \Lambda - \{i\} \text{ is calculated})$$

(where $f_1, \ldots, f_d$ are d elements of GF(q), $f_d \neq 0$, and $\Lambda$ is a set of any (d+1) terminals out of the N terminals), and can use public keys of the system $$A = g_1^{\alpha 1} g_2^{\alpha 2} \bmod p, \ B = g_1^{\beta 1} g_2^{\beta 2} \bmod p, \ \Gamma = g_1^\gamma \bmod p,$$

public information $$A_1 = g_1^{\alpha 11} g_2^{\alpha 21} \bmod p, \ldots, A_N = g_1^{\alpha 1N} g_2^{\alpha 2N} \bmod p$$

$$B_1 = g_1^{\beta 11} g_2^{\beta 21} \bmod p, \ldots, B_N = g_1^{\beta 1N} g_2^{\beta 2N} \bmod p$$

$$\Gamma_1 = g_1^{\gamma 1} \bmod p, \ldots, \Gamma_N = g_1^{\gamma N} \bmod p$$

which are calculated by the secret information $\alpha 1_i$, $\alpha 2_i$, $\beta 1_i$, $\beta 2_i$, $\gamma_i$, the prime number p, the measure q, the elements g1, g2, and a Hash function hash ( ), and (1) the chairman terminal generates arbitrarily a non-zero element k of GF(q), and calculates preparatory information $$C1_1 = g_1^k \bmod p, \; C1_2 = g_2^k \bmod p,$$

(2) the chairman terminal calculates exclusive information $$C2_{i1} = \Gamma_{i1} \hat{} (k \times \lambda(i_1, \alpha) \bmod q) \bmod p, \ldots,$$

$$C2_{id} = \Gamma_{id} \hat{} (k \times \lambda(i_d, \alpha) \bmod q) \bmod p$$

based on a set $\alpha$ of the d particular terminals $i_1, \ldots, i_d$, $\lambda(i_1, \alpha), \ldots, (i_d, \alpha)$, and the public information $\Gamma_{i1}, \ldots \Gamma_{id}$, (3) the chairman terminal calculates verification information $$v = A^k B \hat{} \{(c \times k) \bmod q\} \bmod p \; (c = \text{hash}(C1_1, C1_2) \bmod q),$$

$$v_{i1} [= A_{i1}^k B_{i1} \hat{} \{(c \times k) \bmod q\}] \hat{} \{\lambda(i_1, \alpha) \bmod q\} \bmod p, \ldots,$$

$$v_{id} [= A_{id}^k B_{id} \hat{} \{(c \times k) \bmod q\}] \hat{} \{\lambda(i_d, \alpha) \bmod q\} \bmod p$$

and broadcasts the verification information together with the exclusive information $C2_{i1}, \ldots, C2_{id}$, the particular terminal numbers $i_1, \ldots, i_d$ to all terminals, (4) the chairman terminal calculates a common key $$K = \Gamma^k \bmod p,$$

(5) the respective terminals j ($j \neq i_1, \ldots, i_d, \phi$) calculate inverse elements $$E_{i1} = V_{i1}^{(-1)} \bmod p, \ldots, E_{id} = V_{id}^{(-1)} \bmod p$$

of the verification information $v_{i1}, \ldots, v_{id}$, calculate $\lambda(j, \Lambda_j), \lambda(i_1, \{j, i_1\}), \ldots, \lambda(i_d, \{j, i_d\})$ and $$T_j = \{\Pi(j-L)\}/j \; (\text{product of } L \in \Lambda_j - \{j\} \text{ is calculated})$$

where $\Lambda_j = \{j, i_1, \ldots, i_d\}$, calculate a verification equation $$\{C1_1 \hat{} ((\alpha 1_j + \beta 1_j \times c) \times \lambda(j, \Lambda_j) T_j \bmod q)\}$$

$$\times \{C1_2 \hat{} ((\alpha 2_j + \beta 2_j \times c) \times \lambda(j, \Lambda_j) T_j \bmod q)\}$$

$$\times v_{i1} \hat{} \{\lambda(i_1, \{j, i_1\}) \times T_j \bmod q\} \times \ldots$$

$$\times v_{id} \hat{} \{\lambda(i_d, \{j, i_d\}) \times T_j \bmod q\} \bmod p = v \hat{} \{T_j \bmod q\} \bmod p \; (c = \text{hash}(C1_1, C1_2) \bmod q)$$

by using the public keys A, B of the system, and own secret information $\alpha 1_j, \alpha 2_j, \beta 1_j, \beta 2_j$, replace $\lambda(i_1, \{j, i_1\}) \times T_j$, with $|\lambda(i_1, \{j, i_1\}) \times T_j|$ and replace $V_{i1}$ with $E_{i1}$ if $\lambda(i_1, \{j, i_1\}) \times T_j < 0$ while replace $\lambda(i_d, \{j, i_d\}) \times T_j$ with $|\lambda(i_d, \{j, i_d\}) \times T_j|$ and replace $V_{id}$ with $E_{id}$ if $\lambda(i_d, \{j, i_d\}) \times T_j < 0$, and then stop key sharing unless the verification equation is satisfied and, if the verification equation is satisfied, (6) the respective terminals j calculate inverse elements $$F_{i1} = C2_{i1}^{(-1)} \bmod p, \ldots, F_{id} = C2_{id}^{(-1)} \bmod p$$

of the exclusive information $C2_{i1}, \ldots, C2_{id}$, calculates cession keys $$K_j = C1 \hat{} \{\gamma_j \times \lambda(j, \Lambda_j) \times T_j \bmod q\} \times C2_{i1} \hat{} \{\lambda(i_1, \{j, i_1\}) \times T_j \bmod q\} \times \ldots$$

$$\times C2_{id} \hat{} \{\lambda(i_d, \{j, i_d\}) \times t_j \bmod q\} \bmod p$$

by using the $t_j$, the $\lambda(j, \Lambda_j), \lambda(i_1, \{j, i_1\}), \ldots, \lambda(i_d, \{j, i_d\})$, the preparatory information C1, the exclusive information $C2_{i1}, \ldots, C2_{id}$, and own secret information $\gamma_j$, replace $\lambda(i_1, \{j, i_1\}) \times T_j$ with $|\lambda(i_1, \{j, i_1\}) \times T_j|$ and replace $C2_{i1}$ with $F_{i1}$ if $\lambda(i_1, \{j, i_1\}) \times T_j < 0$ while replace $\lambda(i_d, \{j, i_d\}) \times T_j$ with $|\lambda(i_d, \{j, i_d\}) \times T_j|$ and replace $C2_{id}$ $F_{id}$ if $\lambda(i_d, \{j, i_d\}) \times T_j < 0$, and calculates a power residue value of $K_j$ $$K_j \hat{} (1/T_j \bmod q) \bmod p$$

which has $1/T_j$ as an exponent and p as a modulus to thus obtain the common key K ($= (g_1^\gamma)^k \bmod p$).

65. An exclusive key sharing method according to claims 57, 58, 60, 61, 63 or 64, wherein the chairman terminal calculates the inverse elements of the exclusive information or the verification information and broadcasts them to all terminals.

66. An exclusive key sharing method according to claims 1 to 19, 21 to 26, 30, 41, 44, 45, 49 to 54, or 56 to 64, wherein the multiplication operation is caused to correspond to an addition operation on a curve such as an elliptic curve on any finite field.

\* \* \* \* \*